(12) United States Patent
Veselova et al.

(10) Patent No.: US 12,554,694 B2
(45) Date of Patent: Feb. 17, 2026

(54) DATABASE SYSTEM WITH GEOSPATIAL DATA AND METHODS FOR USE THEREWITH

(71) Applicant: Ocient Holdings LLC, Chicago, IL (US)

(72) Inventors: Anna Veselova, Chicago, IL (US); Greg R. Dhuse, Chicago, IL (US); Richard George Wendel, III, Cincinnati, OH (US); Benjamin Daniel Rabe, Sandy, UT (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/802,198

(22) Filed: Aug. 13, 2024

(65) Prior Publication Data

US 2025/0028700 A1 Jan. 23, 2025

Related U.S. Application Data

(63) Continuation of application No. 18/355,505, filed on Jul. 20, 2023, now Pat. No. 12,117,986.

(51) Int. Cl.
*G06F 16/00* (2019.01)
*G06F 16/22* (2019.01)
(Continued)

(52) U.S. Cl.
CPC ...... *G06F 16/2246* (2019.01); *G06F 16/2455* (2019.01); *G06F 16/284* (2019.01); *G06F 16/29* (2019.01)

(58) Field of Classification Search
CPC ............. G06F 16/2246; G06F 16/2455; G06F 16/284; G06F 16/29; G06F 16/2272
See application file for complete search history.

(56) References Cited

U.S. PATENT DOCUMENTS

| 5,548,770 A | 8/1996 | Bridges |
| 6,230,200 B1 | 5/2001 | Forecast |

(Continued)

OTHER PUBLICATIONS

A new high performance fabric for HPC, Michael Feldman, May 2016, Intersect360 Research.
(Continued)

*Primary Examiner* — Alexander Khong
(74) *Attorney, Agent, or Firm* — Garlick & Markison; Timothy W. Markison

(57) ABSTRACT

A database system operates by: executing a query against a relational database table indicating a predicate applied to geospatial data of a geospatial data column, based on: applying an inner predicate to internal level nodes when traversing a set of internal levels of the each tree-based index structure to identify a first subset of leaf nodes in a plurality of leaf nodes of the each tree-based index structure based on identifying internal nodes having internal node bounding boxes meeting the inner predicate; and applying a leaf predicate to only leaf nodes included in the first subset of leaf nodes of the tree-based index structure to identify a second subset of leaf nodes of the first subset of leaf nodes corresponding to only leaf nodes of the first subset of leaf nodes having corresponding leaf node bounding boxes meeting the leaf predicate; wherein a query resultant of the query is generated based on geospatial objects of the geospatial data column for ones of a plurality of rows of the relational database table indicated by the second subset of leaf nodes.

16 Claims, 88 Drawing Sheets

(51) Int. Cl.
　　　*G06F 16/2455*　　(2019.01)
　　　*G06F 16/28*　　　(2019.01)
　　　*G06F 16/29*　　　(2019.01)

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 2001/0051949 | A1 | 12/2001 | Carey |
| 2002/0032676 | A1 | 3/2002 | Reiner |
| 2002/0188405 | A1* | 12/2002 | Luo .................. G06F 7/36 702/14 |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0124500 | A1* | 5/2013 | Beavin .............. G06F 16/24534 707/E17.017 |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2021/0406235 | A1* | 12/2021 | Killamsetti ......... G06F 16/2272 |
| 2021/0406236 | A1* | 12/2021 | Killamsetti ......... G06F 16/9027 |
| 2022/0043690 | A1 | 2/2022 | Kondiles |
| 2022/0043755 | A1 | 2/2022 | Kondiles |
| 2022/0043787 | A1 | 2/2022 | Kondiles |
| 2022/0382751 | A1 | 12/2022 | Dhuse |
| 2023/0091018 | A1 | 3/2023 | Arnold |
| 2023/0107652 | A1 | 4/2023 | Veselova |
| 2024/0111773 | A1* | 4/2024 | Li ..................... G06F 16/2272 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

Thomason et al., Context Trees: Augmenting Geospatial Trajectories with Context, ACM 2016, pp. 1-37 (Year: 2016).

\* cited by examiner database system 10 computing device 18 computing device 18 computing device 18 node 37 node 37 node 37 node 37

FIG. 21 query processing system 2502 query execution module 2504 database system 10 database system 10 query execution module 2504 database system 10 database system 10 query processing system 2510 query processing system 2510 database system 10 record processing and storage system 2505 segment generator 2617 database system 10 database system 10 query processing system 2802 overlapping geospatial region determination module 3315

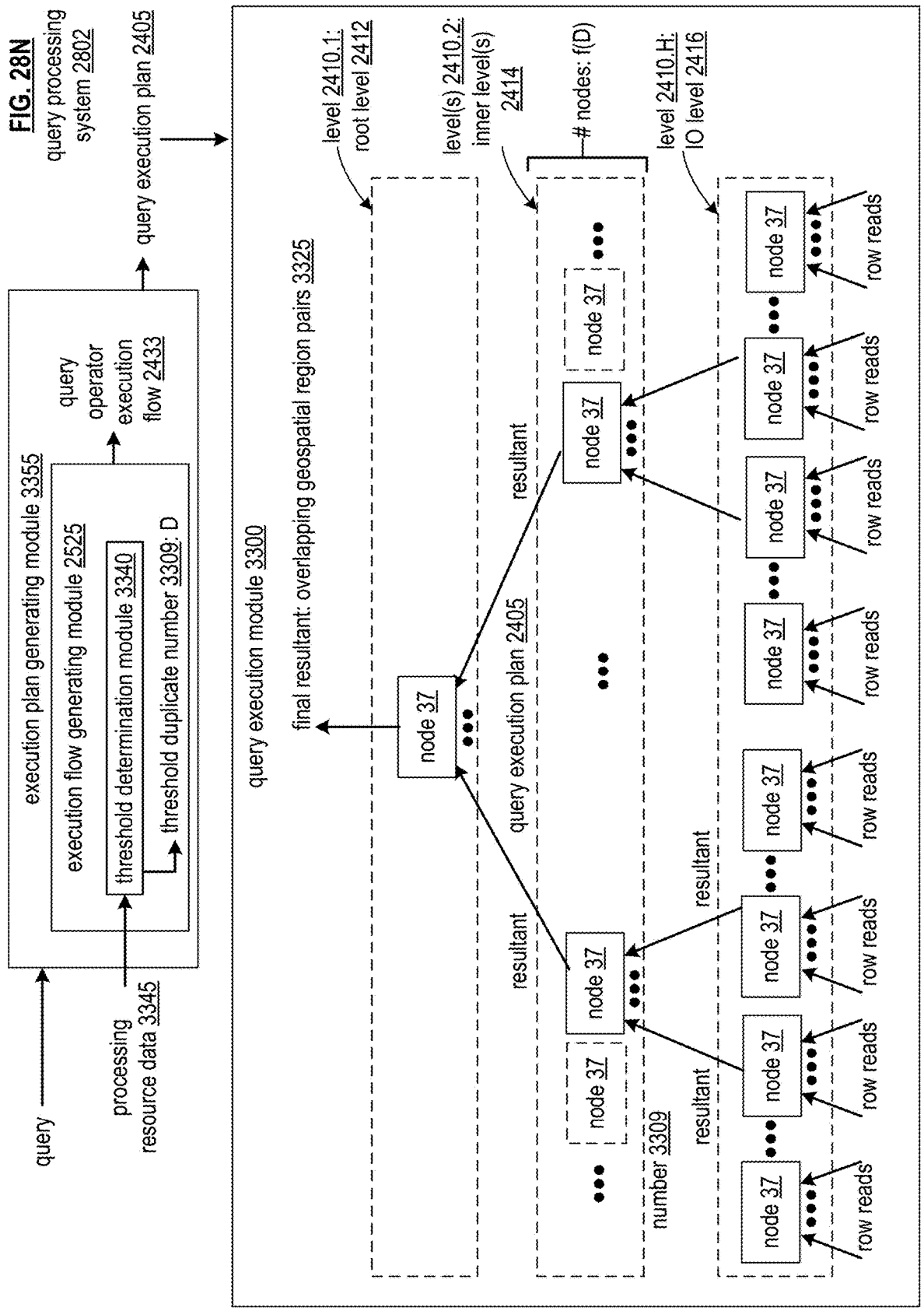

database system 10

DATABASE SYSTEM WITH GEOSPATIAL DATA AND METHODS FOR USE THEREWITH

CROSS-REFERENCE TO RELATED APPLICATIONS

The present U.S. Utility Patent application claims priority pursuant to 35 U.S.C. § 120 as a continuation of U.S. Utility application Ser. No. 18/355,505, entitled "STRUCTURING GEOSPATIAL INDEX DATA FOR ACCESS DURING QUERY EXECUTION VIA A DATABASE SYSTEM", filed Jul. 20, 2023, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 28N is a schematic block diagram of a query processing system that selects a threshold duplicate number corresponding to a number of nodes participating in a portion of a query execution plan:

DETAILED DESCRIPTION OF THE INVENTION

Figure 1:
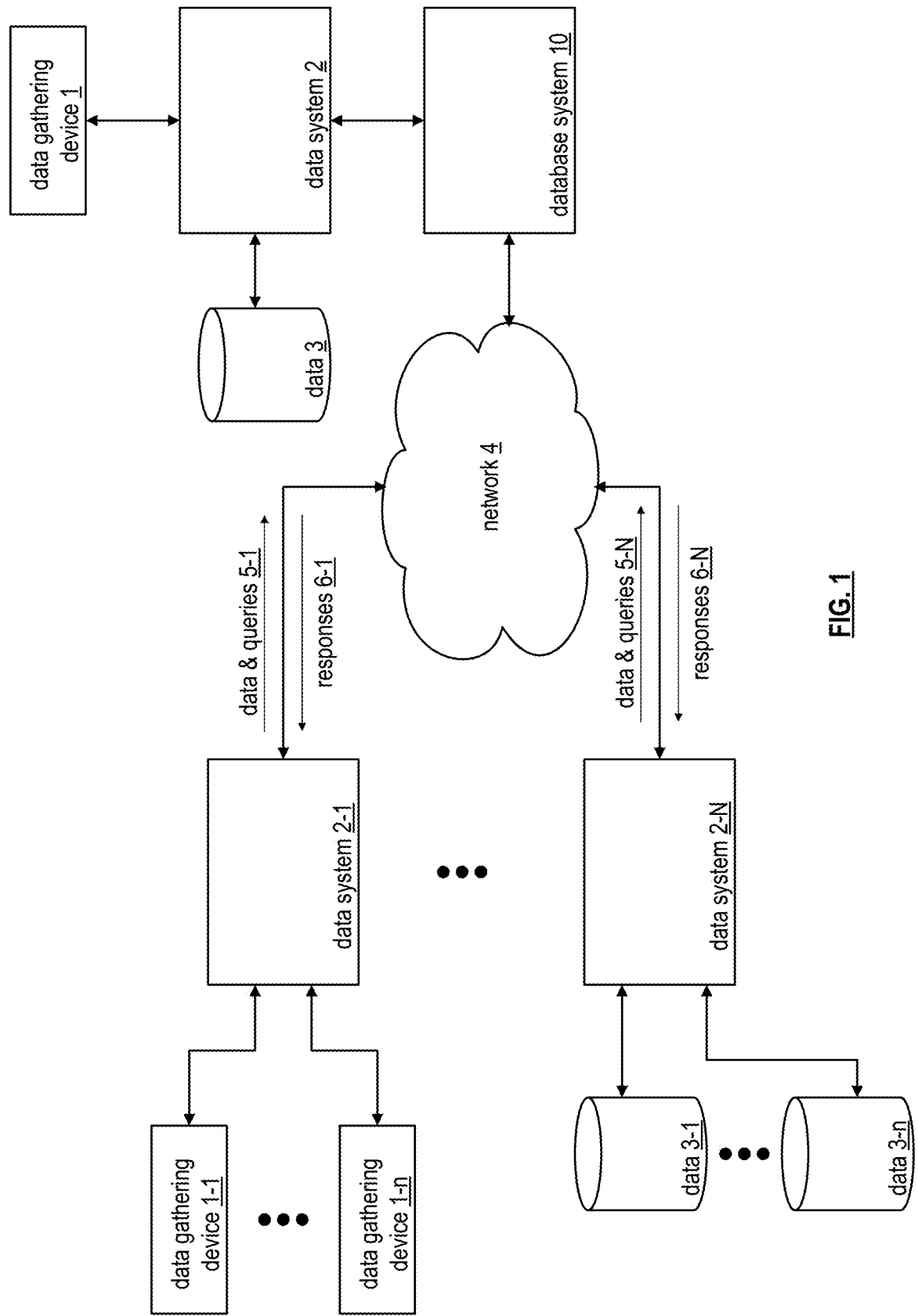
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
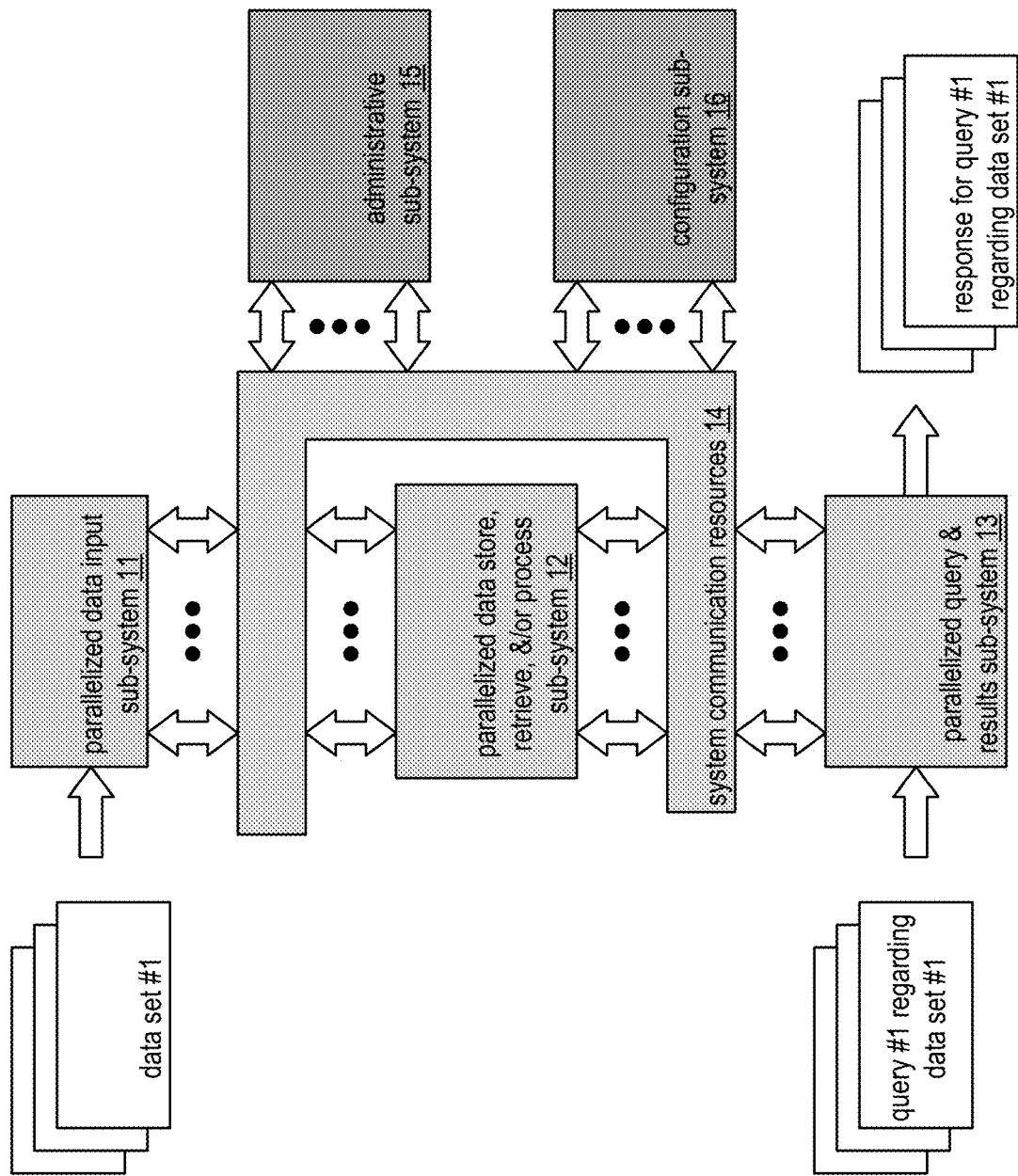
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
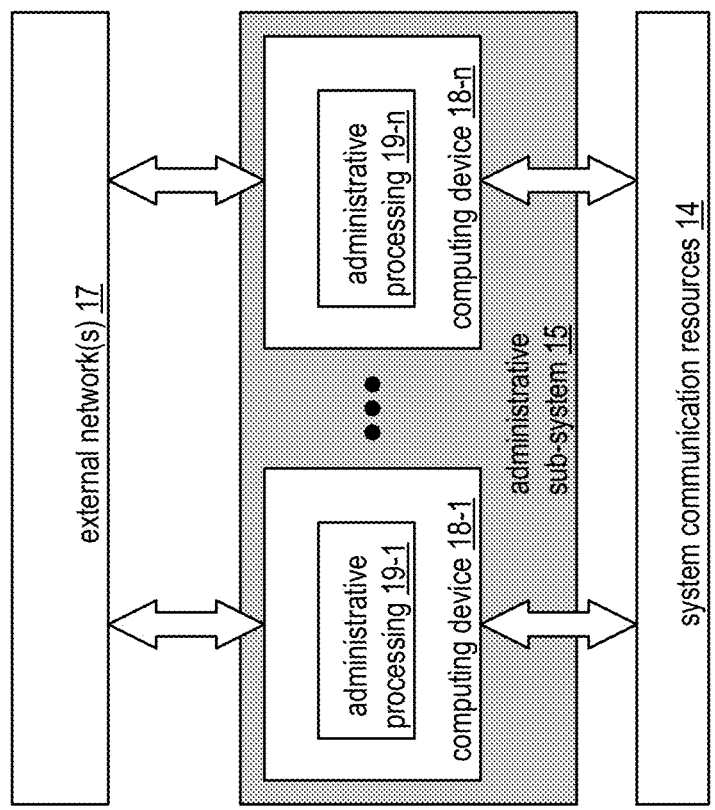
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-$n$. Each of the computing devices executes an administrative processing function utilizing a corresponding administrative processing of administrative processing 19-1 through 19-$n$ (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
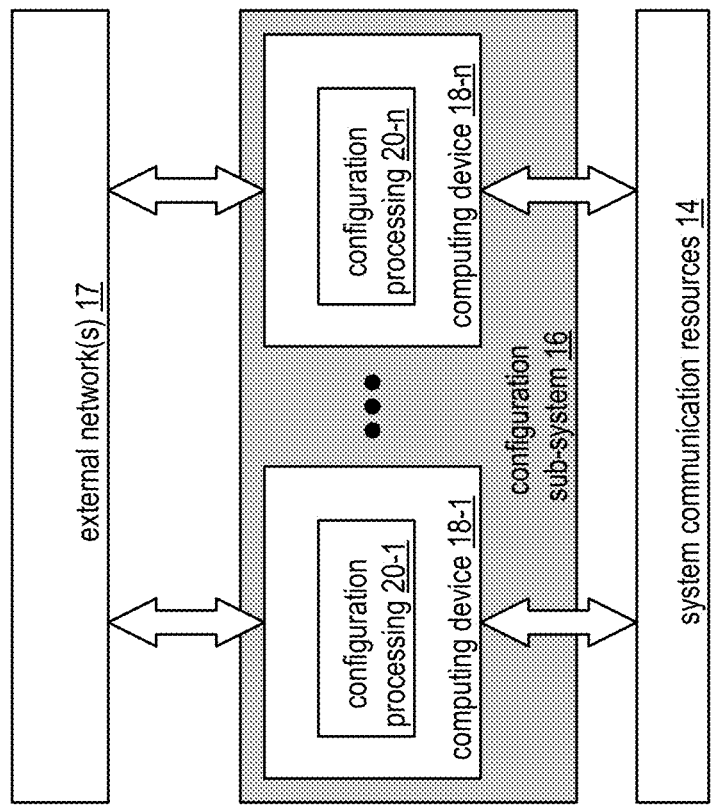
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-$n$. Each of the computing devices executes a configuration processing function 20-1 through 20-$n$ (which includes a plurality of configuration operations) that coordinates system level configurations of the database system. Each computing device is coupled to the external network 17 of FIG. 2, or networks, and to the system communication resources 14 of FIG. 1A.

Figure 4:
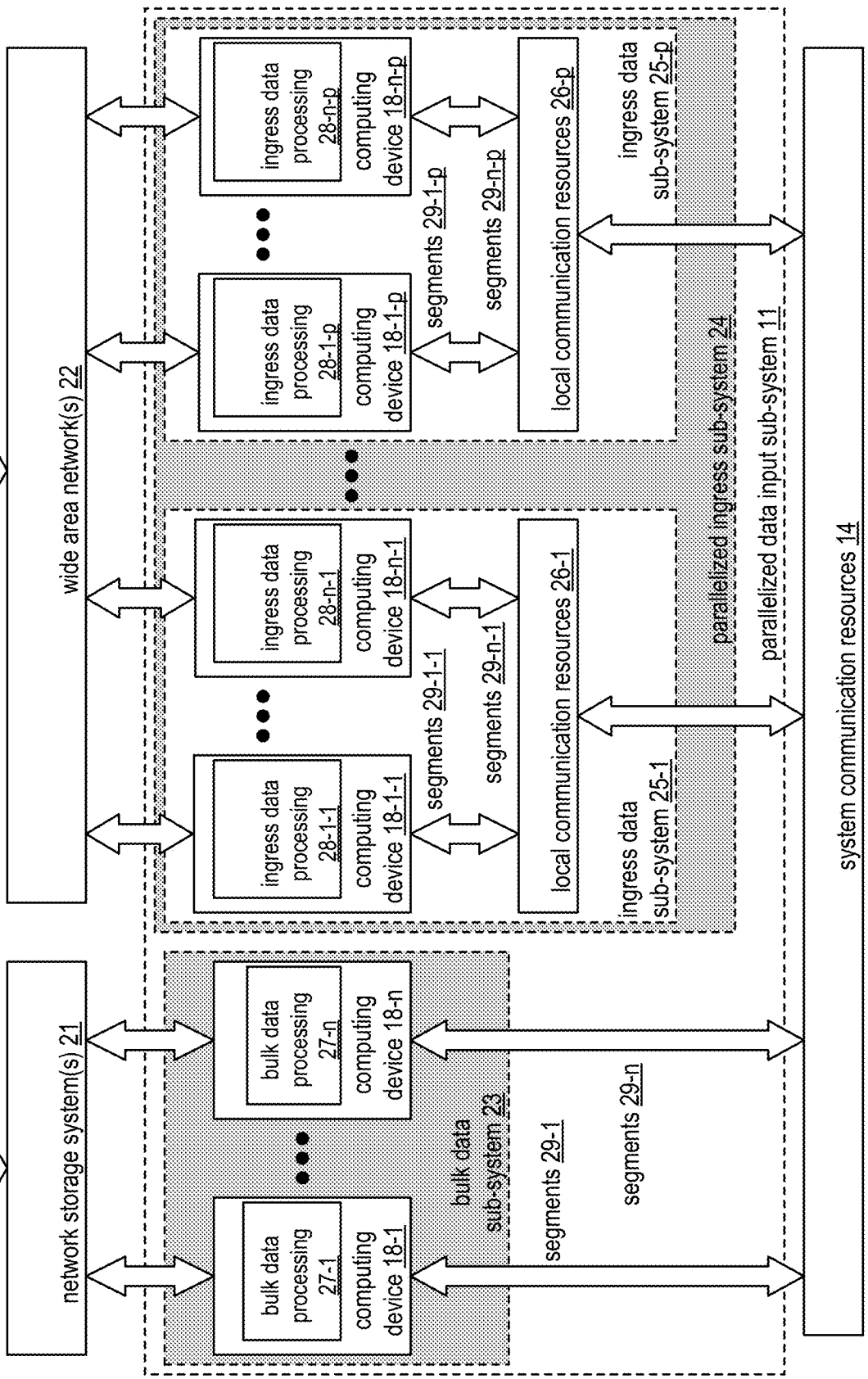
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-$n$. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-$p$ that each include a local communication resource of local communication resources 26-1 through 26-$p$ and a plurality of computing devices 18-1 through 18-$n$. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-$p$, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
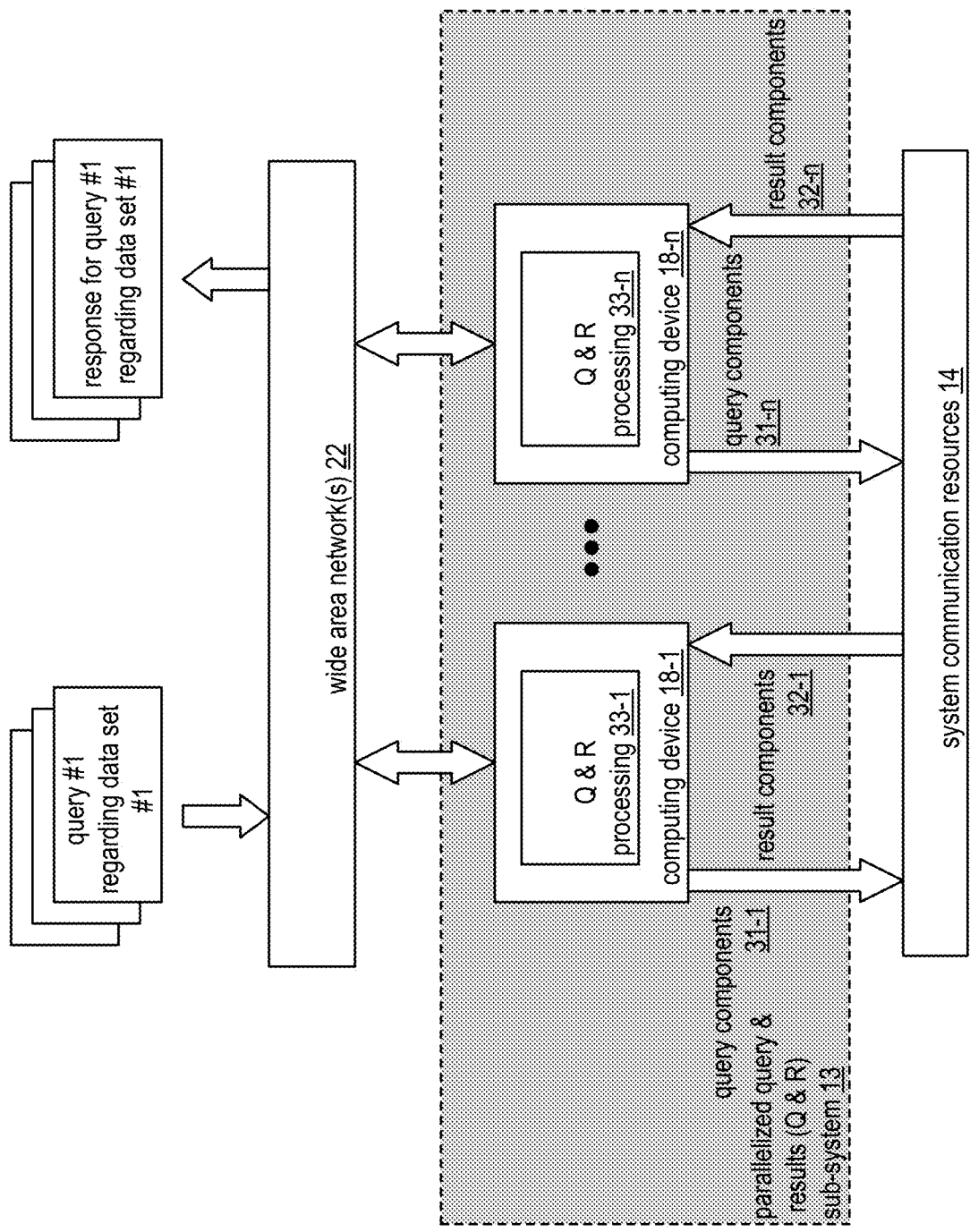
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-$n$. Each of the computing devices executes a query (Q) & response (R) processing function 33-1 through 33-$n$. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-$n$. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
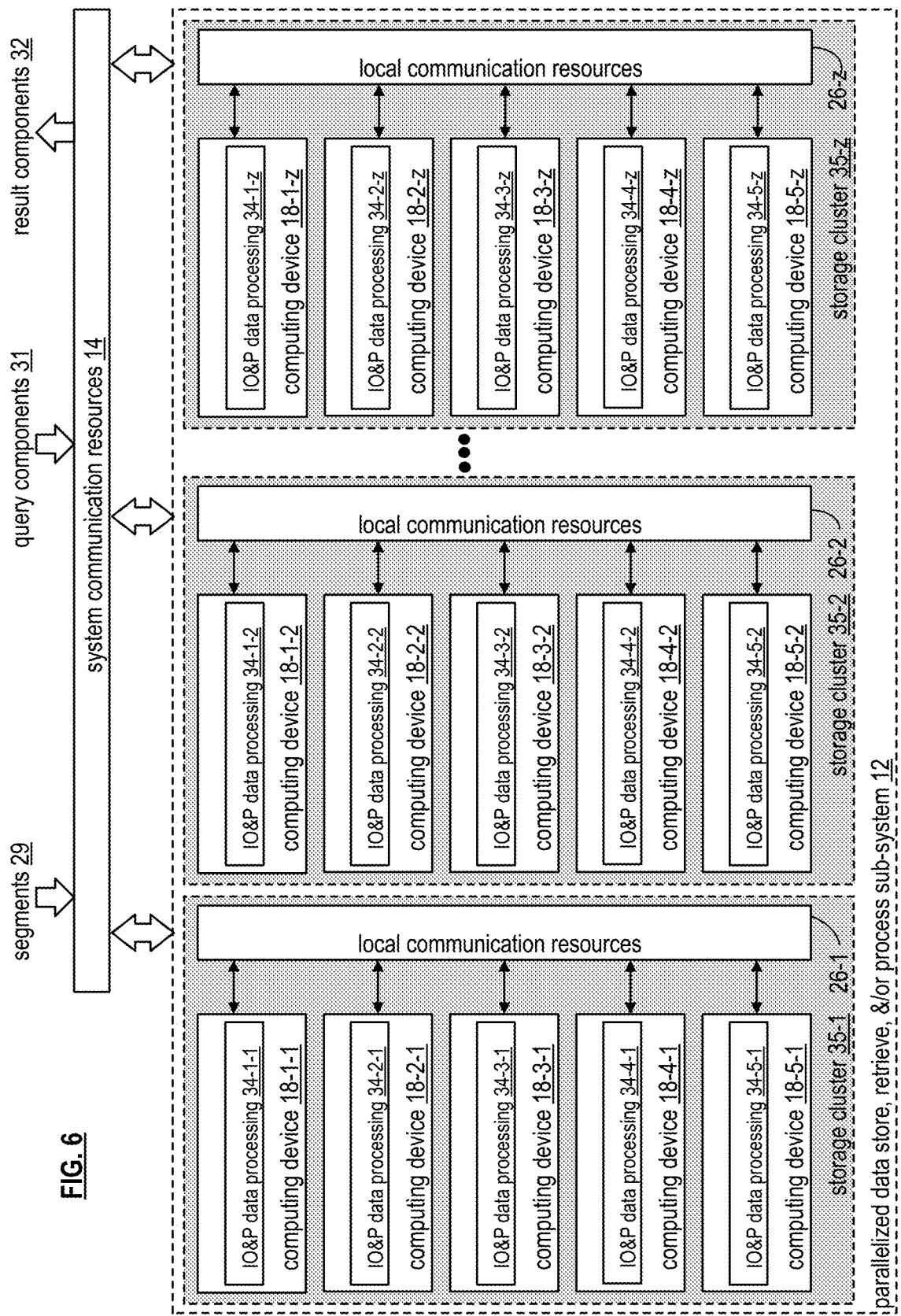
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-$z$. Each storage cluster includes a corresponding local communication resource 26-1 through 26-$z$ and a number of computing devices 18-1 through 18-5.

Each computing device executes an input, output, and processing (IO & P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-$n$ are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
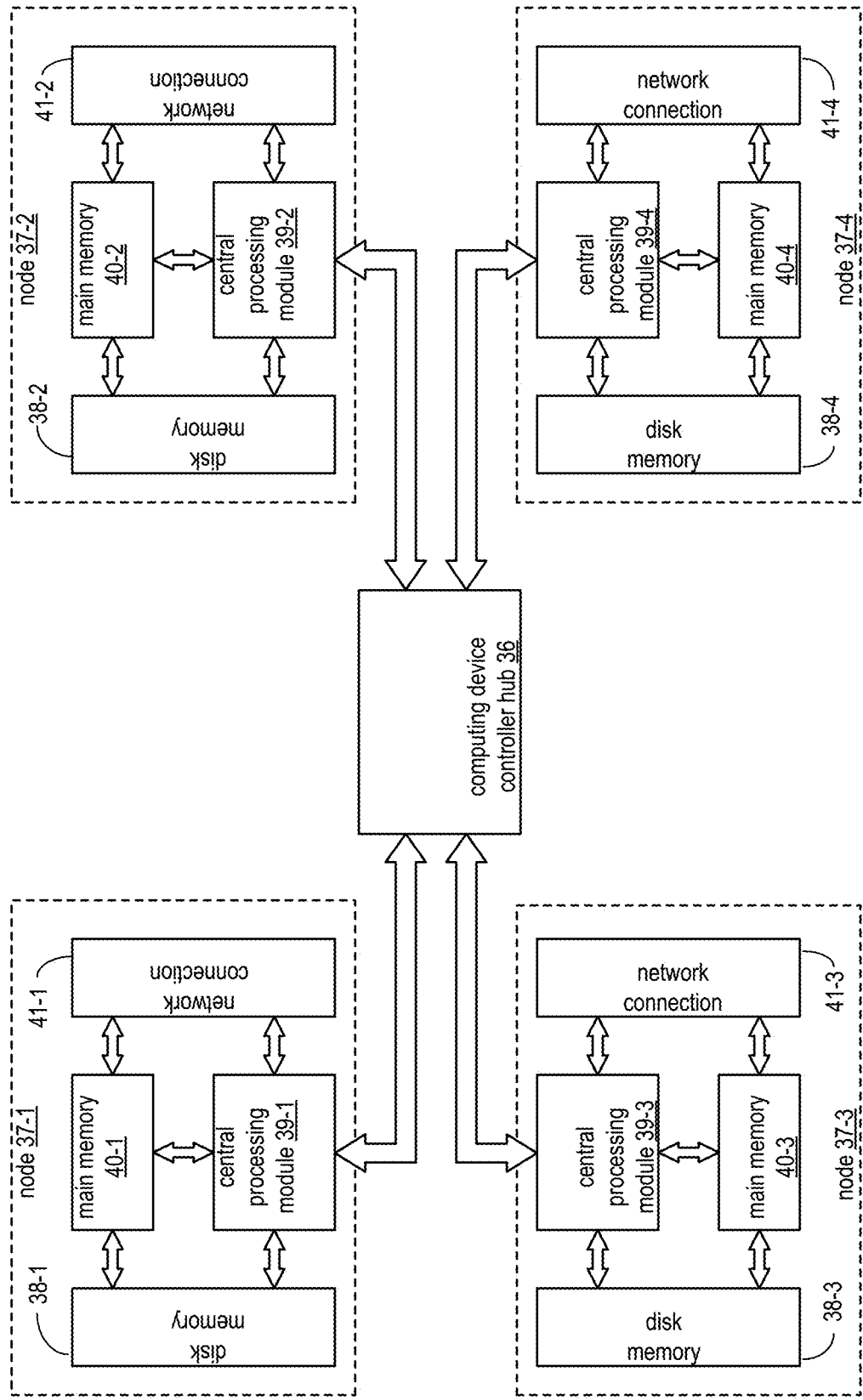
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
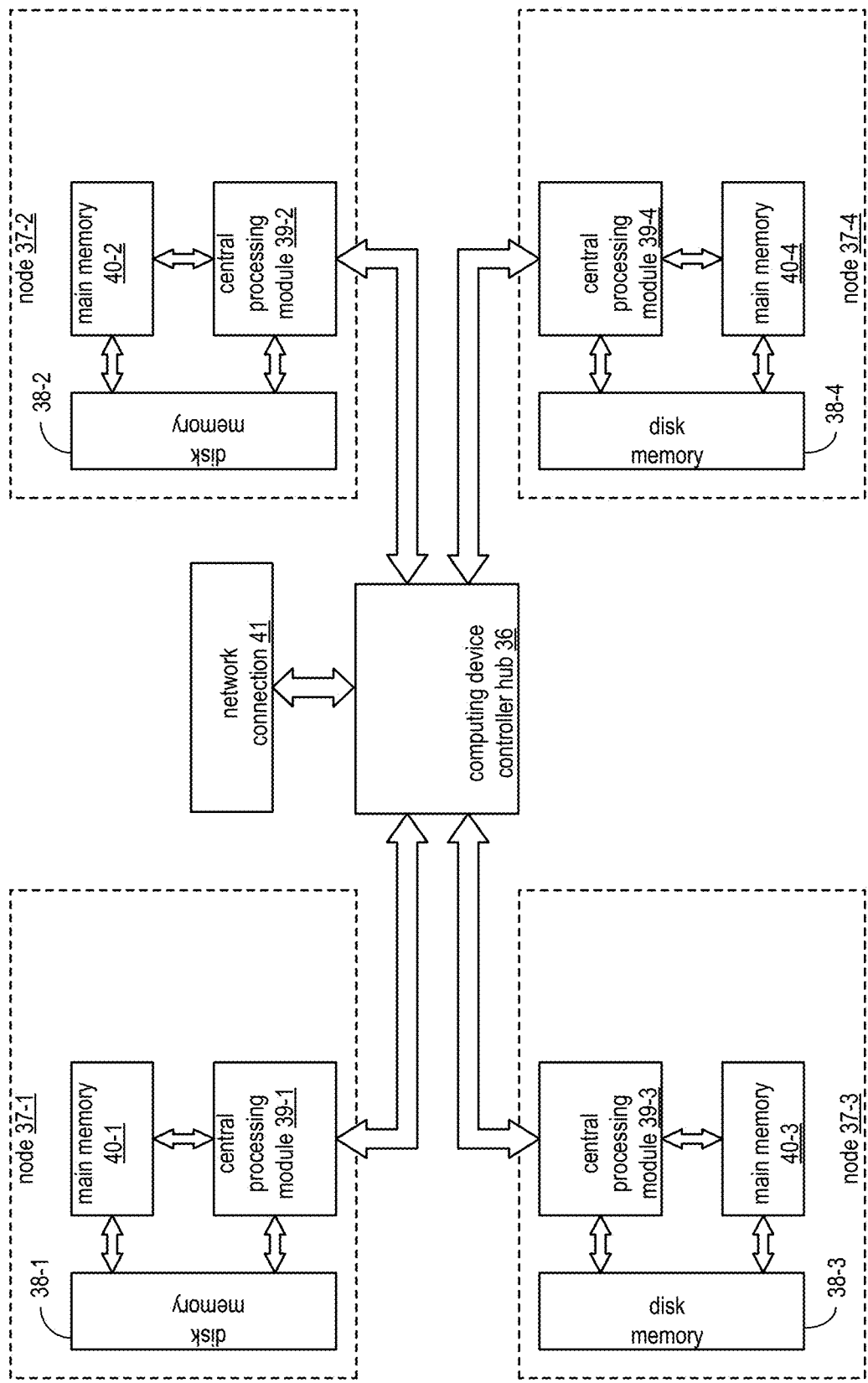
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
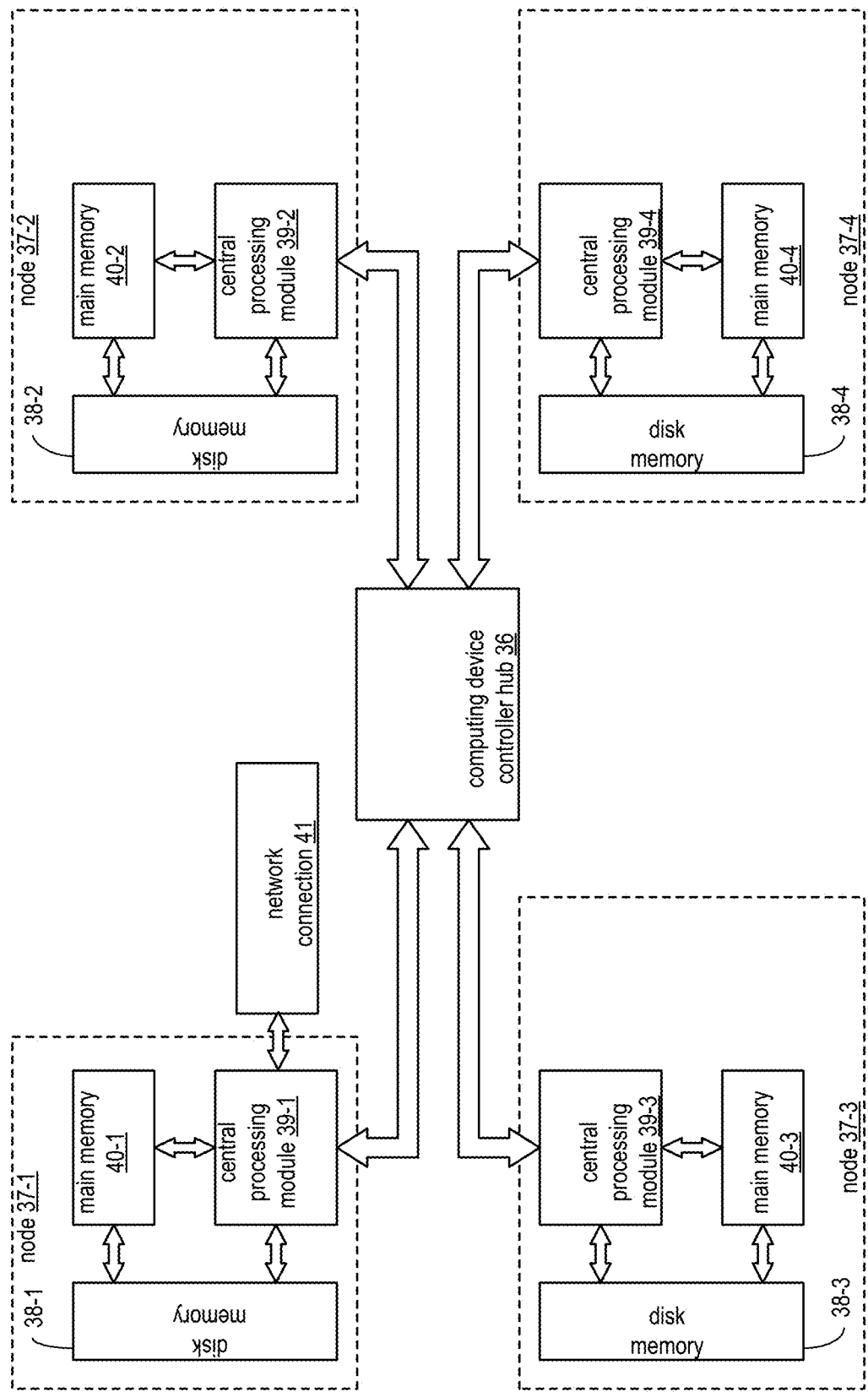
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
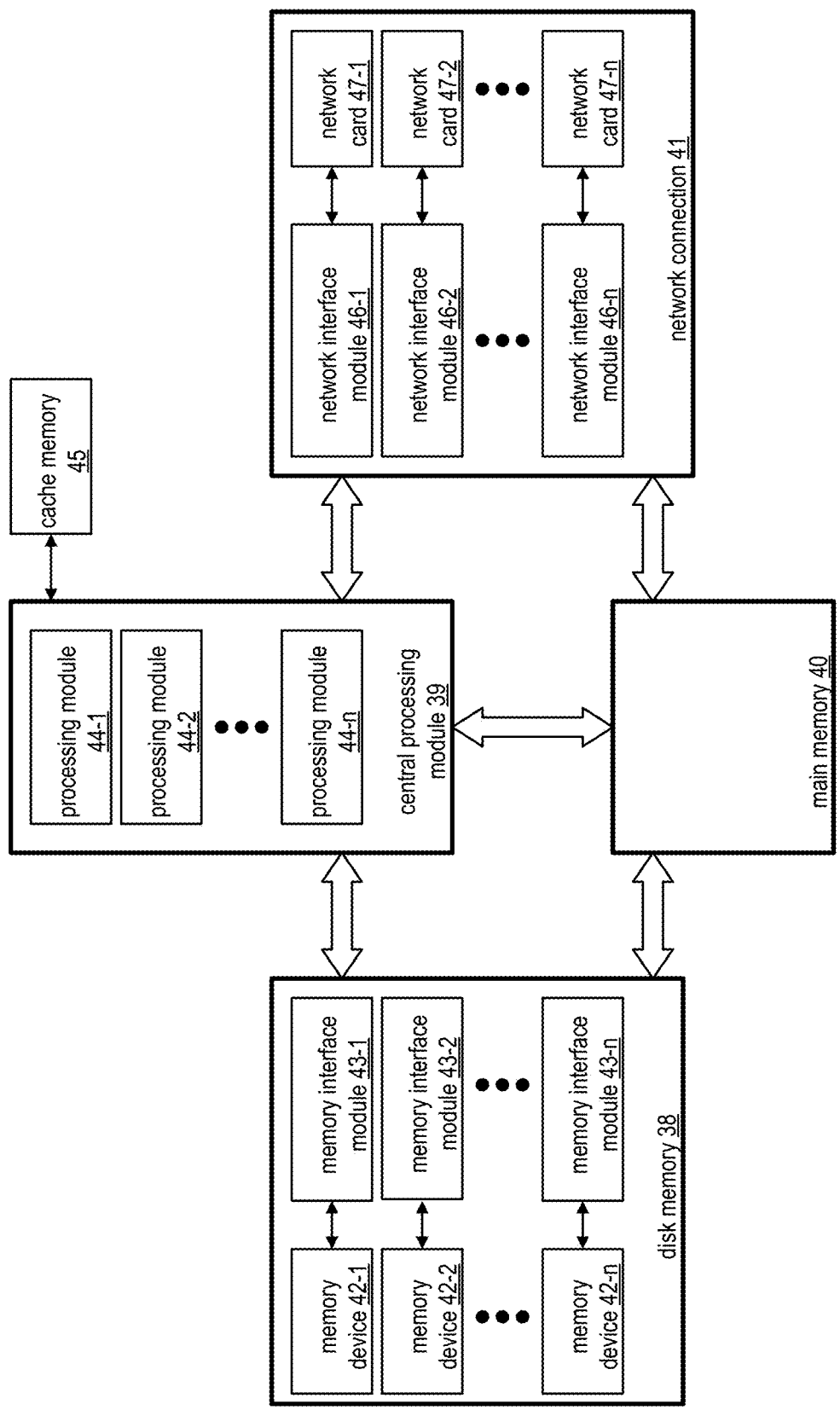
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-$n$ and an associated one or more cache memory 45. A processing module is as defined at the end of the detailed description.

The disk memory 38 includes a plurality of memory interface modules 43-1 through 43-$n$ and a plurality of memory devices 42-1 through 42-$n$ (e.g., non-volatile memory). The memory devices 42-1 through 42-$n$ include, but are not limited to, solid state memory, disk drive memory, cloud storage memory, and other non-volatile memory. For each type of memory device, a different memory interface module 43-1 through 43-$n$ is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-$n$ and a plurality of network cards 47-1 through 47-$n$. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-$n$ include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
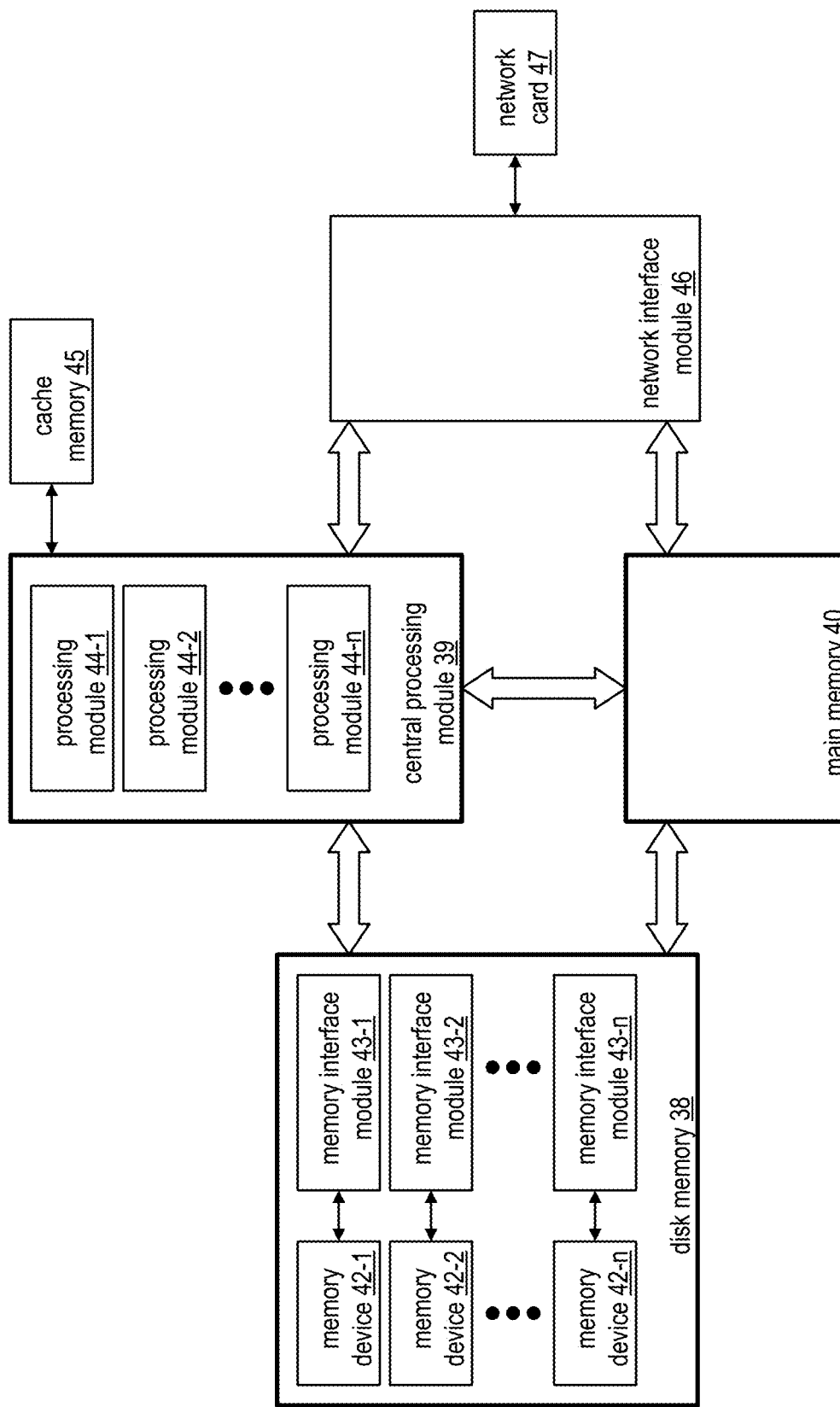
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
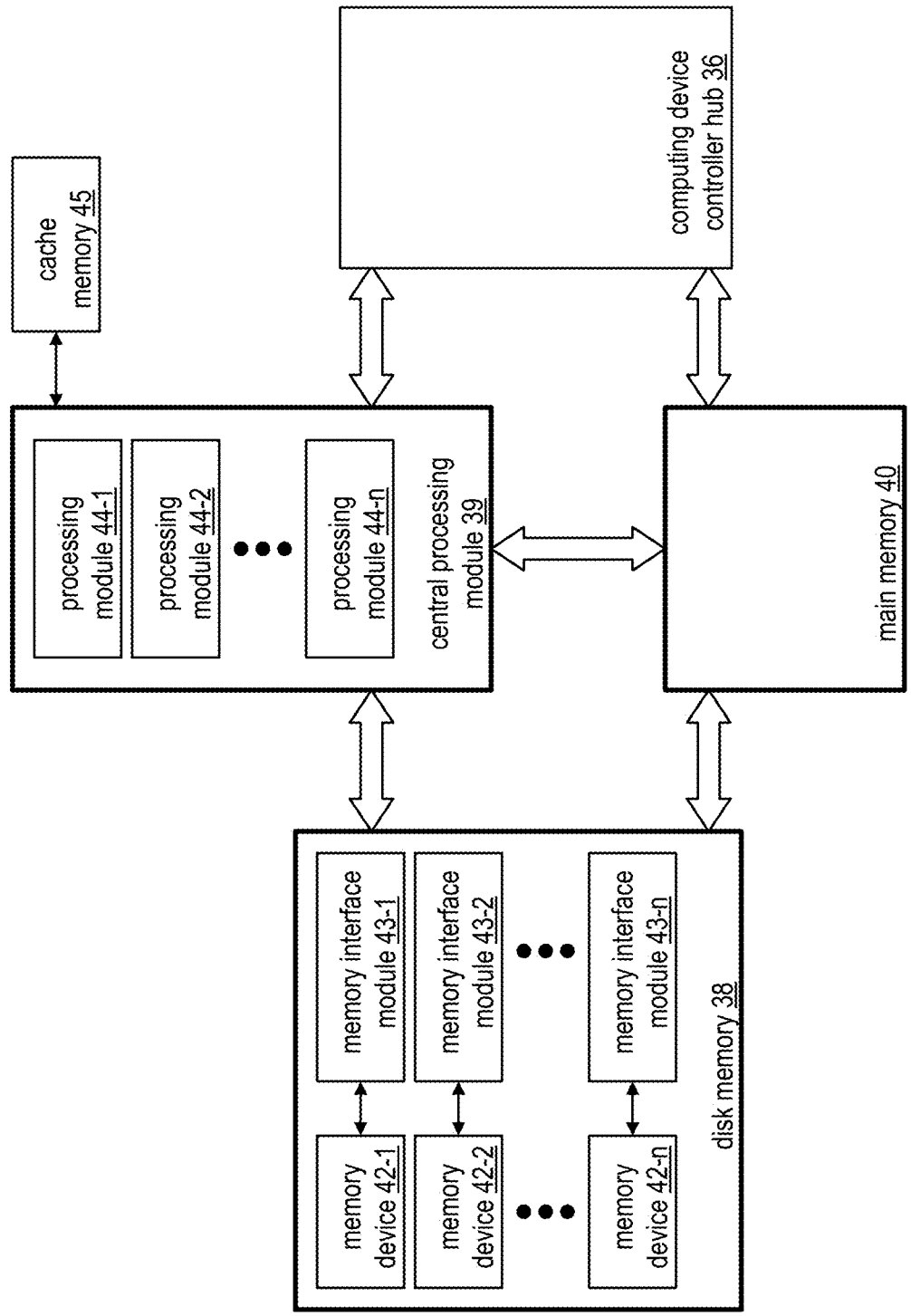
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
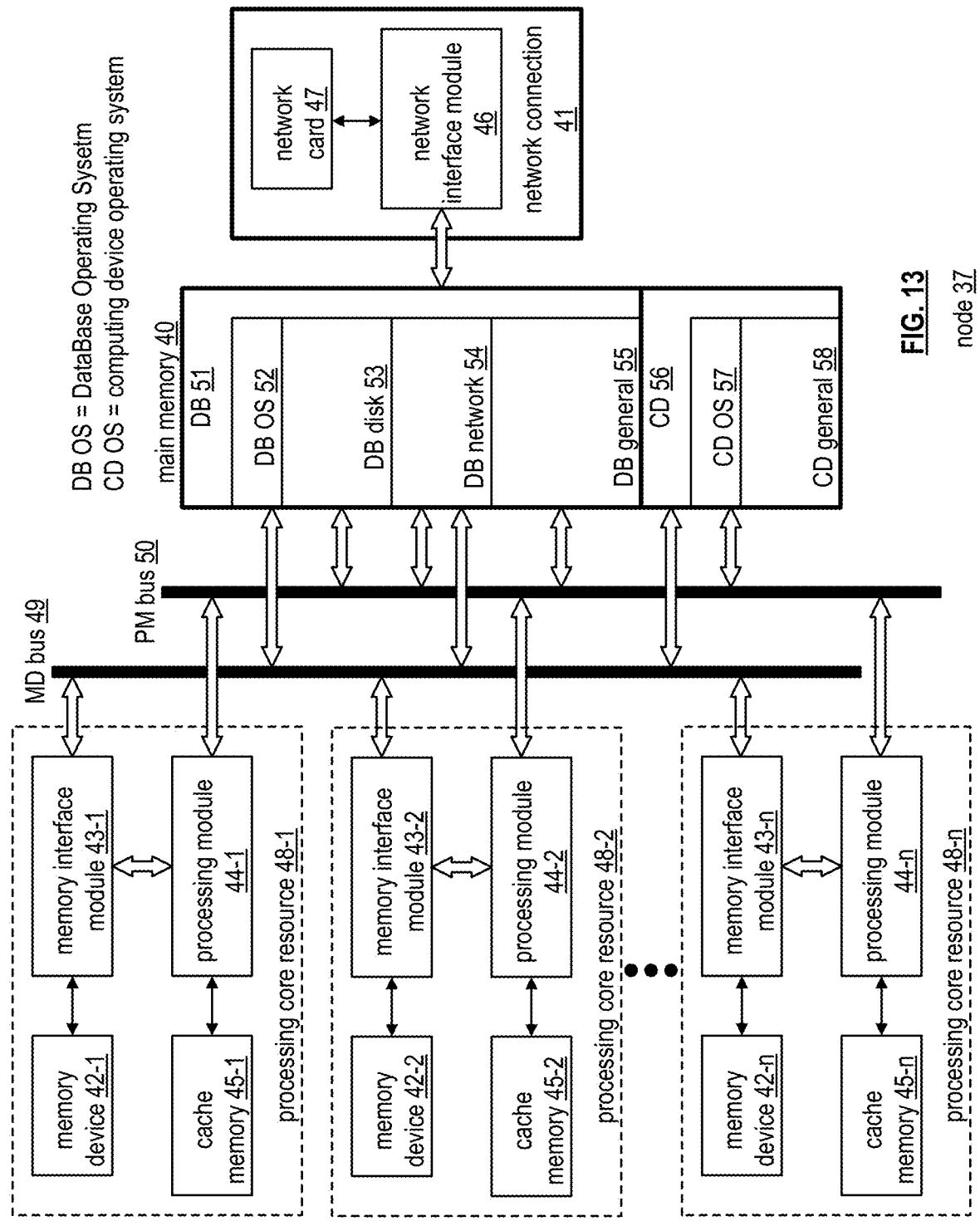
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
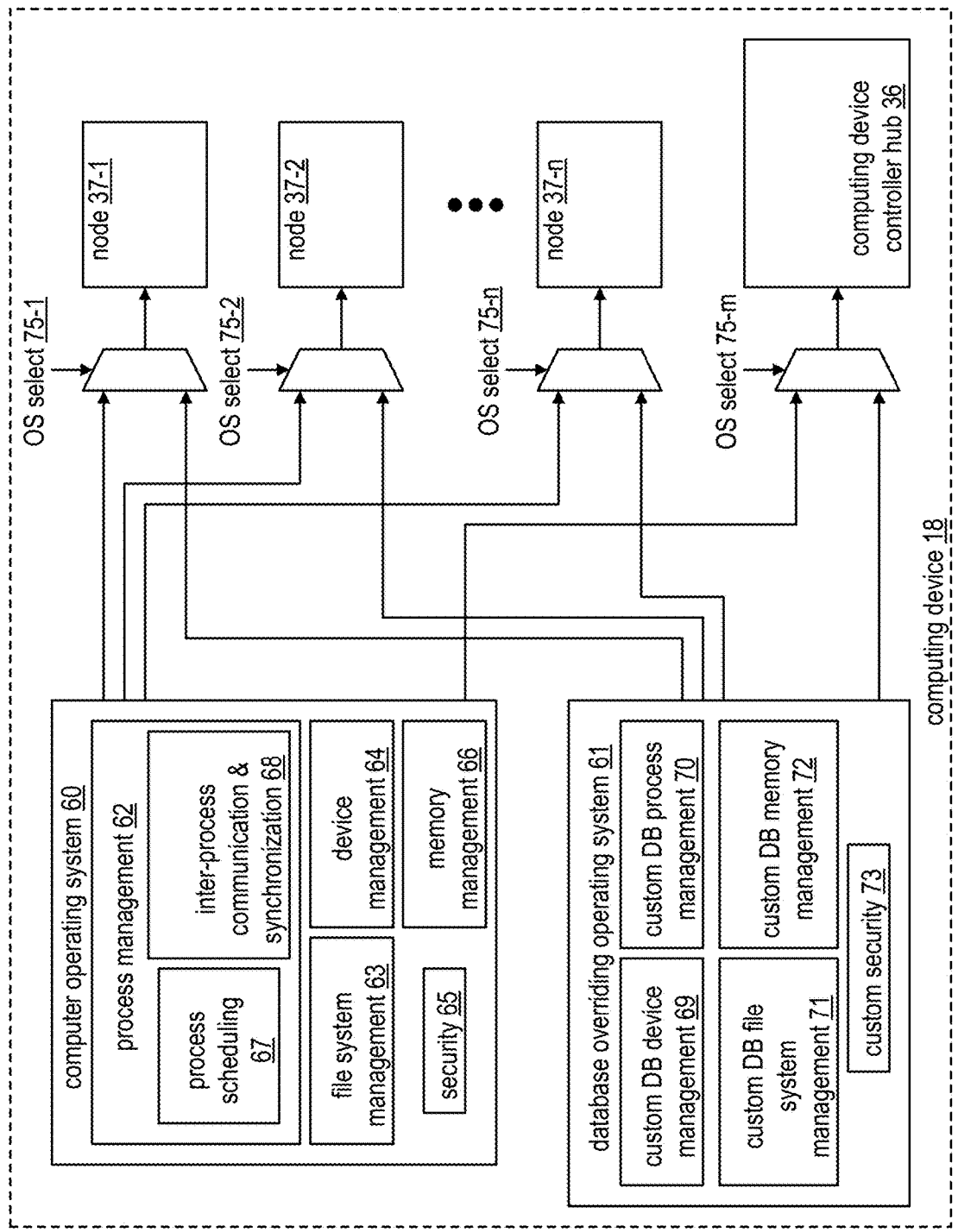
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
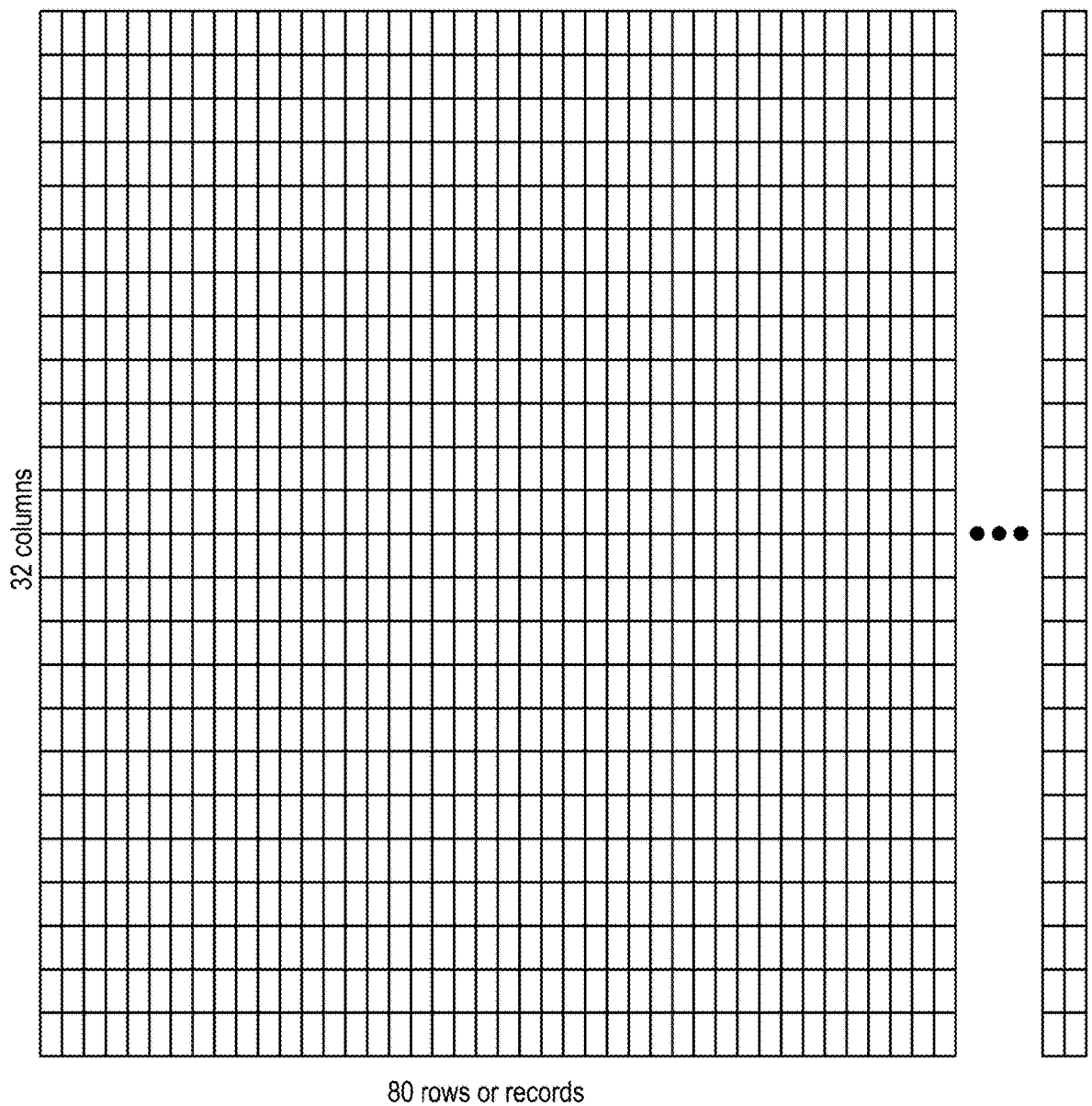

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
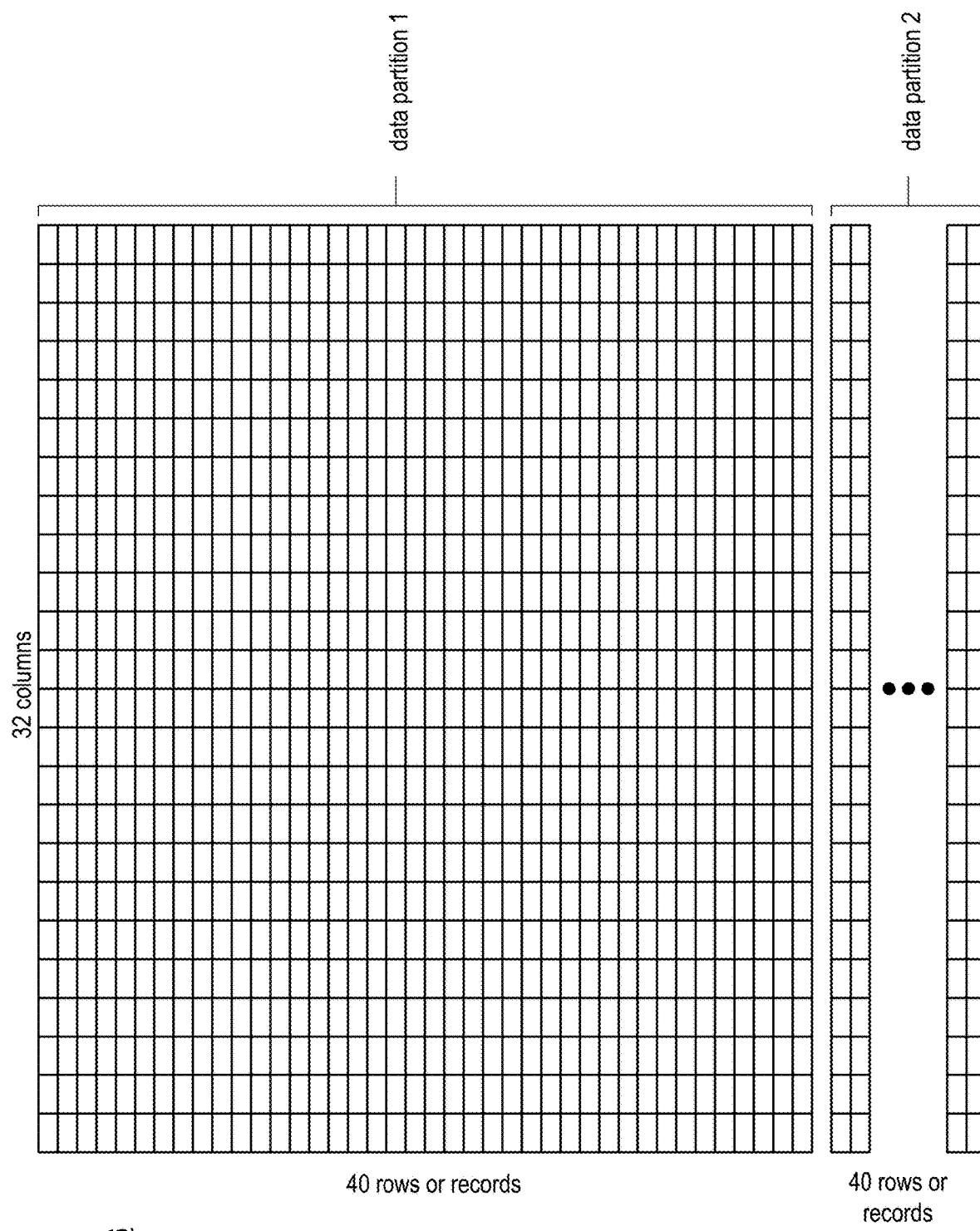

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
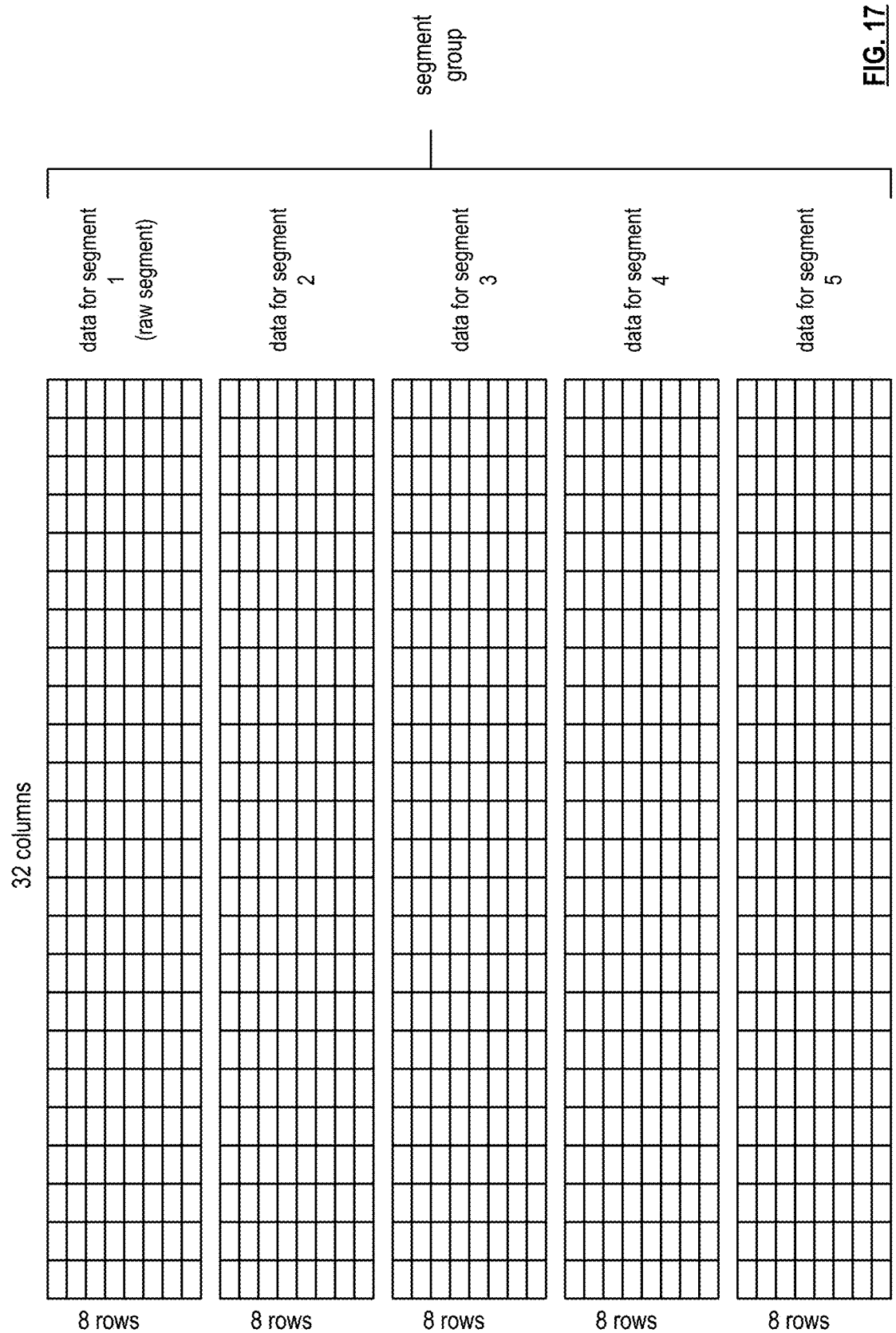

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
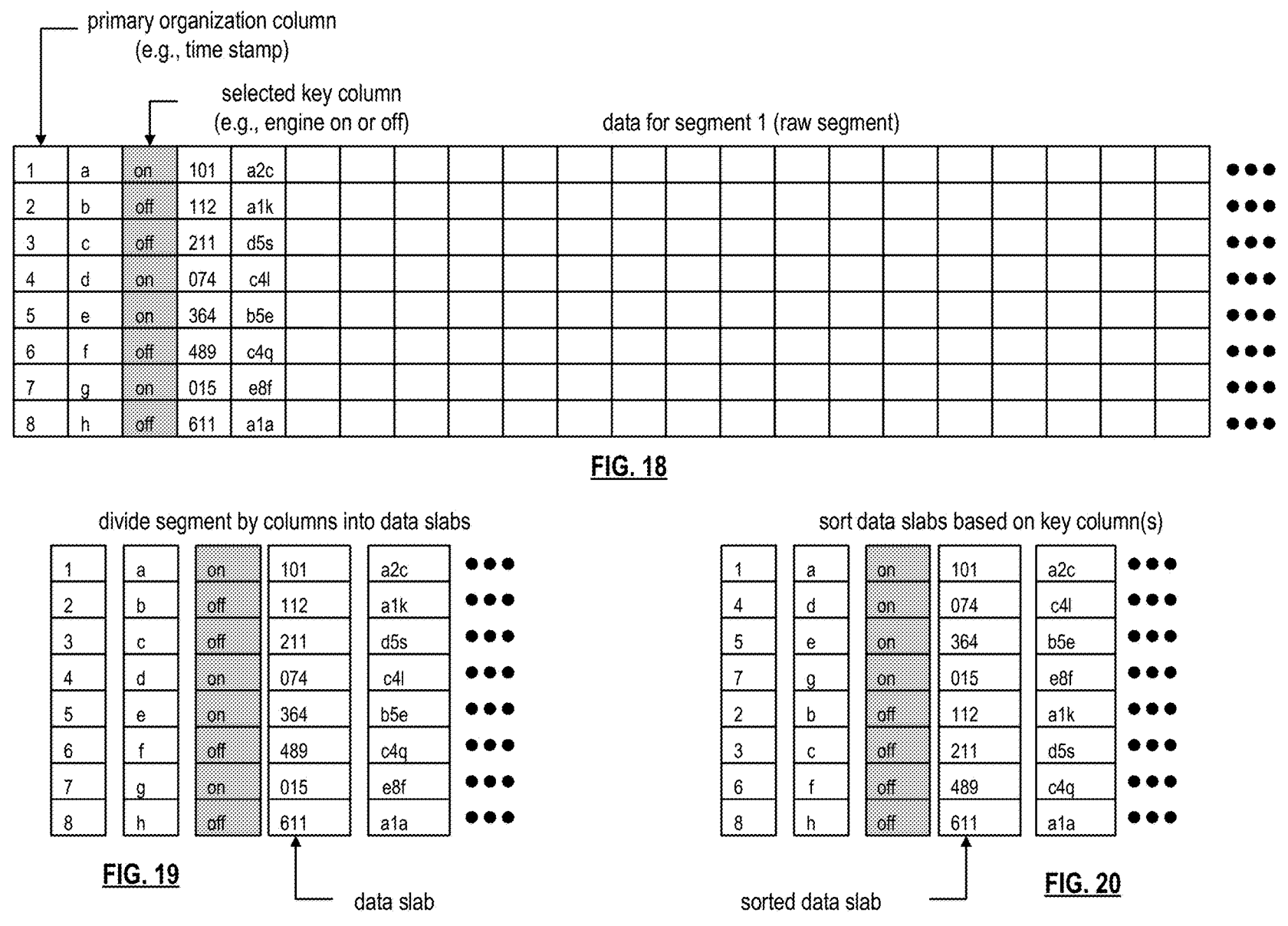

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
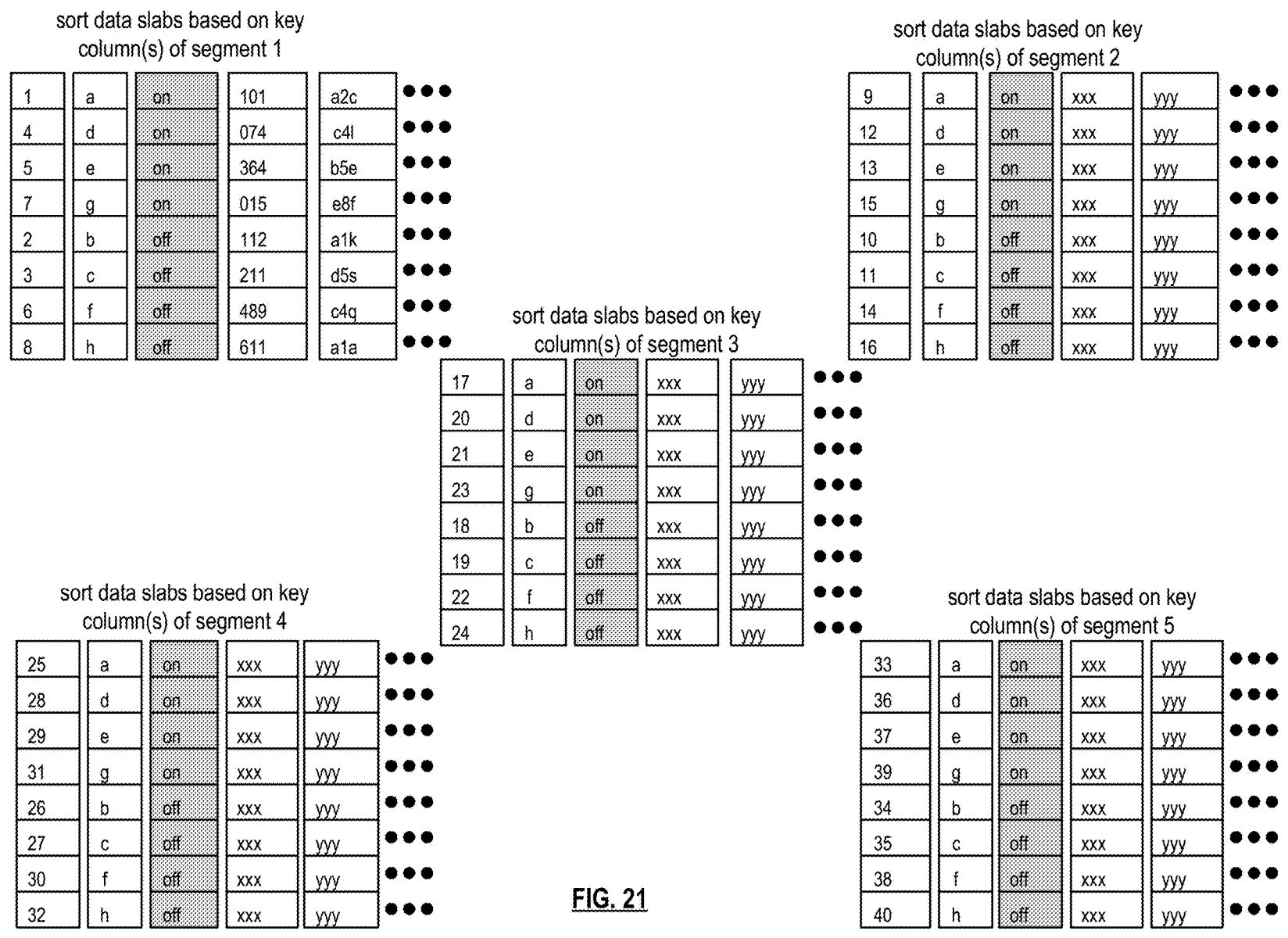

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
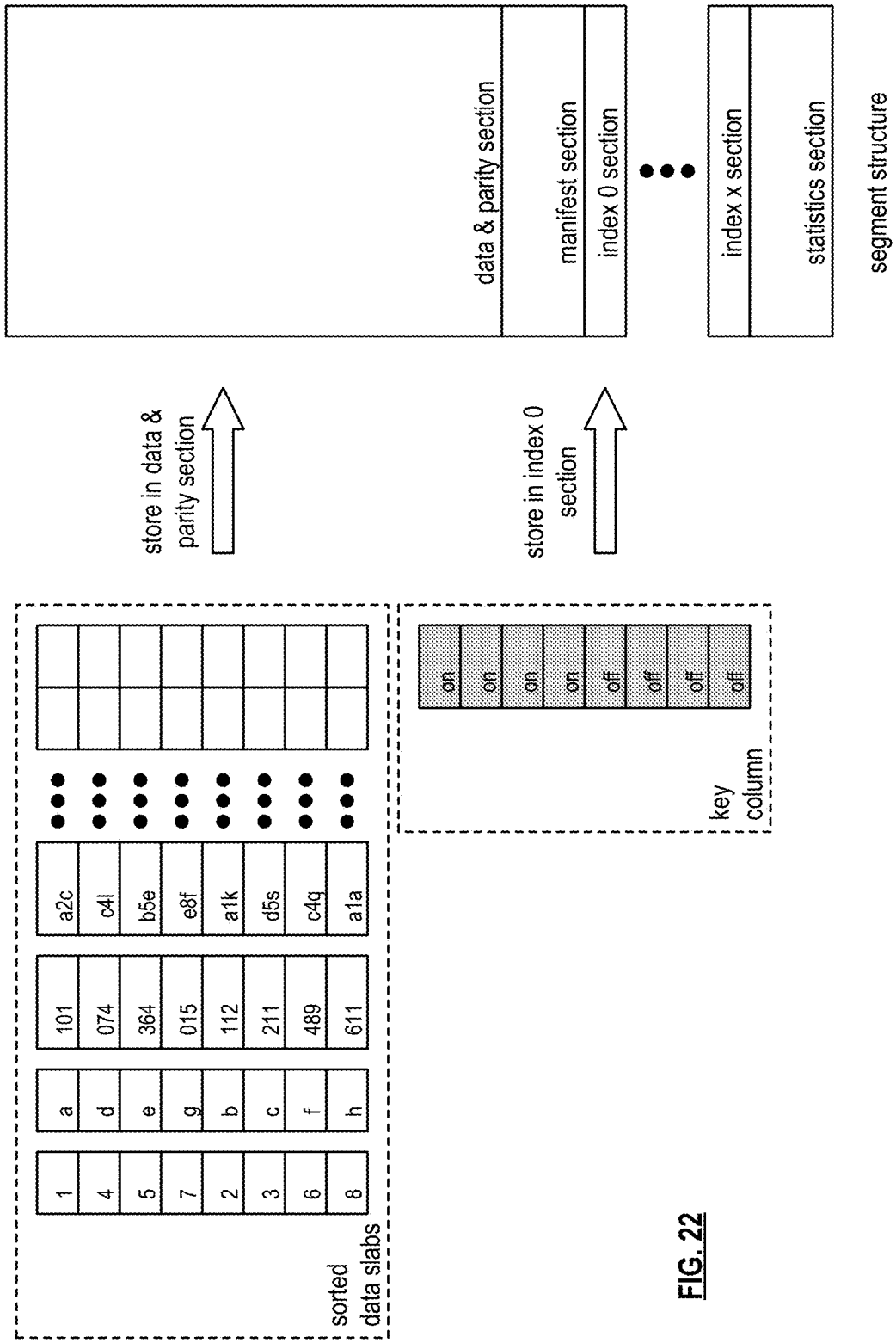

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
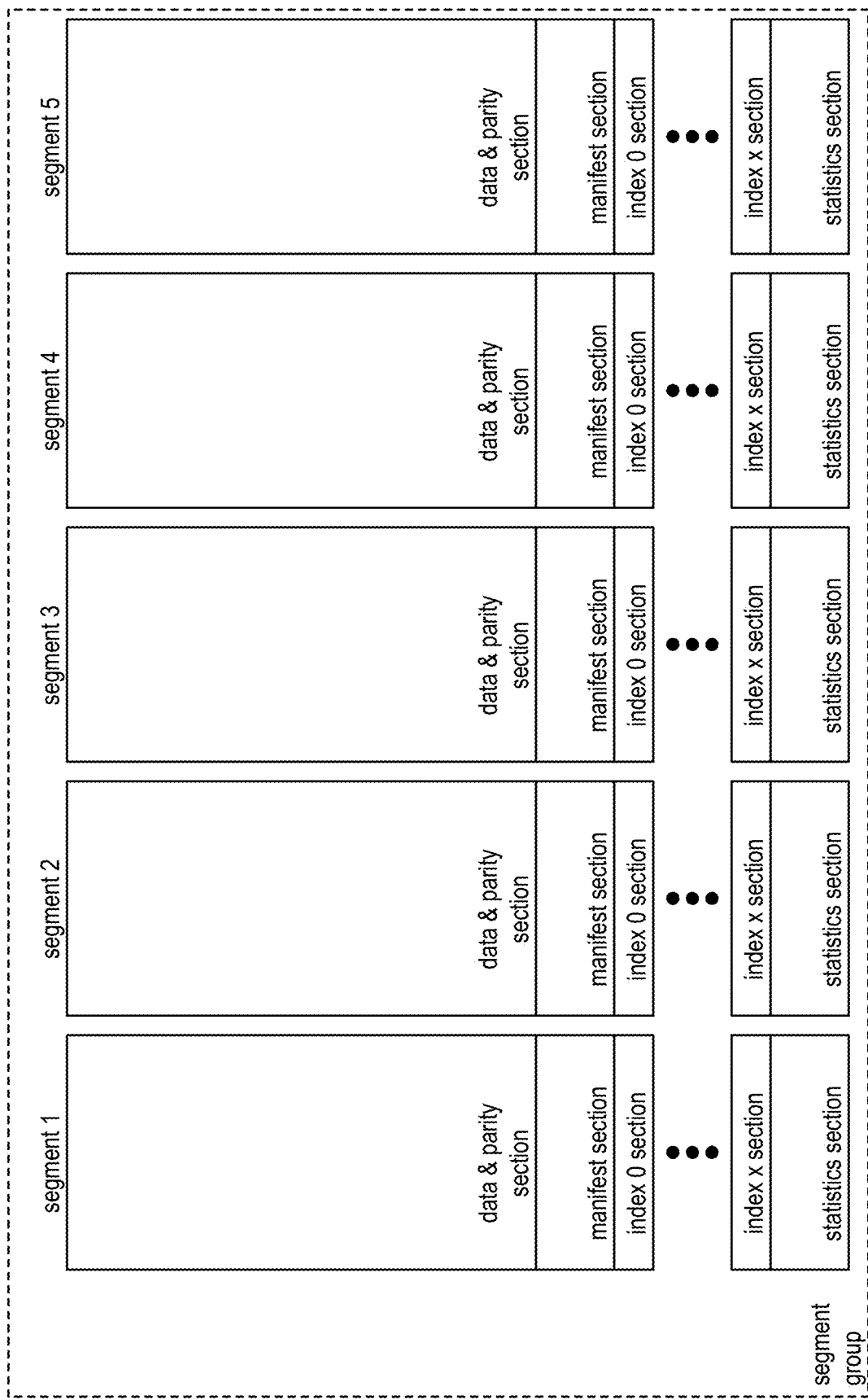

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
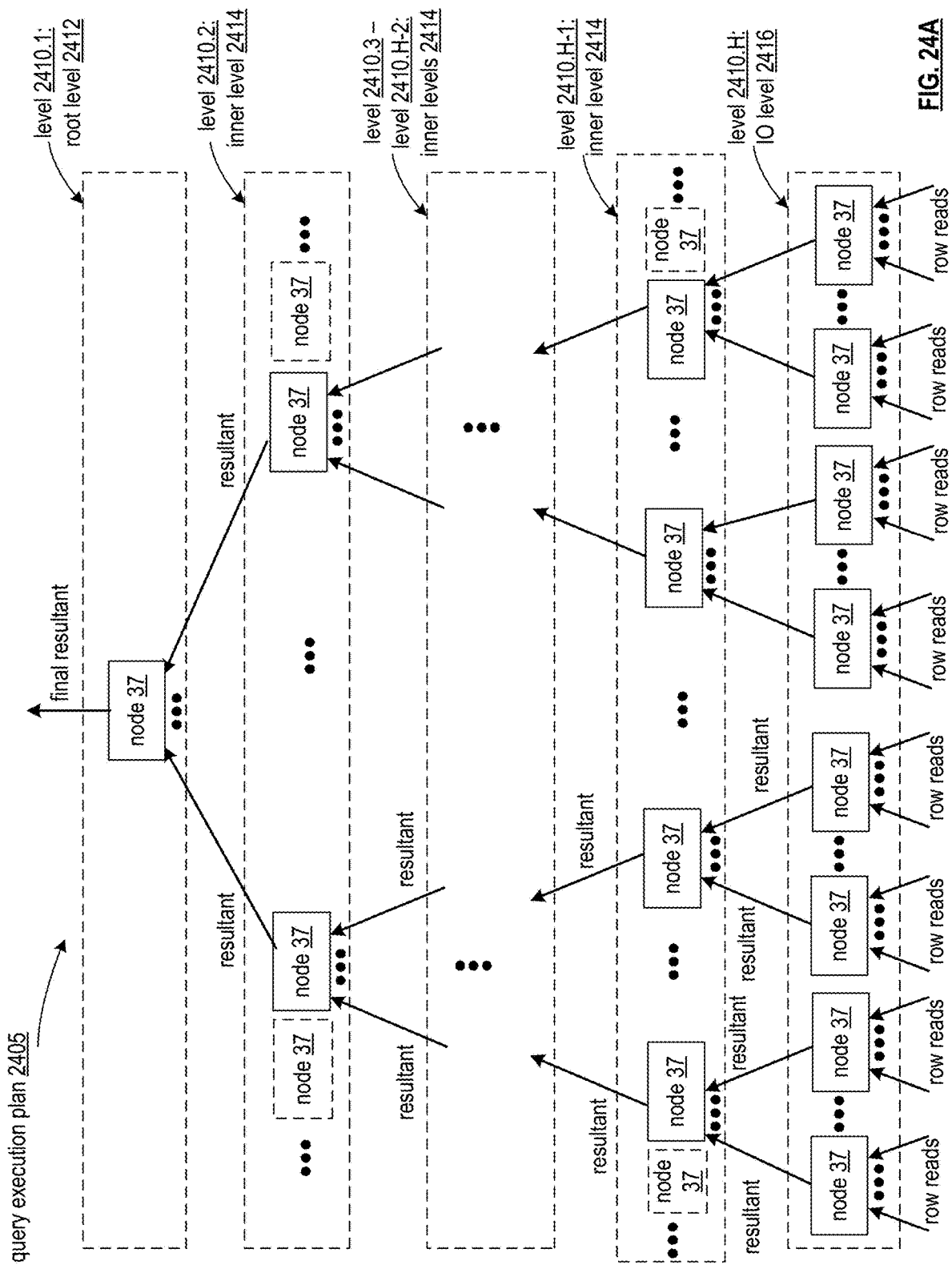
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata, such as system metadata applied across a plurality of nodes 37, for example, where at least one node 37 participates in some or all features and/or functionality of FIG. 24A based on receiving and storing the system metadata in local memory of the at least one node 37 as configuration data, such as configuration data, and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
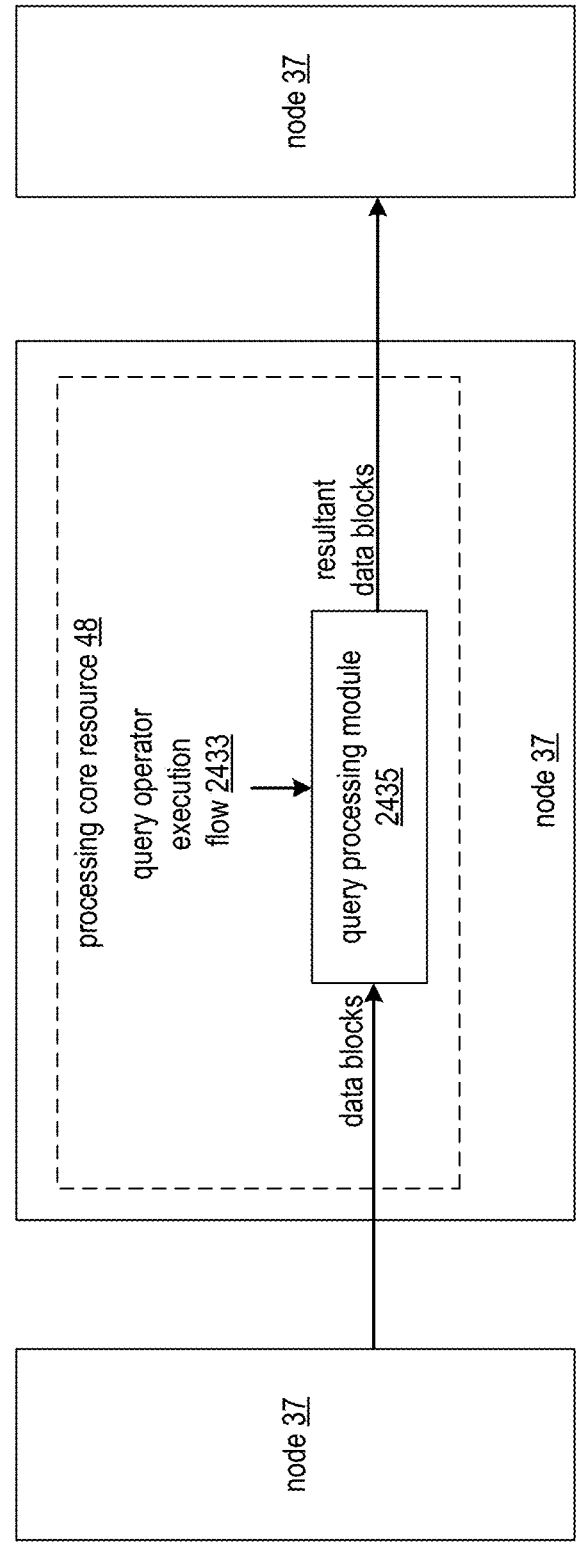
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata, such as system metadata, applied across a plurality of nodes 37 that includes the given node, for example, where the given node 37 participates in some or all features and/or functionality of FIG. 24B based on receiving and storing the system metadata in local memory of given node 37 as configuration data, and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
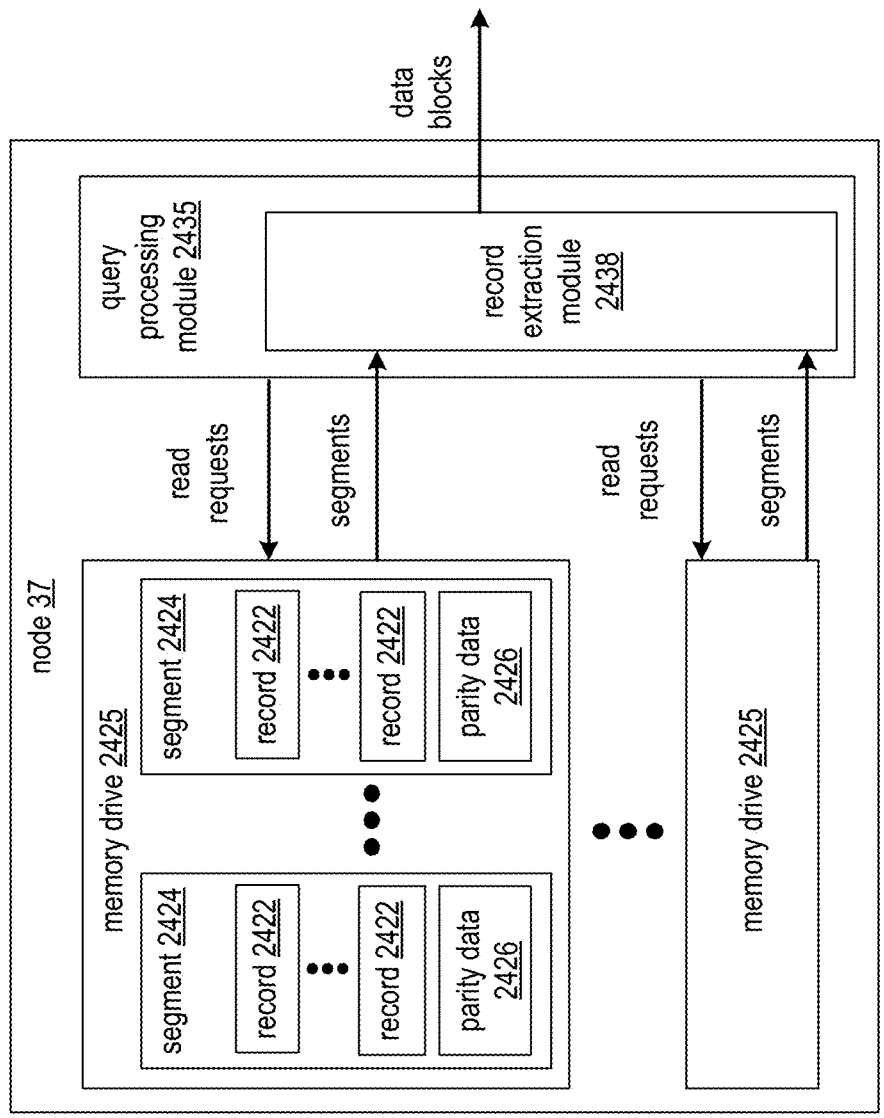

FIG. 24C illustrates a particular example of a node 37 at the IO level 2416 of the query execution plan 2405 of FIG.

24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata, such as system metadata, applied across a plurality of nodes 37 that includes the given node, for example, where the given node 37 participates in some or all features and/or functionality of FIG. 24C based on receiving and storing the system metadata in local memory of given node 37 as configuration data, and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
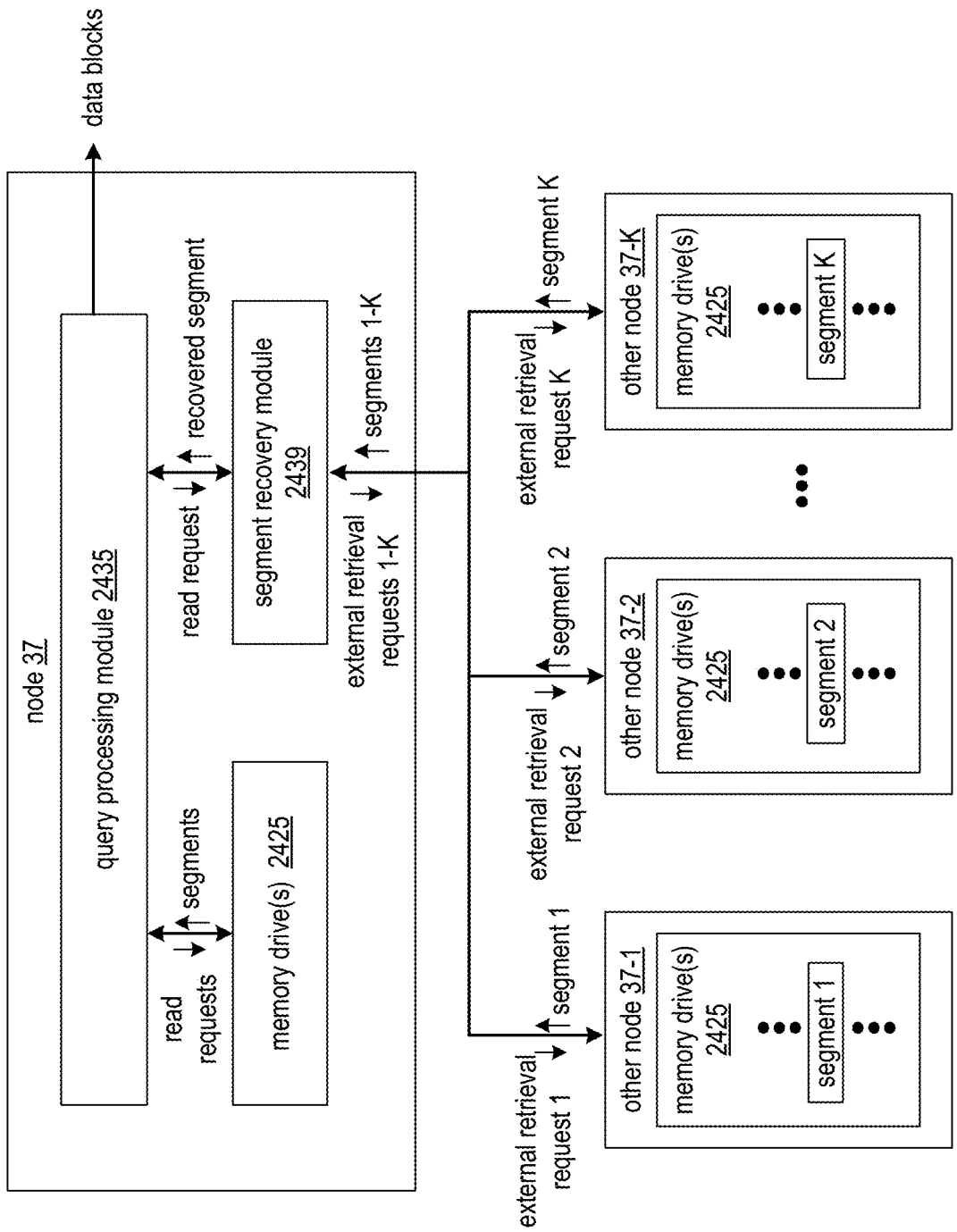

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata, such as system metadata, applied across a plurality of nodes 37 that includes the given node, for example, where the given node 37 participates in some or all features and/or functionality of FIG. 24D based on receiving and storing the system metadata in local memory of given node 37 as configuration data, and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
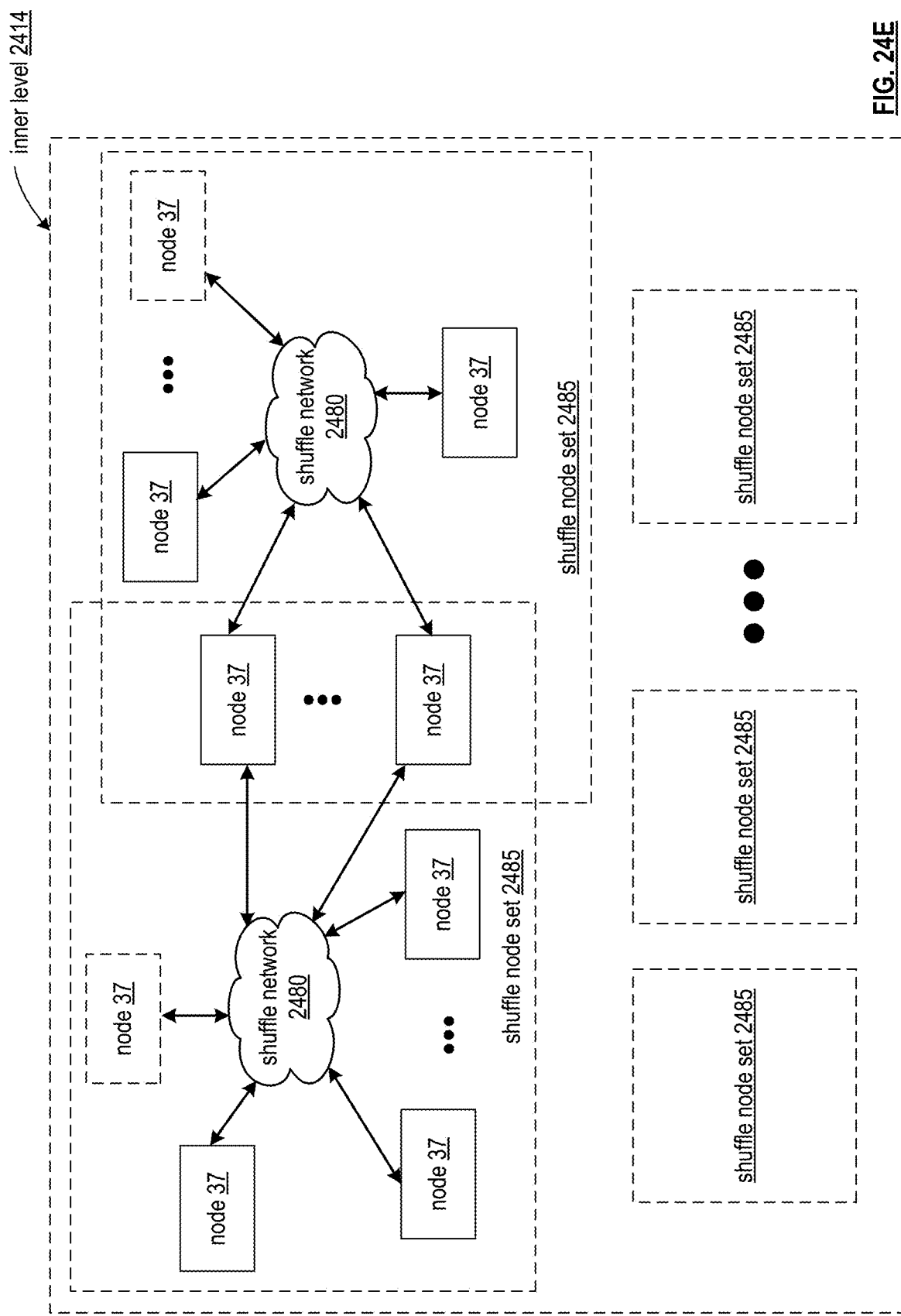
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata, such as system, applied across a plurality of nodes 37, for example, where at least one node 37 participates in some or all features and/or functionality of FIG. 24E based on receiving and storing the system metadata in local memory of the at least one node 37 as configuration data, and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
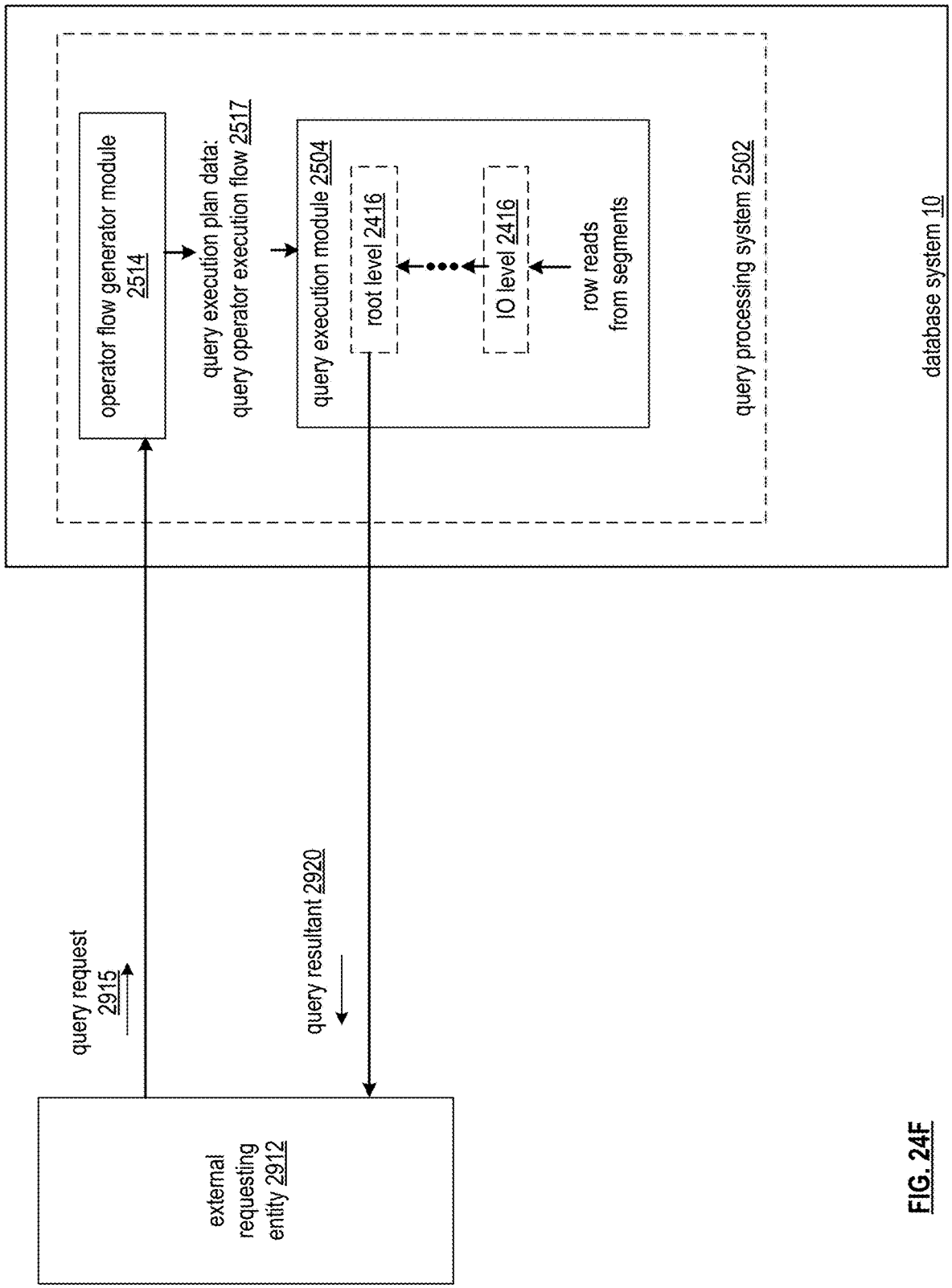
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
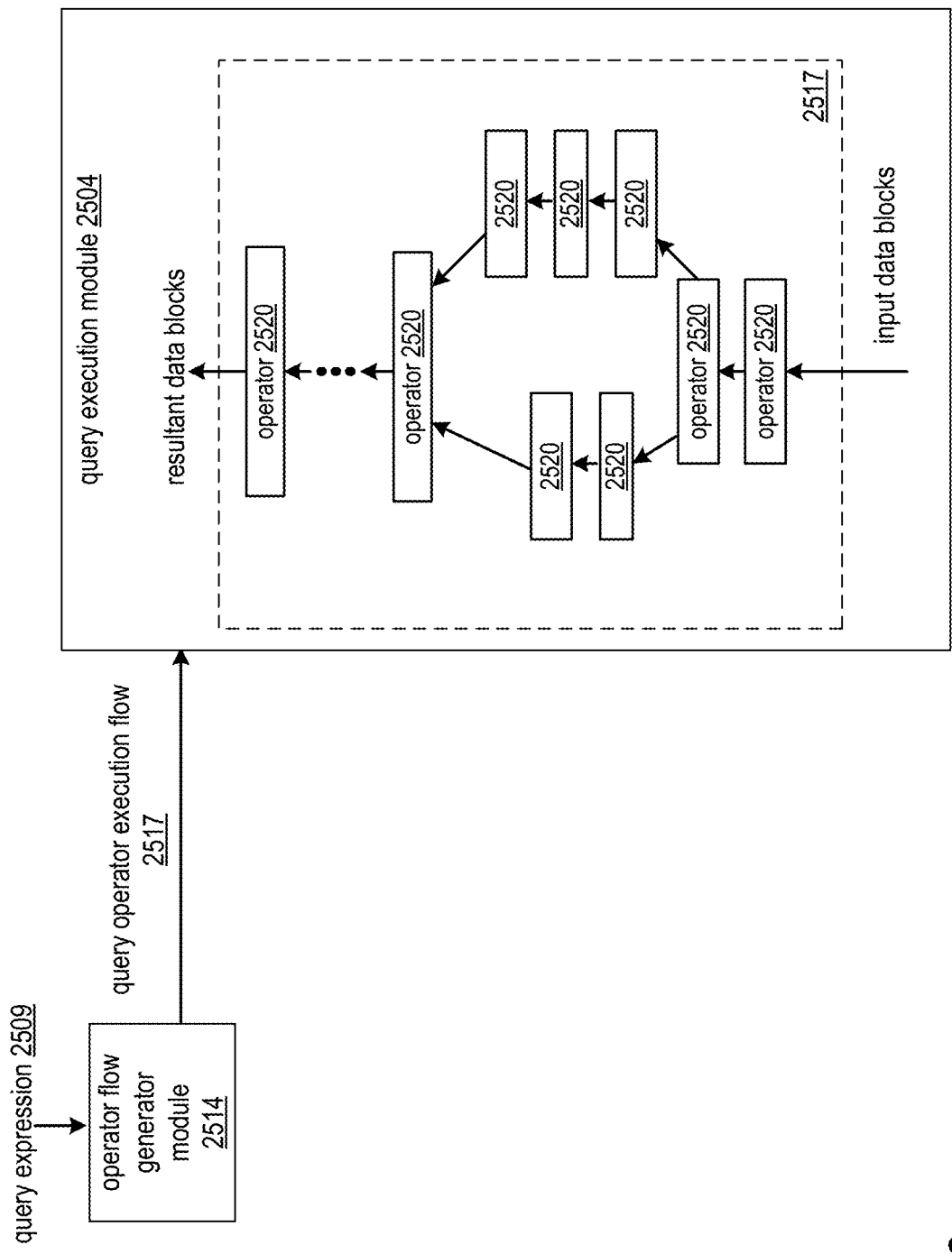
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
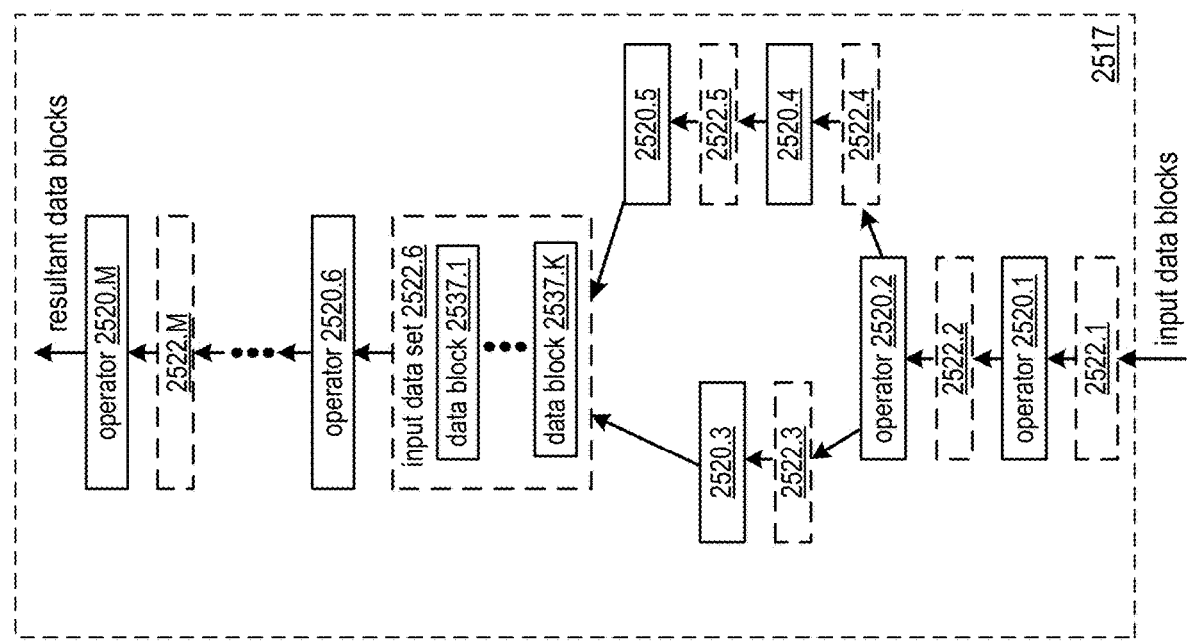
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data, and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
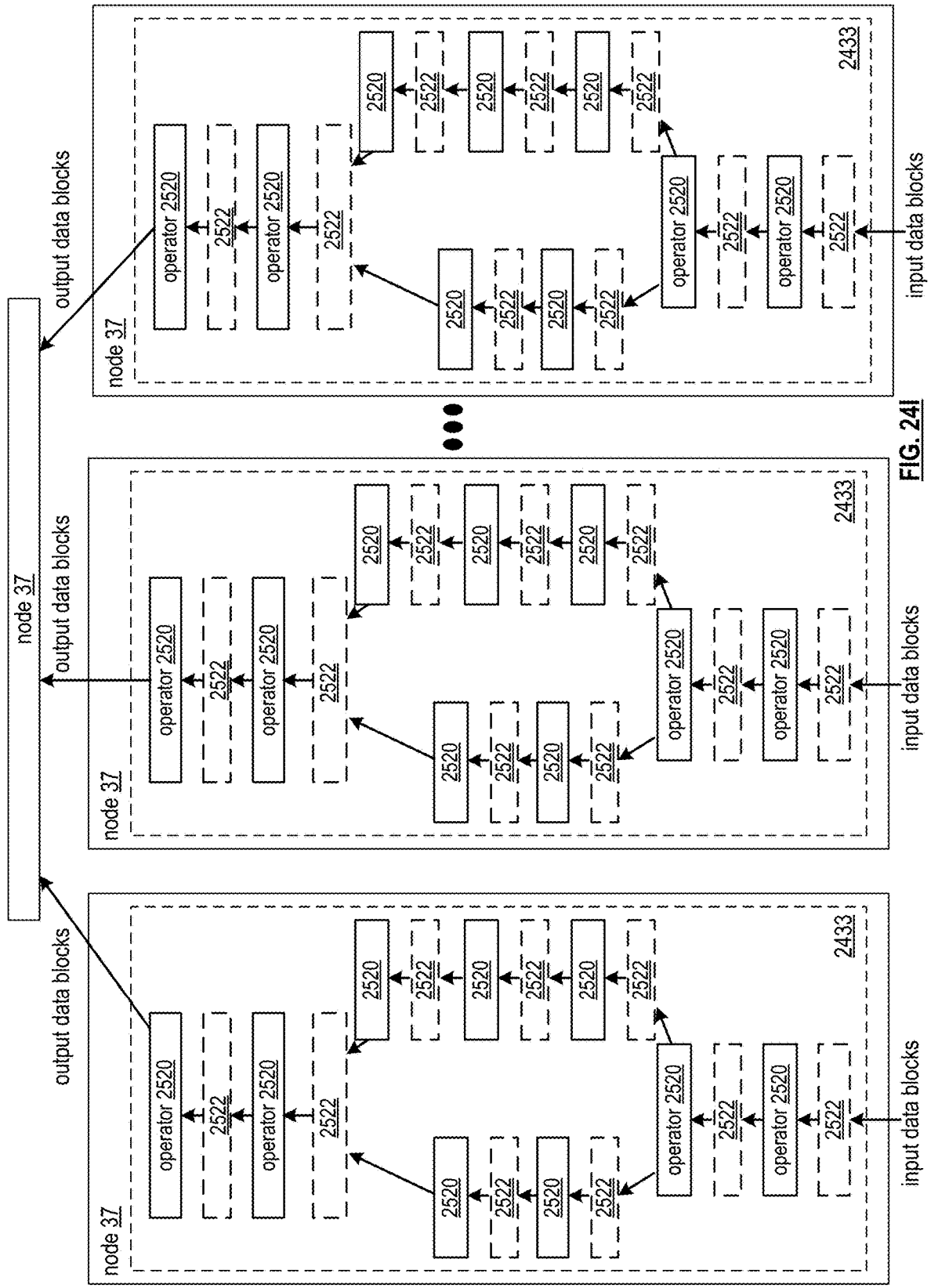
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
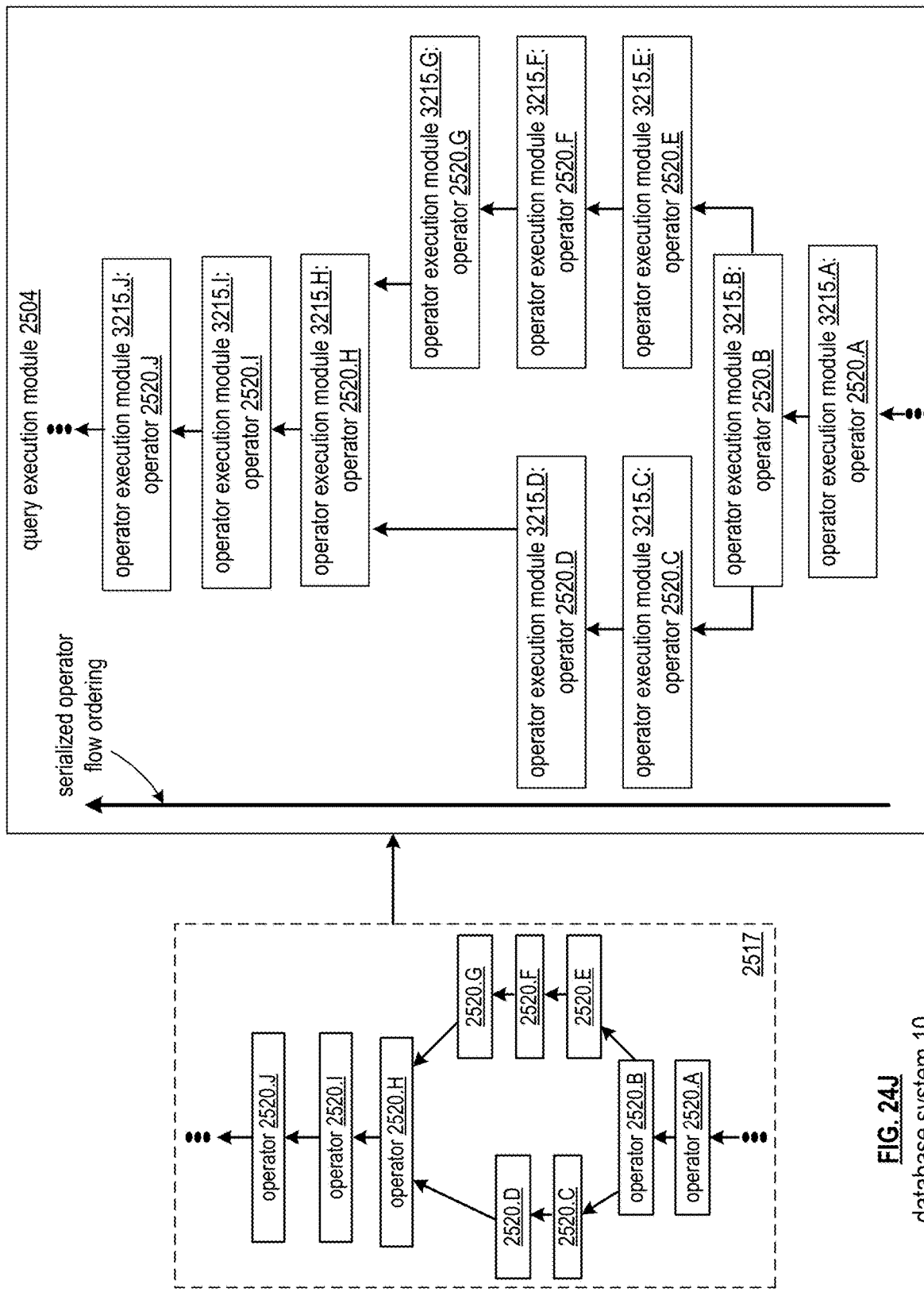
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
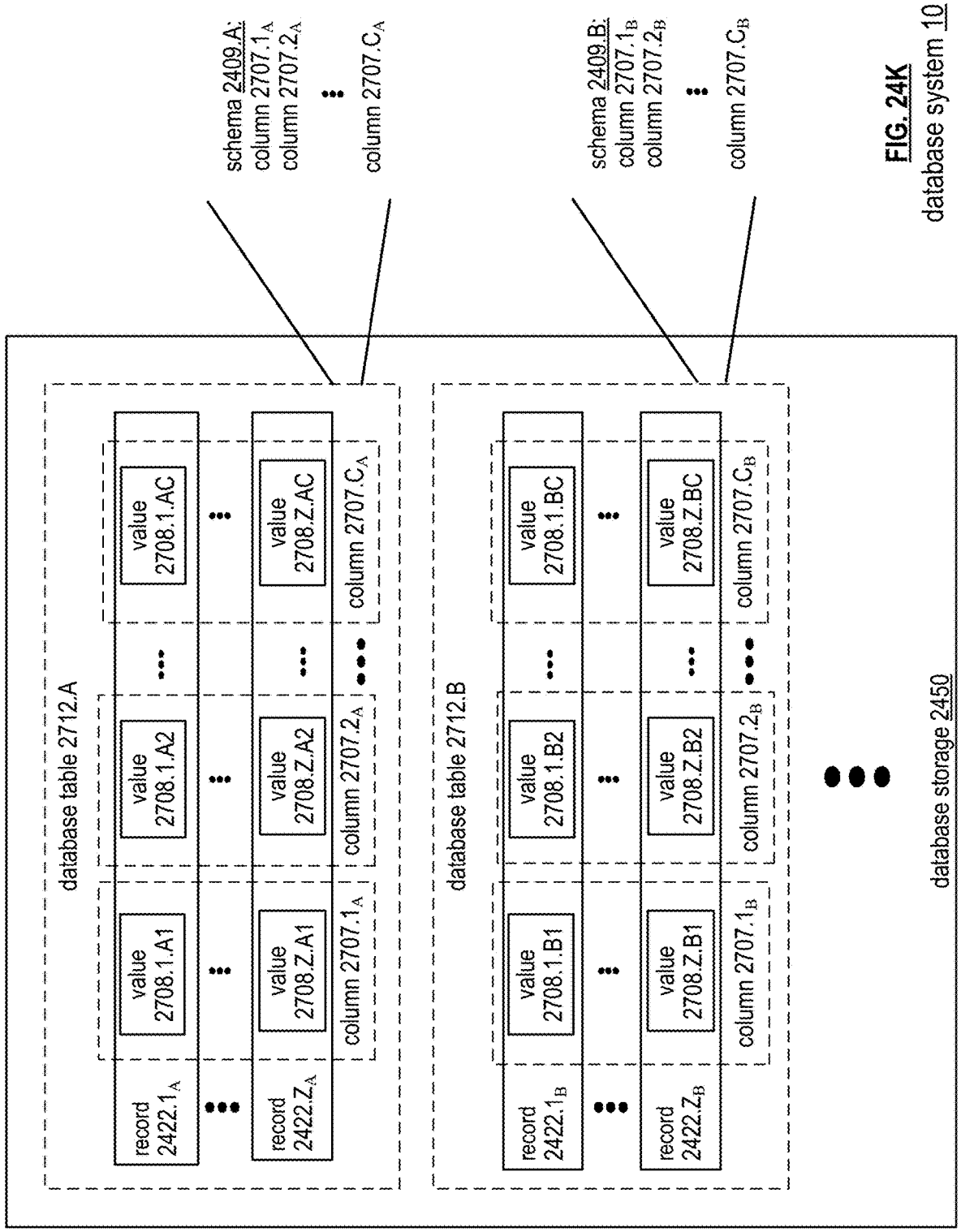
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709A for database table 2712A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
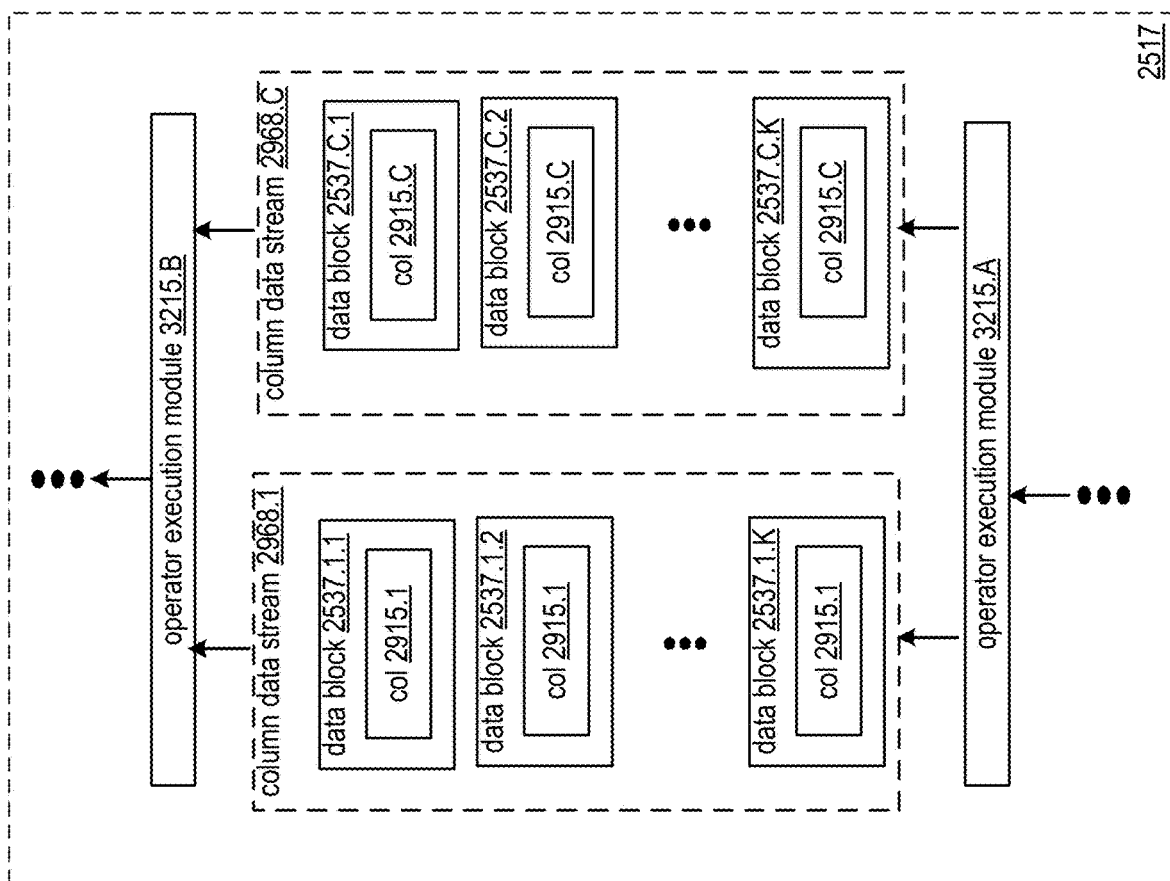
FIG. 24L is a schematic block diagram of a query execution module that implements a plurality of column data streams in accordance with various embodiments.
Figure 24M:
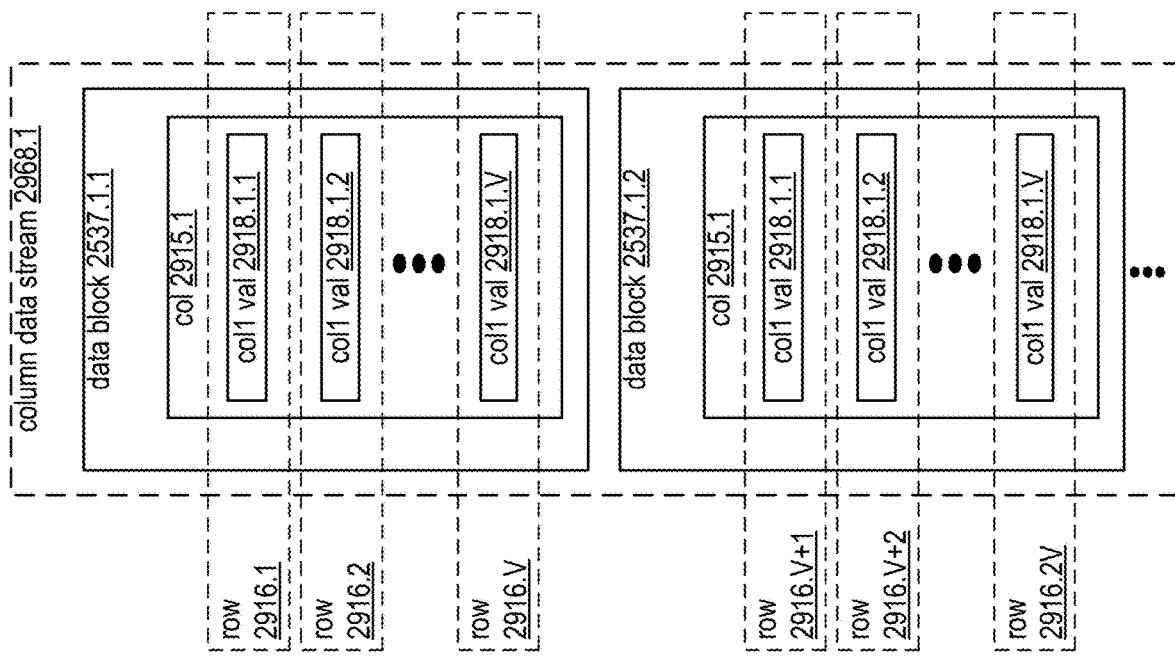
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
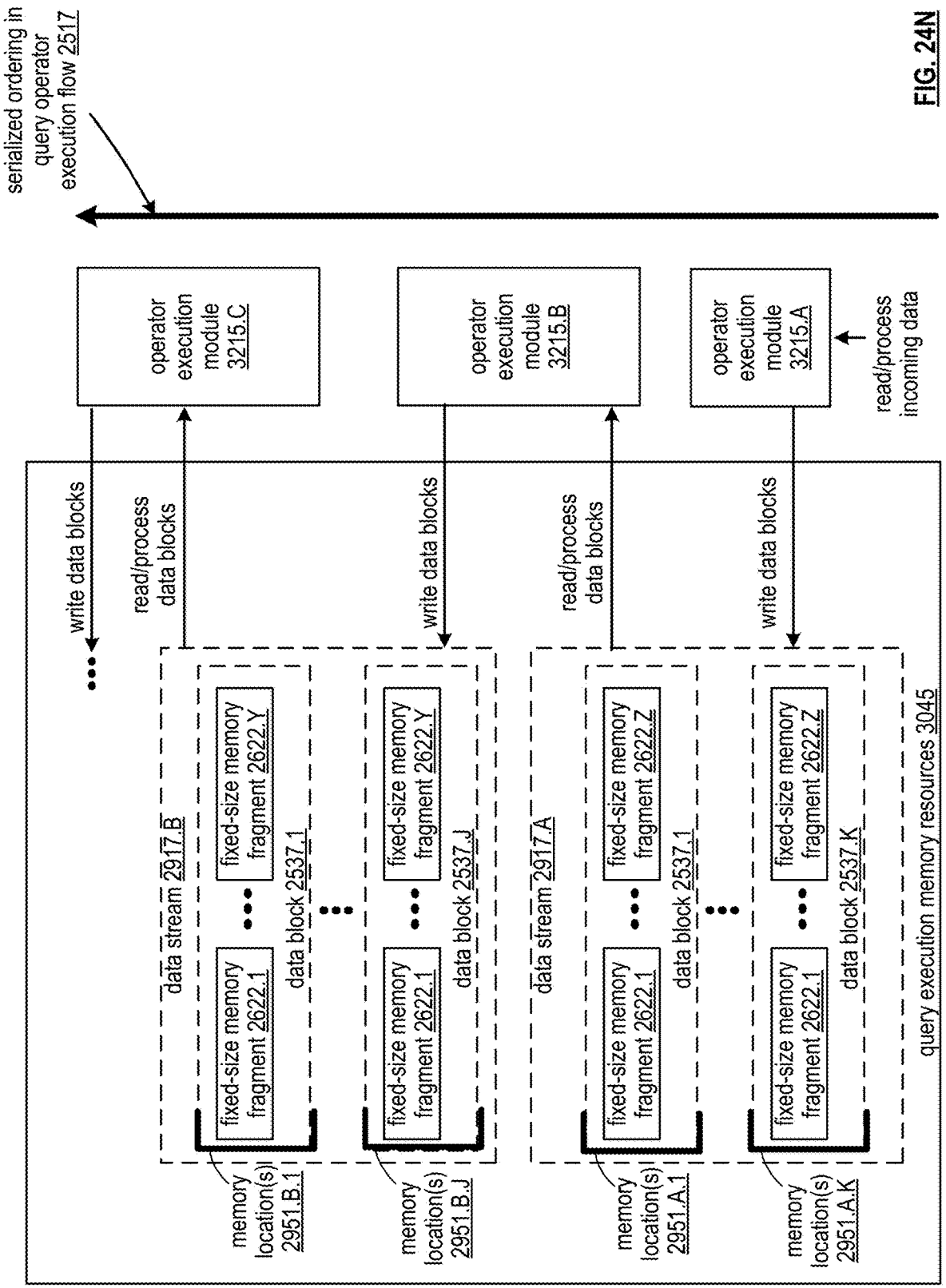
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215A can generate these data blocks 2537.1-2537.K of data stream 2917A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917A and/or the operator execution module 3215.B writes data blocks 2537.1-2537.J of data stream 2917.B. As another example, the operator execution module 3215.C reads data blocks 2537.1-2537.K of data stream 2917A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24O:
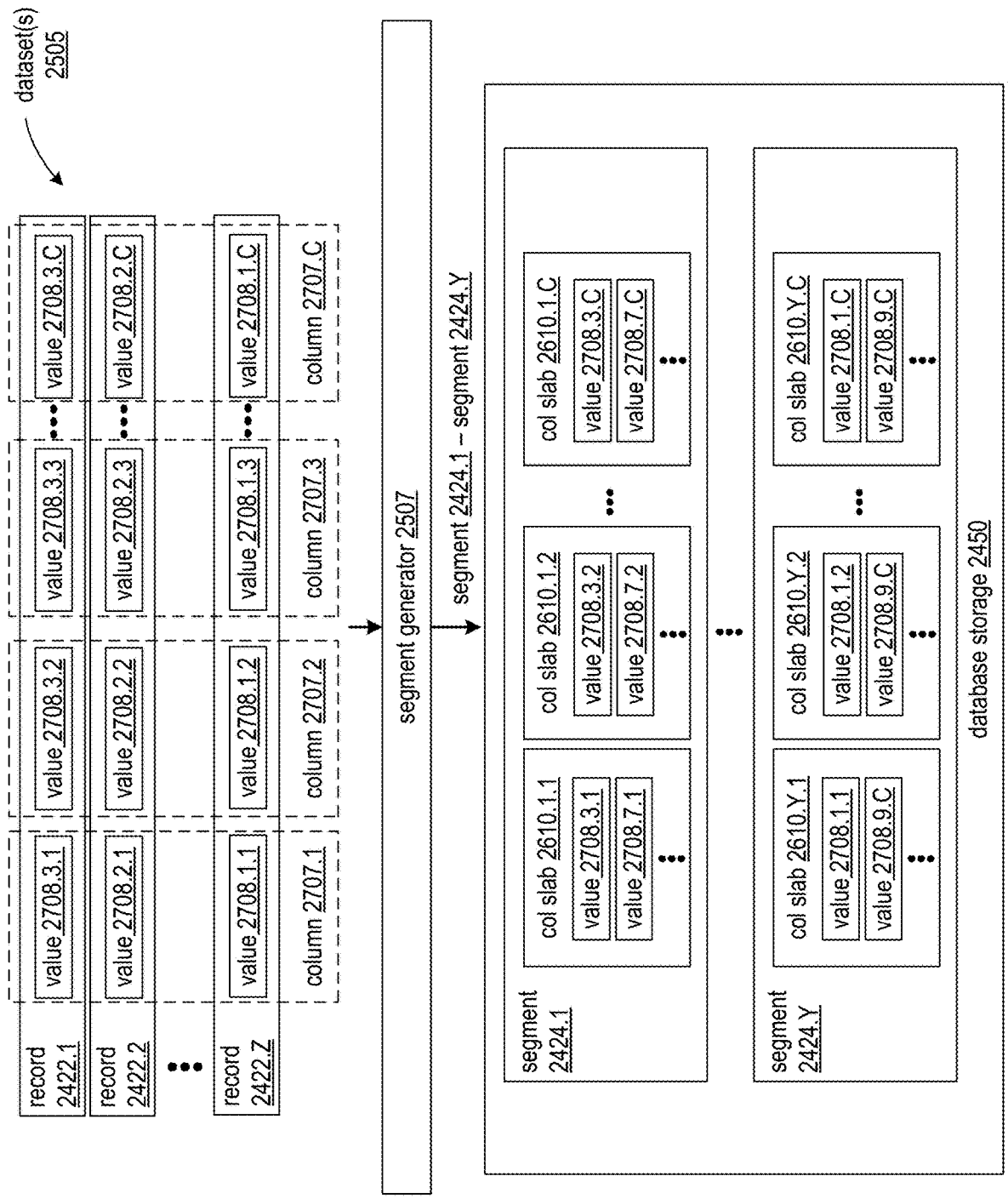
FIG. 24O is a schematic block diagram of a database system that implements a segment generator that generates segments from a plurality of records in accordance with various embodiments.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
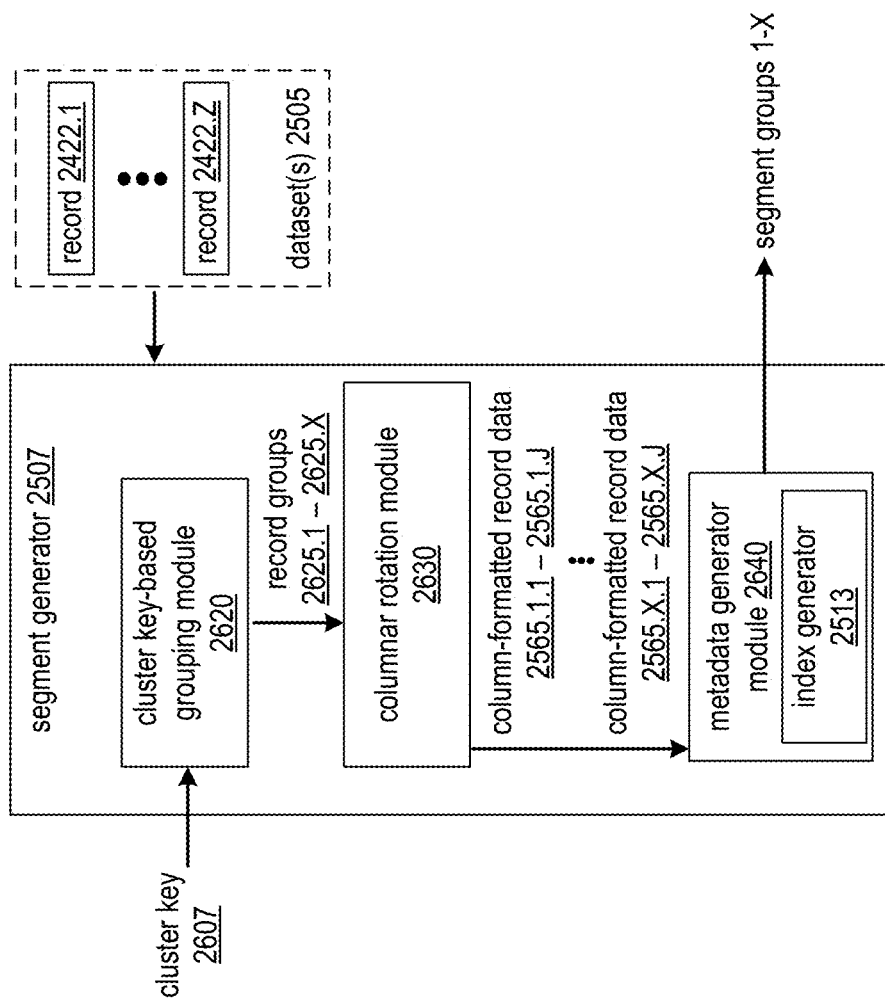
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system 2505 of U.S. Utility application Ser. No. 16/985,723, U.S. Utility application Ser. No. 16/985,957, and/or U.S. Utility application Ser. No. 16/985,930.

Figure 24Q:
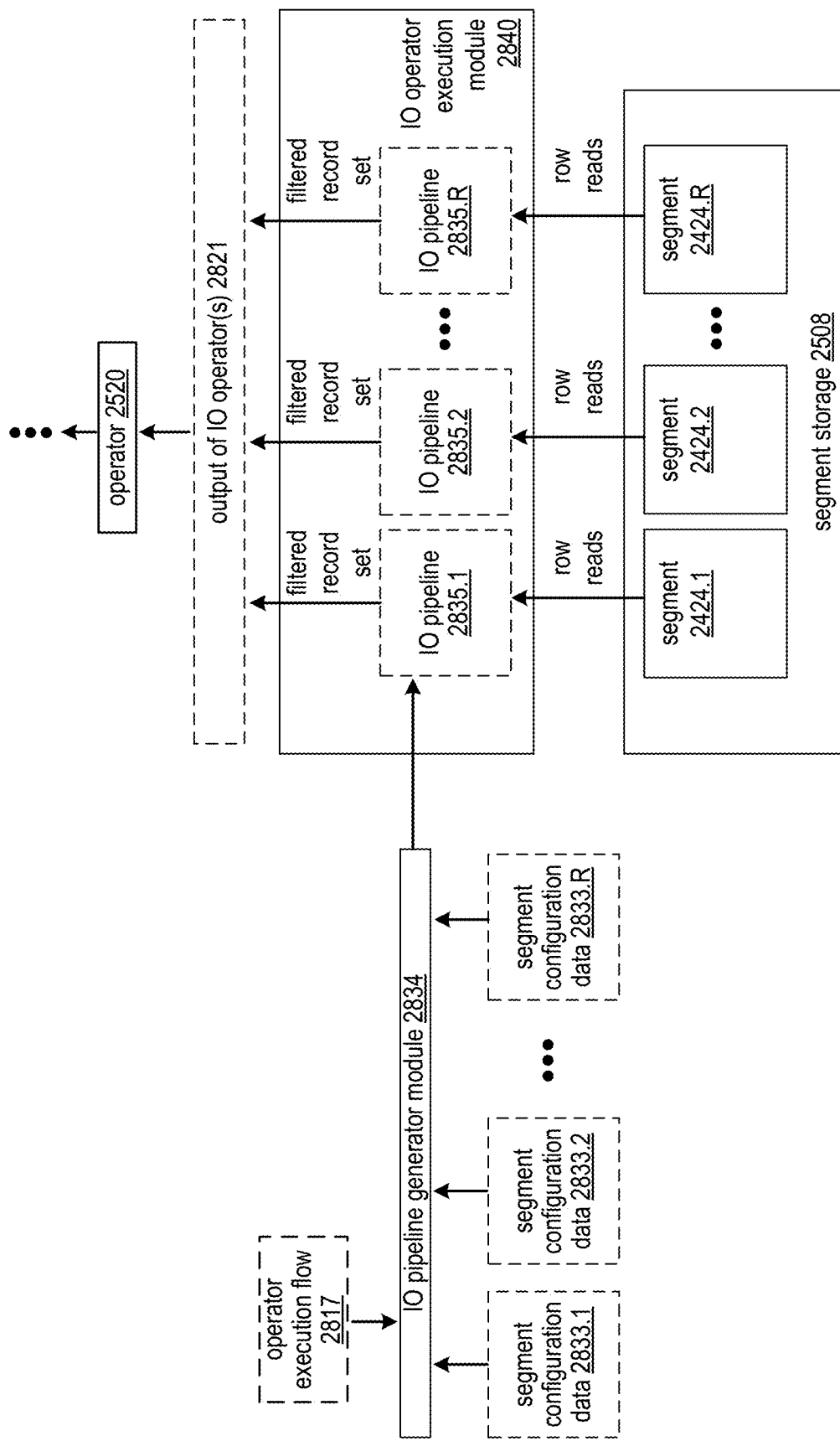
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the columns slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
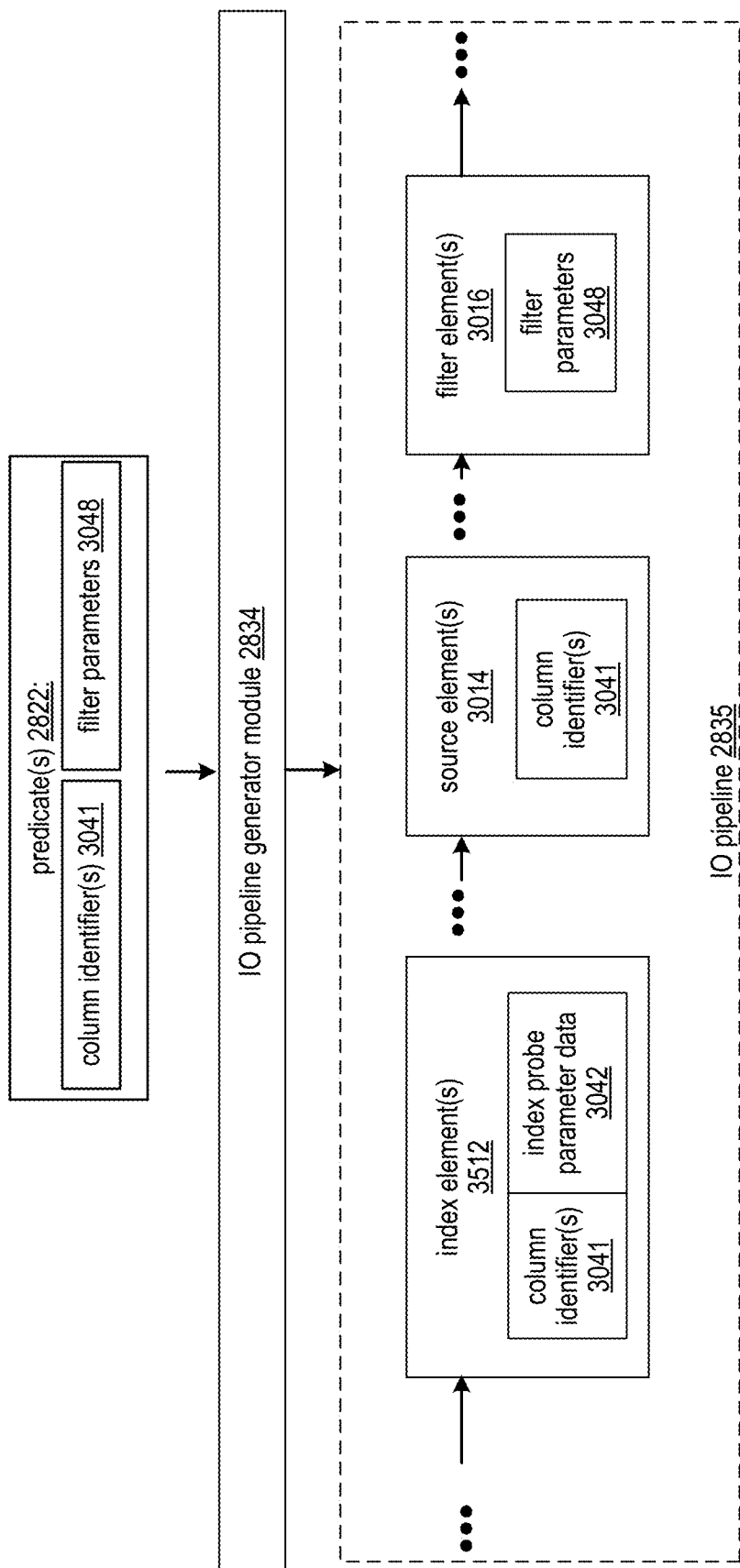
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834, IO pipeline 2835, and/or IO operator execution module 2840 implements some or all features and/or functionality of the IO pipeline generator module 2834, IO pipeline 2835, and/or IO operator execution module 2840 as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303,437.

Figure 25A:
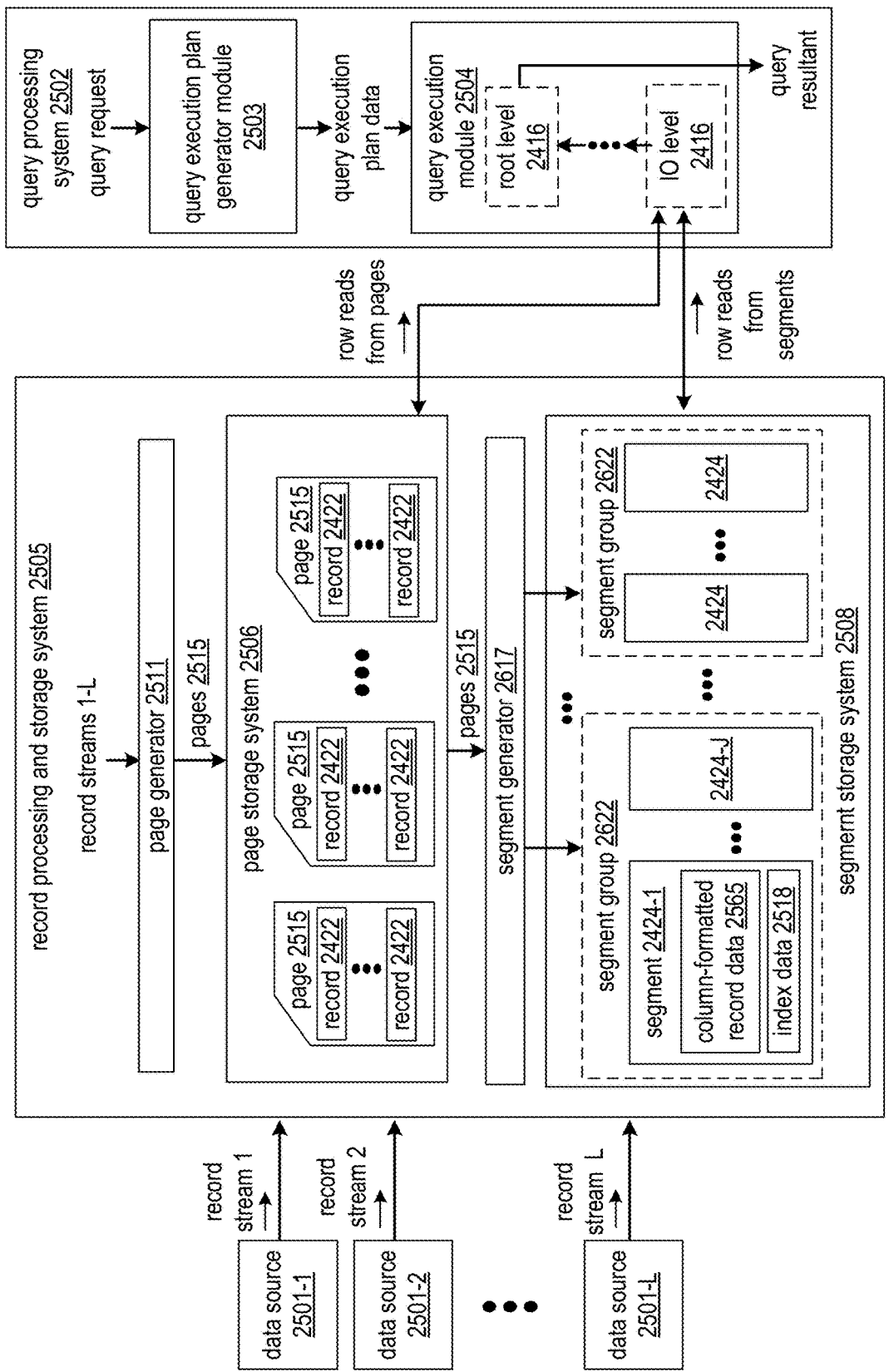
FIGS. 25A-25B are schematic block diagrams of embodiments of a database system that includes a record processing and storage system in accordance with various embodiments.
Figure 25B:
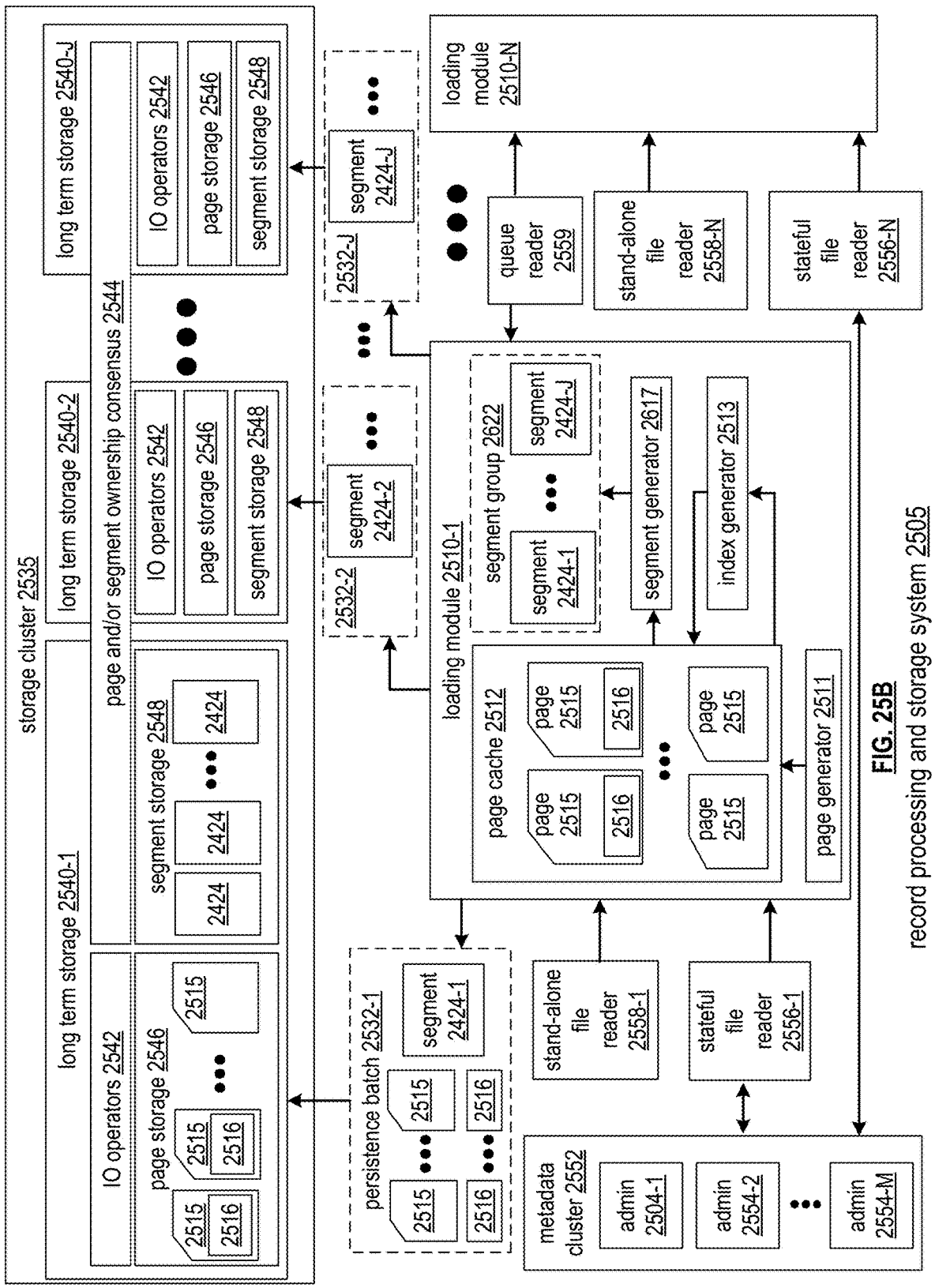
Figure 25C:
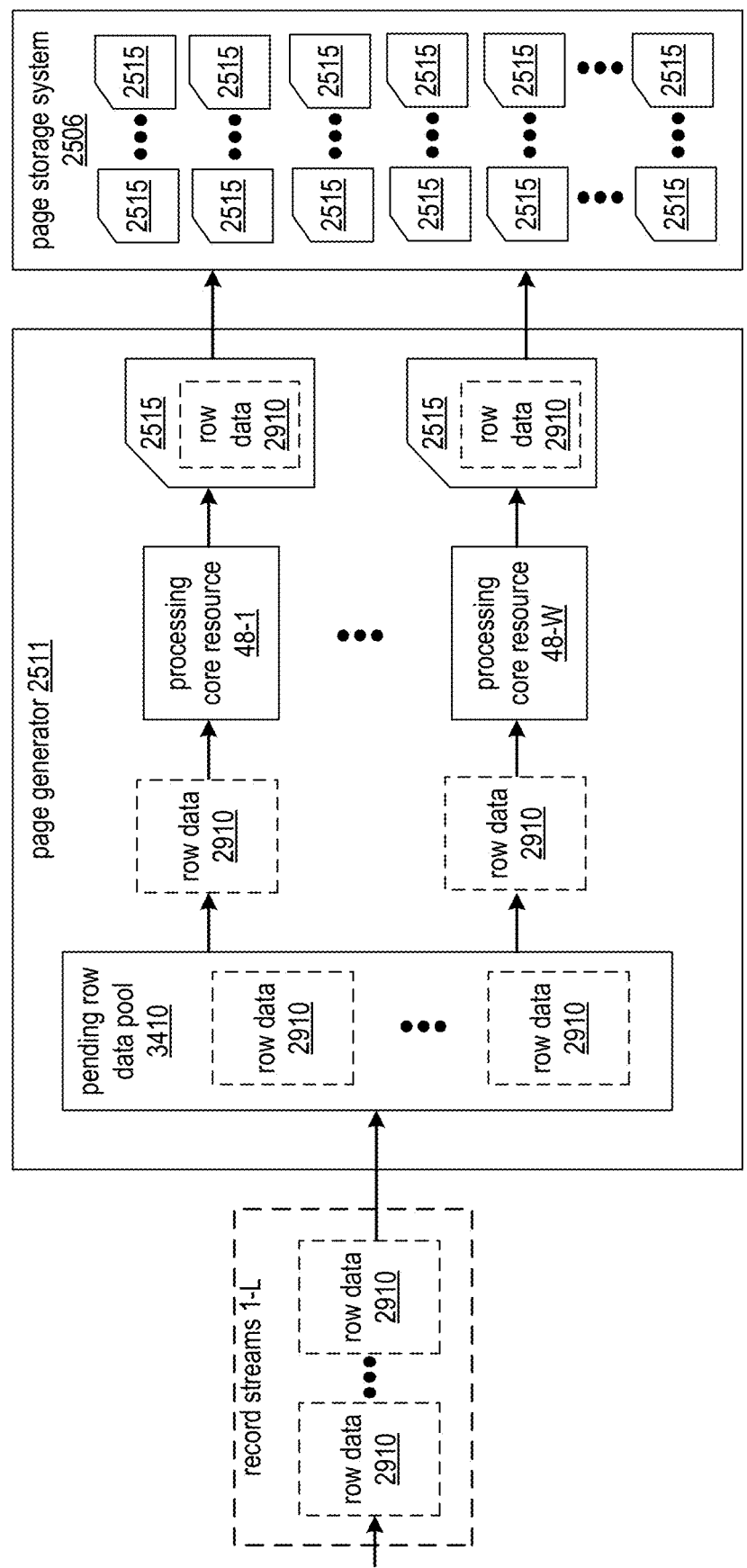
FIG. 25C is a schematic block diagrams of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words, delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalitics at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata applied across a plurality of nodes 37, for example, where at least one node 37 participates in some or all features and/or functionality of FIG. 25A based on receiving and storing the system metadata in local memory of the at least one node 37 as configuration data, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1-2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1-2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2010-1-2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments as discussed in conjunction with FIG. 26A. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-$x$ of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-z of FIG. 6 can receive pages 2515, corresponding index data 2516, and/or segments 2424 from its own set of loading modules 2510-1-2510-N, where the record processing and storage system 2505 of FIG. 25B can include z sets of loading modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each long term storage 2540 can include its own page storage 2546 that stores received pages 2515 generated by and received from one or more loading modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata applied across a plurality of nodes 37, for example, where at least one node 37 participates in some or all features and/or functionality of FIG. 25B based on receiving and storing the system metadata in local memory of the at least one node 37 as configuration data, and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1-2510-N, for example, where each loading module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata applied across a plurality of nodes 37, for example, where at least one node 37 participates in some or all features and/or functionality of FIG. 25C based on receiving and storing the system metadata in local memory of the at least one node 37 as configuration data, and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
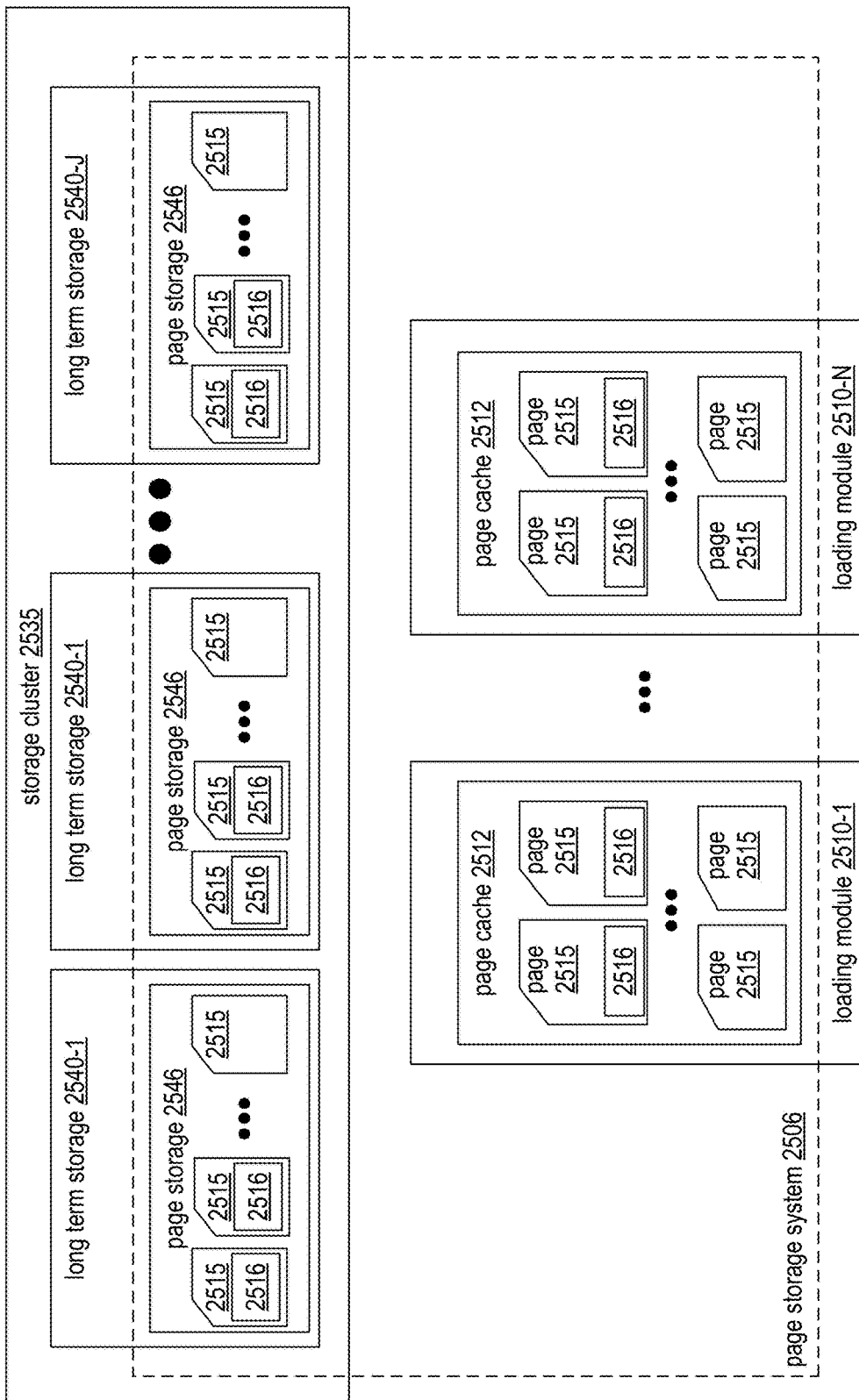
FIG. 25D is a schematic block diagrams of an embodiment of a page storage system of a record processing and storage system in accordance with various embodiments.
Figure 25E:
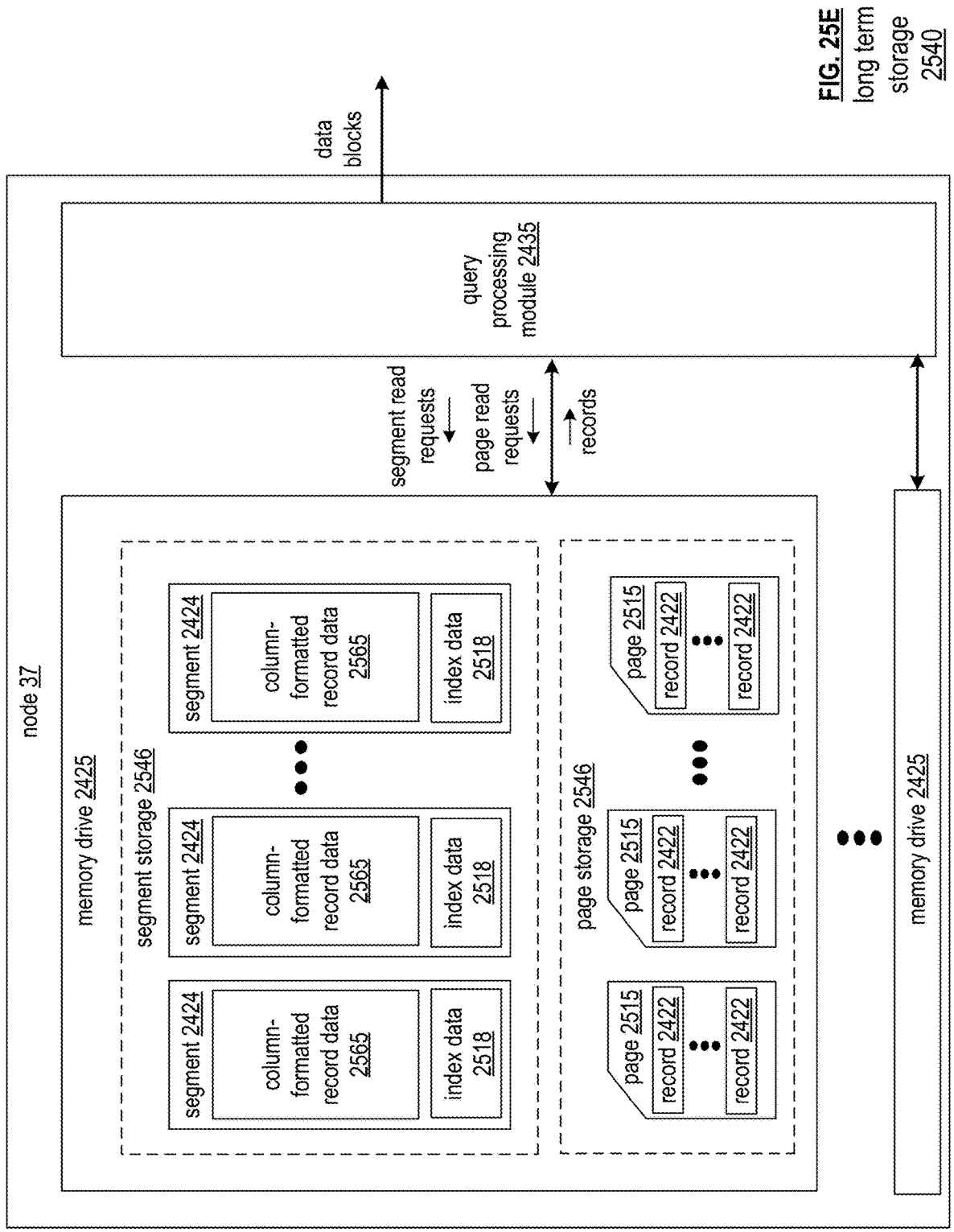
FIG. 25E is a schematic block diagrams of a node that implements a query processing module that reads records from segment storage and page storage in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

Some or all features and/or functionality of FIG. 25D can be performed via at least one node 37 in conjunction with system metadata, such as system metadata applied across a plurality of nodes 37, for example, where at least one node 37 participates in some or all features and/or functionality of FIG. 25D based on receiving and storing the system metadata in local memory of the at least one node 37 as configuration data and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata applied across a plurality of nodes 37, for example, where the given node 37 performs some or all features and/or functionality of FIG. 25E based on receiving and storing the system metadata in local memory of the at least one node 37 as configuration data and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

Figure 26A:
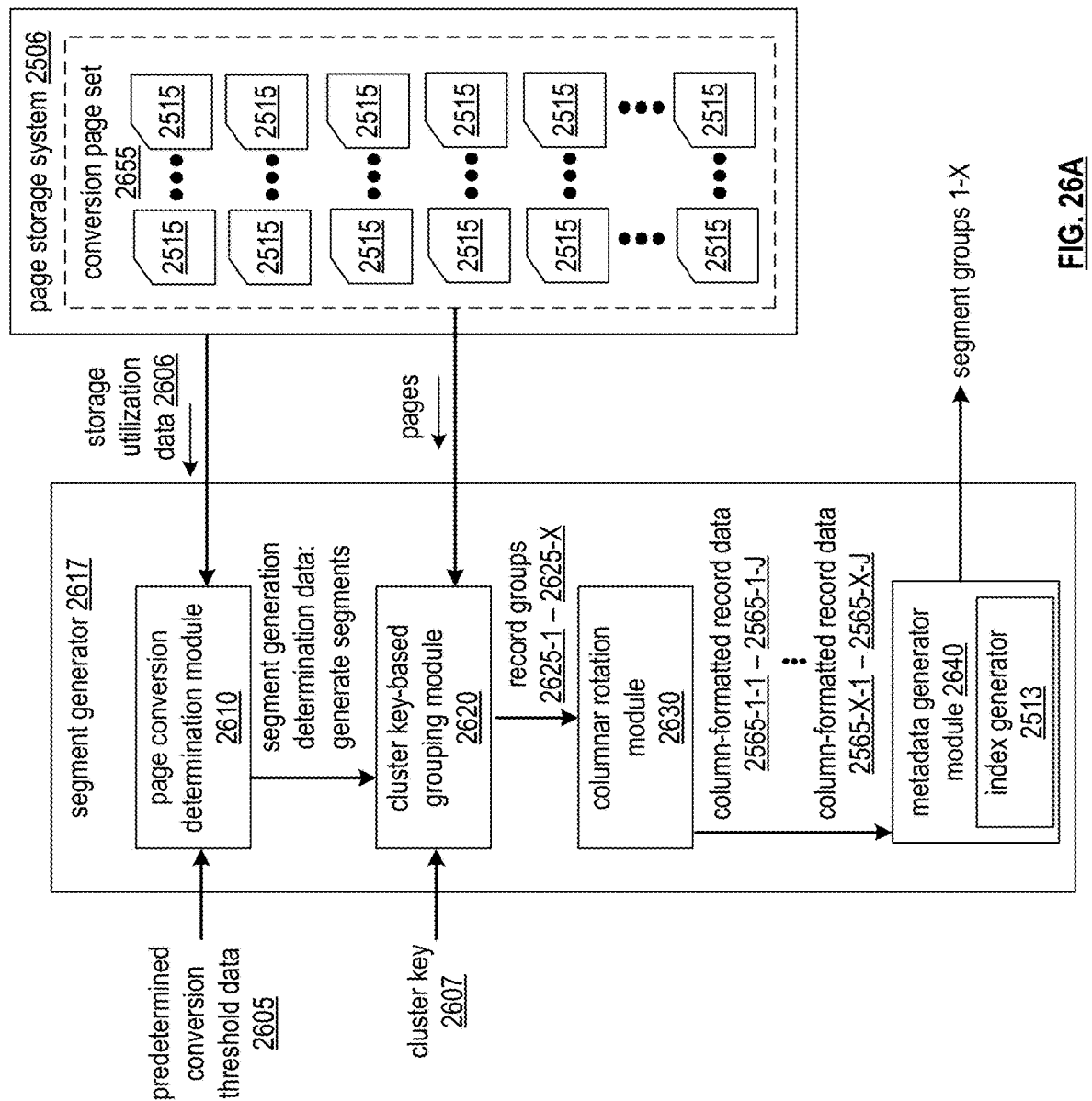
FIG. 26A is a schematic block diagram of a segment generator of a record processing and storage system in accordance with various embodiments.

FIG. 26A illustrates an example embodiment of a segment generator 2617. The segment generator 2617 of FIG. 26A can be utilized to implement the segment generator 2617 of FIG. 25A, can be utilized to implement each segment generator 2617 of each loading module 2510 of FIG. 25B, and/or can be utilized to implement any embodiments of segment generator 2617 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to accumulate as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2617 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2617 can commence the conversion process accordingly in response to the segment generation determination data indicating it is time to generate segments, for example, via a cluster key-based grouping module 2620, a columnar rotation module 2630, and/or a metadata generator module 2640.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a loading module 2510 of FIG. 25B, where the segment generator 2617 of FIG. 26A is implemented by the corresponding loading module 2510 and where the segment generator 2617 of FIG. 26A is operable to perform the conversion process only upon pages 2515 in the page cache 2512. In some cases, the storage utilization data 2606 can relate specifically to storage utilization across all page caches 2512 of all loading modules 2510-1-2510-N, where the page conversion determination module 2610 of FIG. 26A is implemented to dictate whether the conversion process be commenced across all corresponding loading modules 2510. In some cases, the storage utilization data 2606 can alternatively or additionally include storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2617.

The storage utilization data 2606 can be sent to and/or requested by the segment generator 2617: in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2617 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2617 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

Figure 26B:
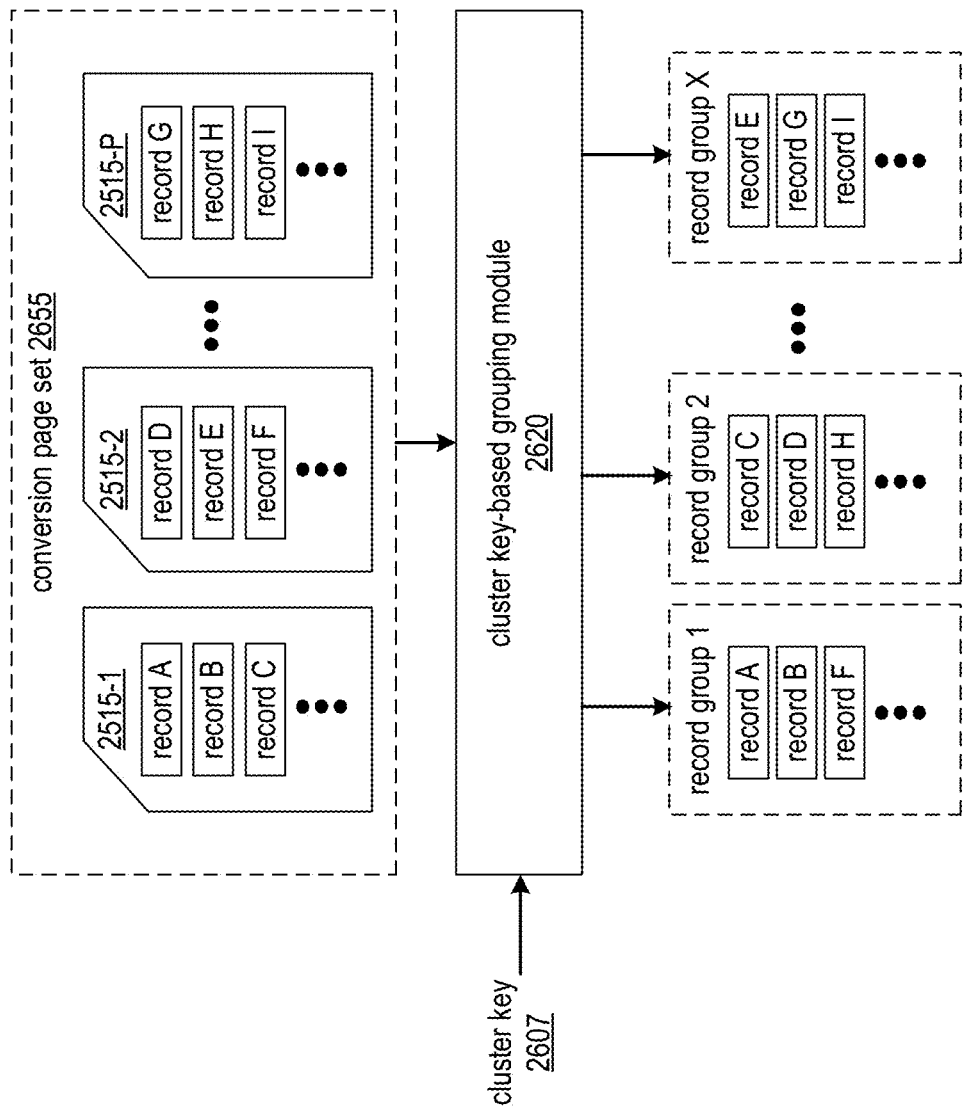
FIG. 26B is a schematic block diagram of a cluster key-based grouping module of a segment generator in accordance with various embodiments.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26B.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2617. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2617 as discussed previously, and where each column-formatted row data 2565-1-2565-J is included in a corresponding segment of a set of J segments 2424 of a segment group 2622.

The final segments can be formed from the column-formatted row data 2565 to include metadata generated via a metadata generator module 2640. The metadata generator module 2640 can be operable to generate the manifest section, statistics section, and/or the set of index sections 0-$x$ for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Some or all features and/or functionality of FIG. 26A can be performed via at least one node 37 in conjunction with system metadata applied across a plurality of nodes 37, for example, where at least one node 37 participates in some or all features and/or functionality of FIG. 26A based on receiving and storing the system metadata in local memory of the at least one node 37 as configuration data and/or based on further accessing and/or executing this configuration data to implement some or all functionality of segment generator 2617 and/or page storage system 2508 as part of its database functionality accordingly. Performance of some or all features and/or functionality of FIG. 26A can optionally change and/or be updated over time, and/or a set of nodes participating in executing some or all features and/or functionality of FIG. 26A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 26B illustrates an example embodiment of a cluster key-based grouping module 2620 implemented by segment generator 2617. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26B can be utilized to implement the segment generator 2617 of FIG. 26A and/or any other embodiment of the segment generator 2617 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

Some or all features and/or functionality of FIG. 26B can be performed via at least one node 37 in conjunction with system metadata applied across a plurality of nodes 37, for example, where at least one node 37 participates in some or all features and/or functionality of FIG. 26B based on receiving and storing the system metadata in local memory of the at least one node 37 as configuration data and/or based on further accessing and/or executing this configuration data to implement some or all functionality of cluster key-based grouping module 2620 as part of its database functionality accordingly. Performance of some or all features and/or functionality of FIG. 26B can optionally change and/or be updated over time, and/or a set of nodes participating in executing some or all features and/or functionality of FIG. 26B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIGS. 27A-27I present embodiments of a database system 10 operable to index data based on one or more special indexing conditions 3817. For example, in addition to indexing data under "normal" conditions (e.g. indexing by their non-null values), additional indexing conditions can be applied to further index data (e.g. indexing null values, indexing empty arrays, indexing arrays containing null values, etc.). This can be useful in generating and applying IO pipelines 2835 for query expressions requiring rows having these special conditions be included and/or reflected in a query resultant, and/or requiring these rows having these special conditions be filtered out (e.g. when a negation is applied rendering use of a set difference against a full set of rows). In particular, index elements can be utilized as described previously to identify rows having these special conditions without sourcing the data and reading the row values in a same or similar fashion as applying index elements in IO pipelines discussed previously. IO pipelines can be generated to include index elements for special conditions based on determining types of rows that need identified for inclusion and/or filtering by applying set logic rules to the query predicate and/or operators in the query expression.

Such functionality can improve the technology of database systems by improving the efficiency of query executions. In particular, fewer rows need be read via source elements in executing queries when identifying rows having special conditions for inclusion and/or filtering in generating the query resultant, based on generating and utilizing corresponding index data for these special conditions.

Such functionality can be applied at a massive scale, where a massive number of rows are processed and indexed via one or more special index conditions, and/or where index data is applied to identify a massive number of rows, or a subset of a massive number of rows, in executing queries. Some or all functionality described herein with regards to generating index data for special conditions, or utilizing index data for special conditions in query execution, cannot practically be performed by the human mind.

Figure 27A:
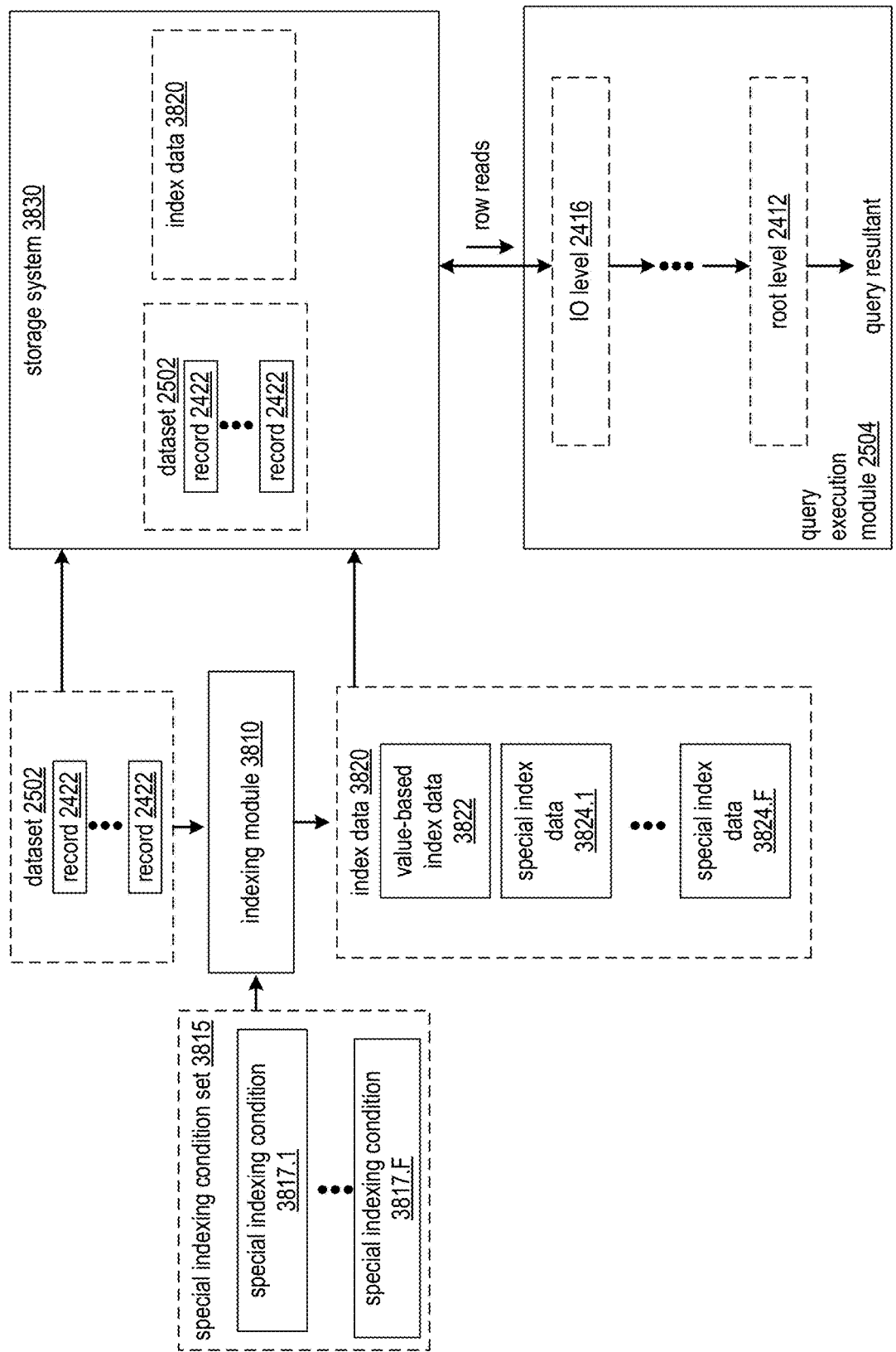
FIG. 27A is a schematic block diagram of a database system that implements an indexing module that generates special index data in accordance with various embodiments.

FIG. 27A illustrates an embodiment of a database system 10 that implements an indexing module 3810. The indexing module 3810 can be implemented via at least one processor and/or at least one memory of the database system 10 to generate index data for a dataset 2502 of records 2422. The index data 3820 can be stored via a storage system 3830 in conjunction with storage of the dataset 2502, where the index data 3820 and/or records 2422 themselves can be accessed in query executions via a query execution module 2504 as discussed previously. Some or all features and/or functionality of the database system 10 of FIG. 27A can implement the database system 10 of FIG. 25A and/or any other embodiment of database system 10 described herein. Some or all features and/or functionality index generation, index storage, and/or query execution of FIG. 27A can any other embodiment of index generation, index storage, and/or query execution described herein.

The indexing module 3810 can be implemented as a segment indexing module 2510 of a segment generator module 2506. In such embodiments, the storage system 3830 can be implemented as segment storage system 2508, where the index data 3810 generated for different segments are stored in conjunction with storage of corresponding segments as discussed previously. Such an embodiment is discussed in further detail in conjunction with FIG. 27B. In other embodiments, the indexing module 3810 can be otherwise implemented to generate index data for storage in conjunction with row data of a data set stored in any structure, and/or the storage system 3830 can otherwise be implemented via any one or more memories operable to store the index data 3810 and/or the records 2422 of a corresponding dataset 2502.

The index data 3820 can be generated and stored in conjunction with a probabilistic index structure, such as a probabilistic index structure 3020 and/or a non-probabilistic index structure. When the index data 3820 is generated and stored in conjunction with a probabilistic index structure, the index data can indicate proper supersets of rows satisfying each of a set of index values and/or conditions as discussed in conjunction with some or all of 30A-37C, where false positive rows identified by index elements need be filtered out via sourcing of rows and applying a filtering element, for example, where corresponding IO pipelines implement one or more probabilistic index-based IO constructs 3010 as described previously. When the index data 3820 is generated and stored in conjunction with a non-probabilistic index structure, the index data can indicate exactly the set of rows satisfying each of a set of index values and/or conditions as discussed in conjunction with some or all of 30A-37C, where false positive rows identified by index elements need not be filtered out via sourcing of rows and applying a filtering element in some or all cases.

In some embodiments, some or all of the index data 3820 is implemented via an inverted index structure. In some embodiments, some or all of the index data 3820 is implemented via a substring-based index structure. In some embodiments, some or all of the index data 3820 is implemented via a suffix-based index structure 3760. In some embodiments, some or all of the index data 3820 is implemented as secondary index data 2545 of some or all of FIGS. 25A-27D. The index data 3820 can be in accordance with any other type of index structure described herein, and/or any other index structure utilized to index data in database systems.

Index data 3820 can be implemented to index one or more different columns 3023 as discussed previously. Different columns can be indexed via the same or different type of index structure. Index data 3820 can be implemented to index one or more different segments 2424 as discussed previously. One more columns of records stored in different segments can be indexed via the same or different type of index structures for different segments as discussed in conjunction with FIGS. 25A-27D.

Generating the index data 3820 for some or all columns and/or for some or all segments can include generating value-based index data 3822, and special index data 3824.1-3824.F for a set of F different special indexing conditions 3817.1-3817.F of a special indexing condition set 3815.

The value-based index data 3822 can correspond to a mapping of non-null values to rows in accordance with a probabilistic or non-probabilistic structure. For example, the mapping is based on actual and/or hashed values of a set of all non-null values for a given column, where a set of rows having a given actual and/or hashed value are identified as being mapped to the given actual and/or hashed value in the mapping.

The special index data 3824 can correspond to additional mapping of special conditions to rows having these special conditions in accordance with a probabilistic or non-probabilistic structure. For example, a set of rows having a given special condition are identified as being mapped to the given special condition in the mapping. Generating the special index data 3824 for a given special indexing condition and a given column 3023 can include identifying which ones of the set of records 2422 of the dataset 2502 satisfy the special indexing condition, where all rows satisfying the special indexing condition are mapped to the special indexing condition in the corresponding index data 3824. In some embodiments, a probabilistic structure can be applied to these special conditions, where multiple different special conditions are hashed to a same value in the mapping. Alternatively, a non-probabilistic index structure is applied to these special conditions, where only rows satisfying the special indexing condition are mapped to the special indexing condition in the corresponding index data 3824, guaranteeing that exactly the set of rows satisfying the special indexing condition are mapped to the special indexing condition.

In some embodiments, some or all index data 3824 is stored in accordance with a different index structure from the value-based index data 3822 and/or from other index data 3824, for example, in accordance with a same or different type of indexing scheme from the value-based index data 3822 and/or from other index data 3824.

Alternatively, the index data 3820 is stored via a single indexing structure, such as an inverted index structure. For example, a set of index values, such as index values 3043, are utilized to identify each of a set of non-null values mapped to corresponding ones of the set of rows, and additional index values unique from this set of index values are utilized to identify each of the set of special indexing conditions 3817 mapped to corresponding ones of the set of rows. As a particular example, the index values 3043 utilized to identify each of the set of special indexing conditions 3817 are guaranteed to fall outside a set of hash values to which non-null values can be hashed to in value-based index data 3822 and/or the index values 3043 utilized to identify each of the set of special indexing conditions 3817 otherwise are unique from index values 3043 corresponding to non-values. Alternatively, the index values 3043 utilized to identify each of the set of special indexing conditions 3817 are not guaranteed to be unique from index values 3043 corresponding to non-values based on the corresponding indexing structure of index data 3820 being a probabilistic indexing structure, where further sourcing and filtering is necessary to differentiate rows having the special indexing conditions 3817 vs. non-null values mapped to the given index value 3043.

The special indexing condition set 3815 utilized to determine the number and types of the set of special index data 3824.1-3824.F that be generated can be the same or different for different columns 3023 of the dataset 2502. For example, a first column 3023 can be indexed via a first set of special index conditions 3815 to render a first set of index special index data 3824.1-3824.F1, and a second column 3023 can be indexed via a second set of special index conditions 3815 to render a second set of index special index data 3824.1-3824.F2, where the first set of special index conditions 3815 and the second set of special index conditions have a non-null set difference, and/or where number of conditions F1 and F2 in the first and second set of special index conditions are different.

Figure 27B:
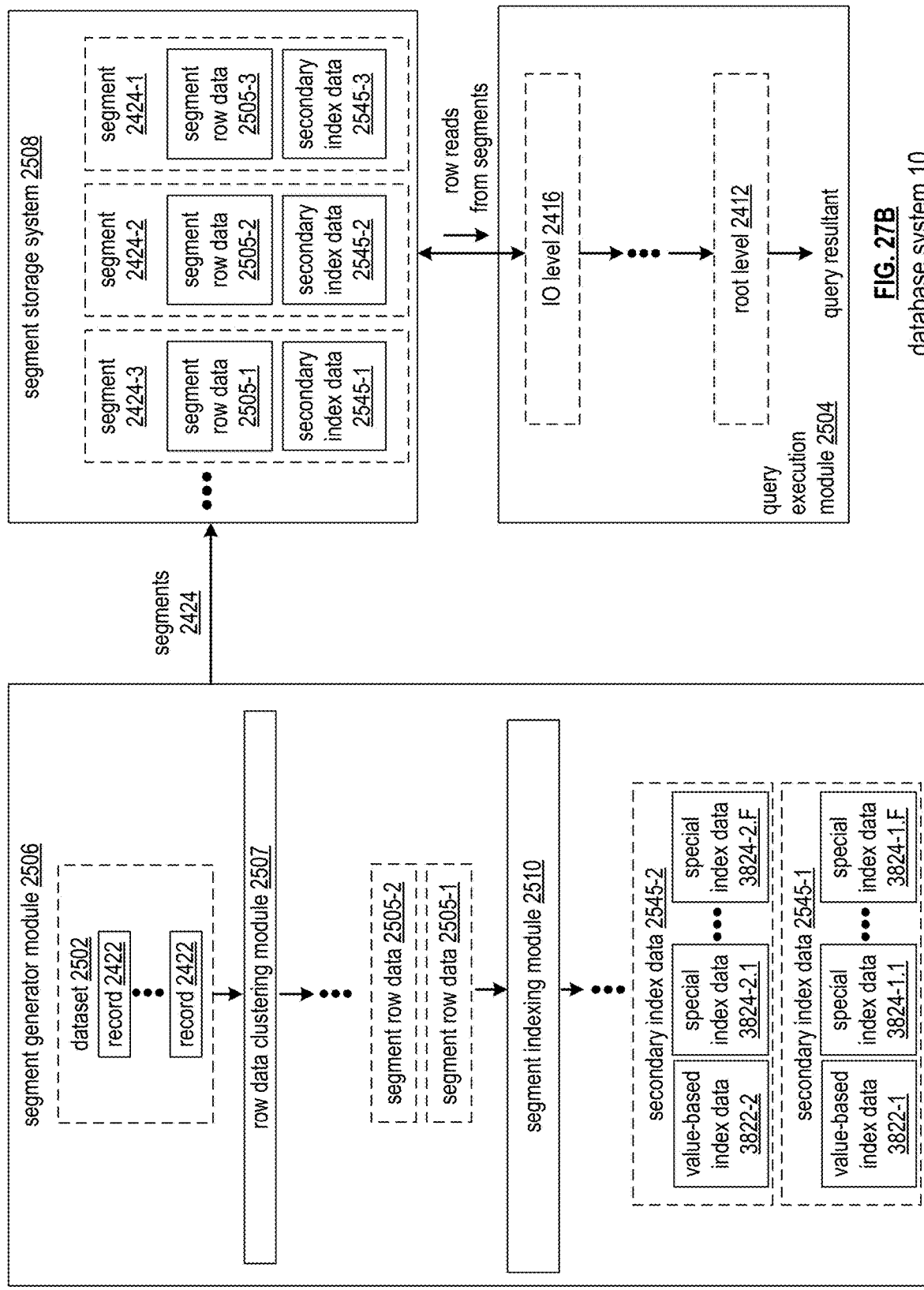
FIG. 27B is a schematic block diagram of a database system that implements a segment generator module that generates special index data in accordance with various embodiments.
Figure 27C:
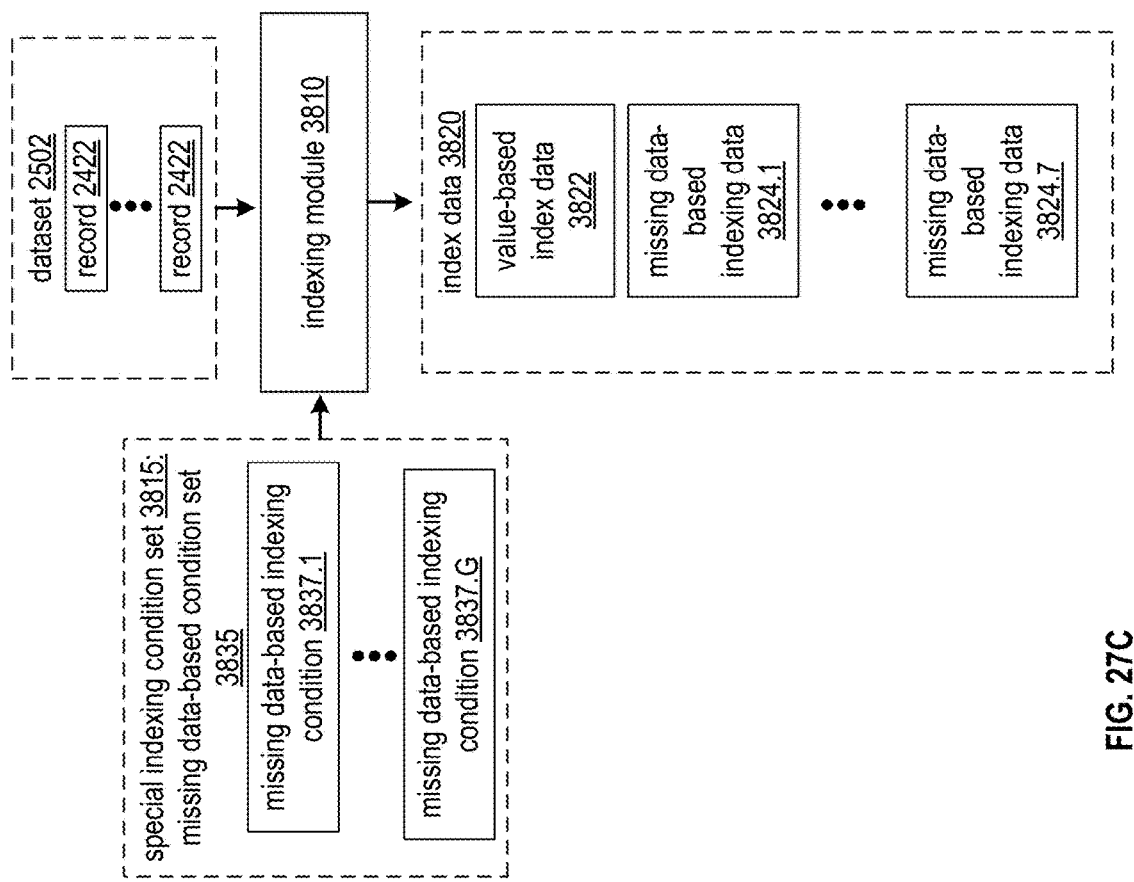
FIG. 27C is a schematic block diagram of a database system that implements an indexing module that generates that generates missing data-based index data in accordance with various embodiments.
Figure 27D:
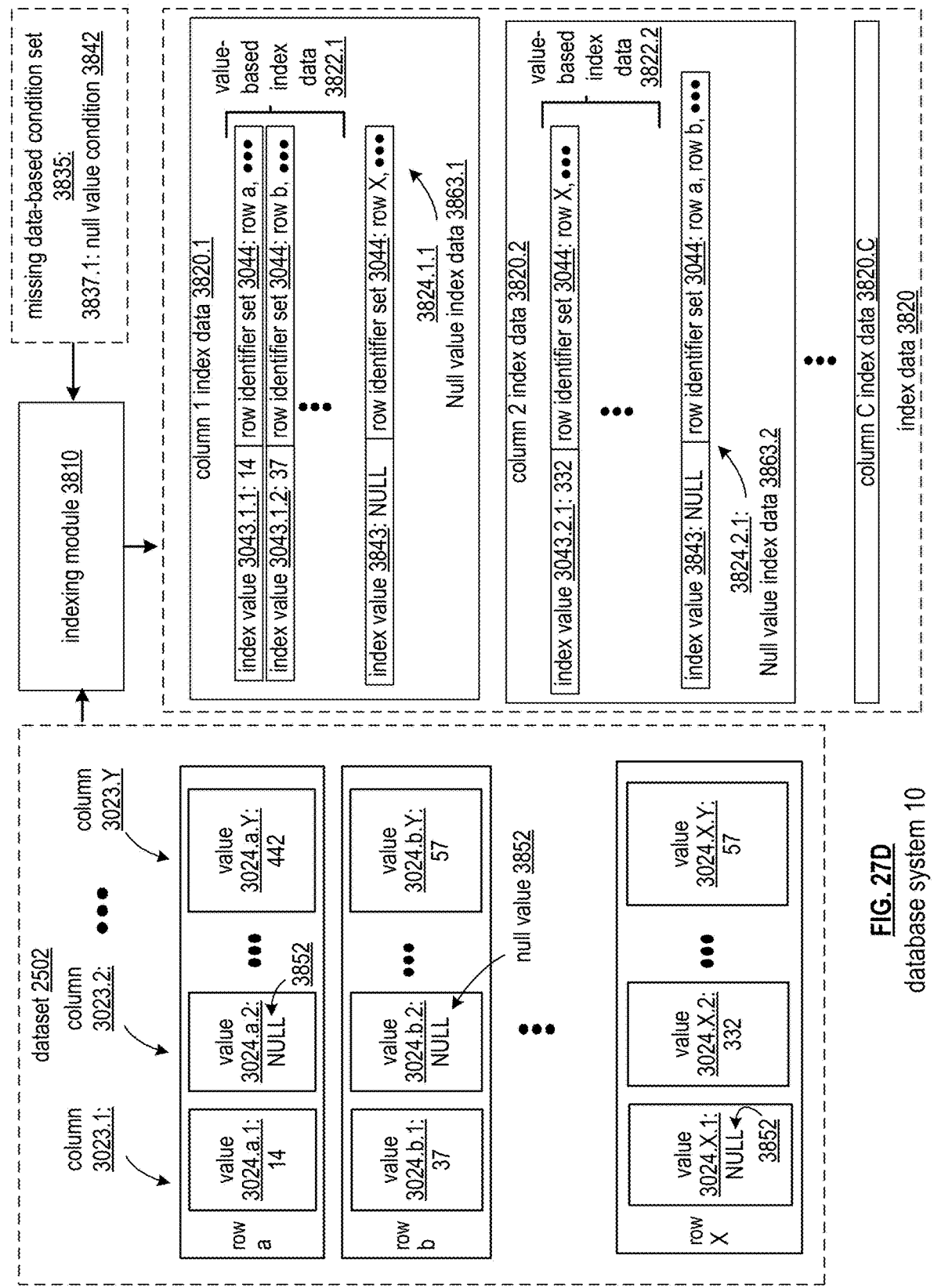
FIG. 27D is a schematic block diagram of a database system that implements an indexing module that generates that generates null value index data for an example dataset in accordance with various embodiments.
Figure 27E:
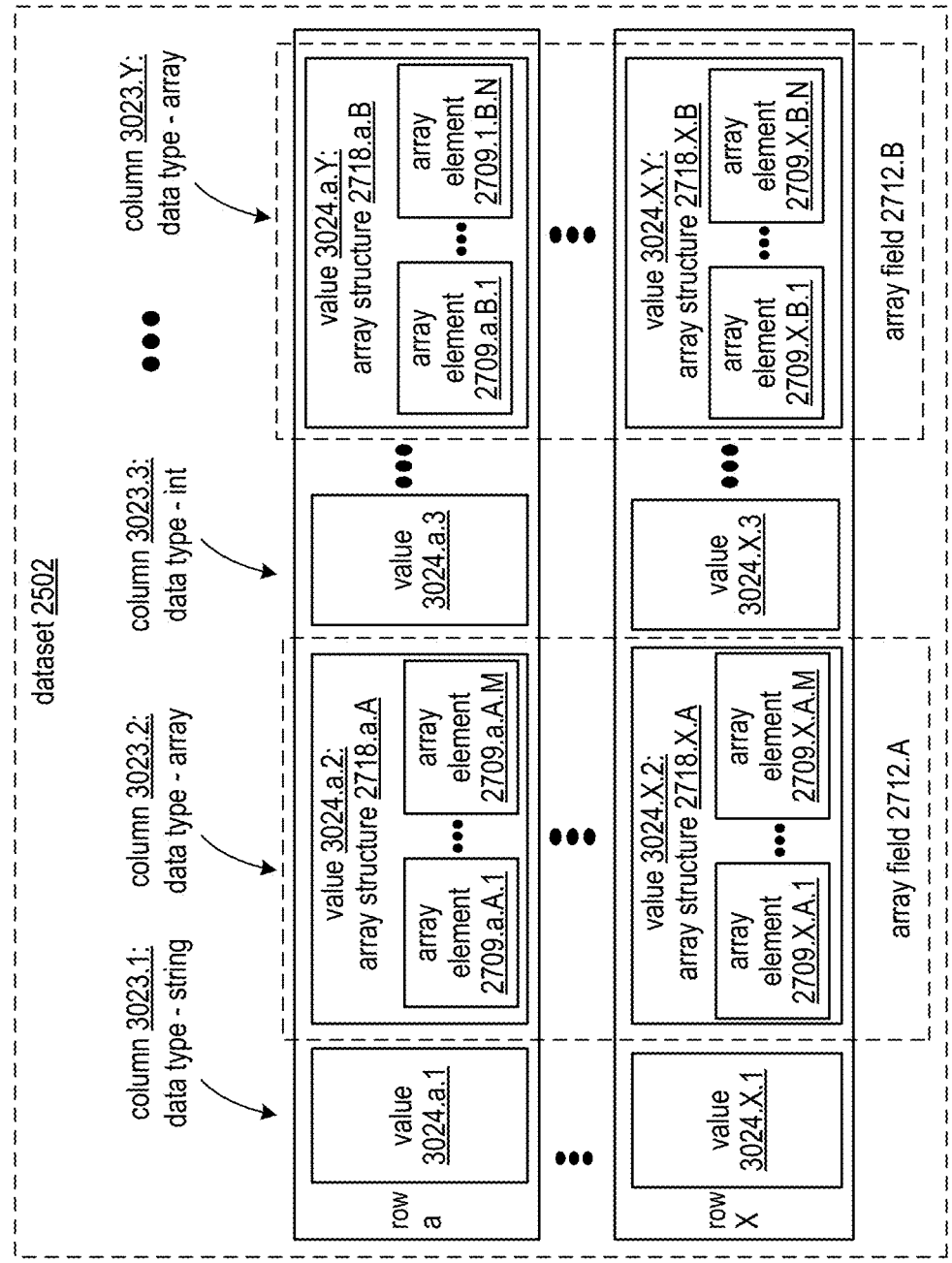
FIG. 27E illustrates an example dataset that includes at least one array field in accordance with various embodiments.

As a particular example, a first column can include array structures as discussed in further detail in conjunction with FIG. 27E, and includes a special index data 3824 for three special indexing conditions 3817 including: a first condition corresponding equality with the null value, a second condition corresponding to equality with an empty array containing no elements, and a third condition corresponding to including at least one array element of the array with a value equal to the null value, based on storing array structures where this second condition and third condition are applicable. A second column includes fixed length values or variable length values not included in an array structure (e.g. integers, strings, etc.), and includes a special index data 3824 for only the first condition corresponding to equality with a null value, based on not storing array structures, where the second condition and third condition are thus not applicable.

The special indexing condition set 3815 utilized to determine the number and types of the set of special index data 3824.1-3824.F that be generated for a given column 3023 can be the same or different for different segments 2424 generated for the dataset 2502. For example, a full set of special indexing condition types can be indicated in the secondary indexing scheme option data 2531 and/or a given special indexing condition set 3815 for a given segment is selected in generating secondary indexing scheme selection data 2532 for the given segment. For example, a first segment 2424 can have a given column indexed via a first set of special index conditions 3815 to render a first set of index special index data 3824.1-3824.F1, and a second segment 2424 can have the given column 3023 indexed via a second set of special index conditions 3815 to render a second set of index special index data 3824.1-3824.F2, where the first set of special index conditions 3815 and the second set of special index conditions have a non-null set difference, and/or where number of conditions F1 and F2 in the first and second set of special index conditions are different.

As a particular example, the row data clustering module 2507 sorts groupings of rows having particular special conditions (e.g. rows with a null value for a given column, rows with empty arrays for a given column, rows having arrays for a given column containing null values, etc.,) into different segments. In some embodiments, only segments with rows having the given special condition for the given column have index data generated for the given special condition for the given column based on including rows where this special condition applies. In some embodiments, other segments can optionally have index generated for these special conditions indicating that none of its rows satisfy the special condition for the given column.

FIG. 27B illustrates an embodiment of generating special index data 3824 included in secondary index data 2545 for different segments 2424, for example, via some or all features and/or functionality discussed in conjunction with FIG. 25A. Some or all features and/or functionality of the database system 10 of FIG. 27B can implement the database system 10 of FIG. 27A, of FIG. 25A, and/or any other embodiment of database system 10 described herein.

FIG. 27C illustrates an embodiment of indexing module 3810 that generates missing data-based indexing data 3824.1-3824.G based on the special index condition set 3815 indicating a corresponding missing data-based condition set 3835. Some or all features and/or functionality of the indexing module 3810 of FIG. 27C can implement the indexing module 3810 of FIG. 27A and/or any embodiment of database system 10 described herein.

The missing data-based condition set 3835 can be implemented as some or all of the special index condition set 3815, where all special indexing conditions 3815 correspond to missing data-based conditions 3837 of the missing data-based condition set 3835, and/or where some special indexing conditions 3815 correspond to additional special indexing conditions that are not missing data-based conditions 3837, such as other user-defined conditions, administrator-defined conditions, and/or automatically selected conditions not related to missing data, but useful in optimizing query execution, for example, based on these conditions arising frequently in dataset and/or query expressions against the dataset (e.g. indexing arrays meeting the condition of having all of its elements equal to the same value, regardless of what this same value is)

Each missing data-based conditions 3837 can correspond to a type of condition for a given row, such as a given column of a given row, that is based on some form of missing data. For example, values of columns meeting one of the set of missing data-based condition set 3835 can correspond to columns having missing and/or undefined values.

In some embodiments, one missing data-based condition 3837 can correspond to a null value condition. The null value condition can be applied to a one or more given columns 3023 being indexed. The null value condition can be satisfied for a given column for rows having a value of NULL for the given column, and/or based on a non-null value for the given column never having been supplied and/or being missing for the corresponding row.

Alternatively or in addition, one missing data-based condition 3837 can correspond to an empty array condition. The empty array condition can be applied to a one or more given columns 3023 being indexed. The empty array condition can be satisfied for a given column for rows having an empty array (e.g. [ ]) as the value for the given column, and/or based on elements of a corresponding array never having been supplied and/or being missing for the given column of the corresponding row. The empty array condition can be distinct from the null value condition, where, for a given column, no row can satisfy both the empty array condition and the null value condition (e.g. a given column value for a given row cannot have a value of [ ] because it has the value of NULL, or vice versa).

Alternatively or in addition, one missing data-based condition 3837 can correspond to a null-inclusive array condition. The null-inclusive array condition can be applied to one or more given columns 3023 being indexed. The null-inclusive array condition can be satisfied for a given column for rows having an array where one or more of its array elements are null values (e.g. [ . . . , NULL, . . . ]), and/or based on one or more elements of a corresponding array never having been supplied with non-null elements and/or being missing for the given column of the corresponding row. In particular, the null-inclusive array condition can be implemented via an existential quantifier applied to sets of elements of array structures of a given column, requiring equality with the null value (e.g. index rows where the statement for_some(array element)==null is true to the given column). The null-inclusive array condition can be distinct from both the empty array condition and the null value condition, where, for a given column: no row can satisfy both the null-inclusive array condition and empty array condition (e.g. a given column value for a given row cannot have a value of [ ] because it is non-empty array having one or more NULL-valued elements, or vice versa); and/or no row can satisfy both the null-inclusive array condition and empty array condition (e.g. e.g. a given column value for a given row cannot have a value of NULL because it is non-empty array having one or more NULL-valued elements, or vice versa)

Alternatively or in addition, one or more missing data-based condition 3837 can correspond to a different type of missing data-based condition 3837 corresponding to any other type of condition where a data value for a corresponding one or more columns 3023 is unknown, null, empty, not supplied, intentionally left blank, or otherwise missing. For example, another missing data-based condition 3837 corresponds to a universal quantifier condition applied to array structures for equality with the null value, where rows having all elements of corresponding arrays equal to the null value are indexed accordingly (e.g. index rows where the statement for_all(array element)==null is true to the given column). As discussed in further detail herein, a row having a column value meeting a missing data-based condition 3837 can still have data/meaning associated with this column value.

In some embodiments, some or all missing data-based condition 3837 can be distinct conditions, where, for a given column or given set of columns of the corresponding index structure, no given row can satisfy more than one missing data-based condition 3837. In some embodiments, some or all special indexing conditions 3817 can be distinct conditions, where, for a given column or given set of columns of the corresponding index structure, no given row can satisfy more than one special indexing conditions 3817.

Alternatively, in other embodiments, two or more missing data-based condition 3837 can optionally be satisfied by a given row, where the given row is indexed a given column or given set of columns of a corresponding index structure for multiple ones of the missing data-based conditions 3837. Alternatively or in addition, two or more special indexing conditions 3817 can optionally be satisfied by a given row, where the given row is indexed a given column or given set of columns of a corresponding index structure for multiple ones of the special indexing conditions 3817.

In some embodiments, some or all missing data-based condition 3837 can be distinct conditions from the value-based indexing of value-based index data 3822, where, for a given column or given set of columns of the corresponding index structure, no given row can satisfy both a missing data-based condition 3837 and be indexed for a given actual and/or hashed value in value-based index data 3822. This can apply to the null value condition and/or the empty array condition, as given column values that are either null or empty arrays have no non-null value, and are thus not mapped to non-null values for the given column in the value-based index data 3822.

Alternatively or in addition, some rows can satisfy both a missing data-based condition 3837 and be mapped to a value in value-based index data 3822 for a given column. This can apply to the null-inclusive array condition, for example, where a given row has a column value of the given column that is an array having one array element with a null value, rendering mapping of the given row to the null-inclusive array condition in the index data for the given column, and where this array for the given column has another element with a non-null value, rendering mapping of the given row to this given non-null value in for the given column.

In some embodiments, the missing data-based condition set 3835 fully encompass all possible states a given column value that a given column can have, in addition to the non-null values of the value-based index data 3822, where a given row is guaranteed to be mapped to exactly one, or at least one, index value of the index data 3820 based on being guaranteed to either have having a non-null value mapped in an index value in value-based index data 3822 or to have a value with missing data met by one of the missing data-based conditions 3837 of the missing data-based condition set 3835.

FIG. 27D presents an example embodiment of generating index data via an indexing module 3810 for some or all columns of a dataset 2502 containing a set of X rows a, b, c, d, . . . X having a set of columns 1-Y. Some or all features and/or functionality of the indexing module 3810 and/or index data 3820 of FIG. 27D can be utilized to implement the indexing module 3810 and/or index data 3820 of FIG. 27A, and/or any embodiment of database system 10 described herein.

In this example, at least columns 1, 2, and Y are populated by column values 3024 that are integer values for some or all rows, for example, based on these columns having an integer data type. However, some column values for at least columns 1, 2, and Y have values 3024 corresponding to null value 3852 for the corresponding row (e.g. NULL, or another defined and/or special "value" denoting the corresponding data is missing, unknown, undefined, was never supplied, etc.). In some embodiments, if a column is not supplied with a non-null value (e.g. is not supplied with an integer value or other value of the corresponding data type), its value is automatically set as and/or designated as the null value 3852.

The indexing module 3810 can generate index data 3820 based on a missing data-based condition set 3835 denoting a null value condition 3842, such as the null value condition discussed in conjunction with FIG. 27C. Other missing data-based conditions 3837 may not be relevant for some or all columns, for example, based on the columns containing integer values or other simple data types rather than more complex datatypes such as arrays.

Value-based index data 3822.1 of the index data 3820.1 of column 1 maps a set of rows to each non-null column value (or a hashed value for column values, for example, where the index data is in accordance with a probabilistic index structure), In particular, each non-null column value corresponds to one of a plurality of different index values 3043 of the value-based index data 3822.1, for example, which can be probed by corresponding index elements in IO pipelines to render the corresponding row identifier sets 3044 indicating ones of the plurality of rows mapped to these index values 3043 as discussed previously.

Furthermore, an additional index value 3843 can correspond to the null value condition 3842, and is mapped to all rows in the set of rows having the null value 3852 for column 1 (in this example, at least row X), as null value index data 3863 for the null value condition 3842, where the special index data 3824 for column 1 corresponds to this null value index data 3863. For example, this index value 3843 of the column 1 index data 3820.1 can be probed by corresponding index elements in IO pipelines to render the corresponding row identifier set 3044 indicating ones of the plurality of rows mapped to this index values 3843 to identify ones of the plurality of rows satisfying the null value condition 3842 for column 1.

Such value-based index data 3822 and special index data 3824 can be generated for some or all additional columns, such as column 2 as illustrated in FIG. 27E. In this example, the additional index value 3843 in the index data 3820.2 for column 2 is mapped to all rows in the set of rows having the null value 3852 for column 2, which includes at least row a and row b, as these rows have the null value 3852 as the value 3024 of column 2.

FIG. 27E illustrates an embodiment of a dataset 2502 having one or more columns 3023 implemented as array fields 2712. Some or all features and/or functionality of the dataset 2502 of FIG. 27E can be utilized to implement the dataset 2502 of FIG. 27A, FIG. 27D, and/or any embodiment of dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 27F:
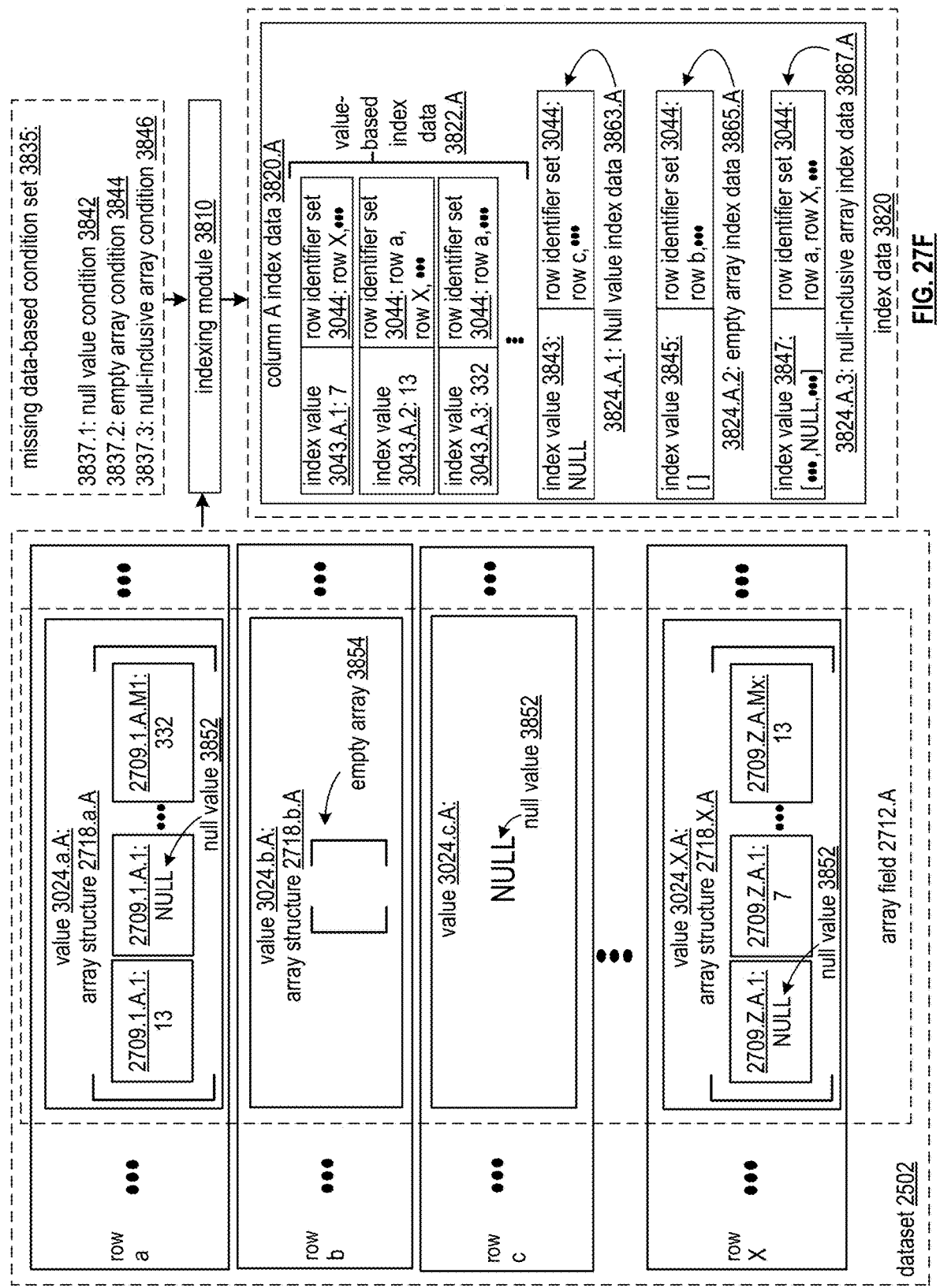
FIG. 27F is a schematic block diagram of a database system that implements an indexing module that generates that generates null value index data, empty array index data, and/or null-inclusive array index data for an example dataset in accordance with various embodiments.

FIG. 27F presents an example embodiment of generating index data via an indexing module 3810 for a given column 3023.A of a dataset 2502 implemented as an array field 2712A Some or all features and/or functionality of the indexing module 3810 and/or index data 3820 of FIG. 27F can be utilized to implement the indexing module 3810 and/or index data 3820 of FIG. 27A, FIG. 27D, and/or any embodiment of database system 10 described herein.

The indexing module can generate value-based index data 3822 to map rows to index values 3043 denoting rows having array structures 2718 for the given column 3023 that contain a corresponding non-null value. In some embodiments, the value-based index data 3822 can be implemented as probabilistic index data (e.g. values of elements 2709 are hashed to a hash value implemented as index value 3043, where a given index value 3043 indicates a set of rows with array structures that include a given value hashed to index value 3043, and possibly rows with array structures that instead include another given value that also hashes to this index value 3043, and would possibly require filtering as false positive rows in query execution). The value-based index data 3822 can be implemented as non-probabilistic data in other embodiments, where a given value-based index value 3043 is mapped to all rows having array structures 2718 for the given column 3023 that contain a corresponding value, and is further mapped to only rows having array structures 2718 for the given column 3023 that contain the corresponding value.

In some embodiments, unlike the value-based index data 3822 of the example of FIG. 27D where rows are mapped to index values 3043 based on their column value 3024 for the given column having equality with a corresponding value, value-based index data 3822 for some or all array fields 2712 can be generated where rows are mapped to index values 3043 based on their column value 3024 for the given column being an array structure containing the corresponding value as one of its elements, even if the given array structure also contains other values. Thus, while the index data 3822 of the example of FIG. 27D reflects an equality condition applied to the corresponding column based on the columns being implemented to contain a single value (e.g. index rows for a given value when col==value or hash(col)==val is true), the index data 3822 of FIG. 27F reflects an existential qualifier condition applied to sets of elements included in array structures of the corresponding column (e.g. index rows for a given value when for_some(col)==value or for_some(hash(col))==val is true). This structure can be leveraged to simplify the IO pipeline for queries having query predicates indicating existential qualifier condition applied to sets of elements included in array structures, as discussed in further detail in conjunction with FIG. 40B.

Furthermore, in embodiments where the value-based index data 3822 for some or all array fields 2712 is generated by mapping rows to index values 3043 based on their column value 3024 for the given column being an array structure containing the corresponding value as one of its elements, a given row can be mapped to multiple different index values 3043 for the given column due to having an array structure containing multiple different elements. In this example, row A is mapped to index value 3043.A.2 and 3043A.3 due to containing value 13 as one of its elements and value 332 as another one of its elements.

The missing data-based condition set 3835 applied to some or all columns implemented as array fields 2712 can include the null value condition 3842, as well as an empty array condition 3844, such as the empty array condition discussed in conjunction with FIG. 27C, and/or a null-inclusive array condition 3846, such as the null-inclusive array condition discussed in conjunction with FIG. 27C. In this example, additional index values 3843, 3845, and 3847 correspond to the null value condition 3842, the empty array condition 3844, and the null-inclusive array condition 3846, respectively, and each are mapped to rows meeting the corresponding condition for the corresponding array field 2712A as null value index data 3863, empty array index data 3865, and null-inclusive array index data 3867 implementing special index data 3824 for each condition for the given column.

In particular, index value 3843 maps to a row identifier set 3044 indicating at least row c due to row c having a value 3024 for the array field 2712 equal to the null value 3852, and thus satisfying the null value condition 3842. Index value 3845 maps to a row identifier set 3044 indicating at least row b due to row b having a value 3024 for the array field 2712 equal to the empty array 3854 having zero elements 2709, and thus satisfying the empty array condition 3844. Index value 3847 maps to a row identifier set 3044 indicating at least row a and row X due to rows a and X having a value 3024 for the array field 2712 equal to an array structure 2718 including a set of elements 2709 that includes the null value 3852 as at least one of its elements, and thus satisfying the null-inclusive array condition 3846.

Note that the row identifier set 3044 for index value 3843 does not include row a or row X despite their values including null value 3852, as these null values are elements 2709 of a corresponding array structure 2718, rather than the value of the array structure 2718 as a whole, as required to meet the null value condition 3842. Similarly, the row identifier set 3044 for index value 3847 does not include row c despite row c having hull value 3852, as null value 3852 of row c is the value for the column value 3024, and thus the column value 3024 does not include any array structure containing any elements 2907, as required to meet the null-inclusive array condition 3846.

Note that the row identifier set 3044 for index value 3843 also does not include row b, as the corresponding value 3024 is the empty array 3854, which is different from the null value 3852 required to meet the null value condition 3842. Similarly, the row identifier set 3044 for index value 3845 does not include row c, as the corresponding value 3024 is the null value 3852, which is different from the empty array 3854 required to meet the empty array condition 3844.

Note that the row identifier set 3044 for index value 3845 does not include row a or row X, as rows have non-empty array structure 2718 despite containing null valued elements, rather than being empty with zero elements 2709, as required to meet the empty array condition 3844. Similarly, the row identifier set 3044 for index value 3847 does not include row b, rows b is empty with no elements, and thus does not containing null valued elements, as required to meet the empty array condition 3846.

In particular, as discussed previously, the null value condition 3842, the empty array condition 3844, and the null-inclusive condition 3846 implemented as the missing data-based conditions 3837.1-3837.3 of the missing data-based condition set 3835 are distinct conditions, where their corresponding row identifier sets 3044 of the respective null value index data 3863, the empty array index data 3865, and the null-inclusive array index data 3867 are guaranteed to be mutually exclusive sets of rows.

The row identifier sets 3044 of the null value index data 3863, the empty array index data 3865, and the value based index data 3822 can also be guaranteed to be mutually exclusive sets of rows. The row identifier sets 3044 of all of the value-based index data 3822, the null value index data 3863, the empty array index data 3865, and the null-inclusive array index data 3867, can be guaranteed to be collectively exhaustive with respect to the set of rows 1-X.

Some or all rows in the row identifier set 3044 of null-inclusive array index data 3867 can have a non-null intersection with rows included in a union of row identifier sets 3044 of value-based index data 3822 based on some rows in row identifier set 3044 of value-based index data 3822 having array structures containing some non-null elements and also some null elements. A set difference between rows in the row identifier set 3044 of null-inclusive array index data 3867 and rows included in a union of row identifier sets 3044 of value-based index data 3822 can be non-null, for example, based on some rows in row identifier set 3044 of value-based index data 3822 having array structures containing only non-null elements, and/or based on some rows in row identifier set 3044 of null-inclusive array index data 3867 having array structures containing only null elements.

Note that despite the index values 3043 of value-based index data 3822 being mapped based on satisfying an existential quantifier condition applied to the set of elements of column values 3024, index values 3843 and 3845 are further unique based on instead being mapped based on satisfying an equality condition applied to the column value 3024 as a whole (e.g. these conditions column value 3024 must be equal to the null value 3852 or the empty set 3854, rather than these conditions requiring the column value 3024 have one or more of its set of elements 2709 meeting a condition). Index value 3847 can be considered as most similar to the index values 3043 of value-based index data 3822 based on its condition also corresponding to an existential quantifier condition applied to the set of elements of column values 3024 (e.g. the array must contain a value equal to null, rather than another non-null value denoted by another index value 3043). Despite these differences in tests for equality conditions vs. existential quantifier condition, all index values can optionally be mapped to rows within a same index structure for the given column and/or can be probed via index elements in an identical fashion.

Figure 27G:
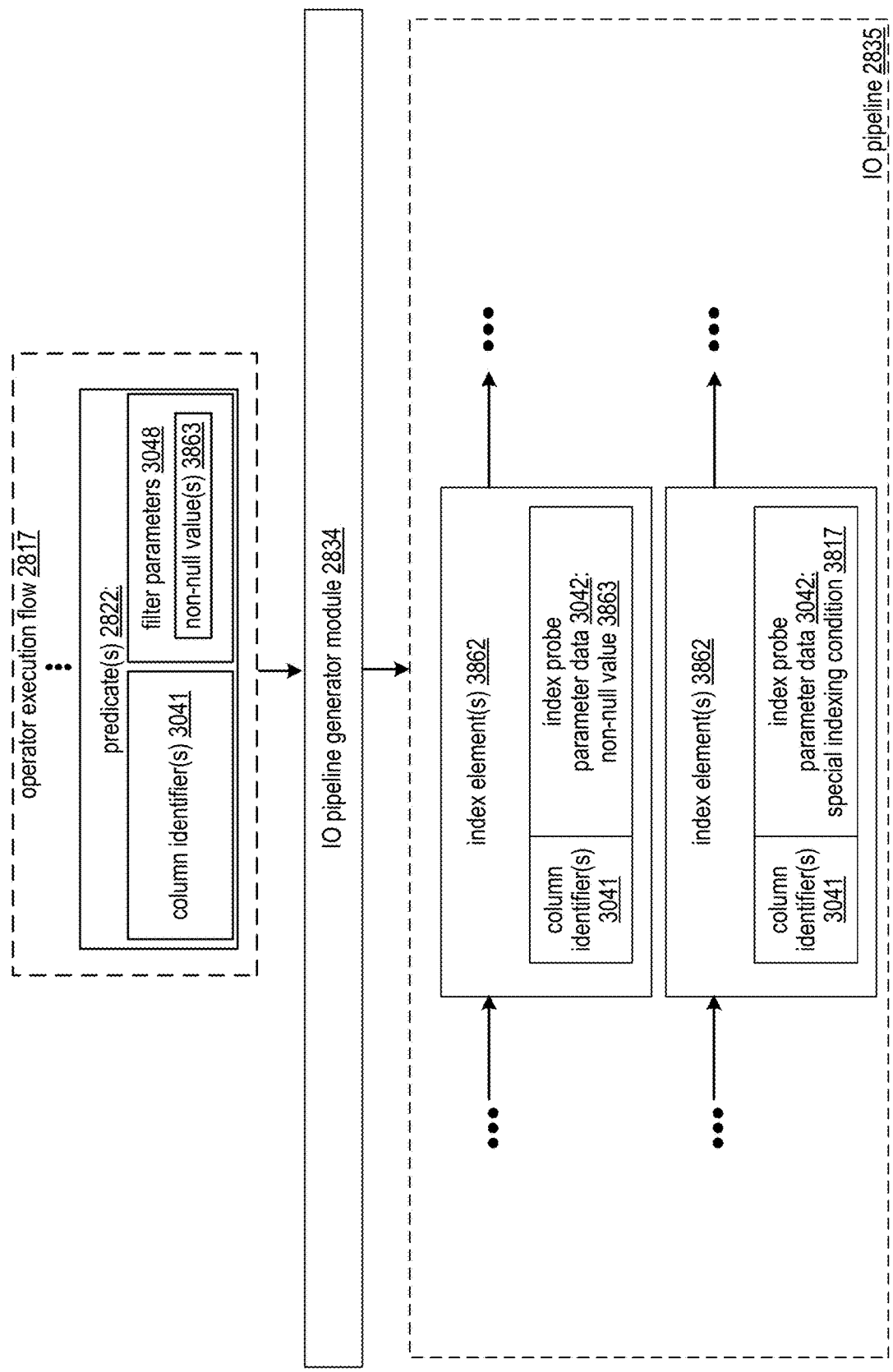
FIG. 27G illustrates generation of an IO pipeline based on filter parameters indicating a non-null value in accordance with various embodiments.

FIG. 27G illustrates an example embodiment of an IO pipeline generator module 2834 of a query processing system 2802 that generates an IO pipeline 2835 for an operator execution flow 2817 containing predicates 2822. Some or all features and/or functionality of the query processing system 2802, IO pipeline generator module 2834, and/or IO pipeline 2835 of FIG. 27G can be utilized to implement any embodiment of the query processing system 2802, IO pipeline generator module 2834, and/or IO pipeline 2835 discussed herein. The IO pipeline 2835 of FIG. 27G can be implemented via the query execution module 2504 of FIG. 27A, for example, applied to index data 3820 having some or all features and/or functionality described in conjunction with FIGS. 27A-27F. The IO pipeline 2835 of FIG. 27G can be implemented via any other embodiment of query execution module 2504 described herein. Query processing system 2802 can implement any embodiment of query processing system described herein and/or can implement any processing and/or memory resources of database system 10.

A given operator execution flow 2817 can include one or more query predicates 2822. For example, the operator execution flow 2817 is generated by a query processing system to push some or all predicates of a given query expression to the IO level for implementation at the IO level as discussed previously.

An IO pipeline 2835 generated for a given operator execution flow 2817 can optionally contain one or more index elements 3862 applied serially or in parallel. These index elements 3862 can be based on column identifiers 3041 denoting the column for the corresponding index data, and index probe parameter data 3042 indicating the index value to be probed. These index elements 3862 can be implemented in a same or similar fashion as IO operators of FIGS. 28C and/or 29A having types sourcing index structures for the corresponding column denoted by column identifier 3041. Alternatively or in addition, these index elements 3862 can be implemented in a same or similar fashion as any probabilistic index element 3012 described herein. However, the corresponding index structure can be probabilistic or non-probabilistic as discussed previously. Alternatively or in addition, these index elements 3862 can be implemented in a same or similar fashion as any other index element described herein. However, the corresponding index structure can be a substring-based index structure 3570.A, or any other type of index structure described herein.

One or more index elements 3862 can have index probe parameter data 3042 indicating a non-null value 3863 denoted by given filter parameters 3048. For example, the non-null value 3863 is denoted in filter parameters 3048, where the corresponding predicates 2833 indicate identification of rows having values, for the given column 3041, satisfying: equality with the non-null value 3863; inequality with the non-null value 3863, being greater than or less than the non-null value 3863; containing the non-null value 3863 as a substring; being a substring of the non-null value 3863; having at least one of its set of array elements being equal to the non-null value 3863; having at least one of its set of array elements being unequal to the non-null value 3863, having at least one of its set of array elements being greater than or less than the non-null value 3863; having at least one of its set of array elements containing the non-null value 3863 as a substring; having at least one of its set of array elements set of array elements being a substring of the non-null value 3863; having all of its set of array elements being equal to the non-null value 3863; having all of its set of array elements being unequal to the non-null value 3863, having all of its set of array elements being greater than or less than the non-null value 3863; having all of its set of array elements containing the non-null value 3863 as a substring; having all its set of array elements set of array elements being a substring of the non-null value 3863; and/or other requirements based on and/or involving the non-null value 3863.

When executed via a query execution module 2504, these index elements 3862 can identify sets of rows that are guaranteed to include all rows satisfying this given condition involving the non-null value 3863, for example, when combined with other index elements and/or with other operators (e.g. intersection, union, set difference, source elements, filtering operators, etc.) to apply the query predicate 2822 at the IO level. The need for some or all source elements and/or filtering operators can be based on the corresponding index being implemented as a probabilistic index structure.

In some cases, source elements and/or filtering operators are not necessarily due to the corresponding index being implemented as a non-probabilistic index structure. In some cases, source elements and/or filtering operators are still necessary despite the corresponding index being implemented as a non-probabilistic index structure, due to set logic applied to the predicates 2822 and/or the nature of the corresponding index structure.

In some embodiments, the IO pipeline 2835 can further include one or more additional index elements 3862 can have index probe parameter data 3042 indicating a special indexing condition 3817. For example, the need for these one or more additional index elements 3862 to identify rows satisfying the special indexing condition 3817 is required, in combination with the index elements 3862 involving the one or more non-null values and/or other operators (e.g. intersection, union, set difference, source elements, filtering operators, etc.) to appropriately apply the query predicate 2822 at the IO level to render the correct result.

Different types of predicates for different queries may require utilizing different additional index elements 3862, where some special conditions are relevant to the execution of the given query and other special conditions are not relevant, for example, based on types of operators in its predicate 2822 and/or based on applying corresponding set logic. Some types of predicates for some queries may not require any of these additional index elements 3862, where rows having special conditions are not relevant to the execution of the given query, for example, based on types of operators in its predicate 2822 and/or based on applying corresponding set logic.

Generating the IO pipeline 2835, and/or determining whether one or more such additional index elements 3862 for one or more different special indexing conditions 3817 of the special indexing condition set 3815 be applied, can be based on selecting a subset of special indexing conditions 3817 of the special indexing condition set 3815, and including an index element 3862 for each selected special indexing conditions 3817 in this subset to be applied in executing the corresponding IO pipeline 2835.

For some types of query predicates 2822, this subset of special indexing conditions 3817 of the special indexing condition set 3815 can include: all of the special indexing conditions 3817 of the special indexing condition set 3815. For other types of query predicates 2822, this subset of special indexing conditions 3817 of the special indexing condition set 3815 can include none of the special indexing conditions 3817 of the special indexing condition set 3815, where only index elements 2835 for non-null values 3863 of the query predicates 2822 are applied. For other types of query predicates 2822, this subset of special indexing conditions 3817 of the special indexing condition set 3815 can include a proper subset of the special indexing conditions 3817 of the special indexing condition set 3815, where index elements 2835 for only some of the special indexing conditions 3817 of the special indexing condition set 3815 are applied.

Selecting this subset of special indexing conditions 3817 of the special indexing condition set 3815 can be based on one or more operators of the given query, a serialized and/or parallelized set of operators to implement the query predicates 2822 in the operator execution flow 2817, a predetermined mapping of subsets of special indexing conditions 3817 for different types of query predicates 2822 and/or query operators 2822; known set logic rules; and/or another determination. Different query predicates 2822 for different queries can have different subsets of special indexing conditions 3817 with different numbers and/or types of special indexing conditions 3817 identified, where different sets of corresponding additional index elements 3862 are applied in different corresponding IO pipelines 2835 accordingly.

Selecting this subset of special indexing conditions 3817 of the special indexing condition set 3815 for a given query can be based on guaranteeing the correct query resultant and/or identification exactly the correct set of rows satisfying the query predicate (i.e. all rows that satisfy the query predicate and only rows that satisfy the query predicate), as correctness of the query resultant can be based on rows satisfying special indexing conditions 3817 rendering the query predicates 2822 true or false, and thus determining whether rows satisfying special indexing conditions 3817 should be included in, or be candidates for inclusion in, the corresponding output of rows satisfying the query predicates. In some embodiments, selecting this subset of special indexing conditions 3817 of the special indexing condition set 3815 can be based on identifying a subset of special indexing conditions 3817 that render the query predicates 2822 as true, for example, based on a predetermined mapping and/or applying known set logic rules, where the corresponding index elements are applied to ensure corresponding rows are identified as part of the set of rows identified as satisfying the query predicates 2822 in conjunction with executing the query. Alternatively or in addition, selecting this subset of special indexing conditions 3817 of the special indexing condition set 3815 can be based on identifying a subset of special indexing conditions 3817 that render the query predicates 2822 as false, for example, based on a predetermined mapping and/or applying known set logic rules, where the corresponding index elements are applied to ensure corresponding rows are identified as part of an intermediate set of rows identified as not satisfying the query predicates 2822 in conjunction with executing the query, where a set difference is applied to this intermediate set of rows and a full set of rows to which the query is applied to render a set of rows satisfying the query predicates 2822.

As a particular example, selecting the subset of special indexing conditions 3817 can further include selecting the null value condition 3842 when an inequality condition is applied and/or when a set difference is applied to apply a negation of a condition of filtering parameters, such as a negation of an equality condition, due to the null value condition 3842 not satisfying the inequality condition and/or other negated condition (e.g. null!=literal is false, and null values should not be identified), and being filtered via the set difference.

For example, an IO pipeline for a negated condition includes applying the negation via a set difference to filter out rows satisfying the condition (e.g. the negated query predicates) and to further filter out rows that satisfy neither the condition nor the negated condition (e.g. rows with values of null for the column) by applying an index element for the null value condition to filter out identified rows.

Alternatively or in addition, selecting the subset of special indexing conditions 3817 can further include not selecting the null value condition 3842 when a non-negated equality condition is applied, when another non-negated condition is applied, and/or when a set difference is not applied, due to the null value condition 3842 not satisfying the equality condition and/or other non-negated condition (e.g. null=="literal" is false, and null values should not be identified).

The subset of special indexing conditions 3817 of the special indexing condition set 3815 can be applied via a set of corresponding index elements 3862 implemented in parallel, for example, via different nodes 37 and/or different processing resources independently and/or without coordination. This set of corresponding index elements 3862 can be further implemented in parallel with some or all index elements 3862 indicating non-null values 3863, for example, via different nodes 37 and/or different processing resources independently and/or without coordination.

The IO pipeline 2835 generated via IO pipeline generator module 2834 can be generated as the same IO pipeline 2835 or different IO pipeline 2835 for different segments 2424. For example, different IO pipelines 2835 are generated for different segments due to different segments having different index structures as discussed previously. In some embodiments, for a given query, an IO pipeline 2835 for a first segment includes at least one index element 3862 having index probe parameter data 3042 indicating a special indexing condition 3817, while an IO pipeline 2835 for a second segment does not includes any index element 3862 having index probe parameter data 3042 indicating the special indexing condition 3817, for example, based on the special indexing condition being indexed for rows of the first segment, but not for rows of the second segment.

Figure 27H:
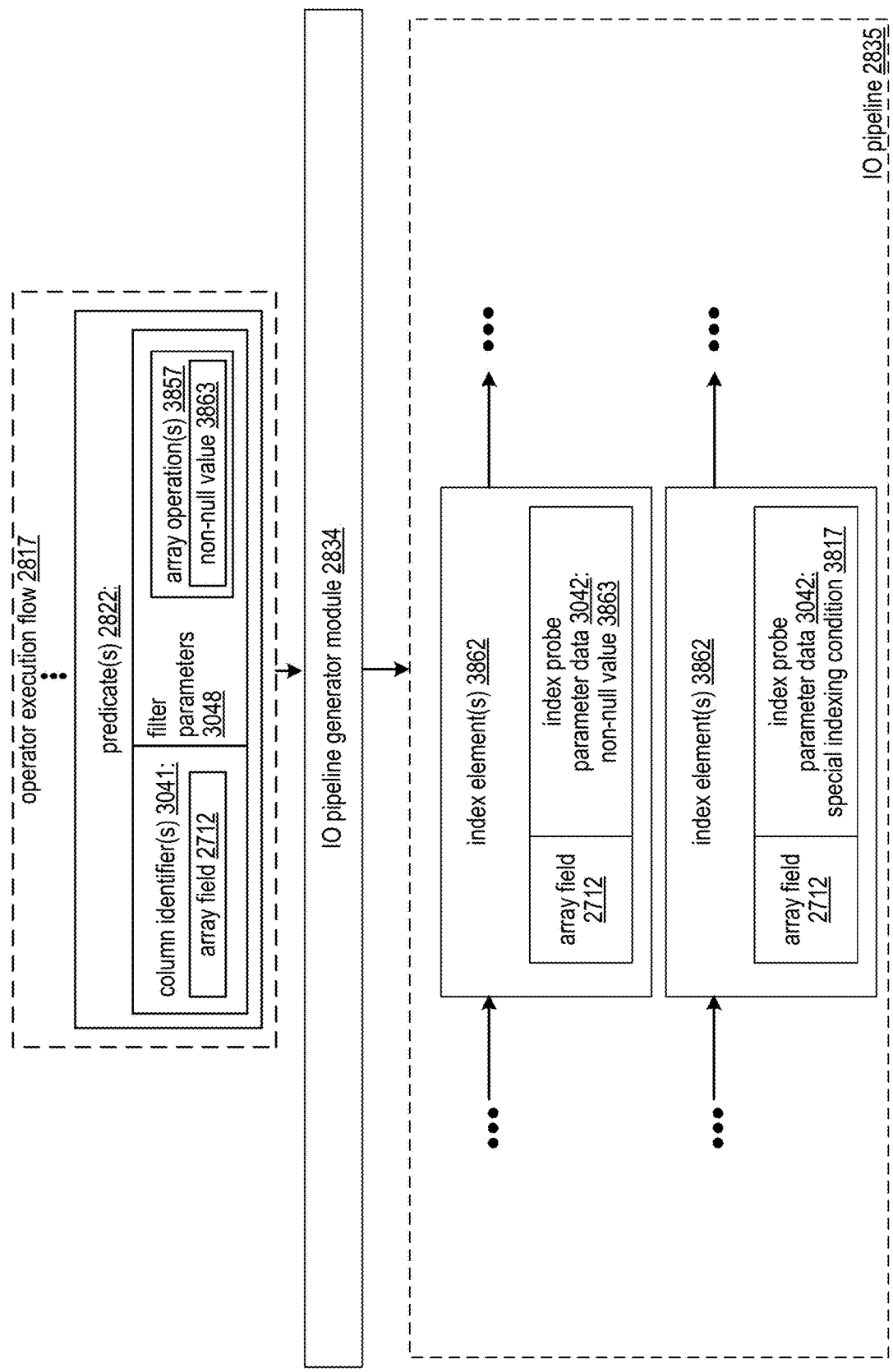
FIG. 27H illustrates generation of an IO pipeline based on filter parameters indicating an array operation upon a non-null value in accordance with various embodiments.

FIG. 27H illustrates an example embodiment of an IO pipeline generator module 2834 of a query processing system 2802 that generates an IO pipeline 2835 for an operator execution flow 2817 containing predicates 2822 applied to a column implemented as an array field 2712. Some or all features and/or functionality of the query processing system 2802, IO pipeline generator module 2834, and/or IO pipeline 2835 of FIG. 27G can be utilized to implement the query processing system 2802, IO pipeline generator module 2834, and/or IO pipeline 2835 of FIG. 27G, and/or any other embodiment of the query processing system 2802, IO pipeline generator module 2834, and/or IO pipeline 2835 discussed herein.

Some queries can have predicates 2822 applied to an array field 2712. For example, their filter parameters 3048 can include one or more array operations 3857 that involve one or more non-null values 3863. The IO pipeline can apply these predicates 2822 accordingly based on implementing the array operations 3857. This can include applying one or more index elements 3862 indicating the column identifier 3041 denoting this array field 2712 to access the index data for this array field accordingly, such as index data discussed in conjunction with FIG. 27F. For example, at least one index element 3862 denotes the non-null value, and at least one additional index element 3862 denotes a special indexing condition 3817. For example, a subset of special indexing conditions 3817 of the special indexing condition set 3815 are selected based on the query predicate 2822 as discussed in conjunction with FIG. 27G, where the subset of special indexing conditions 3817 are selected based on the array operations 3857 and/or set logic rules for the array operations 3857, such as which types of special indexing conditions 3817 render the array operations 3857 as being true or false.

In some embodiments, the array operations 3857 can include a universal quantifier applied to the set of elements of array structures of the array field 2717. For example, the filter parameters 3048 indicate identification of rows having values, for array structures of the given column 3041, satisfying: having all of its set of array elements being equal to the non-null value 3863; having all of its set of array elements being unequal to the non-null value 3863, having all of its set of array elements being greater than or less than the non-null value 3863; having all of its set of array elements containing the non-null value 3863 as a substring; having all its set of array elements set of array elements being a substring of the non-null value 3863; and/or having all of its set of array elements meeting another defined condition, which can optionally include one or more complex predicates, at least one conjunction, at least one disjunction, a nested quantifier, or other condition.

As used herein, a "for_all(A) [condition]" function can be implemented as an array operation 3857 implemented to perform a universal quantifier for array elements of array structures of a given column "A" meeting the specified condition, and/or where rows satisfying the "for_all(A) [condition]" correspond to all rows, and to only rows, with corresponding values 3024 for the given column A having all of its elements meeting the given condition.

In some embodiments, the subset of special indexing conditions 3817 are selected to include the empty array condition 3844 based on the array operations 3857 including a universal quantifier. For example, the empty array condition 3844 is selected to identify rows satisfying the empty array condition 3844 for the given column due to rows satisfying the empty array condition 3844 for the given column satisfying the universal quantifier in accordance with set logic (e.g. as its contents are empty, all of its zero elements automatically satisfy the condition). The corresponding query resultant, and/or subsequent processing, can be applied to the identified rows of empty array condition 3844 accordingly. Alternatively or in addition, the null value condition 3842 does not satisfy the universal quantifier in accordance with set logic (e.g. the value is null and not an array) and/or the null-inclusive array condition 3846 does not satisfy the universal quantifier in accordance with set logic (e.g. the null values does not satisfy the condition involving the non-null value, and thus all elements do not satisfy the condition), where these conditions are not selected as corresponding sets of rows should not be identified as meeting the query predicates. For example, the subset of special indexing conditions 3817 is selected to include the empty array condition 3844, and to not include the null value condition 3842 nor the null-inclusive array condition 3846, based on the array operations 3857 including a universal quantifier, such as a non-negated universal quantifier. Example IO pipelines for query predicates that include universal quantifiers are discussed in further detail in conjunction with FIGS. 40A and 42B.

In some embodiments, the array operations 3857 can include an existential quantifier applied to the set of elements of array structures of the array field 2717. For example, the filter parameters 3048 indicate identification of rows having values, for array structures of the given column 3041, satisfying: having at least one of its set of array elements being equal to the non-null value 3863; having at least one of its set of array elements being unequal to the non-null value 3863, having at least one of its set of array elements being greater than or less than the non-null value 3863; having at least one of its set of array elements containing the non-null value 3863 as a substring; having at least one of its set of array elements set of array elements being a substring of the non-null value 3863; and/or having at least one of its set of array elements meeting another defined condition, which can optionally include one or more complex predicates, at least one conjunction, at least one disjunction, a nested quantifier, or other condition.

As used herein, a "for_some(A) [condition]" function can be implemented as an array operation 3857 implemented to perform an existential quantifier for array elements of array structures of a given column "A" meeting the specified condition, and/or where rows satisfying the "for_some(A) [condition] correspond to all rows, and to only rows, with corresponding values 3024 for the given column A having at least one of its elements meeting the given condition.

In some embodiments, the subset of special indexing conditions 3817 are selected based on the array operations 3857 including an existential quantifier. For example, none of the special indexing conditions 3817 are selected due to rows satisfying the existential quantifier for the given column. For example, the null value condition 3842 does not satisfy the existential quantifier in accordance with set logic (e.g. the value is null and not an array), the empty array condition 3844 does not satisfy the existential quantifier in accordance with set logic (e.g. the array is empty and thus does not include at least one value satisfying the condition), and/or the null-inclusive array condition 3846 does not satisfy the existential quantifier in accordance with set logic (e.g. the null values do not satisfy the condition involving the non-null value, and thus none of these elements are relevant in determining whether the array satisfies the condition, but these rows can still be identified via other index elements due to the array's non-null values satisfying the existential quantifier), where none of these three conditions are selected for use in index elements, as corresponding sets of rows should not be identified as meeting the query predicates. For example, the subset of special indexing conditions 3817 is selected to not include the null value condition 3842, the empty array condition 3844, nor the null-inclusive array condition 3846 based on the array operations 3857 including an existential quantifier, such as a non-negated existential quantifier. Example IO pipelines for query predicates that include existential quantifiers are discussed in further detail in conjunction with FIGS. 40B and 42C.

In some embodiments, the subset of special indexing conditions 3817 are selected based on the array operations 3857 including a negation of a universal quantifier for a condition. Set logic can be applied to determine this expression is equivalent to an existential quantifier for the negation of the condition, and can be treated as an existential quantifier accordingly. Thus, the null value condition 3842, the empty array condition 3844, and the null-inclusive array condition 3846 do not satisfy the existential quantifier for the negation of the condition. However, in cases where the IO pipeline applies the negation via a set difference, selecting the subset of special indexing conditions 3817 can therefore include selecting all of these special indexing conditions 3817 to ensure their corresponding rows are identified, and all of these rows not meeting the existential quantifier for the negation of the condition are filtered out in applying the set difference. For example, the subset of special indexing conditions 3817 is selected to include the null value condition 3842, the empty array condition 3844, and the null-inclusive array condition 3846 based on the array operations 3857 including a negation of a universal quantifier. Example IO pipelines for query predicates that include negations of universal quantifiers are discussed in further detail in conjunction with FIGS. 40C and 42D.

In some embodiments, the subset of special indexing conditions 3817 are selected based on the array operations 3857 including a negation of an existential quantifier for a condition. Set logic can be applied to determine this expression is equivalent to a universal quantifier for the negation of the condition, and can be treated as a universal quantifier accordingly. Thus, only the empty array condition 3844 satisfies the universal quantifier of the negated condition, while the null value condition 3842 and the null-inclusive array condition 3846 do not satisfy the universal quantifier of the negated condition. However, in cases where the IO pipeline applies the negation via a set difference, selecting the subset of special indexing conditions 3817 can therefore include selecting the null value condition 3842 and the null-inclusive array condition 3846 to ensure their corresponding rows are identified, and all of these rows not meeting the universal quantifier for the negation of the condition are filtered out in applying the set difference. Selecting the subset of special indexing conditions 3817 can further include not selecting the empty array condition 3844 in these cases as these rows should be included in the resulting set of rows after applying the set difference, and should thus not be identified for filtering via the set difference. For example, the subset of special indexing conditions 3817 is selected to include the null value condition 3842 and the null-inclusive array condition 3846, and to not include the empty array condition 3844, based on the array operations 3857 including a negation of an existential quantifier. Example IO pipelines for query predicates that include negations of existential quantifiers are discussed in further detail in conjunction with FIGS. 40D and 42E.

Figure 27I:
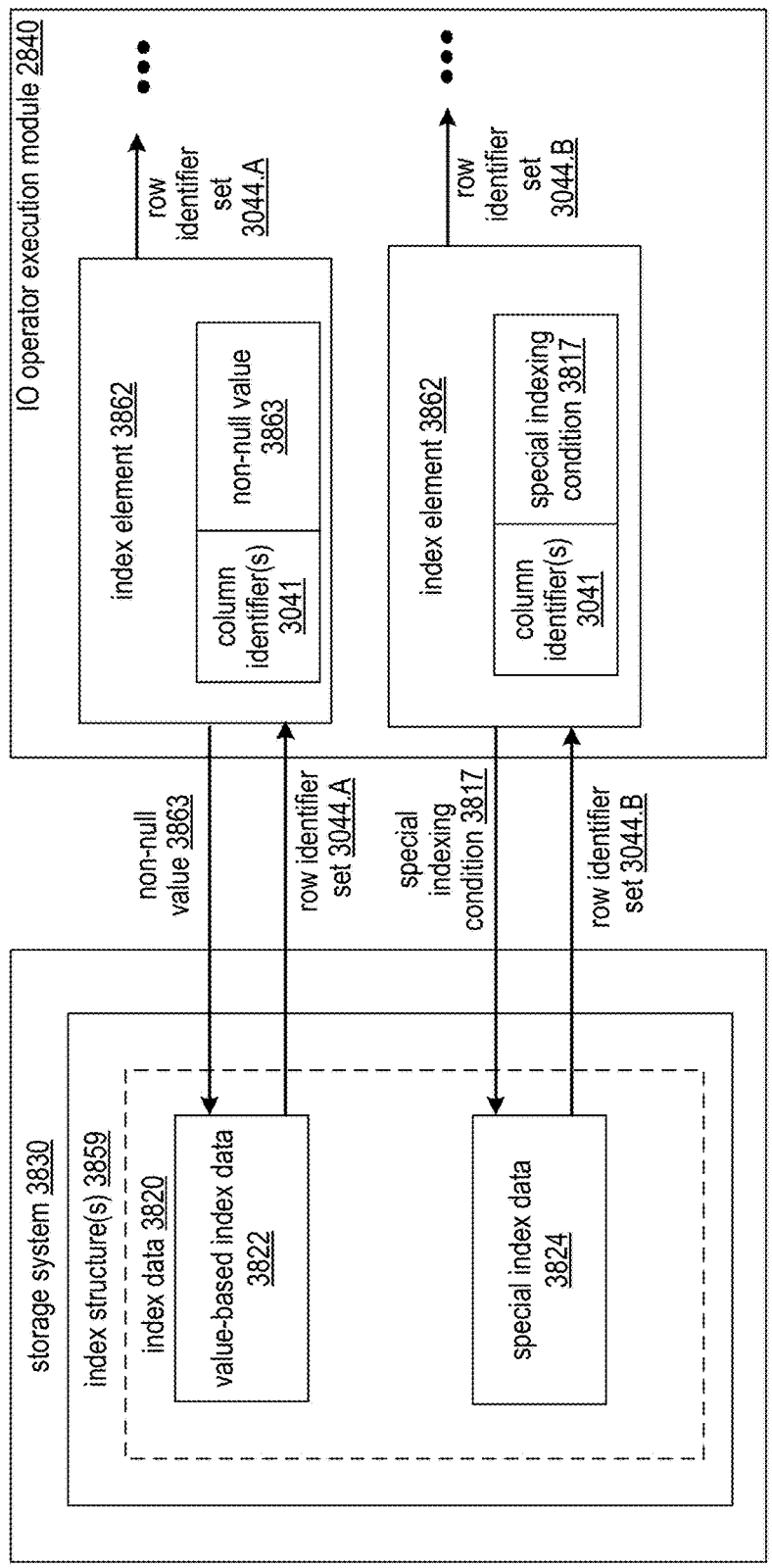
FIG. 27I illustrates execution of an IO pipeline via an IO operator execution module in accordance with various embodiments.

FIG. 27I illustrates an example embodiment of an IO operator execution module 2840 of a query processing system 2802 that executes an IO pipeline having index elements 3862, such as the IO pipeline of FIGS. 27G and/or 27H, based on accessing corresponding index data 3820 of one or more index structures 3859 storing the index data 3820 in storage system 3830, such as the storage system 3830 of FIG. 27A storing the index data 3820 having some or all features and/or functionality described in conjunction with FIGS. 27A-27F. Some or all features and/or functionality of the query processing system 2802 and/or IO operator execution module 2840 of FIG. 27I can be utilized to implement any embodiment of the query processing system 2802 and/or IO operator execution module discussed herein. The IO operator execution module of FIG. 27I can apply index elements 3862 to access index structures 3859 in a same or similar fashion as IO operator execution module applying index elements 3012 to access probabilistic index structures 3020. The index structure 3859 can be implemented as an inverted index structure or another type of index structure.

One or more index elements 3862 having index probe parameter data 3042 indicating non-null values 3863 can be applied based on accessing corresponding value-based index data 3822. For example, the non-null value 3863 is utilized to access the index value 3043 in the index structure 3859 having this non-null value 3863, or being equal to the hash value when a hash function is applied to the non-null value 3863, and the corresponding row identifier set 3044.A mapped to the index value 3043 corresponding to this non-null value 3863 is retrieved accordingly and utilized in further operations by the IO operator execution module, or other operators utilized to execute the corresponding query.

One or more index elements 3862 having index probe parameter data 3042 indicating special indexing conditions 3817 can be similarly applied based on accessing corresponding special index data 3824. For example, the special indexing conditions 3817 is utilized to access the index value 3043 in the index structure 3859 having a corresponding index value 3043, such as index value 3843, 3845, and/or 3847 corresponding to the null value condition 3842, the empty array condition 3844, and/or the null-inclusive condition 3846. The corresponding row identifier set 3044.B mapped to the index value corresponding to this special indexing conditions 3817 is retrieved accordingly and utilized in further operations by the IO operator execution module, or other operators utilized to execute the corresponding query. For example, executing the query and generating the resultant is based on processing rows in one or more row identifier sets 3044.A accessed via index elements 3862 having index probe parameter data 3042 indicating non-null values 3863, and further based on processing rows in one or more row identifier sets 3044.B accessed via index elements 3862 having index probe parameter data 3042 indicating special indexing conditions 3817.

Figure 27J:
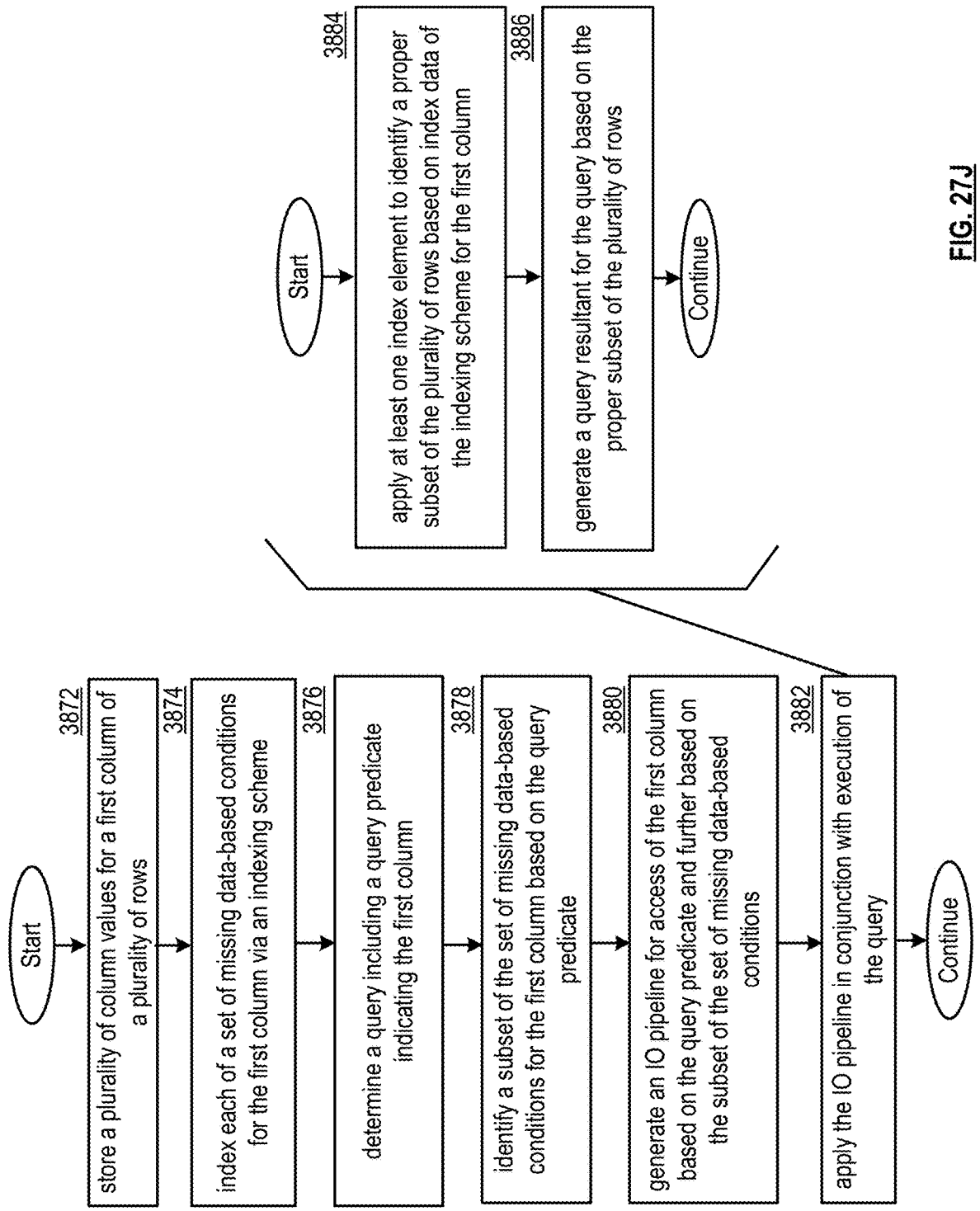
FIG. 27J is a logic diagram illustrating a method for execution in accordance with various embodiments.

FIG. 27J illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27J. In particular, a node 37 can utilize the query processing module 2435 to execute some or all of the steps of FIG. 27J, where multiple nodes 37 implement their own query processing modules 2435 to independently execute the steps of FIG. 27J, for example, to facilitate execution of a query as participants in a query execution plan 2405.

Some or all of the method of FIG. 27J can be performed by the query processing system 2802, for example, by utilizing an operator execution flow generator module 2803 and/or a query execution module 2504. For example, some or all of the method of FIG. 27J can be performed by the IO pipeline generator module 2834 and/or the IO operator execution module 2840. Some or all of the method of FIG. 27J can be performed via communication with and/or access to a segment storage system 2508, such as memory drives 2425 of one or more nodes 37. Some or all of the steps of FIG. 27J can optionally be performed by any other processing module of the database system 10.

Some or all of the method of FIG. 27J can be performed via the IO pipeline generator module 2834 to generate an IO pipeline utilizing at least one index element for a given column. Some or all of the method of FIG. 27J can be performed via the segment indexing module to generate an index structure for data values of the given column. Some or all of the method of FIG. 27J can be performed via the query processing system 2802 based on implementing IO operator execution module that executes IO pipelines by utilizing at least one index element for the given column.

Some or all of the steps of FIG. 27J can be performed to implement some or all of the functionality of the segment processing module 2502 as described in conjunction with FIGS. 27A-27I. Some or all of the steps of FIG. 27J can be performed to implement some or all of the functionality regarding execution of a query via the plurality of nodes in the query execution plan 2405 as described in conjunction with FIGS. 24A-24E. Some or all steps of FIG. 27K can be performed by database system 10 in accordance with other embodiments of the database system 10 and/or nodes 37 discussed herein. Some or all steps of FIG. 27J can be performed in conjunction with some or all steps of any other method described herein.

Step 3872 includes storing a plurality of column values for a first column of a plurality of rows. Step 3874 includes indexing each of a set of missing data-based conditions for the first column via an indexing scheme. Step 3876 includes determining a query including a query predicate indicating the first column. Step 3878 includes identifying a subset of the set of missing data-based conditions for the first column based on the query predicate. Step 3880 includes generating an IO pipeline for access of the first column based on the query predicate and further based on the subset of the set of missing data-based conditions. Step 3882 includes applying the IO pipeline in conjunction with execution of the query.

Performing step 3882 can include performing step 3884 and/or step 3886. Step 3884 includes applying at least one index element to identify a proper subset of the plurality of rows based on index data of the indexing scheme for the first column. Step 3886 includes generating a query resultant for the query based on the proper subset of the plurality of rows.

In various embodiments, the proper subset of the plurality of rows includes ones of the plurality of rows having values for the first column included in the subset of the set of missing data-based conditions.

In various embodiments, the indexing scheme is a probabilistic indexing scheme, and wherein the IO pipeline includes at least one index-based IO construct. In various embodiments, the indexing scheme implements an inverted index structure.

In various embodiments, the set of missing data-based conditions includes a null value condition, and wherein a first subset of the plurality of column values satisfy the null value condition based on the first subset of the plurality of column values of the first column each being a null value. In various embodiments, another subset of the plurality of column values do not satisfy any of the set of missing data-based conditions based on each having a non-null value, and/or the proper subset of the plurality of rows includes ones of the other subset of the plurality of column values satisfying the query predicate.

In various embodiments, the plurality of column values of first column correspond to an array data type, and/or the set of missing data-based conditions further includes: an empty array condition, where a second subset of the plurality of column values satisfy the empty array condition based on the second subset of the plurality of column values of the first column each having an empty array value; and/or a null-inclusive array condition, where a third subset of the plurality of column values satisfy the null-inclusive array condition based on the third subset of the plurality of column values of the third column including a set of array elements, and further based on at least one of the set of array elements having the null value.

In various embodiments, the first subset, the second subset, and the third subset are mutually exclusive. In various embodiments, a fourth subset of the plurality of column values do not satisfy any of the set of missing data-based conditions based on being an array including at least one array element and having no array elements having the null value, and/or the proper subset of the plurality of rows includes ones of the fourth subset of the plurality of column values satisfying the query predicate.

In various embodiments, none of the proper subset of the plurality of rows have values for the first column included in the subset of the set of missing data-based conditions based on the subset of the set of missing data-based conditions for the first column being identified as null.

In various embodiments, applying the at least one index element includes applying an index element for values satisfying one the set of missing data-based conditions included in subset of the set of missing data-based conditions. In various embodiments, applying the at least one index element includes applying an index element for values satisfying one the set of missing data-based conditions not included in subset of the set of missing data-based conditions to identify another proper subset of the plurality of rows. In various embodiments, applying the IO pipeline further includes filtering the another proper subset of the plurality of rows to generate the proper subset of the plurality of rows.

In various embodiments, the method further includes indexing a set of values for the first column via the indexing scheme, where the set of values for the first column meet none of the set of missing data-based conditions, and/or where the plurality of column values include the set of values. In various embodiments, applying the at least one index element includes: applying a first index element for values satisfying one the set of missing data-based conditions, and/or applying a second index element for values equal to one of the set of values.

In various embodiments, indexing each of the set of missing data-based conditions for the first column via the indexing scheme includes: identifying ones of the plurality of rows having column values of the first column meeting one of the set of missing data-based conditions; and/or indexing the each of the ones of the plurality of rows for the one of the set of missing data-based conditions via the indexing scheme.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing operational instructions. The operational instructions, when executed via the at least one processor, can cause the database system to store a plurality of column values for a first column of a plurality of rows; index each of a set of missing data-based conditions for the first column via an indexing scheme; determine a query including a query predicate indicating the first column; identify a subset of the set of missing data-based conditions for the first column based on the query predicate; generate an IO pipeline for access of the first column based on the query predicate and further based on the subset of the set of missing data-based conditions; and/or apply the IO pipeline in conjunction with execution of the query. Applying apply the IO pipeline in conjunction with execution of the query can include: applying at least one index element to identify a proper subset of the plurality of rows based on index data of the indexing scheme for the first column, wherein the proper subset of the plurality of rows includes ones of the plurality of rows having values for the first column included in the subset of the set of missing data-based conditions; and/or generating a query resultant for the query based on the proper subset of the plurality of rows.

Figure 27K:
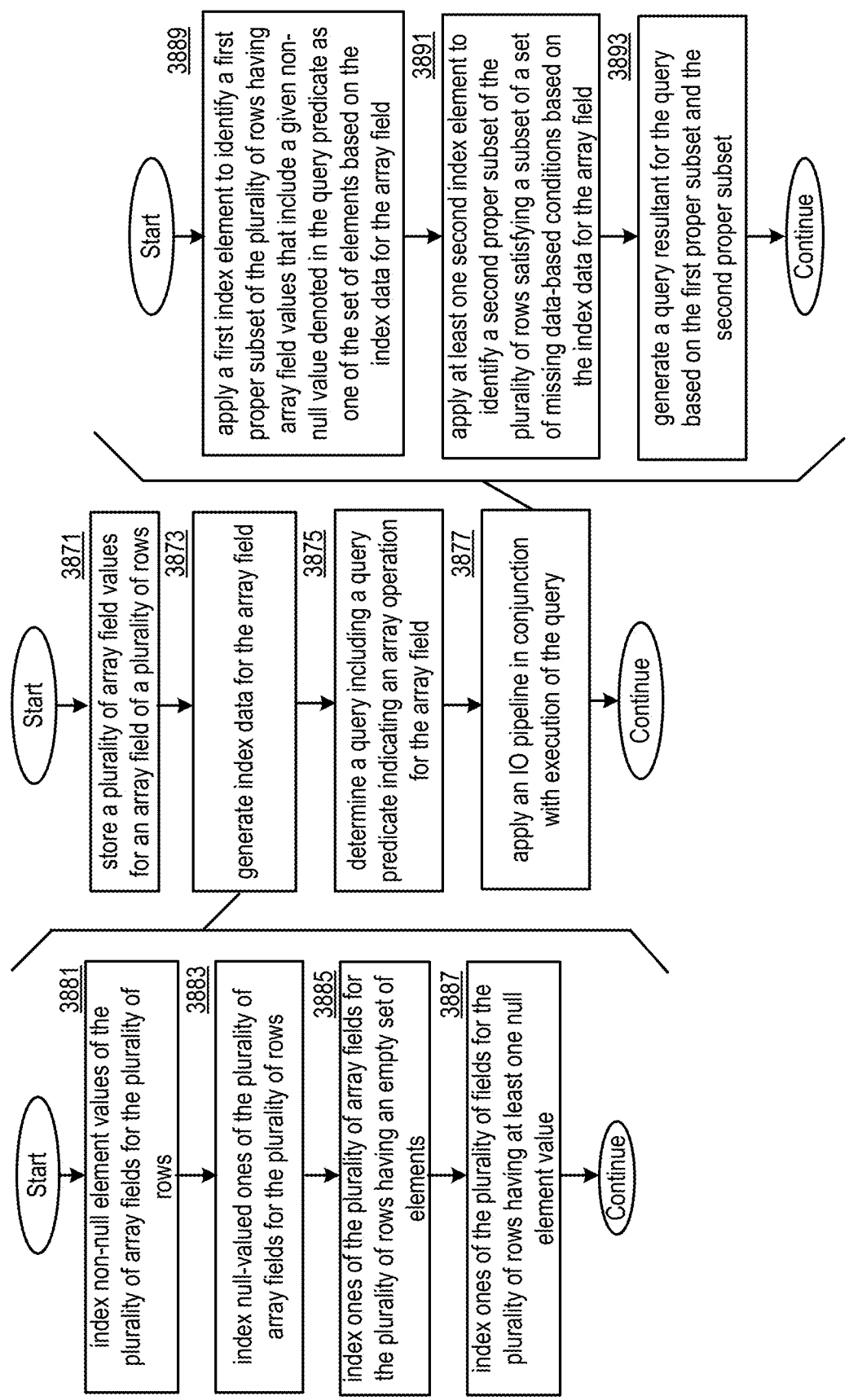
FIG. 27K is a logic diagram illustrating a method for execution in accordance with various embodiments.

FIG. 27K illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27K. In particular, a node 37 can utilize the query processing module 2435 to execute some or all of the steps of FIG. 27K, where multiple nodes 37 implement their own query processing modules 2435 to independently execute the steps of FIG. 27K, for example, to facilitate execution of a query as participants in a query execution plan 2405.

Some or all of the method of FIG. 27K can be performed by the query processing system 2802, for example, by utilizing an operator execution flow generator module 2803 and/or a query execution module 2504. For example, some or all of the method of FIG. 27K can be performed by the IO pipeline generator module 2834 and/or the IO operator execution module 2840. Some or all of the method of FIG. 27K can be performed via communication with and/or access to a segment storage system 2508, such as memory drives 2425 of one or more nodes 37. Some or all of the steps of FIG. 27K can optionally be performed by any other processing module of the database system 10.

Some or all of the method of FIG. 27K can be performed via the IO pipeline generator module 2834 to generate an IO pipeline utilizing at least one index element for a given column. Some or all of the method of FIG. 27K can be performed via the segment indexing module to generate an index structure for data values of the given column. Some or all of the method of FIG. 27K can be performed via the query processing system 2802 based on implementing IO operator execution module that executes IO pipelines by utilizing at least one index element for the given column.

Some or all of the steps of FIG. 27K can be performed to implement some or all of the functionality of the segment processing module 2502 as described in conjunction with FIGS. 27A-27I. Some or all of the steps of FIG. 27K can be performed to implement some or all of the functionality regarding execution of a query via the plurality of nodes in the query execution plan 2405 as described in conjunction with FIGS. 24A-24E. Some or all steps of FIG. 27K can be performed by database system 10 in accordance with other embodiments of the database system 10 and/or nodes 37 discussed herein. Some or all steps of FIG. 27K can be performed in conjunction with some or all steps of FIG. 27J and/or any other method described herein.

Step 3871 includes storing a plurality of array field values for an array field of a plurality of rows. Step 3873 includes generating index data for the array field. Step 3875 includes determining a query including a query predicate indicating an array operation for the array field. Step 3877 includes applying an IO pipeline in conjunction with execution of the query.

Performing step 3873 can include performing some or all of steps 3881-3887. Step 3881 includes indexing non-null values of the plurality of array fields for the plurality of rows, for example, as value-based index data 3822. Step 3883 includes indexing null-valued ones of the plurality of array fields for the plurality of rows, for example, as null value index data 3863. Step 3885 includes indexing ones of the plurality of array fields for the plurality of rows having an empty set of elements, for example, as empty array index data 3865. Step 3887 includes indexing ones of the plurality of fields for the plurality of rows having at least one null element value, for example, as null-inclusive array index data 3867.

Performing step 3877 can include performing some or all of steps 3889-3993. Step 3889 includes applying a first index element to identify a first proper subset of the plurality of rows having array field values that include a given non-null value denoted in the query predicate as one of the set of elements based on the index data for the array field. Step 3891 includes applying at least one second index element to identify a second proper subset of the plurality of rows satisfying a subset of a set of missing data-based conditions based on the index data for the array field. Step 3893 includes generating a query resultant for the query based on the first proper subset and the second proper subset.

In various embodiments, the array operation includes a universal quantifier of a universal statement indicating the given non-null value and/or an existential quantifier or an existential statement indicating the given non-null value. In various embodiments, the query predicate includes a negation of the universal quantifier and/or a negation of the existential quantifier. In various embodiments, the query predicate indicates the universal statement indicating equality of all of the set of elements of array field values with the given non-null value, and/or the existential statement indicating equality of at least one of the set of elements of array field values with the given non-null value. In various embodiments, the query predicate indicates the universal statement indicating satisfaction of a like-based condition by all of the set of elements of array field values with the given non-null value, and/or the existential statement indicating satisfaction of a like-based condition by at least one of the set of elements of array field values with the given non-null value.

In various embodiments, the set of missing data-based conditions includes a null value condition, an empty array condition, and a null-inclusive array condition. In various embodiments, the subset of the set of missing data-based conditions is a proper subset of the set of missing data-based conditions. In various embodiments, the subset of the set of missing data-based conditions is all of the set of missing data-based conditions.

In various embodiments, the index data maps each of a first plurality of subsets of the plurality of rows to non-null values of ones of their sets of elements of the array field. In various embodiments, the index data further maps each of a second plurality of subsets of the plurality of rows to a corresponding one of the set of missing data-based conditions. In various embodiments, the second plurality of subsets are mutually exclusive. In various embodiments, each of a set of non-null values of the index data is mapped to a corresponding one of the first plurality of subsets that includes all rows of the plurality of rows having array field values with a set of elements satisfying an equality-based existential statement for the each of the set of non-null values.

In various embodiments, at least one of the set of missing data-based conditions is mapped to a corresponding one of the second plurality of subsets that includes all rows of the plurality of rows having array field values equal to a corresponding array field value. In various embodiments, at least one additional one of the set of missing data-based conditions is mapped to a corresponding one of the second plurality of subsets that includes all rows of the plurality of rows having array field values with a set of elements satisfying an equality-based existential statement denoting equality with a null value.

In various embodiments, the index data is generated in accordance with a probabilistic indexing scheme, and wherein the IO pipeline includes at least one index-based IO construct. In various embodiments, the index data is generated in accordance with an inverted index structure.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of array field values for an array field of a plurality of rows. The executable instructions, when executed via the at least one processor, can further cause the database system to generate index data for the array field based on: indexing non-null element values of the plurality of array fields for the plurality of rows; indexing null-valued ones of the plurality of array fields for the plurality of rows; indexing ones of the plurality of array fields for the plurality of rows having an empty set of elements; and/or indexing ones of the plurality of fields for the plurality of rows having at least one null element value. The executable instructions, when executed via the at least one processor, can further cause the database system to determine a query including a query predicate indicating an array operation for the array field, and to applying an IO pipeline in conjunction with execution of the query by: applying a first index element to identify a first proper subset of the plurality of rows having array field values that include a given non-null value denoted in the query predicate as one of the set of elements based on the index data for the array field; applying at least one second index element to identify a second proper subset of the plurality of rows satisfying a subset of a set of missing data-based conditions based on the index data for the array field; and/or generating a query resultant for the query based on the first proper subset and the second proper subset.

Figure 28A:
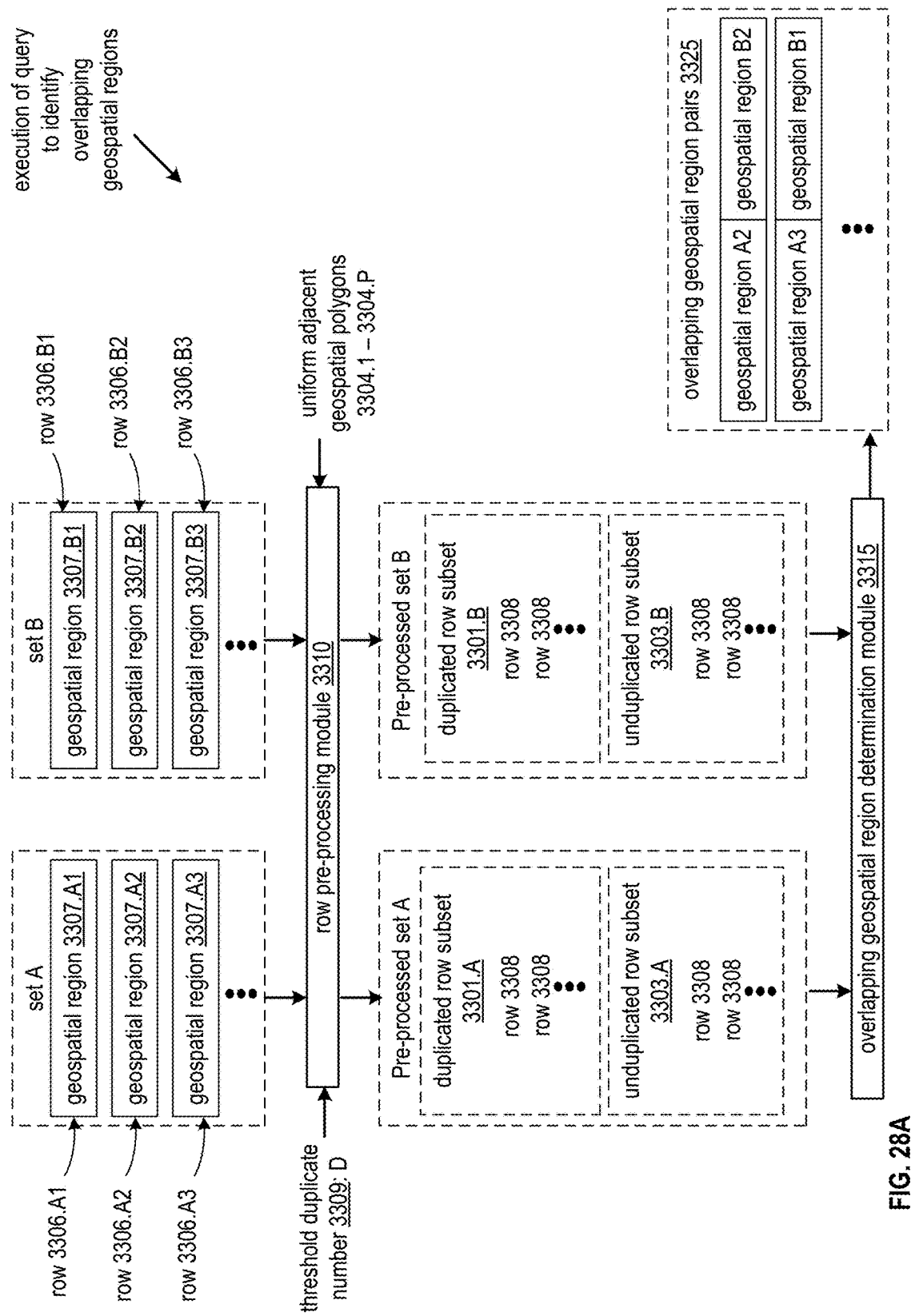
FIG. 28A is a schematic block diagram of a query execution module that implements row pre-processing module and an overlapping geospatial region determination module.
Figure 28B:
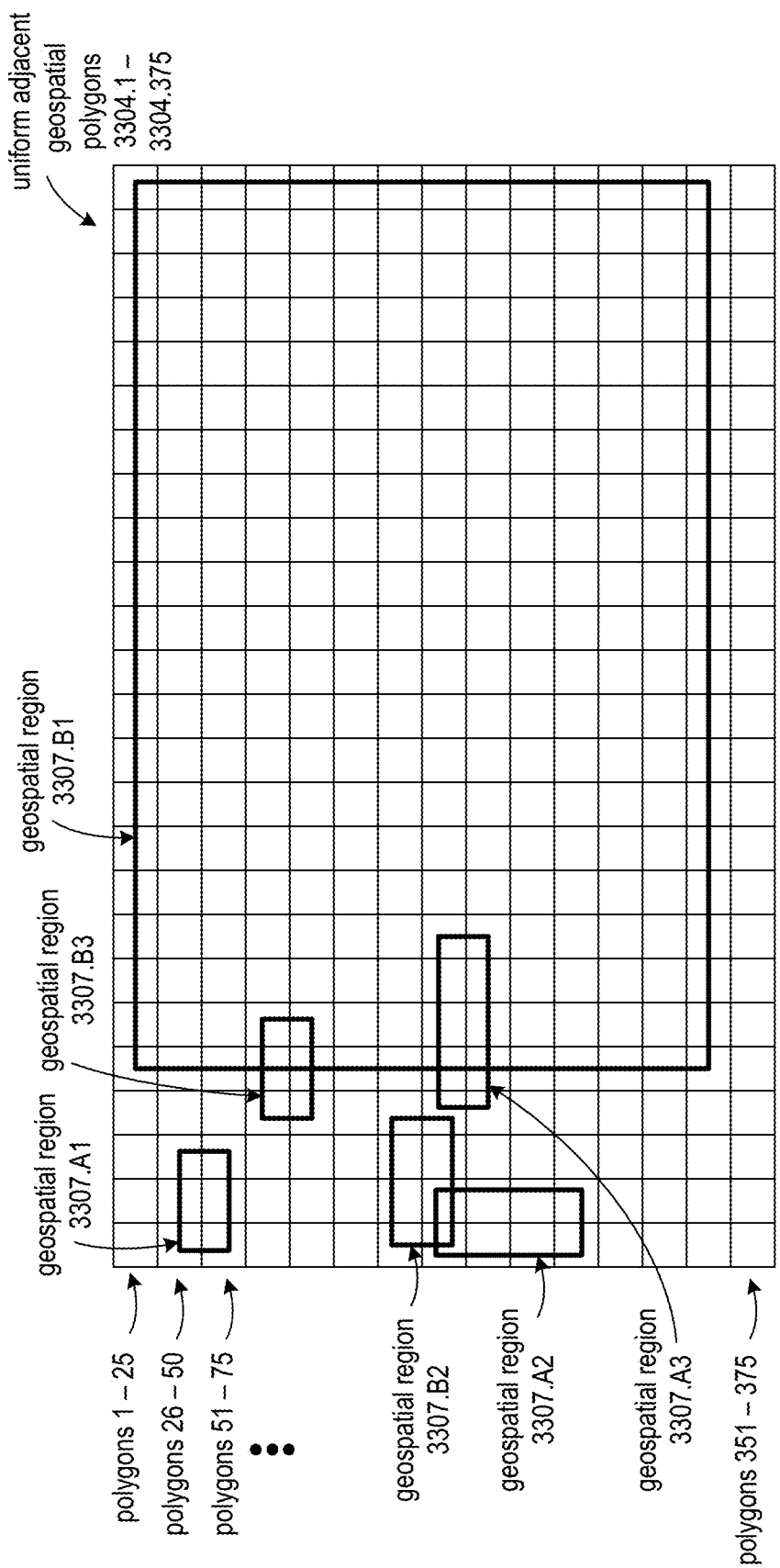
FIG. 28B is an illustration of a plurality of uniform adjacent geospatial polygons containing portions of geospatial regions.
Figure 28C:
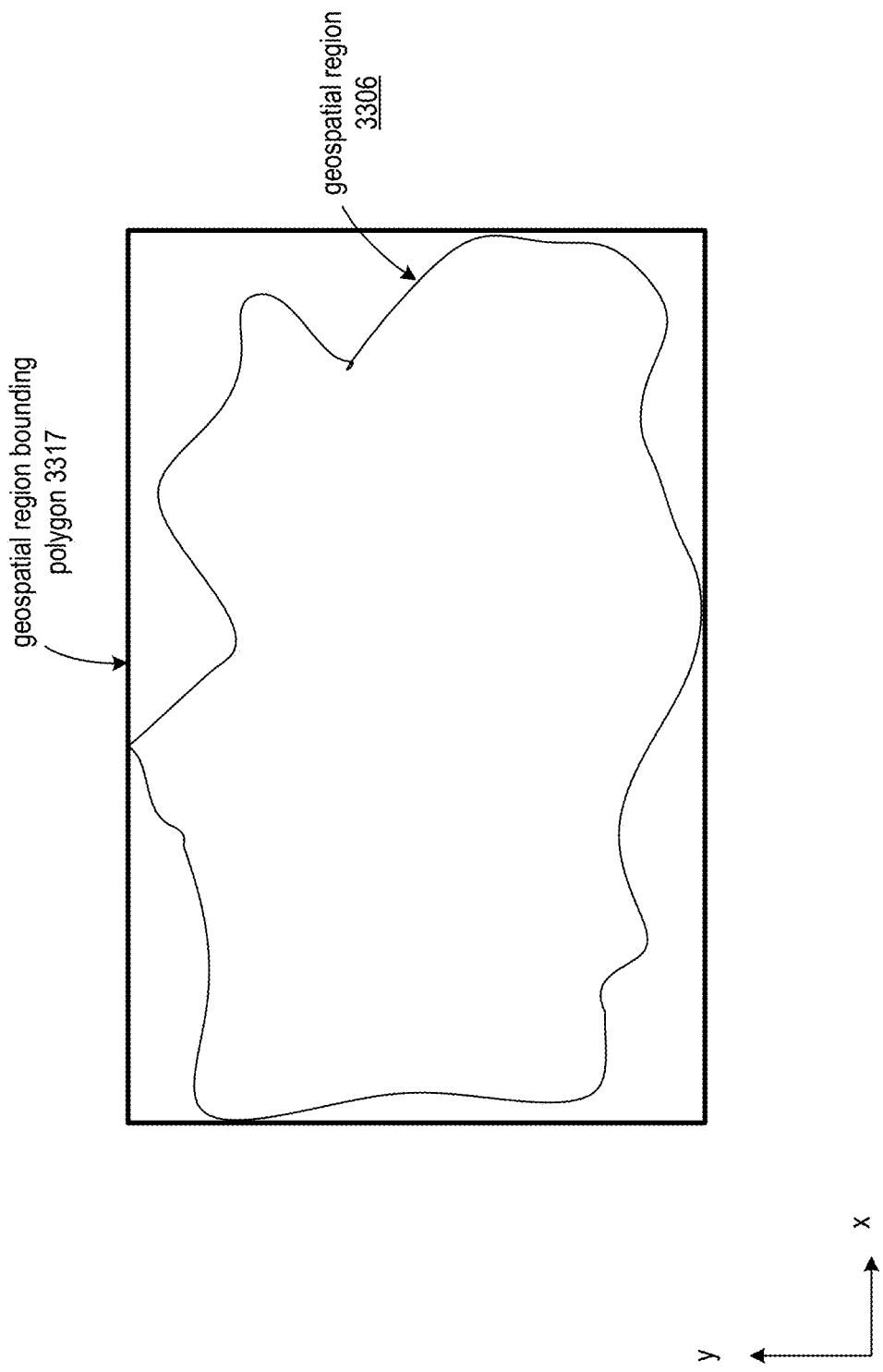
FIG. 28C is an illustration of a geospatial region bounding polygon of a geospatial region.
Figure 28D:
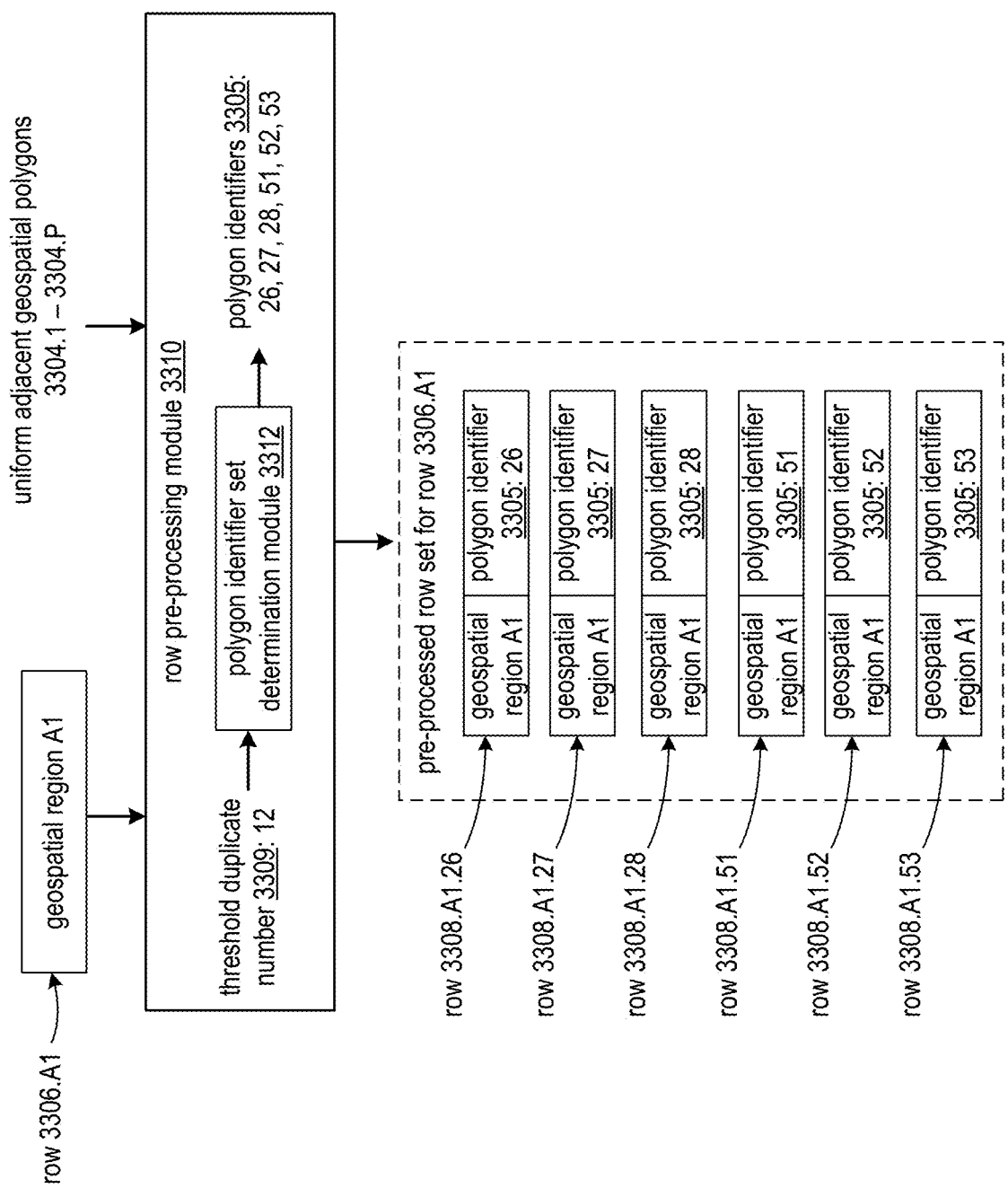
FIG. 28D is a schematic block diagram of a row pre-processing module generating an example pre-processed row set for an example row.
Figure 28E:
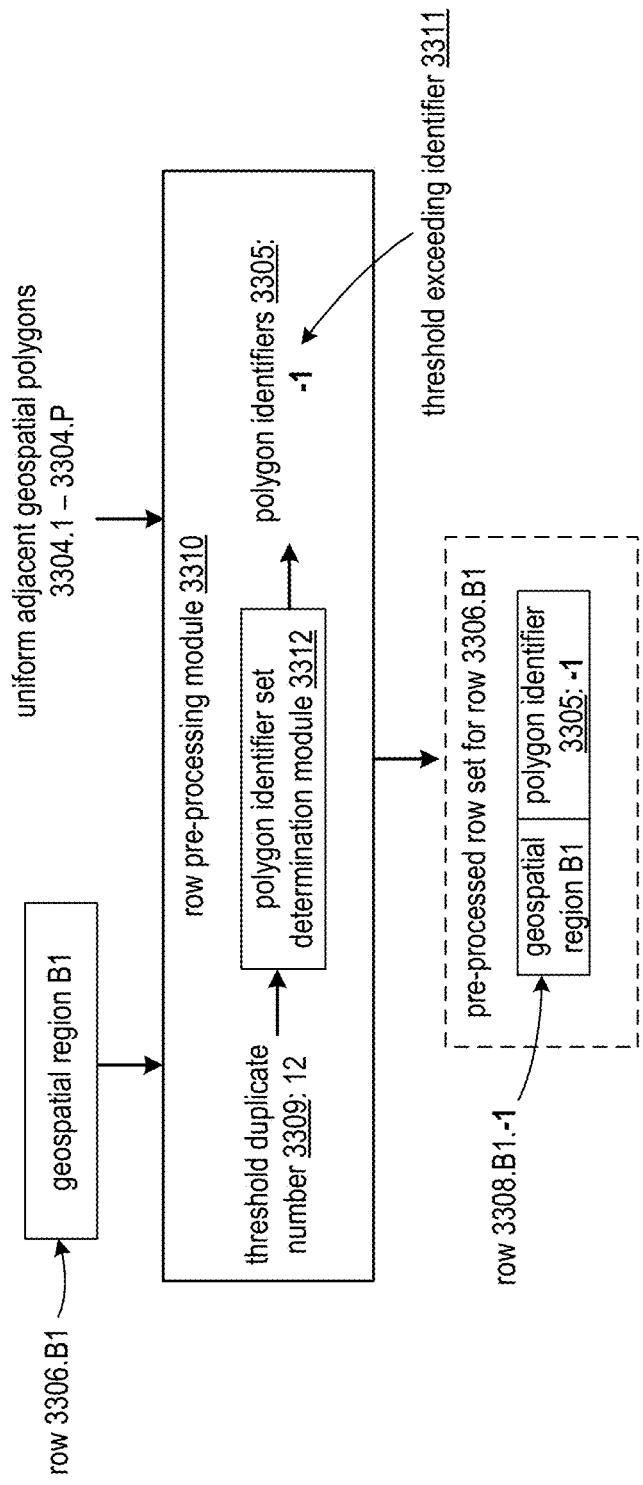
FIG. 28E is a schematic block diagram of a row pre-processing module generating another example pre-processed row set for another example row.
Figure 28F:
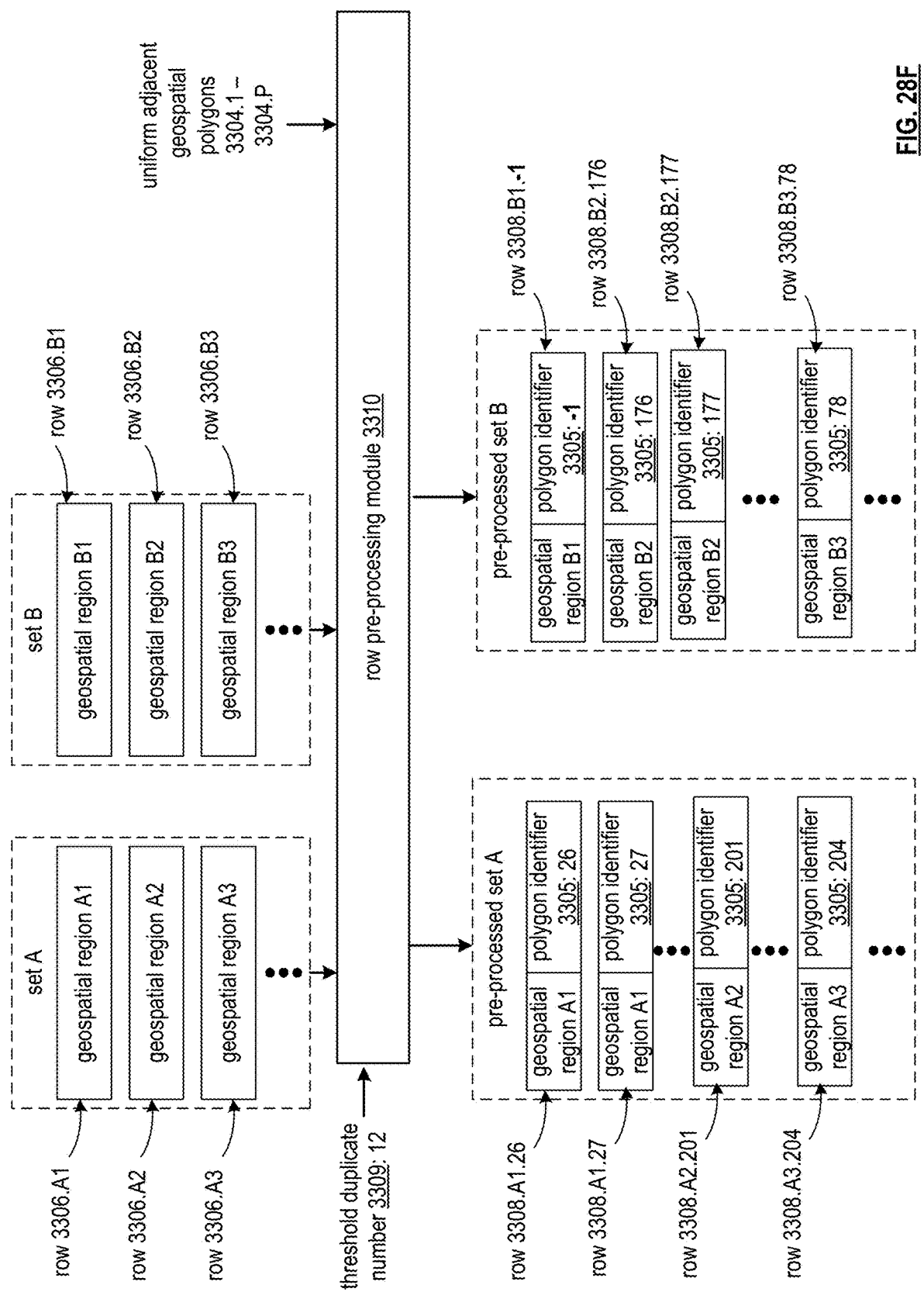
FIG. 28F is a schematic block diagram of a row pre-processing module generating example pre-processed sets for an example set of rows.
Figure 28G:
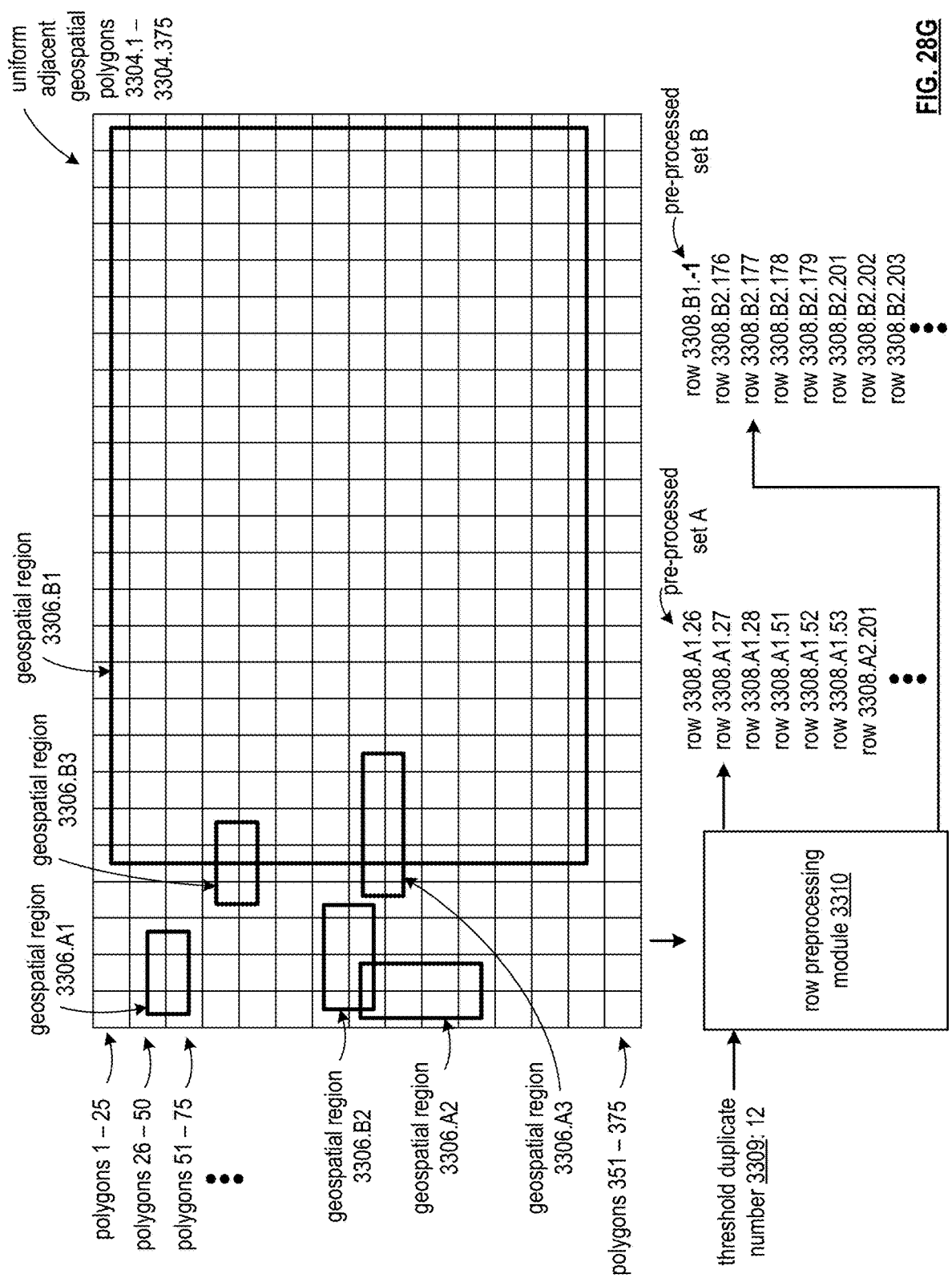
FIG. 28G is a schematic block diagram of a row pre-processing module generating example pre-processed sets for an example set of geospatial regions in relation to plurality of uniform adjacent geospatial polygons.
Figure 28H:
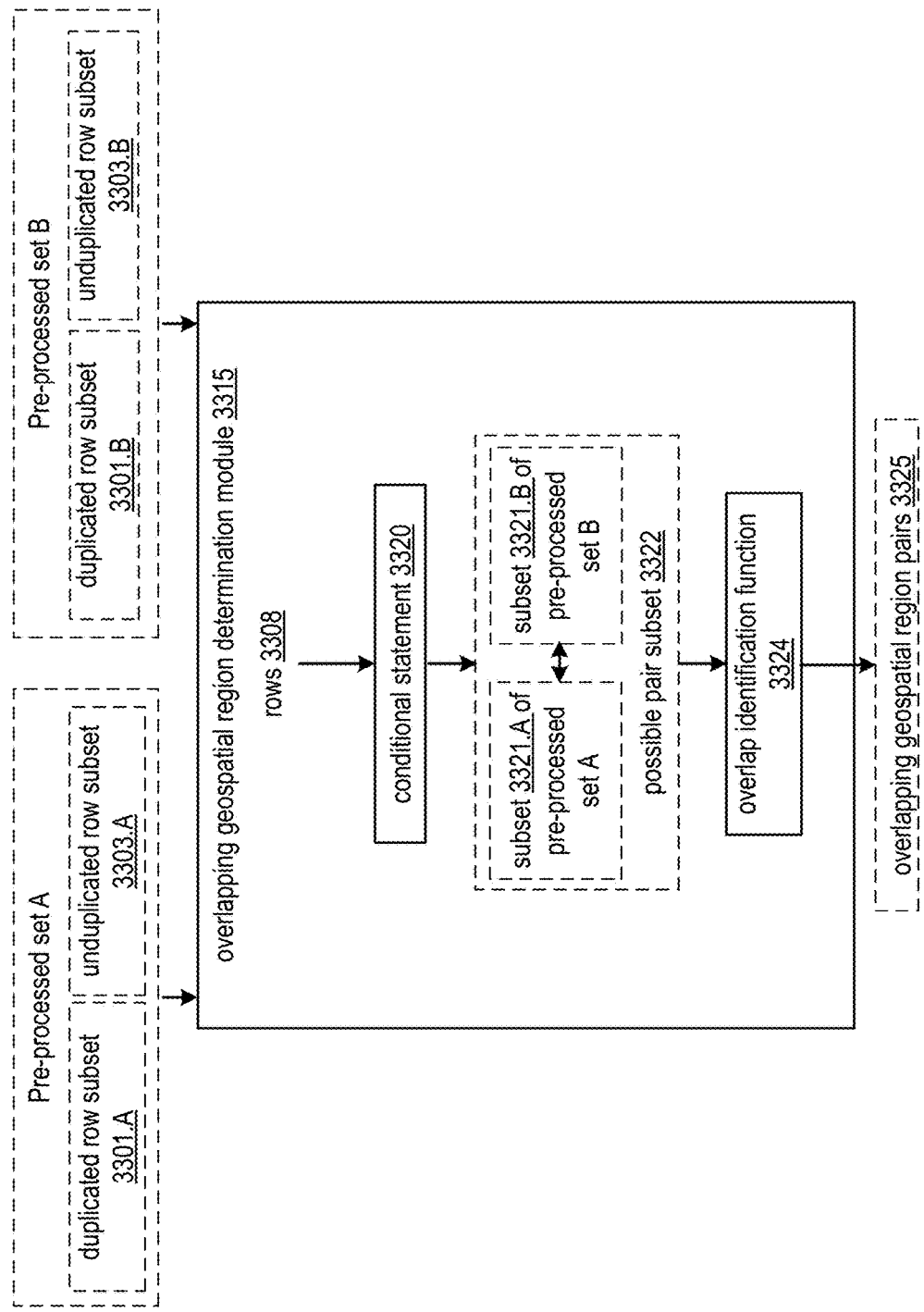
FIG. 28H is a schematic block diagram of an overlapping geospatial region determination module that identifies overlapping geospatial region pairs.
Figure 28I:
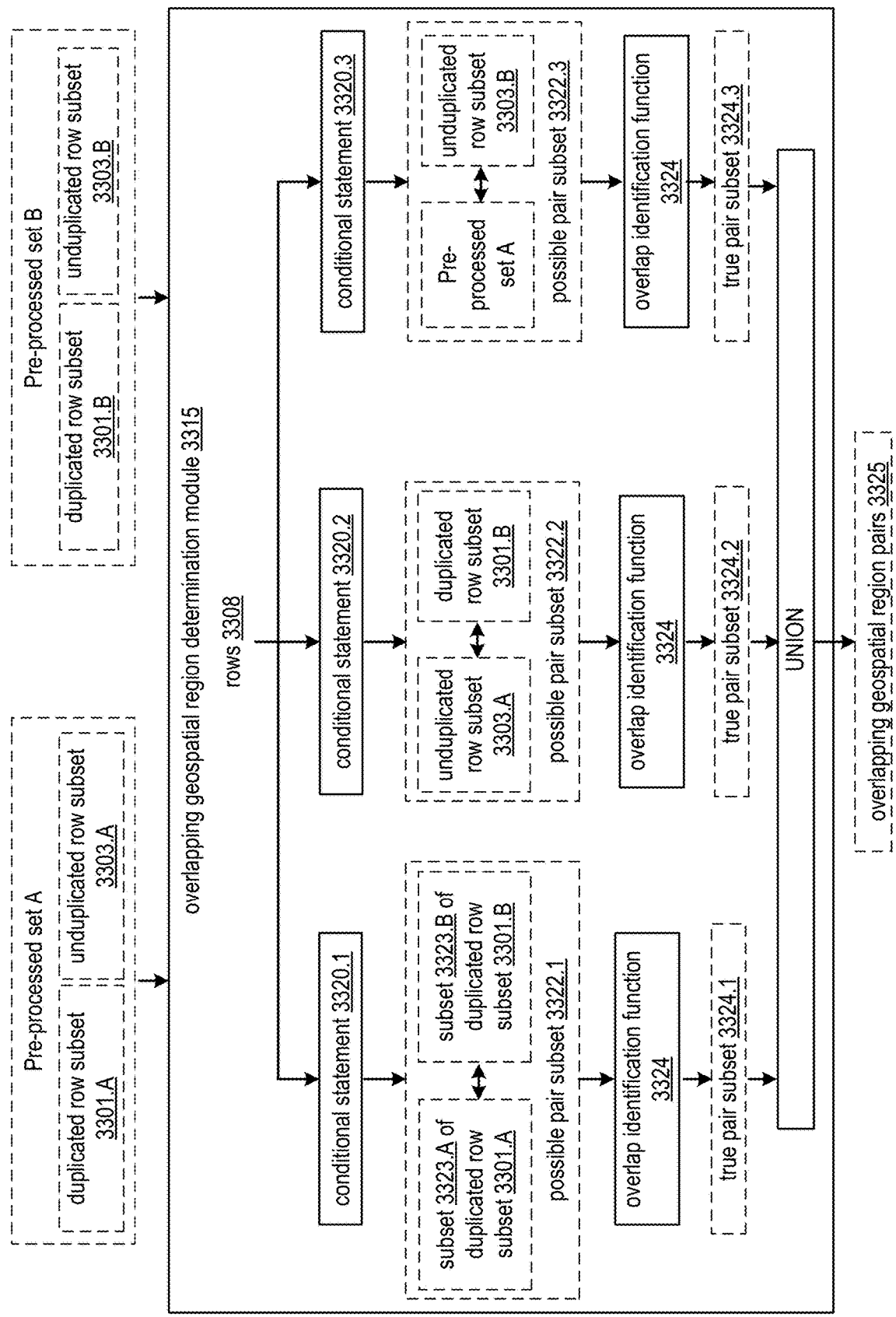
FIG. 28I is a schematic block diagram of an example of an overlapping geospatial region determination module that identifies overlapping geospatial region pairs based on implementing three conditional statements.
Figure 28J:
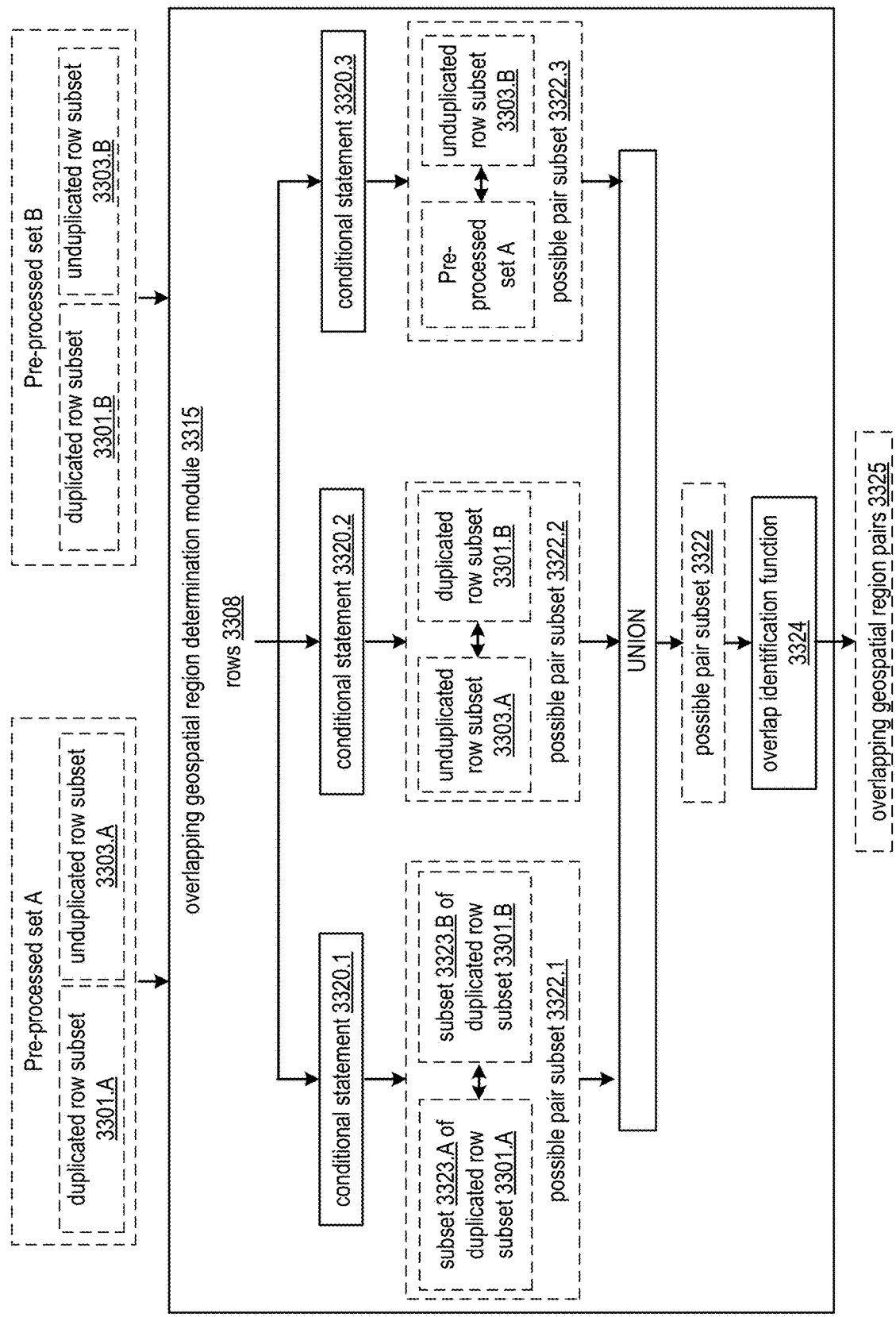
FIG. 28J is a schematic block diagram of another example of an overlapping geospatial region determination module that identifies overlapping geospatial region pairs based on implementing three conditional statements.
Figure 28K:
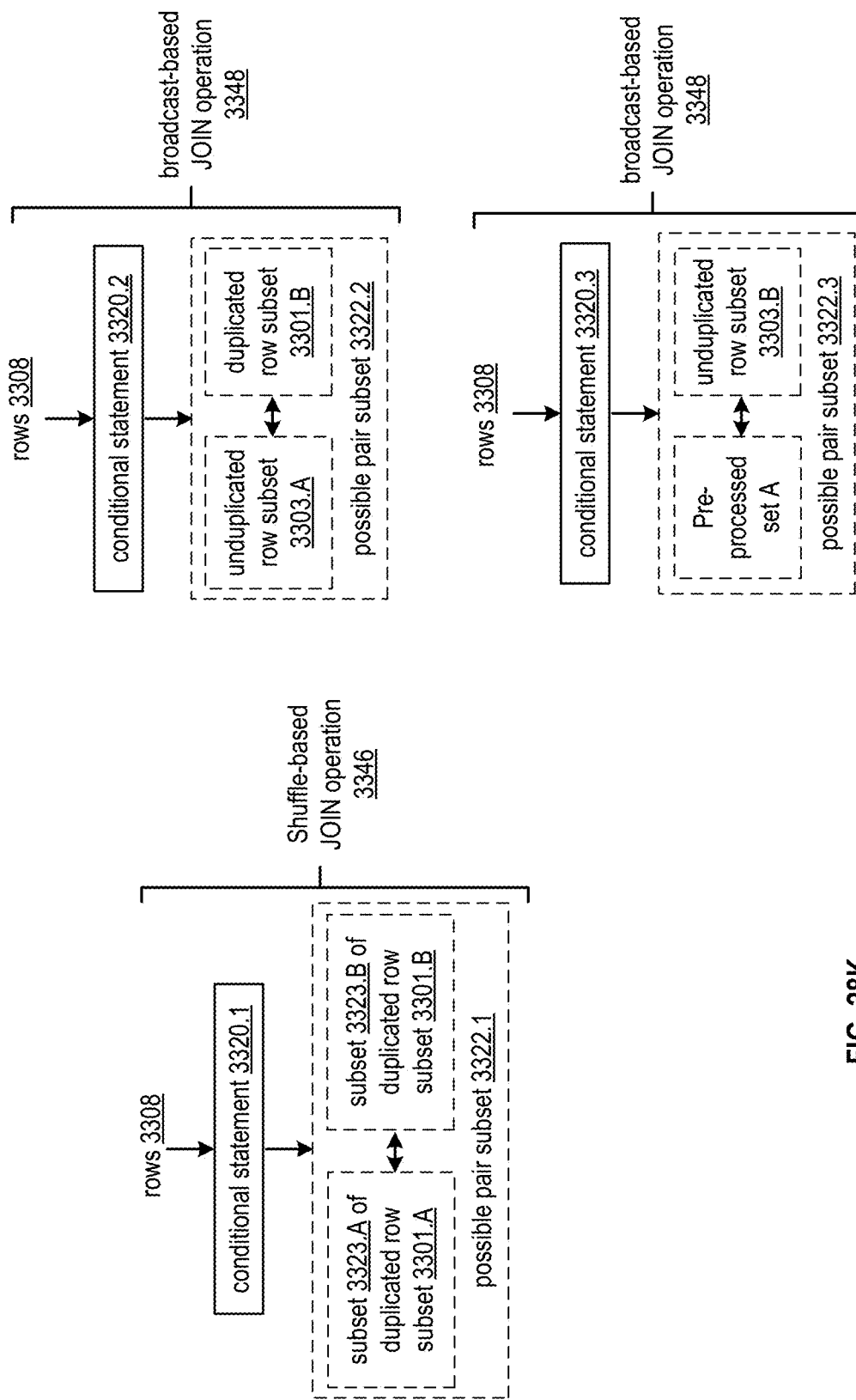
FIG. 28K is a schematic block diagram of an overlapping geospatial region determination module that implements a shuffle-based JOIN operation and broadcast-based JOIN operations.
Figure 28L:
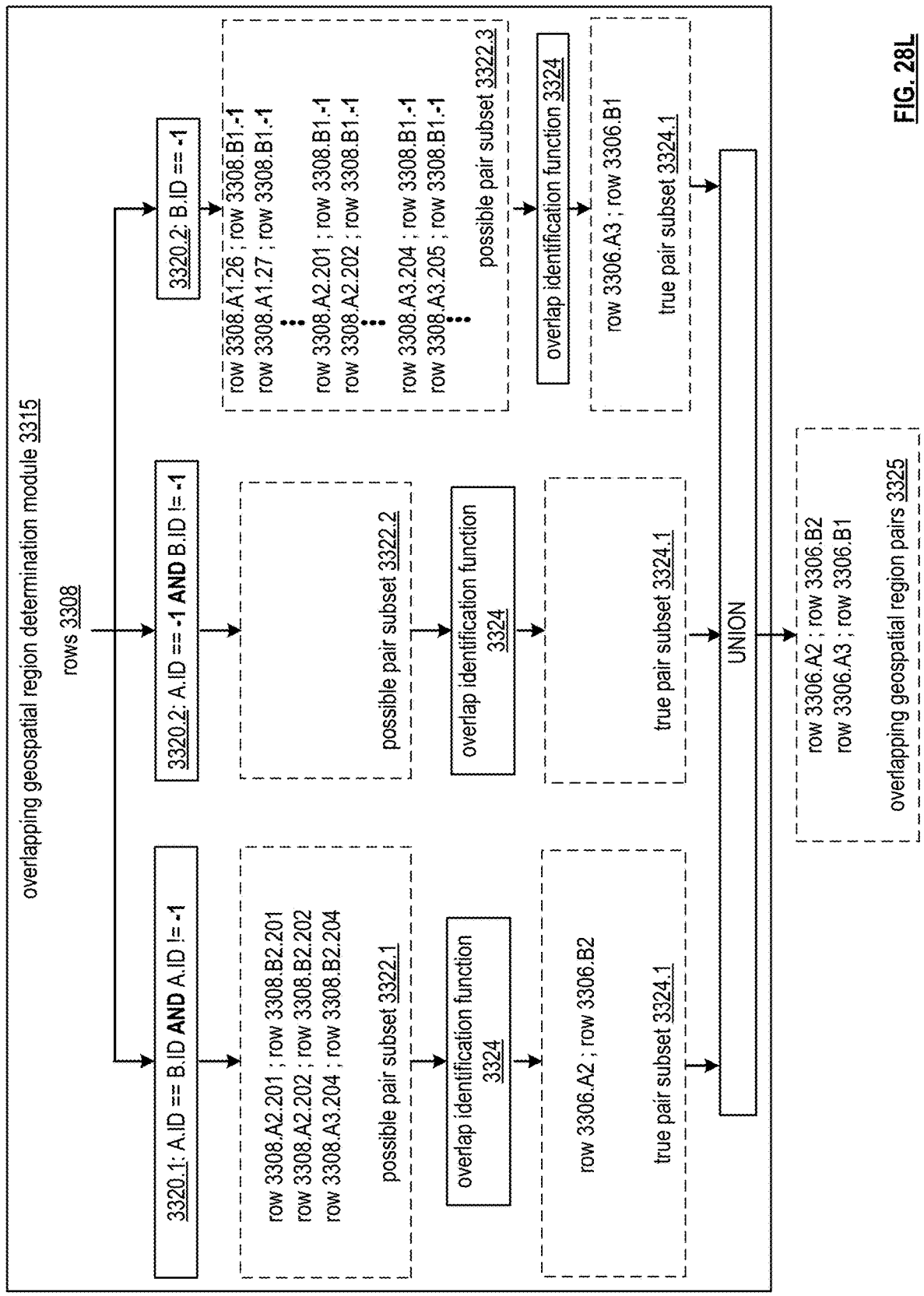
FIG. 28L is a schematic block diagram of an overlapping geospatial region determination module that identifies example overlapping geospatial region pairs for an example set of rows.
Figure 28M:
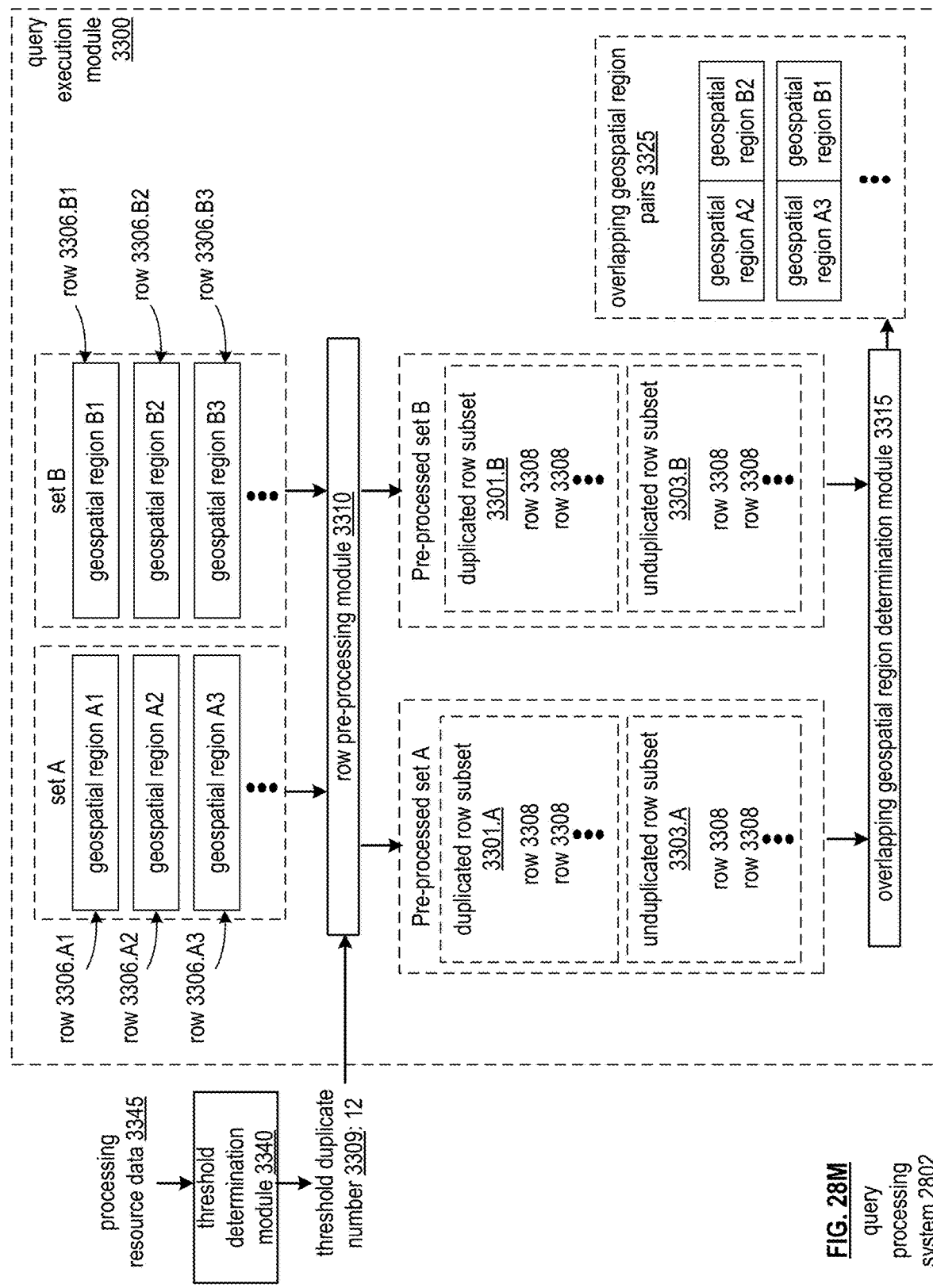
FIG. 28M is a schematic block diagram of a query processing system that implements a threshold determination module.
Figure 28O:
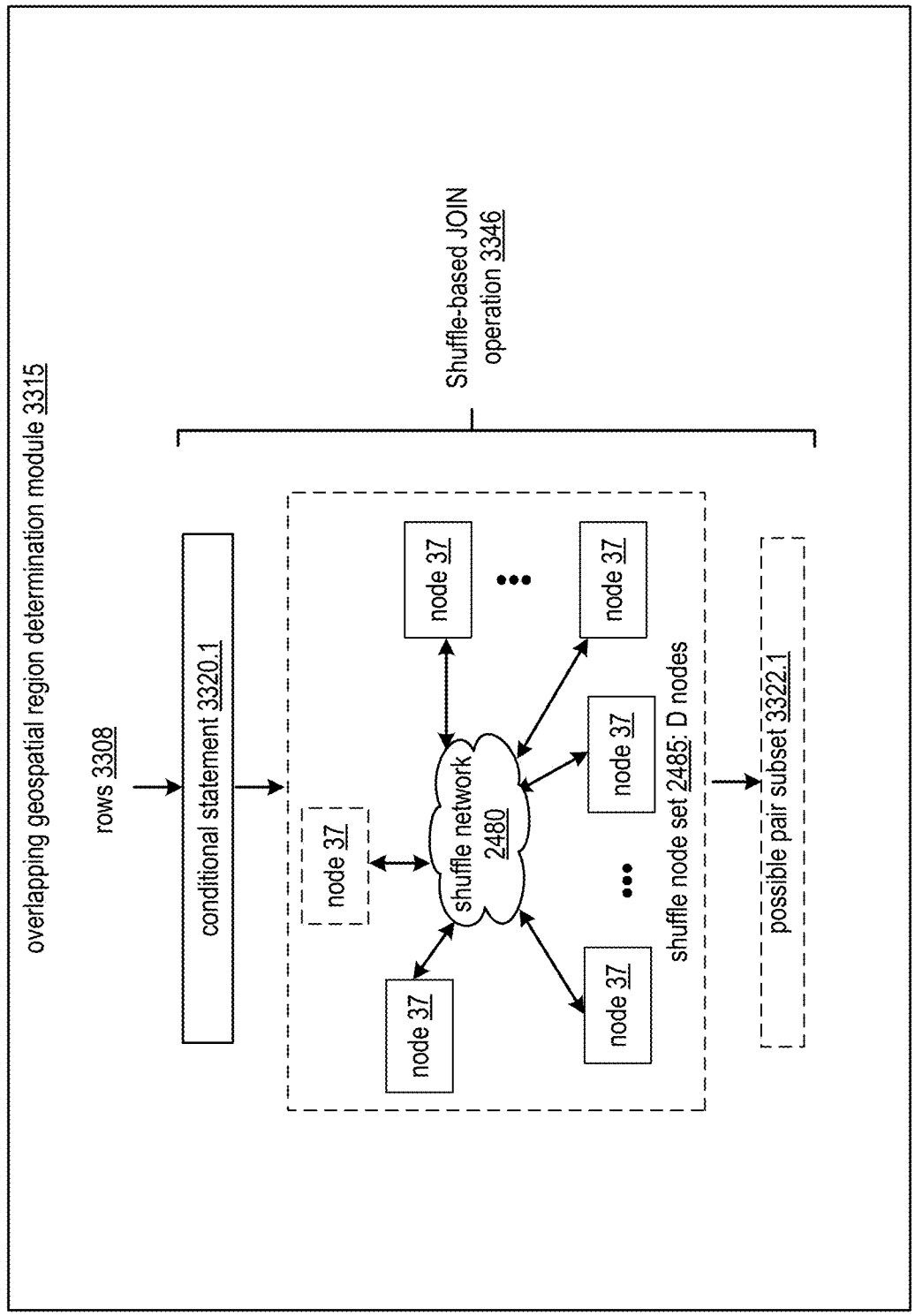
FIG. 28O is a schematic block diagram of an overlapping geospatial region determination module having number of nodes participating in a shuffle-based JOIN operation corresponding to a threshold duplicate number.

FIGS. 28A-28O illustrate embodiments of a query execution module 3300 that is operable to execute queries against one or more datasets of records that include data indicating geospatial regions. The query execution module 3300 can be implemented via the query processing system 2802 and/or can be implemented via the parallelized query and results sub-system 13. The query execution module 3300 can otherwise be implemented via at least one processor operable to execute queries against a data set.

The one or more datasets accessed by the query execution module 3300 storing the geospatial region data can be stored and accessed as segments in a segment storage system 2508, in memory drives 2425 of one or more nodes 37, and/or in any other database and/or memory. For example, multiple rows 3306 of a dataset can each include data indicating a geospatial region 3307, for example, in a field having a data type corresponding to the geospatial region. The rows 3306 can be implemented as these geospatial regions 3307, such as corresponding objects and/or simple features implementing these geospatial regions 3307.

A geospatial region 3307 can be represented as a bounded two dimensional area, such as a polygon, a circle, or other two dimensional shape. For example, a geospatial region 3307 can include plurality of coordinates indicating locations of various portions of a boundary of the geospatial region, such as points defining the perimeter of a corresponding polygon. A geospatial region can be implemented as a geometry data type or geography data type in SQL, such as a Polygon instance of the geometry data type. For example, corresponding queries against the dataset of geospatial regions are SQL queries. A geospatial region 3307 can be implemented as another planar spatial data type, a simple feature, and/or can otherwise define a two-dimensional region in any physical or imaginary two-dimensional or other multi-dimensional space. In some embodiments, the geospatial region 3307 can be in compliance with the Open Geospatial Consortium (OGC) Simple Features for SQL Specification and/or the PostGIS spatial extender for PostgreSQL object-relational databases.

In some embodiments, each geospatial region 3307 can correspond to the boundary of a physical location upon the surface of the Earth. In such embodiments, the plurality of points can correspond to latitude and longitude coordinates defining a location of each point on the surface of the Earth. Alternatively or in addition, the plurality of points can correspond to GPS data generated via an application, for example, collected in rows 3306. Alternatively or in addition, the geospatial region 3307 can be defined based on political regions, man-made landmarks, or natural features. For example, the geospatial region 3307 can be defined based on indicating at least one street address, building, river, body of water, country, state, city, or other known landmark with a known location on the Earth's surface and/or other known region with a known boundary on the Earth's surface. The boundary of the physical location upon the surface of the Earth can be defined based on a corresponding instance of a SQL geometry data type or other planar spatial data type defining the bounds of the region, for example, via latitude and longitude coordinates or other points with defined locations with respect to the Earth and/or with respect to a physical location on Earth and/or in proximity to the Earth. Note that while the geospatial regions 3307 are described and depicted as two-dimensional shapes on a two-dimensional plane for simplicity, the geospatial regions 3307 can be non-flat based on a curvature of the earth and/or optionally based on altitude changes in geographic features upon corresponding portions of the surface of the earth.

In some embodiments, queries are performed to identify pairs rows 3306 having geospatial regions 3307 that overlap with each other, and/or their respective overlap. For example, geospatial regions compared via an STOverlaps( ) SQL function, an STIntersection( ) SQL function, an STTouches( ) SQL function, other Open Geospatial Consortium OGC method executable in SQL; an ST_Interects( ) function, ST_Overlaps( ), and/or function for execution of PostGIS spatial and/or geographic objects executable against a PostgreSQL database; and/or other function identifying intersecting geospatial regions, touching geospatial regions, overlapping geospatial regions, geospatial regions contained within other geospatial regions, and/or geospatial regions that are otherwise touching and/or overlapping somewhere. For example, geometry instances can be determined to overlap when the output of such a comparison function indicates an overlap, such as when a STIntersection( ) comparison function is non-null and/or when output of a STOverlaps( ) function is True. Geometry instances can be determined to not overlap when the output of such a comparison function indicates no overlap, such as when a STIntersection( ) comparison function is null and/or when output of a STOverlaps( ) function is False.

As a particular example, the query includes, is implemented as, is logically equivalent to, and/or logically similar to performance of a join operation on datasets A and B, conditioned on A and B intersecting. For example, the query expression is implemented to include the expression A join B on ST_Intersects(A,B), A join B on STIntersection(A,B), or another expression where datasets A and B are joined on a condition requiring intersection of respective geospatial objects.

FIG. 28A illustrates an embodiment of a query execution module 3300 that identifies overlapping pairs of geospatial regions in two data sets A and B, where a query resultant corresponds to and/or is based on identification of a set of overlapping geospatial region pairs 3325 that indicates ones of the geospatial regions of set A that overlap with ones of the geospatial regions of set B. The set of overlapping geospatial region pairs 3325 can further indicate polygons or geometric regions defined as the intersection between each pair of overlapping geospatial regions.

While the embodiments of FIGS. 28A-28O illustrate identification of overlapping geospatial region pairs 3325 in two different data sets, the overlapping geospatial region pairs 3325 can be identified from a same data set, where geospatial regions of the data set that overlap with other geospatial regions of the same data set are identified. In some embodiments, identification of overlapping geospatial region pairs 3325 in more than two different data sets can be identified, where three or more geospatial regions are identified as all overlapping.

The identification of the overlapping geospatial region pairs 3325 can be achieved via a row pre-processing module 3310 and an overlapping geospatial region determination module 3315. The row pre-processing module 3310 and overlapping geospatial region determination module 3315 can be implemented via at least one processor of the query execution module 3300, such as at least one processor of at least one node 37 participating in a query execution plan 2405 executing the query. The row pre-processing module 3310 and overlapping geospatial region determination module 3315 can be implemented via any other processing resources and/or memory resources of the database system 10.

The row pre-processing module 3310 can be operable to process incoming rows 3306 of one or more datasets involved in the query, such as dataset A and dataset B of FIG. 28A. The row pre-processing module 3310 can generate a pre-processed set of each dataset that includes a plurality of processed rows 3308. The processed rows 3308 can be different from the original rows 3306, for example, where each processed row is generated from an original row 3306 to include an additional appended column and/or additional data. Examples of generating processed rows is discussed in further detail in conjunction with FIGS. 28C-28G.

The pre-processed set for a set of rows 3306 of a dataset can include a duplicated row subset 3301 and an unduplicated row subset 3303. Each row in the duplicated row subset 3301 can be generated based on duplicating corresponding rows 3306, where two or more instances of a given row 3306 is reflected as multiple rows 3308 in the duplicated row subset 3301. Each row in the unduplicated row subset 3303 can include exactly one instance of rows 3308 for any given row 3306.

A given row 3306 can be guaranteed to have corresponding rows 3308 in exactly one of the duplicated row subset 3301 or the unduplicated row subset 3303, where every row 3306 is reflected as one or more rows 3308 in either the duplicated row subset 3301 or the unduplicated row subset 3303, but not both. Note that some rows in the duplicated row subset can include exactly one instance of a given row 3306, where a given row 3306 has only one row 3308 in the duplicated row subset. However, rows in the unduplicated row subset can be guaranteed to be unduplicated, where a given row 3306 is guaranteed to have only one row 3308 in the unduplicated row subset.

Determining whether to generate rows 3308 from rows 3306 as duplicated rows of the duplicated row subset 3301 or unduplicated rows of the unduplicated row subset can be based on a threshold duplicate number 3309, having a value of D. Rows in the duplicated row subset 3301 can be guaranteed to included D or less duplicates. In the case where duplication would require more than D duplicates for a given row 3306, a corresponding row 3308 can be generated as an unduplicated row.

Determining whether to generate rows 3308 from rows 3306 as duplicated rows of the duplicated row subset 3301 or unduplicated rows of the unduplicated row subset can be further based on a plurality of uniform adjacent geospatial polygons 3304.1-3304.P. Rows 3306 that are duplicated as a number of rows 3308 in the duplicated row subset 3301 can be based on overlap with a corresponding number of uniform adjacent geospatial polygons 3304.1-3304.P that is less than or equal to D. Rows 3306 that are not duplicated as a single row 3308 in the unduplicated row subset 3303 can be based on overlap with a number of uniform adjacent geospatial polygons 3304.1-3304.P that is greater than D. The plurality of uniform adjacent geospatial polygons 3304 are discussed in further detail in conjunction with FIG. 28B.

The overlapping geospatial region determination module 3315 can process the duplicated row subsets 3301 and unduplicated row subsets 3303 to identify overlapping geospatial region pairs 3325. This can include performing one or more JOIN operations on the unduplicated row subsets 3301 and unduplicated row subsets 3303.

As discussed in further detail herein, the unduplicated row subsets 3301 and unduplicated row subsets 3303 generated by the row pre-processing module 3310 can be leveraged to improve the efficiency of the identification of overlapping geospatial region pairs 3325 by the overlapping geospatial region determination module 3315. In particular, the generation of unduplicated row subsets 3301 and unduplicated row subsets 3303 via the row pre-processing module 3310 can be implemented to improve the efficiency of the identification of overlapping geospatial region pairs 3325 by the overlapping geospatial region determination module 3315 when processing geospatial regions. This improves the technology of database systems in performing join operations to identify overlapping geospatial regions by increasing the efficiency of query executions, such as enabling faster execution of these queries and/or reducing memory resources required for execution of these queries.

FIG. 28B spatially illustrates an example embodiment of a set of geospatial regions 3307A1-3307A3 of dataset A, and a set of geospatial regions 3307.B1-3307.B3 of dataset B of FIG. 28A. The geospatial regions 3307 are depicted with respect to a plurality of uniform adjacent geospatial polygons 3304.1-3304.P. The geospatial regions 3307 can correspond to square "tiles" or other uniform shaped regions upon the two-dimensional space and/or upon the surface of the earth.

The plurality of uniform adjacent geospatial polygons 3304.1-3304.375 of FIG. 28B can implement the plurality of uniform adjacent geospatial polygons 3304.1-3304.P of FIG. 28A, where P is 375 in this example. P can correspond to any other number, and can be based on a size of uniform adjacent geospatial polygons with respect to a size of the Earth or with respect to another full space upon which geospatial regions can be located.

Each uniform adjacent geospatial polygons 3304 can have a unique identifier 3305, such as an integer identifier or other identifier. In this example, the depicted set of 375 uniform adjacent geospatial polygons 3304 are identified via integers 1-375, where integer 1 is in the top left corner, and increments horizontally, and then vertically.

The uniform adjacent geospatial polygons 3304 can optionally be implemented via a regular polygons, such as the squares of FIG. 28B. The uniform adjacent geospatial polygons 3304 can optionally be implemented via other regular polygons, such as hexagons, that can be adjacently placed to fully cover a two-dimensional region. The uniform adjacent geospatial polygons 3304 can be implemented via non-regular polygons, such as rectangles of uniform dimensions. In other embodiments, not all of the uniform adjacent geospatial polygons 3304 have a same size and/or shape.

The size, shape, and/or positions of the plurality of uniform adjacent geospatial polygons 3304 can be predetermined, for example, fixed for each query. In some embodiments, the query processing system 2802 is operable to select the size of the plurality of uniform adjacent geospatial polygons 3304 based on a given query, where the uniform size of the plurality of uniform adjacent geospatial polygons 3304 is determined differently for different queries. In some embodiments, the database system 10 is operable to select the size of the plurality of uniform adjacent geospatial polygons 3304 based on a given one or more datasets, where the uniform size of the plurality of uniform adjacent geospatial polygons 3304 is determined differently for different datasets, for example, based on an average, maximum, and/or minimum area of its geospatial regions 3307 and/or where the uniform size is adjusted over time based on the addition of new geospatial regions 3307 to a given dataset over time.

The overlap of geospatial regions with these uniform adjacent geospatial polygons can be leveraged to improve query execution efficiency when identifying overlapping geospatial regions, based on first determining whether pairs of geospatial regions are upon any shared uniform adjacent geospatial polygons 3304. When this is the case, the pair of corresponding geospatial regions can be processed to determine whether they indeed overlap, for example, based on performing an STIntersection( ) function or STOverlaps( ) function upon geometry and/or geography objects implementing the geospatial regions 3307. This can be ideal in reducing the number of pairs upon which the function, such as the STIntersection( ) function or STOverlaps( ) function, need be performed based on first identifying whether they could possibly overlap based on whether they share any uniform adjacent geospatial polygons 3304.

In particular, identifying the overlapping geospatial region pairs 3325 can be achieved based on identifying which uniform adjacent geospatial polygons 3304 with which multiple geospatial regions 3307 from different datasets overlap. For example, each geospatial region's row 3306 can be duplicated as rows 3308, for each uniform adjacent geospatial polygon 3304 with which it overlaps, and each appended with the unique polygon identifiers 3305 of the corresponding uniform adjacent geospatial polygon 3304. A hash join or other join operation can be performed to identify rows 3308 having identical polygon identifiers 3305, and a function such as STIntersection( ) or STOverlaps( ) can be performed to identify which of these rows sharing uniform adjacent geospatial polygons 3304 indeed overlap.

However, in cases where a given geospatial regions 3307 is drastically larger than some or all other geospatial regions 3307, identifying the overlapping geospatial region pairs 3325 via this means would require a tremendous number of duplicates due to this large geospatial region's overlap with a large number of uniform adjacent geospatial polygons 3304. The resulting shuffle performed via the hash join could be incredibly inefficient in this case. Simply adjusting the size of the uniform adjacent geospatial polygons 3304 is not sufficient in preventing inefficiency problems in cases where geospatial regions of datasets are of disproportionate size, as largening the uniform adjacent geospatial polygons 3304 would result in much greater numbers of geospatial regions 3307 needing be shuffled and compared, rendering use of the uniform adjacent geospatial polygons 3304 less useful in filtering possible pairs. For example, in the extreme case where a bounding polygon 3317 of a huge geospatial region 3307 were to cover the whole earth, and where uniform adjacent geospatial polygons 3304 were each one square mile, approximately 197 million rows would be created and shuffled in duplicating and identifying overlapping geospatial regions with this huge example geospatial region.

This problem can be prevented based on implementing the threshold duplicate number 3309 to cap the number of duplicates that can be generated for rows, where large geospatial regions 3307 thus do not render a tremendous number of duplicates that could otherwise induce incredible inefficiency in query execution. The features and functionality presented in FIGS. 28A-28O present improvements to the technology of database systems when performing join operations to identify overlapping geospatial regions by increasing the efficiency of query execution based on capping the number of duplicates for these rows based on implementing the threshold duplicate number 3309. This can improve the efficiency of performing the join operation by reducing the number of rows required to be shuffled in a hash join operation and/or can improve the efficiency of performing the join operation by reducing the memory resources required in generating and storing the duplicated rows.

Identifying which uniform adjacent geospatial polygons 3304 with which a given geospatial regions 3307 overlaps (or possibly overlaps) can optionally be simplified based on first bounding the geospatial regions 3307 via a bounding polygon, such as a rectangle. For example, the geospatial regions 3307 of FIG. 28B are rectangular based on their non-rectangular boundaries having been bounded by the depicted rectangles to simplify determination of overlapping uniform adjacent geospatial polygons 3304.

Such an example is depicted in FIG. 28C. A given geospatial region 3307 can have a non-rectangular shape or other arbitrary shape. The given geospatial region 3307 can be bounded via a geospatial region bounding polygon 3317. For example, the geospatial region bounding polygon 3317 is a rectangle, where the sides of the rectangular geospatial region bounding polygon 3317 can each be parallel to one of two orthogonal axes, such as the x axis and y axis of FIG. 28C.

The x and y axes can correspond to axes of a coordinate system utilized to identify points upon the given geospatial region 3307. Thus, the bounding rectangle can be simply constructed based on identifying the point of the given geospatial region 3307, such as a point of a corresponding polygon, having a greatest x value, the lowest x value, the greatest y value, and the lowest y value, where segments of the rectangle are generated to intersect with these points parallel with the x axis or y axis, respectively, to form a rectangle. In some embodiments, the coordinate system corresponds to latitude and longitude lines of the Earth.

In some embodiments, the sides of square uniform adjacent geospatial polygons 3304 are also each parallel to one of these two orthogonal axes to ensure sides of rectangular geospatial region bounding polygons 3317 are parallel with sides of square uniform adjacent geospatial polygons 3304, for example, as depicted in FIG. 28B. For example, the geospatial regions 3307 of FIG. 28B were already processed to render their geospatial region bounding polygon 3317 depicted as the geospatial regions 3307 of FIG. 28B. In other embodiments, such bounding polygons are not generated for some or all geospatial regions 3307.

The polygons 3317 can have a same number of sides as the uniform adjacent geospatial polygons 3304, where this number of sides is optionally different from four. While the geospatial region 3307 is depicted as a curved shape, all geospatial regions 3307 can optionally be implemented as polygons with no curved boundaries.

FIG. 28D illustrates an embodiment of generating a pre-processed row set for a row 3306A 1 via a row pre-processing module 3310. Some or all features or functionality of the row pre-processing module 3310 of FIG. 28D can be utilized to implement the row pre-processing module 3310 of FIG. 28A. The row 3308A1 can indicate geospatial region 3307.A1 of FIG. 28B. In this example, the threshold duplicate number 3309 has a value of 12. The value of D can be any other integer number. Selection of the value of D is discussed in further detail in conjunction with FIGS. 28M-28O.

The row pre-processing module 3310 can implement a polygon identifier set determination module 3312 that indicates identifiers of a subset of the plurality of uniform adjacent geospatial polygons 3304 that overlap and/or are included within the corresponding geospatial region 3307 and/or its determined geospatial bounding polygon 3317. In this example, a set of six uniform adjacent geospatial polygons 3304 are identified, corresponding to the polygons 3304 with identifiers 26, 27, 28, 51, 52, and 53 as illustrated in FIG. 28B.

The pre-processed row set includes a set of six duplicate rows 3308 for the given row 3306A1. Each row can be appended with and/or otherwise indicate the corresponding polygon identifier 3305. This set of duplicate rows 3308 can be included in the duplicated row subset 3301.A.

Note that in some embodiments, a given geospatial region 3307 may be included within, and thus overlap with, only one uniform adjacent geospatial polygons 3304. In such embodiments, a single "duplicate" row 3308 is generated for the given row 3306 denoting the identifier of the given uniform adjacent geospatial polygons 3304. While multiple duplicates are not generated for such a row 3306 in this case, the corresponding row 3308 is still considered a member of the duplicate row subset 3301 based on the row being denoted with a true polygon identifier and not overlapping with a number of polygons exceeding the threshold duplicate number 3309.

In particular, because the polygon identifier set determination module 3312 identified that the geospatial region 3307.A1 or corresponding bounding polygon 3317 overlapped with less than the threshold duplicate number 3309 of uniform adjacent polygons (i.e. 6<12), the set of six duplicate rows 3308.A1.26-3308A1.28 and 3308A1.51-3308.A1.53 were generated for the given row 3306.A1 accordingly.

Continuing with this example, FIG. 28e illustrates an embodiment of generating a pre-processed row set for another row 3308.B1 via the row pre-processing module 3310. Some or all features or functionality of the row pre-processing module 3310 of FIG. 28e can be utilized to implement the row pre-processing module 3310 of FIG. 28A. The row 3306.B1 can indicate geospatial region 3307.B1 of FIG. 28B. The threshold duplicate number 3309 can again have a value of 12. For example, the pre-processed row sets for rows 3306.A1 and 3306.B1 are generated in accordance with execution of a query that processes datasets that include rows 3306.A1 and 3306.B1, for example, as illustrated in FIG. 28A, where the value of D in FIG. 28A is 12.

As illustrated in FIG. 28B, the geospatial region 3307.B1 overlaps with greater than 12 uniform adjacent geospatial polygons 3304. Based on determining the geospatial region 3307.B1 overlap with more than 12 uniform adjacent geospatial polygons 3304, rather than generating a number of duplicates based on all uniform adjacent geospatial polygons 3304 with which the geospatial region 3307.B1 overlaps, the polygon identifier set determination module 3312 generates a single row 3308. This single row 3308 can be a member of the unduplicated row set 3303.

To distinguish this row 3308 as a row that was not duplicated to denote overlapping with a given uniform adjacent geospatial polygon 3304, a special, threshold exceeding identifier 3311 that is guaranteed to be distinct from all identifiers 3305 of all uniform adjacent geospatial polygons 3304 is utilized as the polygon identifier 3305 for generating the row 3308. In this example, the threshold exceeding identifier 3311 has a value of negative 1, where all identifiers 3305 of actual uniform adjacent geospatial polygons 3304 are positive integers. The threshold exceeding identifier 3311 can have any other distinct value that is different from identifiers 3305 of all uniform adjacent geospatial polygons 3304.1-3304.P.

Thus, members of the unduplicated row set 3303 can be identified based on having the threshold exceeding identifier 3311 as their polygon identifier 3305. Members of the duplicated row set 3303 can be identified based on having polygon identifiers 3305 that are not the threshold exceeding identifier 3311, and thus identify actual uniform adjacent geospatial polygons 3304.

FIG. 28F illustrates generation of pre-processed sets A and B from set A and B of FIG. 28A, for example, where all other geospatial regions are processed as discussed in conjunction with FIGS. 28D and 28e. FIG. 28G illustrates this generation of pre-processed sets A and B of FIG. 28A with respect to the spatial arrangement of geospatial regions with respect to the uniform adjacent geospatial polygons 3304.1-3304.375 of FIG. 28B. Note that these of pre-processed sets A and B include the pre-processed set of rows for row A1 as discussed in conjunction with FIG. 28D, and the pre-processed set of rows for row B1 as discussed in conjunction with FIG. 28e>

The geospatial regions A1, A2, A3, B2, and B3 are all processed by generating duplicates with corresponding polygon identifiers 3305 of overlapping uniform adjacent geospatial polygons 3304, based on overlapping with, or having a bounding polygon 3317 overlapping with, less than 12 polygons as illustrated in FIG. 28B. Additional geospatial regions not depicted can be similarly processed based on identifying overlapping uniform adjacent geospatial polygons 3304, and/or determining whether the number of uniform adjacent geospatial polygons 3304 with which it overlaps is less than or equal to 12, or greater than 12.

FIG. 28H illustrates an embodiment of overlapping geospatial region determination module 3315. Some or all features and/or functionality of the overlapping geospatial region determination module 3315 can be utilized to implement the geospatial region determination module 3315 of FIG. 28A.

The rows 3308 of pre-processed sets A and B can be processed via a conditional statement 3320 to generate a possible pair subset 3322. For example, the possible pair subset 3322 indicates a set of pairs, where each pair includes one row 3308 of pre-processed set A, and another row 3308 of pre-processed set B, having geospatial regions 3307 which may intersect. The possible pair subset 3322 can be a filtered subset of all possible pairs of rows 3308 from pre-processed set A and pre-processed set B, for example, based on the conditional statement 3320 filtering other possible pairs of rows. In particular, the rows from set A in pairs of possible pair subset 3322 can be a subset 3321.A of pre-processed set A, such as a proper subset of pre-processed set A. Furthermore, the rows from set B in pairs of possible pair subset 3322 can be a subset 3321.B of pre-processed set B, such as a proper subset of pre-processed set B. As a particular example, the conditional statement 3320 is implemented as a condition on a corresponding join operation, and can be is logically equivalent to, is similar to, and/or renders a subset of the logical output of: A.ID==B.ID OR A.ID==-1 OR B.ID==-1. For example, the query A join B on ST_Intersects(A, B) can be implemented based on a query operator flow implementing: A join B on ((A.ID==B.ID OR A.ID==-1 OR B.ID==-1) AND ST_Intersects(A, B)).

In this example, "A" is the name of a table corresponding to dataset A; "B" is the name of a table corresponding to dataset B; "ID" is the name of a column that includes polygon identifiers 3305, for example, created and/or populated by row pre-processing module 3310; "==" is an operator testing for equality; and/or the integer value -1 is the threshold exceeding identifier 3311. Implementing this conditional statement can ensure that duplicated rows are joined when their polygon identifiers 3305 are equivalent, denoting they overlap with a shared uniform adjacent geospatial polygon 3304, and further ensures that unduplicated rows are also joined with other rows for consideration geospatial regions which could overlap with other geospatial regions. As discussed in further herein, the conditional statement 3320 can be implemented to render a proper subset of this example conditional statement 3320 to further improve query execution efficiency based on further filtering pairs of rows for consideration and/or processing.

An overlap identification function 3324 can be performed on some or all pair of rows in the possible pair subset 3322 to identify whether each given pair of corresponding geospatial regions 3307 indeed overlap. For example, the overlap identification function 3324 is implemented as, or is implemented via some or all features and/or functionality of, an STOverlaps( ) SQL function, an STIntersection( ) SQL function, an STTouches( ) SQL function, other Open Geospatial Consortium OGC method executable in SQL, and/or other function identifying intersecting geospatial regions, touching geospatial regions, overlapping geospatial regions, geospatial regions contained within other geospatial regions, and/or geospatial regions that are otherwise touching and/or overlapping somewhere.

FIG. 28I illustrates an embodiment of overlapping geospatial region determination module 3315 where conditional statement 3320 includes three conditional statements 3320.1, 3320.2, and 3320.3. For example, these three conditional statements can be separated via OR operators, where a disjunction of these three conditional statements 3320.1, 3320.2, and 3320.3 renders conditional statement 3320. Some or all features and/or functionality of the overlapping geospatial region determination module 3315 can be utilized to implement the geospatial region determination module 3315 of FIG. 28H.

Rows 3308 can be processed by each conditional statement 3320.1, 3320.2, and 3320.3, for example, in parallel via different nodes 37 Each conditional statement 3320 can process the incoming rows 3308 to render its own possible pair subset 3322,2, which can be processed via the overlap identification function 3324 to render a corresponding true pair subset 3325. A UNION operator can be applied to the three true pair subset 3324.1, 3324.2, and 3324.E to render the overlapping geospatial regions pairs 3325.

The conditional statements are evaluated in different parallel tracks of an operator execution flow 2433, for example, based on processing the corresponding query in accordance with a non-normalized form that is neither CNF nor DNF as discussed previously herein. The overlap identification function 3324 can be performed in each of these parallel tracks as illustrated in FIG. 28I.

Furthermore, the conditional statements 3320.1, 3320.2, and 3320.3 can be structured to guarantee that no pair of rows satisfies multiple conditional statements 3320.1, 3320.2, and 3320.3. Therefore, their outputted possible pair subsets 3322.1, 3322.2, and 3322.3 can be guaranteed to be mutually exclusive. Thus, when combined via the UNION operator, no deduplication is required based on this guarantee that no pair of rows be reflected in multiple ones of the set of parallel tracks, These outputted possible pair subsets 3322.1, 3322.2, and 3322.3 can further be guaranteed to collectively include all pairs in the true set of overlapping region pairs, where the possible pair subsets 3322.1 3322.2 and 3322.3 are not missing any pairs, guaranteeing the overlapping geospatial region pairs 3325 to be the correct resultant.

To achieve these guarantees, pairs of rows included in the possible pair subset 3322.1 outputted based on satisfying the first conditional statement 3320.1 can correspond to pairs having rows from the duplicated row subset 3301.A and from the duplicated row subset 3301.B. The possible pair subset 3322.1 can be guaranteed to include no rows from unduplicated row subsets 3303A or 3303.B based on the conditional statement 3320.1. Some rows 3308 of duplicated row subset 3301.A may not be included in any pairs and/or some rows 3308 of duplicated row subset 3301.B may not be included in any pairs on based on the conditional statement 3320.1, and such possible pairs are thus filtered from further processing. For example, each pair includes rows from duplicated row subset 3301A and duplicated row subset 3301.B having equivalent polygon identifiers 3305, where pairs having non-equivalent polygon identifiers 3305 are not included and thus filtered out. In particular, the rows from duplicated row subset 3301.A in pairs of possible pair subset 3322 can be a subset 3323.A of duplicated row subset 3301.A, such as a proper subset of duplicated row subset 3301.A. Furthermore, the rows from duplicated row subset 3301.B in pairs possible pair subset 3322 can be a subset 3323.B of duplicated row subset 3301.B, such as a proper subset of pre-processed set B. An example of a conditional statement 3320.1 rendering these guarantees is discussed in conjunction with FIG. 28L.

Meanwhile, pairs of rows included in the possible pair subset 3322.2 outputted based on satisfying the second conditional statement 3320.2 can correspond to pairs having rows from the unduplicated row subset 3303A and from the duplicated row subset 3301.B. The possible pair subset 3322.2 can be guaranteed to include no rows from duplicated row subset 3301.A or from unduplicated row subset 3303.B based on the conditional statement 3320.2. Each row 3308 of unduplicated row subset 3301A can be guaranteed be included in pairs of possible pair subset 3322 with rows of duplicated row subset 3301.B. An example of a conditional statement 3320.2 rendering these guarantees is discussed in conjunction with FIG. 28L.

Finally, pairs of rows included in the possible pair subset 3322.3 outputted based on satisfying the third conditional statement 3320.3 can correspond to a first set of pairs having rows from the unduplicated row subset 3303A and from the unduplicated row subset 3303.B, and having rows from the duplicated row subset 3301.A and from the unduplicated row subset 3301.B. The possible pair subset 3322.3 can be guaranteed to include no rows from duplicated row subset 3301A or from unduplicated row subset 3303.B based on the conditional statement 3320.3. Each row 3308 of unduplicated row subset 3301.B can be guaranteed not be included in pairs of possible pair subset 3322 with rows of both duplicated row subset 3301.A and unduplicated row subset 3303A. An example of a conditional statement 3320.3 rendering these guarantees is discussed in conjunction with FIG. 28L.

In other embodiments, the third conditional statement 3320.3 is split into two conditional statements, and optionally two corresponding parallel tracks. One of these conditional statements can render a possible pair subset that includes rows from the unduplicated row subset 3303.A and from the unduplicated row subset 3303.B. The other one of these conditional statements can render rows from the duplicated row subset 3301.A and from the unduplicated row subset 3301.B.

FIG. 28J illustrates another embodiment of overlapping geospatial region determination module 3315 where conditional statement 3320 includes the three conditional statements 3320.1, 3320.2, and 3320.3 of FIG. 28I, rendering the possible pair subsets 3322.1, 3322.2, and 3322.3 of FIG. 28I. However, rather than evaluating the overlap identification function 3324 in each parallel path, the overlap identification function 3324 is optionally performed upon rows after the union is performed, for example, via a single node receiving all pairs of possible pair subset 3322 outputted via the UNION.

FIG. 28K illustrates how each set of possible pair subsets 3322.1, 3322.2, and 3322.3 can each be generated by overlapping geospatial region determination module 3315 based on performing a JOIN operator based on the corresponding conditional statement 3320.1, 3320.2, or 3320.3, respectively. Some or all features and/or functionality of FIG. 28K can be utilized to implement the overlapping geospatial region determination module 3315 of FIG. 28I and/or FIG. 28J.

The possible pair subset 3322.1 can be generated based on performing a shuffle-based JOIN operation 3346. For example, a shuffle is performed for rows of pre-processed set A and pre-processed set B via a shuffle node set 2485 of nodes 37 as discussed in conjunction with FIG. 24E. In particular, as the possible pair subsets 3322.1 can be identified based on identifying pairs of rows with equivalent values for their respective polygon identifier 3305, a hash join can be performed and utilized to implement the shuffle-based JOIN operation 3346. Performing the shuffle-based JOIN operation 3346 can include first shuffling rows of pre-processed row set A and pre-processed row set B, where different nodes 37 receive and send different rows to each other for example, via a shuffle network 2480, and/or hashing a smaller side data to hash join with a larger side to ultimately each determine respective mutually exclusive subsets of the possible pair subset 3322.1.

Performing the shuffle-based JOIN operation 3346 to generate the possible pair subset 3322.2 and/or true pair subset 3324.2 can include first broadcasting rows of pre-processed row set A to all nodes 37 of an inner level that are assigned to execute the JOIN, and then sending each row of pre-processed row set B to one node 37 of this inner level, where each node determines pairs of its set B rows and its set A rows meeting the JOIN criteria of conditional statement 3320.2 and/or comparing favorably in the overlap identification function 3324 to generate its own subset of possible pair subsets 3322.2 and/or true pair subset 3324.2. It can be preferred to broadcast the unduplicated row subset 3303.A rather than the duplicated row subset 3301.B, due to unduplicated row subset 3303.A likely having a smaller number of rows to be broadcast based on not having been duplicated.

Performing the shuffle-based JOIN operation 3346 to generate the possible pair subset 3322.3 and/or true pair subset 3324.3 can include first broadcasting rows of pre-processed row set B to all nodes 37 of an inner level that are assigned to execute the JOIN, and then sending each row of pre-processed row set A to one node 37 of this inner level, where each node determines pairs of its set A rows and its set B rows meeting the JOIN criteria of conditional statement 3320.3 and/or comparing favorably in the overlap identification function 3324 to generate its own subset of possible pair subsets 3322.3 and/or true pair subset 3324.3. It can be preferred to broadcast the unduplicated row subset 3303.B rather than the full pre-processed set A including the duplicated row subset 3301.A and unduplicated row subset 3301A, due to unduplicated row subset 3303.B likely having a smaller number of rows to be broadcast based on not having been duplicated.

The broadcast-based JOIN operation 3348 can optionally be implemented as and/or via some or all features and/or functionality of a Spark SQL broadcast join or any other broadcast-based join operation. The shuffle-based JOIN operation 3346 can optionally be implemented as and/or via some or all features and/or functionality of a Spark SQL shuffle join or any other shuffle-based join operation.

The execution of a hash join upon the duplicated rows can render more efficient performance than if rows were not duplicated and processed via a broadcast-based join. However, the duplication of rows based on uniform adjacent geospatial polygons 3304 can render drastically inefficient performance in cases where a tremendous number of duplicates is generated and shuffled for disproportionately large geospatial regions 3307, as discussed previously. Thus, the other unduplicated rows for these geospatial regions are be processed via a hash join based on not being conditioned on equality, and are instead processed via broadcast-based JOIN operations 3348 performed to generate possible pair subsets 3322.2 and 3322.3. Performing these separate broadcast-based JOIN operations 3348 without generating this tremendous number of duplicates for large geospatial regions 3307 overlapping with more than the threshold number of tiles can be more efficient than generating and shuffling this tremendous number of duplicates for these large geospatial regions 3307 via a hash join.

FIG. 28L illustrates an example embodiment of an overlapping geospatial region determination module 3315 with example conditional statements 3320.1, 3320.2, and 3320.3. Some or all features and/or functionality of the overlapping geospatial region determination module 3315 can be utilized to implement the overlapping geospatial region determination module 3315 of FIG. 28H.

The conditional statement 3320 can be implemented as, and/or can be logically equivalent and/or logically similar to:

(A.ID==BID AND A.ID!=−1) OR
(A.ID==−1 AND B.ID!=−1) OR
(B.ID==−1)

For example, the query A join B on ST_Intersects(A, B) can be implemented based on a query operator flow implementing: A join B on (((A.ID==BID AND A.ID!=−1) OR (A.ID==−1 AND B.ID!=−1) OR (B.ID==−1)) AND ST_Intersects(A, B)).

In this example, "A" is the name of a table corresponding to dataset A; "B" is the name of a table corresponding to dataset B; "ID" is the name of a column that includes polygon identifiers 3305, for example, created and/or populated by row pre-processing module 3310; "==" is an operator testing for equality; "!=" is an operator testing for inequality; and/or the integer value −1 is the threshold exceeding identifier 3311.

This conditional statement can optionally be divided into a disjunction of three conditional statements 3320.1, 3320.2, and 3320.3 for parallel processing as discussed in conjunction with FIGS. 28I-28K. Conditional statement 3320.1 can be implemented as and/or can be logically equivalent to and/or logically similar to A.ID==BID AND A.ID!=−1. Conditional statement 3320.2 can be implemented as and/or can be logically equivalent to and/or logically similar to A.ID==−1 AND BID!=−1. Conditional statement 3320.3 can be implemented as and/or can be logically equivalent to and/or logically similar to B.ID==−1. In this example, the corresponding possible pair subsets 3322.1, 3322.2 and 3322.3 can be guaranteed to be mutually exclusive. Furthermore, the corresponding possible pair subsets 3322.1, 3322.2 and 3322.3 can be guaranteed to collectively include all pairs of rows from set A and set B with geospatial regions that intersect.

Thus, a DNF and/or NNF operator execution flow can be generated to leverage distinct, parallel processing of separate rows that fulfil these different conditional statements via parallelized tracks of an operator execution flow 2433 as described in conjunction with some or all features and/or functionality of FIGS. 25A-321. This can be ideal in enabling separate join operations to be performed, where the shuffle-based JOIN operation is implemented to leverage the equality condition of conditional statement 3320.1, and where the broadcast-based JOIN is implemented for conditional statements 3320.2 and 3320.3 as discussed in conjunction with FIG. 28K. This can further improve the technology of database systems when performing join operations to identify overlapping geospatial regions by increasing the efficiency of query execution based on enabling parallelized processing of rows based on whether or not they were duplicated, which can improve the efficiency of performing the join operation by optimizing processing of some rows via a hash join operation while still enabling implementation of a row cap to ensure rows for large geospatial regions can be processed separately.

Implementing these conditional statements in continuing the query for the example geospatial regions presented in FIG. 28B, possible pair subset 3322.1 includes a pair that include rows 3308.A2.201 and 3308.B2.201; a pair that include rows 3308A2.202 and 3308.B2.202; and a pair that includes rows 3308A3.204 and 3308.B2.204, as these rows have equivalent identifiers that are not equal to the threshold exceeding identifier 3311 due to the corresponding geospatial regions not overlapping with more than the threshold number of uniform adjacent geospatial polygons 3304.

Furthermore, possible pair subset 3322.3 includes plurality of pairs that include all possible rows 3308 of the pre-processed row set A with row 3308.B1. The overlap identification function can be upon each pair to identify only pairs having overlapping geospatial regions, and duplicate geospatial regions can be removed, where a pair identifying row 3306.A3 and 3306.B1 is identified due to the overlap of A3 with B1, and removal of duplicated rows. Note that possible pair subset 3322.2 is empty in this example due to no geospatial regions 3307 of set A overlapping with more than the threshold number of uniform adjacent geospatial polygons 3304.

When the overlap identification function 3324 is ultimately applied (e.g. within the parallel track as illustrated or after the union operation), the pair of rows 3306A2 and 3306.B2 of possible pair subset 3322.1 are identified as a true overlapping pair for inclusion in the overlapping geospatial region pairs 3325, and the pair of rows 3306A3 and 3306.B1 of possible pair subset 3322.3 are is identified as a true overlapping pair in the overlapping geospatial region pairs 3325. Note that geospatial regions A3 and B2 of possible pair subset 3322.1 are determined not to overlap, despite sharing overlap with uniform adjacent geospatial polygon 3304.204. Furthermore, the duplicated rows in row pairs of possible pair subsets 3322.1 and 3322.3 are ultimately removed in the overlap identification function 3324, or elsewhere prior to rendering the final resultant. Note that the overlapping geospatial regions B1 and B3 are not identified in this query, as the query involved identification of geospatial regions from set A that intersect with geospatial regions from set B (e.g. A join B on STIntersection(A, B) or A join B on ST_Interects(A, B))

In some embodiments, the conditional statement 3320 can be implemented to further improve efficiency based on further utilizing and requiring "owning IDs" for pairs of rows to facilitate this filtering of duplicated pairs of rows. This can be ideal in further improving efficiency by reducing the number of pairs of rows processed via the overlap identification function 3324, based on eliminating duplicates prior to performing the overlap identification function 3324.

Such owning IDs can correspond to a single polygon identifier 3305 of exactly one uniform adjacent geospatial polygon 3304 for any given pair of geospatial regions 3307 sharing one or more geospatial regions. For example, a function such as "owning(A, B)" when performed on a given pair of geospatial regions 3307 from dataset A and dataset B, returns a single polygon identifier 3305 corresponding to exactly one of the set of shared uniform adjacent geospatial polygons 3304 of this pair of geospatial regions 3307. As a particular example, while the example geospatial regions A2 and B2 of FIG. 28B both overlap with geospatial regions 3304.201 and 3304.202, the "owning(A,B)" function can deterministically return the polygon identifier 3305 of exactly one of these geospatial regions (e.g. the lowest identifier such as 201 in this example, or another deterministically determined polygon identifier 3305). Note that such an owning ID is optionally only determined for a pair of geospatial regions, where identifying an owning ID requires first joining and/or otherwise identifying two given geospatial regions as a possible pair. The owning function can optionally return "null" or another value distinct from all identifiers 3305 of uniform adjacent geospatial polygons 3304 when performed upon two geospatial regions 3307 that share no uniform adjacent geospatial polygons 3304.

As an example embodiment where conditional statement 3320 further utilizes such an owning function, the conditional statement 3320 can be implemented as, can be logically equivalent to, and/or logically similar to:

(A.ID==B.ID AND A.ID!=-1 AND owning(A, B)==A.ID) OR
(A.ID==-1 AND B.ID!=-1 AND BID=owning(A,B)) OR
(B.ID==-1 AND (A.ID==-1 OR owning(A,B)=A.ID))

For example, the query A join B on ST_Intersects(A, B) can be implemented based on a query operator flow implementing: A join B on (((A.ID==B.ID AND A.ID!=-1 AND owning(A, B)==A.ID) OR (A.ID==-1 AND BID!=-1 AND BID=owning(A,B)) OR (B.ID==-1 AND (A.ID==-1 OR owning(A,B)=A.ID))) AND ST_Intersects(A, B)).

This conditional statement can similarly optionally be divided into a disjunction of three conditional statements 3320.1, 3320.2, and 3320.3 for parallel processing as discussed in conjunction with FIGS. 28I-28K. Conditional statement 3320.1 can be implemented as and/or can be logically equivalent to and/or logically similar to A.ID==B.ID AND A.ID!=-1 AND owning(A, B)==A.ID. Conditional statement 3320.2 can be implemented as and/or can be logically equivalent to and/or logically similar to A.ID==-1 AND B.ID!=-1 AND BID=owning(A,B)). Conditional statement 3320.3 can be implemented as and/or can be logically equivalent to and/or logically similar to B.ID==-1 AND (A.ID==-1 OR owning(A,B)=A.ID). In this example, the corresponding possible pair subsets 3322.1, 3322.2 and 3322.3 can be guaranteed to be mutually exclusive. Furthermore, the corresponding possible pair subsets 3322.1, 3322.2 and 3322.3 can be guaranteed to collectively include all pairs of rows from set A and set B with geospatial regions that intersect.

Implementing this further-filtering example conditional statement 3320 for the example presented in FIG. 28B, the possible pair subset 3322.1 only includes one pair of rows for geospatial regions A2 and B2 (e.g. possible pair subset 3322.1 includes the pair that includes row 3308A2.201 and row 3308.B2.201, and not the pair that includes row 3308A2.202 and row 3308.B2.202, based on owning(A2, B2) returning the polygon identifier 3305 with integer value 201 due to the deterministic function assigning the uniform adjacent geospatial polygon 3304.201 as the "owning" uniform adjacent geospatial polygon 3304 for this given pair of geospatial regions A2 and B2.). Similarly, the possible pair subset 3322.3 only includes one pair of rows for geospatial regions A2 and B1 (e.g. possible pair subset 3322.3 includes only the pair that includes row 3308.A3.204 and row 3308.B1.203, and not any other pairs for geospatial region A3, and for no rows for geospatial region A1 or A2, based on owning(A3,B1) returning the polygon identifier 3305 with integer value 204 due to the deterministic function assigning the uniform adjacent geospatial polygon 3304.204 as the "owning" uniform adjacent geospatial polygon 3304 for this given pair of geospatial regions A3 and B1, and/or based on owning(A2,B1) and owning(A1,B1) each returning a value denoting that no uniform adjacent geospatial polygon 3304 is shared by these pairs A2 and B1, or A1 and B1.

FIG. 28M illustrates an embodiment of a query processing system 2802 that implements the query execution module 3300 of FIG. 28A. Some or all features and/or functionality of the query processing system 2802 of FIG. 28N can implement any embodiment of the query processing system 2802 described herein.

The query processing system 2802 can implement a threshold determination module 3340 that automatically selects the threshold duplicate number 3309 based on processing resource data 3345. For example, the threshold duplicate number 3309 is selected via the threshold determination module 3340 once, in predetermined time intervals, and/or on a query-by-query basis. For example, different queries are run, for example, in overlapping time intervals and/or at distinct times, via different processing resources and/or otherwise have different processing resource data 3345, rendering different threshold duplicate numbers 3309 to be selected and implemented for executing these different queries. The processing resource data 3345 can indicate a number of nodes 37 participating in a query, a query execution plan 2405 assigning nodes to different levels of participation in the query, a number of parallelized resources for use in the query, an amount of processing resources and/or memory resources allocated for execution of the query, and/or other information regarding estimated and/or actual processing resources and/or memory resources available in the system.

In some embodiments, the automatically the threshold duplicate number 3309 is selected as, and/or is a monotonically increasing deterministic function of, the number of nodes participating a corresponding query execution plan. In some embodiments, the automatically the threshold duplicate number 3309 is selected as, and/or is a monotonically increasing deterministic function of, the number of nodes participating in an inner level 2414 of a corresponding query execution plan.

Such an embodiment is illustrated in FIG. 28N where the threshold duplicate number 3309 is selected as, and/or is a monotonically increasing deterministic function of, the number of nodes in an inner level 2414 of a corresponding query execution plan. Alternatively or in addition, the threshold duplicate number 3309 is fixed and/or determined based on another means, and the corresponding query execution plan is generated to include a number of nodes in the inner level 2414 that is selected based on this threshold duplicate number 3309, for example, as being equal to or being a monotonically increasing deterministic function of the threshold duplicate number 3309, such as a function of D f(D). Some or all features and/or functionality of the query processing system 2802 of FIG. 28N can be utilized to implement the query processing system 2802 of FIG. 28M.

In particular, an execution plan generating module 3355 can implement the execution flow generating module 2525 to generate a query operator execution flow 2433 for the query that is built based on the threshold duplicate number 3309, where rows are pre-processed in executing the query via the query operator execution flow 2433 based on the value of the threshold duplicate number 3309 as discussed previously. The execution plan generating module 3355 can select the threshold duplicate number 3309 based on implementing the threshold determination module 3340 to select the threshold duplicate number 3309 based on the processing resource data 3345 as discussed in conjunction with FIG. 28M. The execution plan generating module 3355 can further generate a query execution plan 2405 based on selecting a number of nodes, such as the number of nodes participating in an inner level 2414, based on the processing resource data 3345 and/or the value D of the threshold duplicate number 3309.

FIG. 28O illustrates an example of an overlapping geospatial region determination module 3315 that implements a shuffle-based JOIN operation 3346 to identify the possible pair subset 3322.1 by utilizing a shuffle node set 2485 that includes exactly D nodes. Some or all features and/or functionality of the overlapping geospatial region determination module 3315 of FIG. 28O can be utilized to implement the overlapping geospatial region determination module 3315 of FIG. 28M. Some or all features and/or functionality of the shuffle-based JOIN operation 3346 of FIG. 28O can be utilized to implement the shuffle-based JOIN operation 3346 of FIG. 28K.

For example, the threshold duplicate number 3309 can be selected as D based on the processing resource data 3345 indicating D nodes to be implemented in the shuffle node set 2485 of for the corresponding query. As another example, the shuffle node set 2485 can be selected as having exactly D nodes based on the threshold duplicate number 3309 having been selected as D for the given query.

Having a shuffle node set 2485 with a number of nodes equal to the threshold duplicate number 3309 to implement the shuffle-based JOIN operation 3346 can be preferred in optimizing the performance of the shuffle-based JOIN operation 3346. For example, each of the set of D nodes can be guaranteed and/or expected to receive an average of less than or equal to one row 3308 for each given row 3306 based on the threshold duplicate number 3309 guaranteeing that none of the rows 3306 are duplicated as more than D rows 3308. For example, in some embodiments, implementing the shuffle node set 2485 with a number of nodes number of nodes greater than the threshold duplicate number 3309 is less ideal, as some rows are unnecessarily unduplicated and would have been able to be processed via the shuffle node set 2485 based on having a number of overlaps with uniform adjacent geospatial polygons 3304 that is greater than the threshold duplicate number 3309 but less than the number of nodes in the shuffle node set 2485. As another example, in some embodiments, implementing the shuffle node set 2485 with a number of nodes number of nodes less than the threshold duplicate number 3309 is also less ideal, as the shuffle node set 2485 is performed inefficiently due to many duplicates being received and shuffled for rows having a number of overlaps with uniform adjacent geospatial polygons 3304 that is less than the threshold duplicate number 3309 but greater than the number of nodes in the shuffle node set 2485. Thus, setting the number of nodes shuffle node set 2485 to implement the shuffle-based JOIN operation 3346 to be equal with the threshold duplicate number 3309, or vice versa, can further improve the technology of database systems in performing join operations to identify overlapping geospatial regions by further increasing the efficiency of query execution.

Figure 28P:
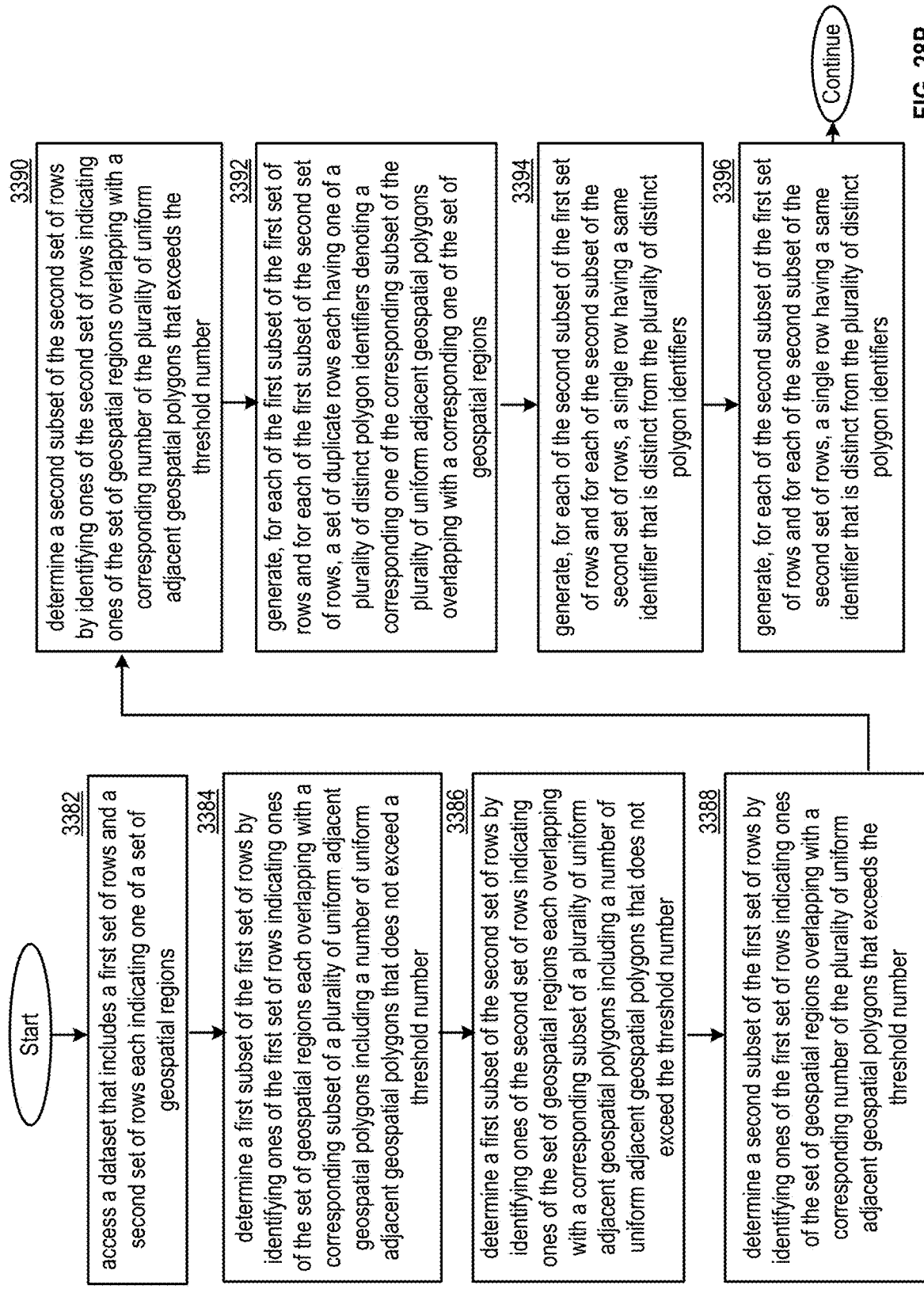
FIG. 28P is a logic diagram illustrating a method for execution in accordance with various embodiments.

FIG. 28P illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28P. In particular, a node 37 can utilize the query processing module 2435 to execute some or all of the steps of FIG. 28P, where multiple nodes 37 implement their own query processing modules 2435 to independently execute the steps of FIG. 28P, for example, to facilitate execution of a query as participants in a query execution plan 2405. Some or all of the method of FIG. 28P can be performed by the query processing system 2802, for example, by utilizing an execution flow generating module 2525 and/or an operator processing module 2435. Some or all of the method of FIG. 28P can be performed by the query execution module 3300 of some or all of FIGS. 28A-28O. Some or all of the method of FIG. 28P be performed by the row pre-processing module 3310 and/or the overlapping geospatial region determination module 3315 of some or all of FIGS. 28A-28O. Some or all of the method of FIG. 28P can be performed via communication with and/or access to a segment storage system 2508, such as memory drives 2425 of one or more nodes 37. Some or all of the steps of FIG. 28P can optionally be performed by any other processing module of the database system 10.

Some or all of the steps of FIG. 28P can be performed to implement some or all of the functionality of the query execution module 3300 as described in conjunction with FIGS. 28A-28O and/or of the query processing system 2802 as described in conjunction with FIGS. 28M-28O. Some or all of the steps of FIG. 28P can be performed to implement some or all of the functionality regarding execution of a query via the plurality of nodes in the query execution plan 2405 as described in conjunction with FIGS. 24A-24E. Some or all steps of FIG. 28P can be performed by database system 10 in accordance with other embodiments of the database system 10 and/or nodes 37 discussed herein.

Step 3382 includes accessing a dataset that includes a first set of rows and a second set of rows each indicating one of a set of geospatial regions. Step 3384 includes determining a first subset of the first set of rows by identifying ones of the first set of rows indicating ones of the set of geospatial regions each overlapping with a corresponding subset of a plurality of uniform adjacent geospatial polygons including a number of uniform adjacent geospatial polygons that does not exceed a threshold number, such as the threshold duplicate number 3309. Step 3386 includes determining a first subset of the second set of rows by identifying ones of the second set of rows indicating ones of the set of geospatial regions each overlapping with a corresponding subset of a plurality of uniform adjacent geospatial polygons including a number of uniform adjacent geospatial polygons that does not exceed the threshold number.

Step 3388 includes determining a second subset of the first set of rows by identifying ones of the first set of rows indicating ones of the set of geospatial regions overlapping with a corresponding number of the plurality of uniform adjacent geospatial polygons that exceeds the threshold number. Step 3390 includes determining a second subset of the second set of rows by identifying ones of the second set of rows indicating ones of the set of geospatial regions overlapping with a corresponding number of the plurality of uniform adjacent geospatial polygons that exceeds the threshold number.

Step 3392 includes generating, for each of the first subset of the first set of rows and for each of the first subset of the second set of rows, a set of duplicate rows each having one of a plurality of distinct polygon identifiers denoting a corresponding one of the corresponding subset of the plurality of uniform adjacent geospatial polygons overlapping with a corresponding one of the set of geospatial regions. Step 3394 includes generating, for each of the second subset of the first set of rows and for each of the second subset of the second set of rows, a single row having a same identifier that is distinct from the plurality of distinct polygon identifiers. For example, the same identifier is the threshold exceeding identifier 3311.

Step 3396 includes identifying a set of pairs of rows of the first set of rows and the second set of rows indicating overlapping ones of the set of geospatial regions based on processing the set of duplicate rows for each of the first subset of the first set of rows and for each of the first subset of the second set of row, and based on further processing the single row for each of the second subset of the first set of rows and for each of the second subset of the second set of rows. This set of pairs of rows can be a resultant of the query and/or can be utilized to generate the resultant. This set of pairs of rows can be implemented as overlapping geospatial region pairs 3325.

In various embodiments, the plurality of distinct polygon identifiers are positive integer identifiers, and the same identifier is a negative integer identifier.

In various embodiments, the method further includes identifying a corresponding bounding polygon for each of one of the set of geospatial regions indicated by one of the first set of rows or the second set of rows. The method can further include determining the corresponding subset of the plurality of uniform adjacent geospatial polygons for each of first subset of the first set of rows and for each of the first subset of the second set of rows based on identifying ones of the plurality of uniform adjacent geospatial polygons overlapping with the corresponding bounding polygon.

In various embodiments, determining the second subset of the first set of rows and the second subset of the second set of rows is based on identifying one more than the number of the plurality of uniform adjacent geospatial polygons overlapping with the one of the set of geospatial regions for each of the second subset of the first set of rows and for each of the second subset of the second set of rows.

In various embodiments, each of the set of pairs of rows includes ones of the first set of rows and one of the second set of rows. Identifying the set of pairs of rows of the first set of rows and the second set of rows indicating overlapping ones of the set of geospatial regions can includes: identifying a first subset of the set of pairs of rows that each includes one of the first subset of the first set of rows and one of the first subset of the second set of rows; identifying a second subset of the set of pairs of rows that includes one of the second subset of the first set of rows; and/or identifying a third subset of the set of pairs of rows that includes one of the second subset of the second set of rows. The first subset of the set of pairs of rows, the second subset of the set of pairs of rows, and the third subset of the set of pairs of rows can be mutually exclusive and collectively exhaustive with respect to the set of pairs of rows.

In various embodiments, identifying each of the first subset of the set pairs of rows is based on identifying one duplicate row of one set of duplicate rows of the first subset of the first set of rows having one of the plurality of distinct polygon identifiers, and identifying one duplicate row of one set of duplicate rows of the first subset of the second set of rows having the one of the plurality of distinct polygon identifiers.

In various embodiments, identifying each of the second subset of the set pairs of rows can be based on determining, for each of the second subset of the first set of rows, whether each of the second set of rows overlaps with the each of the of the second subset of the first set of rows. Identifying each of the third subset of the set pairs of rows can be based on determining, for each of the second subset of the second set of rows, whether each of the first set of rows overlaps with the each of the of the second subset of the second set of rows.

In various embodiments, identifying the set of pairs of rows of the first set of rows and the second set of rows is based on performing a join operator. In various embodiments, the join operator is performed based on a union of three conditional statements.

In various embodiments, a first one of the three conditional statements indicates equality between identifiers of the first set of rows and the second set of rows, a second one of the three conditional statements indicates equality between identifiers of the first set of rows with the same identifier, and/or a third one of the three conditional statements indicates equality between identifiers of the second set of rows with the same identifier.

In various embodiments, the first one of the three conditional statements further indicates non-equality of identifiers of the first set of rows and the second set of rows with the same identifier. In various embodiments, the second one of the three conditional statements indicates non-equality between identifiers of the second set of rows with the same identifier. In various embodiments, the third one of the three conditional statements indicates nonequality between identifiers of the first set of rows with the same identifier.

In various embodiments, each of the three conditional statements are further based on performing an ownership function.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 28Q:
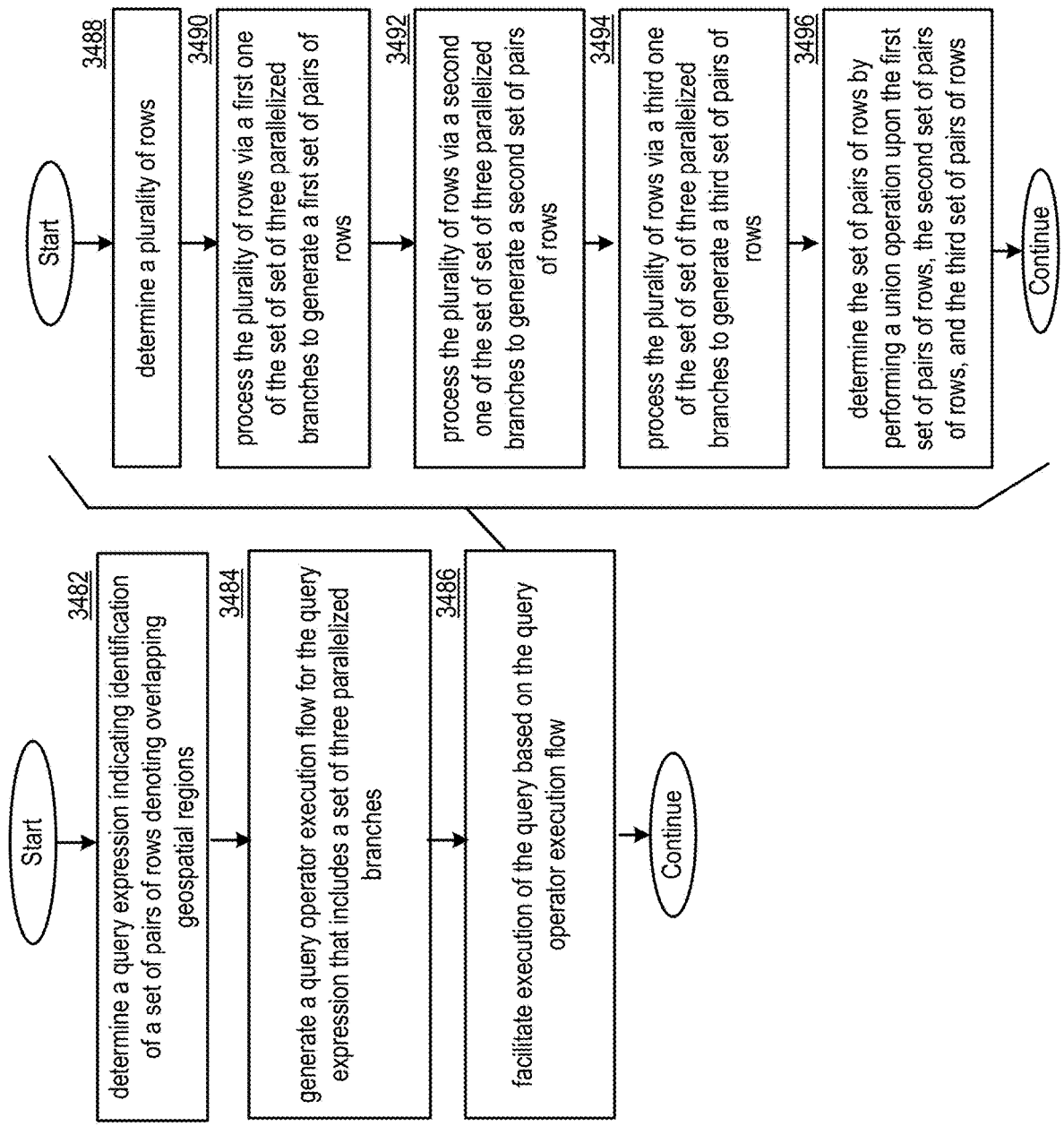
FIG. 28Q is a logic diagram illustrating a method for execution in accordance with various embodiments.

FIG. 28Q illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28Q. In particular, a node 37 can utilize the query processing module 2435 to execute some or all of the steps of FIG. 28Q, where multiple nodes 37 implement their own query processing modules 2435 to independently execute the steps of FIG. 28Q, for example, to facilitate execution of a query as participants in a query execution plan 2405. Some or all of the method of FIG. 28Q can be performed by the query processing system 2802, for example, by utilizing an execution flow generating module 2525 and/or an operator processing module 2435. Some or all of the method of FIG. 28P can be performed by the query execution module 3300 of some or all of FIGS. 28A-28O. Some or all of the method of FIG. 28Q be performed by the row pre-processing module 3310 and/or the overlapping geospatial region determination module 3315 of some or all of FIGS. 28A-28O. Some or all of the method of FIG. 28Q can be performed via communication with and/or access to a segment storage system 2508, such as memory drives 2425 of one or more nodes 37. Some or all of the steps of FIG. 28Q can optionally be performed by any other processing module of the database system 10.

Some or all of the steps of FIG. 28Q can be performed to implement some or all of the functionality of the query execution module 3300 as described in conjunction with FIGS. 28A-28O and/or of the query processing system 2802 as described in conjunction with FIGS. 28M-28O. Some or all of the steps of FIG. 28Q can be performed to implement some or all of the functionality regarding execution of a query via the plurality of nodes in the query execution plan 2405 as described in conjunction with FIGS. 24A-24E. Some or all steps of FIG. 28Q can be performed by database system 10 in accordance with other embodiments of the database system 10 and/or nodes 37 discussed herein.

Step 3482 includes determining a query expression indicating identification of a set of pairs of rows denoting overlapping geospatial regions. Step 3484 includes generating a query operator execution flow for the query expression that includes a set of three parallelized branches. Step 3486 includes facilitating execution of the query based on the query operator execution flow.

Performing step 3486 can include performing steps 3488, 3490, 3492, 3494, and/or 3496. Step 3488 includes determining a plurality of rows. Step 3490 includes processing the plurality of rows via a first one of the set of set of three parallelized branches to generate a first set of pairs of rows. Step 3492 includes processing the plurality of rows via a second one of the set of set of three parallelized branches to generate a second set of pairs of rows. Step 3494 includes processing the plurality of rows via a third one of the set of set of three parallelized branches to generate a third set of pairs of rows. Step 3496 includes determining the set of pairs of rows by performing a union operation upon the first set of pairs of rows, the second set of pairs of rows, and the third set of pairs of rows.

In various embodiments, the first set of pairs of rows, the second set of pairs of rows, and the third set of pairs of rows are mutually exclusive and/or collectively exhaustive with respect to the set of pairs of rows. For example, these sets of pairs of rows are guaranteed to be mutually exclusive based on a set of three exclusive conditions implemented via the set of set of three parallelized branches to identify these sets of pairs of rows In various embodiments, the plurality of rows includes rows of a first dataset and rows of a second dataset, and where each of the plurality of rows has an identifier value. In various embodiments, determining the plurality of rows includes: generating a set of rows based on accessing rows of the first dataset and the second data set; generating a plurality of sets of duplicates corresponding to a first subset of the set of rows that each having an identifier denoting one of a set of uniform adjacent geospatial polygons overlapping with the geospatial regions of the least some of the first set of rows and the second set of rows; denoting each of a second subset of set of rows via same identifier value that is distinct from identifiers of the uniform adjacent geospatial polygons; and/or generating the plurality of rows as the plurality of sets of duplicates and the second subset of the set of rows.

In various embodiments, the first subset of the set of rows are identified based on indicating geospatial regions each overlapping with a corresponding subset of a plurality of uniform adjacent geospatial polygons including a number of uniform adjacent geospatial polygons that does not exceed a threshold number, such as the threshold duplicate number 3309. In various embodiments, each set of duplicates of the plurality of sets of duplicates is based on the corresponding subset of a plurality of uniform adjacent geospatial polygons. In various embodiments, the second subset of the set of rows are identified based on indicating geospatial regions each overlapping with a number of uniform adjacent geospatial polygons of the plurality of uniform adjacent geospatial polygons that exceeds the threshold number.

In various embodiment, processing the plurality of rows via the first one of the set of set of three parallelized branches to generate the first set of pairs of rows includes determining pairs of rows having a first row of the first dataset and a second row of the second data set having matching identifier values that meet an identifier value condition. In various embodiments, processing the plurality of rows via the second one of the set of set of three parallelized branches to generate the second set of pairs of rows includes determining pairs of rows having rows of the first dataset with identifier values not meeting the identifier value condition.

In various embodiments, processing the plurality of rows via the third one of the set of set of three parallelized branches to generate the third set of pairs of rows includes determining pairs of rows having rows of the second dataset with identifier values not meeting the identifier value condition.

In various embodiments, the identifier value condition is non-equality with a single identifier value, such as the threshold exceeding identifier 3311. In various embodiments, the matching identifier values of the first set of pairs of rows each correspond to a set of uniform adjacent geospatial polygons.

In various embodiments, determining the set of pairs of rows further includes identifying a subset of pairs of rows outputted by the union operation having overlapping geospatial regions. For example, the subset of pairs of rows is a proper subset of an output of the union operation.

In various embodiments, the query operator execution flow is in accordance with a non-normalized form that is neither in accordance with conjunctive normal form nor disjunctive normal form.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

Figure 28R:
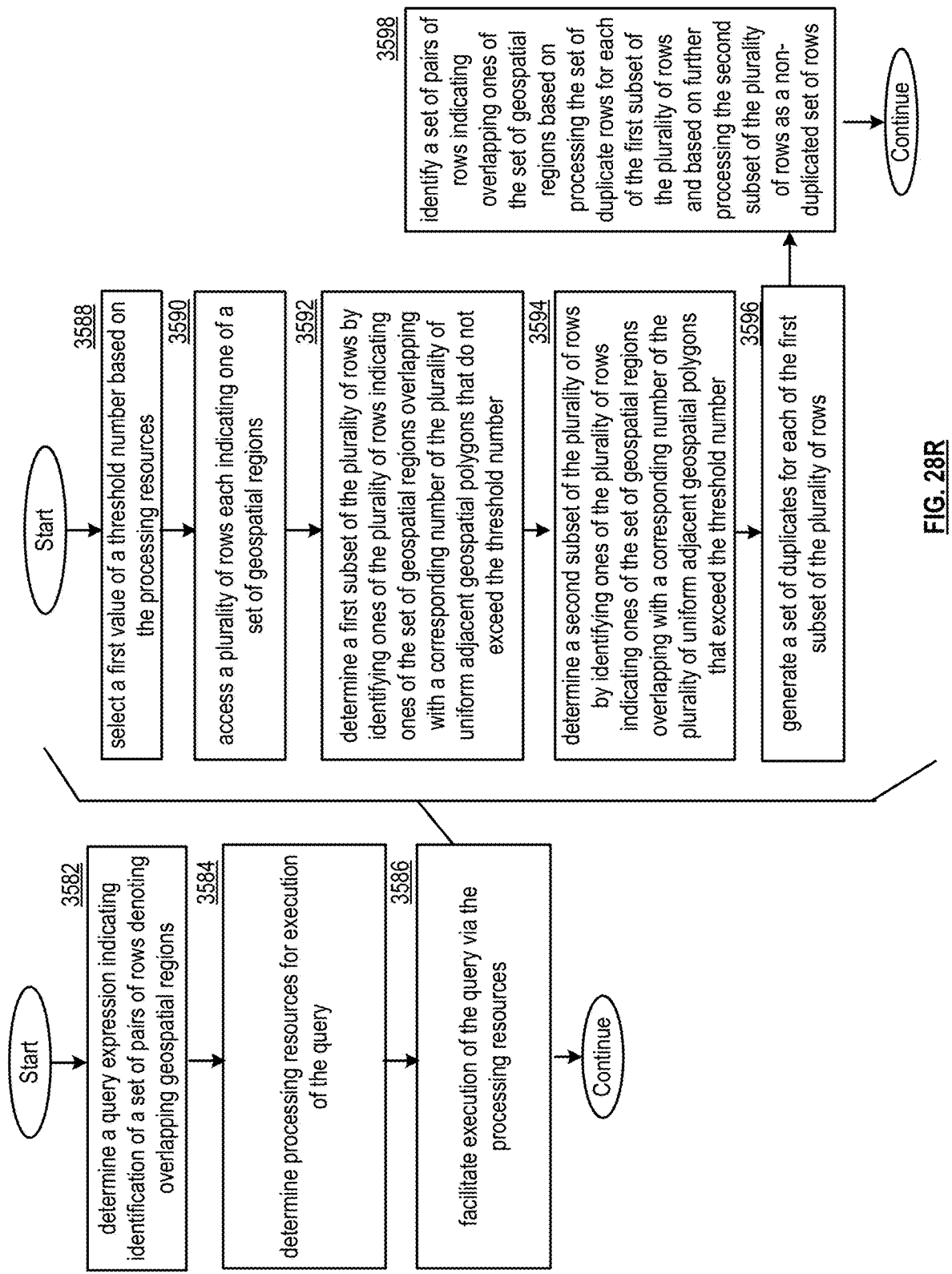
FIG. 28R is a logic diagram illustrating a method for execution in accordance with various embodiments.

FIG. 28R illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28R. In particular, a node 37 can utilize the query processing module 2435 to execute some or all of the steps of FIG. 28R, where multiple nodes 37 implement their own query processing modules 2435 to independently execute the steps of FIG. 28R, for example, to facilitate execution of a query as participants in a query execution plan 2405. Some or all of the method of FIG. 28R can be performed by the query processing system 2802, for example, by utilizing an execution flow generating module 2525 and/or an operator processing module 2435. Some or all of the method of FIG. 28R can be performed by the query execution module 3300 of some or all of FIGS. 28A-28O. Some or all of the method of FIG. 28R be performed by the row pre-processing module 3310 and/or the overlapping geospatial region determination module 3315 of some or all of FIGS. 28A-28O. Some or all of the method of FIG. 28R be performed by threshold determination module 3340 of FIGS. 28M and/or 28N. Some or all of the method of FIG. 28R can be performed via communication with and/or access to a segment storage system 2508, such as memory drives 2425 of one or more nodes 37. Some or all of the steps of FIG. 28R can optionally be performed by any other processing module of the database system 10.

Some or all of the steps of FIG. 28R can be performed to implement some or all of the functionality of the query execution module 3300 as described in conjunction with FIGS. 28A-28O and/or of the query processing system 2802 as described in conjunction with FIGS. 28M-28O. Some or all of the steps of FIG. 28R can be performed to implement some or all of the functionality regarding execution of a query via the plurality of nodes in the query execution plan 2405 as described in conjunction with FIGS. 24A-24E. Some or all steps of FIG. 28R can be performed by database system 10 in accordance with other embodiments of the database system 10 and/or nodes 37 discussed herein.

Step 3582 includes determining a query expression indicating identification of a set of pairs of rows denoting overlapping geospatial regions. Step 3584 includes determining processing resources for execution of the query. Step 3586 includes facilitating execution of the query via the processing resources.

Performing step 3586 can include performing one or more of step 3588, 3590, 3592, 3594, 3596, and/or 3598. Step 3588 includes selecting a first value of a threshold number, such as the threshold duplicate number 3309, based on the processing resources. Step 3590 includes accessing a plurality of rows each indicating one of a set of geospatial regions. Step 3592 includes determining a first subset of the plurality of rows by identifying ones of the plurality of rows indicating ones of the set of geospatial regions overlapping with a corresponding number of the plurality of uniform adjacent geospatial polygons that do not exceed the threshold number. Step 3594 includes determining a second subset of the plurality of rows by identifying ones of the plurality of rows indicating ones of the set of geospatial regions overlapping with a corresponding number of the plurality of uniform adjacent geospatial polygons that exceed the threshold number. Step 3596 includes generating a set of duplicates for each of the first subset of the plurality of rows. Step 3598 includes identifying a set of pairs of rows indicating overlapping ones of the set of geospatial regions based on processing the set of duplicate rows for each of the first subset of the plurality of rows and based on further processing the second subset of the plurality of rows as a non-duplicated set of rows.

In various embodiments, selecting the value of the threshold number based on the processing resources includes identifying a set of nodes participating in at least a portion of the query execution, and where the value of the threshold number is set as the number of nodes in the set of nodes. In various embodiments, the set of nodes participate in at least the portion of the query execution based on participating in a shuffle network in accordance with performing a join operation. In various embodiments, the set of nodes participate in at least the portion of the query execution based on different ones of the set of nodes receiving different ones of the set of duplicates of at least one of first subset of the plurality of rows, where each different one of the set of nodes identifies a corresponding subset of the set of pairs of rows that include a corresponding one of the set of duplicates.

In various embodiments, method further includes determining a second query expression indicating identification of a set of pairs of rows denoting overlapping geospatial regions, determining different processing resources for execution of the second query, and facilitating execution of the query via the processing resources by selecting a second value of the threshold number based on the different processing resources, where the second value of the threshold number is different from the first value of the threshold number based on the different processing resources being different from those of the first query. A set of pairs of rows indicating overlapping ones of the set of geospatial regions can be based on the second value of the threshold number, for example, via performance of some or all of steps 3590-3598.

In various embodiments, generating the set of duplicates for each of the first subset of the plurality of rows includes generating each duplicates corresponding to each row in the first subset of the set of rows to include an identifier denoting one of a set of uniform adjacent geospatial polygons overlapping with the geospatial region of each row. The identifier of each of the set of duplicates for each row can be different from all other identifiers of other ones of the set of duplicates for each row.

In various embodiments, the method further includes denoting each of the second subset of the set of rows via a same identifier value that is distinct from identifiers of all of the plurality of sets of duplicates.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

FIGS. 29A-29H illustrate embodiments of a database system 10 that is operable to: generate geospatial index data 3910 (e.g. indexing a geospatial data column 3904 of a relational database table storing geospatial data as values 2708); store the geospatial index data 3910 in database storage (e.g. via a structured format based on generating and writing a corresponding geospatial index file buffer 3930); and/or access the geospatial index data 3910 during query execution (e.g. via at least one index element 3862 that applies at least one geospatial data filtering predicate 3970 to generate a row identifier set 3044 indicating rows satisfying the geospatial data filtering predicate(s) 3970). Some or all features and/or functionality of database system 10 of FIGS. 29A-29H can implement any embodiment of database system 10 described herein. Some or all features and/or functionality of geospatial index data 3910 of FIGS. 29A-29H can implement any embodiment of secondary index data 2545 or other index data described herein. Some or all features and/or functionality of IO operator execution module 2840 and/or corresponding access of index data during query execution of FIGS. 29A-29H can implement any embodiment of IO operator execution module 2840 and/or corresponding access of index data during query execution described herein.

In some embodiments, geospatial index data 3910 (e.g. a geospatial secondary index) can be an on-disk structure utilized in query execution (e.g. by an IO pipeline in a same or similar fashion as discussed in conjunction with accessing other index data in facilitating query execution at the IO level) to quickly identify rows meeting query predicated based on utilizing bounding box filters. The. geospatial index data 3910 can be implemented in a same or similar fashion as inverted index structures and/or any other secondary index structures described herein, for example, by similarly enabling query performance improvements and/or similarly being stored on-disk within a segment part. However, the geospatial index data 3910 can be implemented via a different on-disk layout from other secondary index data described herein.

Like other Secondary Index structures described herein, the geospatial index data 3910 can be built on a per-segment basis. Per segment, the Geospatial Index can be implemented as a forest of tree-based index structures 3911, such as a forest of r-trees. Each tree-based index structure 3911 (e.g. each r-tree of the forest) can have a bounded maximum number of rows it can store, and if the segment has enough rows, multiple r-trees are used.

In some embodiments, the use of geospatial index data 3910 is motivated by geospatial the types of filters applied to Geospatial data in queries requested to and/or executed by the database system 10. In some embodiments, the most useful geospatial filters are usually some kind of Intersects (e.g. BB_Intersects( ); ST_Intersects( ) and/or other function enabling same or similar filtering functionality) or Contains operation(e.g. BB_Contains( ); ST_Contains( ) and/or other function enabling same or similar filtering functionality). As a particular example, consider a query having a clause "SELECT*WHERE col_car_trip is within illinois_polygon", where col_car_trip indicates geospatial data indicating one or more locations and/or a corresponding route of a car trip, for each row, where Illinois_polygon corresponds to a geospatial object and/or other structure denoting the bounds of the state of Illinois and/or denoting a polygon bounding the state of Illinois; and/or where "is within" implements a Contained function implemented to filter rows based on returning only rows having col_car_trip contained entirely within Illinois_polygon. In some embodiments, geospatial objects can have many decimal points of resolution (e.g. internally stored as doubles), so comparing exact geospatial objects is unideal in some embodiments. An inverted index can only be used for exact matches (and ranges of matches, to some degree). The geospatial index data 3910 can be preferred in this case.

In some embodiments, the use of geospatial index data 3910 is motivated by geospatial types being of variable length. For example, other than points, which are of a fixed size, linestrings and polygons must be transformed into a fixed size representation if they are to be stored in any index. The Inverted Index can accomplish this by means of hashing, but this only allows for equality filters, which are of limited value. The geospatial index data 3910 instead utilizes minimum Bounding Boxes 3922. A bounding box can be implemented as 4 coordinates [latitudeMin, latitudeMax, longitudeMin, longitudeMax] that minimally bound the given Geospatial shape. Bounding box operations to check for contains, contained (e.g. is within) and intersection can be very easy to write & very easy computationally. It can also be computationally simple to compute the "bounding-bounding box" (e.g., the bounding box of two or more bounding boxes), which can be leveraged in construction of geospatial index data 3910 as described in further detail herein.

Figure 29A:
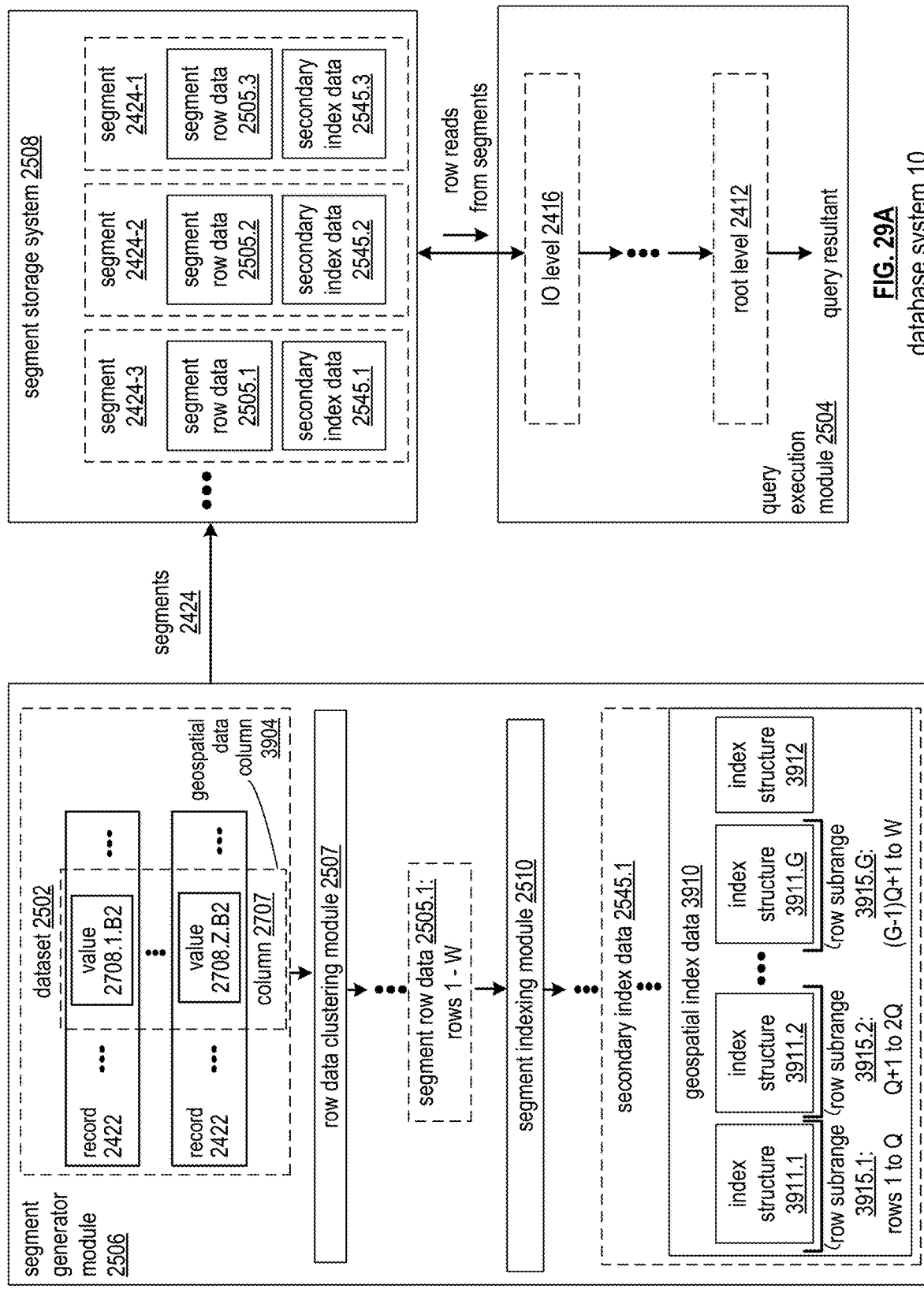
FIG. 29A is a schematic block diagram of a database system that implements a segment indexing module to generate geospatial index data for inclusion in segments for access during query execution via a query execution module in accordance with various embodiments.

FIG. 29A is a schematic block diagram of a database system 10 that implements a segment indexing module 2510 to generate geospatial index data 3910 for inclusion in segments for access during query execution via a query execution module 2504. The segment indexing module 2510 can generate geospatial index data 3910 for some or all segments as some or all of the secondary index data 2545 for each segment, for example, to implement secondary index data for a corresponding column 2707 of records 2422 being stored in these segments that is implemented as a geospatial data column 3904, where corresponding values 2708 indicate geospatial data. The segment indexing module 2510 of FIG. 29A and/or the corresponding secondary index data 2545 of FIG. 29 that includes geospatial index data 3910 can implement any embodiment of segment indexing module 2510 and/or secondary index data 2545, respectfully, described herein.

The geospatial data indicated by a value 2708 of a given record 2422 (i.e. row) can include one or more geospatial objects. As used herein geospatial object can correspond to a non-empty Point, Linestring, or Polygon. A geospatial object can correspond to a non-empty Geospatial Information System (GIS) data type and/or any other non-empty geospatial data type. Geospatial objects can be guaranteed to always have corresponding bounding boxes.

The geospatial data indicated by a value 2708 of a given record 2422 can alternatively or additionally include one or more geospatial special values. As used herein. a geospatial special value can be any special values that can appear in a Point, Linestring, or Polygon column, corresponding to the case where the object is not non-empty, and/or otherwise cannot be defined via a bounding box. This can include some or all of the same special values discussed in conjunction with FIGS. 27A-27L (e.g. NULL, ANY_ARRAY_ELEMENT_NULL, EMPTY_ARRAY), and optionally an addition special value corresponding to the case where a corresponding geospatial object is empty (e.g. EMPTY_GEOGRAPHY). This case where a corresponding geospatial object is empty can have a corresponding missing data-based indexing condition 3837 as discussed in conjunction with FIGS. 27A-27L.

In some embodiments, the column 2707 implemented as geospatial data column 3904 is a scalar column, where each value 2708 includes a single geospatial object (or single corresponding geospatial special value). In some embodiments, the column 2707 implemented as geospatial data column 3904 is an array column, where each value 2708 includes one or more multiple geospatial objects (or at least one corresponding geospatial special value) in a fixed or variable number of corresponding entries. An array column implementing geospatial data column 3904 can be implemented via some or all embodiments of array field 2712, where the value 2708 is an array structure 2718 having geospatial objects or geospatial special values as its array elements 2709. In some embodiments, the column 2707 implemented as geospatial data column 3904 is a tuple column, where values 2708 each include various different types in a known structuring, and where one of the corresponding types is a geospatial object.

In some embodiments, a given set of records 2422 of a corresponding dataset has one such geospatial data column 3904 (e.g. one corresponding scalar column, one corresponding array column, or one corresponding tuple column). In some embodiments, a given set of records 2422 of a corresponding dataset has multiple such geospatial data columns 3904 (e.g. one or more corresponding scalar columns, one or more corresponding array columns, one or more corresponding tuple columns; and/or some combination of scalar, array, and/or tuple columns).

The geospatial index data 3911 for each given segment 2424 can include a set of one or more index structures 3911.1-3911.R. Index structures 3911 can be implemented to index strictly geospatial objects of column 3904, and not geospatial special values. Each index structures 3911 can index rows having row number (e.g. row numbers local to the corresponding segment 2424) falling within a corresponding row subrange 3915 and containing corresponding geospatial objects. Some or all of the set of index structures 3911.1-3911.G can have row subranges 3915 of same or different sizes. In this example, each subrange corresponds to Q rows (e.g. optionally except for the final subrange 3515.G, for example, if the number of rows in the segment is not a multiple of Q, where the remaining rows are included in the final subrange final subrange 3515.G).

The geospatial index data 3910 for each given segment 2424 can further include an additional index structure 3912, which can be implemented via a different index type/different structuring from index structures 3911. Additional index structure 3912 can be implemented to index strictly geospatial special values of column 3904, and not geospatial objects. For example, the index structures 3911 are implemented as r-trees or other tree-based index structures that index geospatial objects, where column 2707 stores geospatial objects. Meanwhile, the additional index structure 3912 can be implemented as an inverted index indexing geospatial special values, and can be implemented in a same or similar fashion as missing data-based indexing data 3824 as discussed in conjunction with FIGS. 27A-27L.

In some embodiments, splitting up a segment 2424 into a series of tree-based index structures 3911.1-3911.G (e.g. a series of r-trees) can allow allows a partial index traversal to emit rows. This can provide a lot of improvements to the technology of database systems by presenting advantages including: minimizing time-to-first-row; setting an upper bound on disk IO & in-memory data necessary to emit a row, guaranteeing that, at worst, on each pull from the index, only an entire single tree-based index structure (e.g. single r-tree) is traversed; and/or allowing the index to be traversed in a sliding-window fashion (e.g. in a same or similar fashion as IO pipeline elements are traversed), emitting a subset of ordered rows on each window pull; and/or allowing the geospatial index data 3910 to handle inefficient filters and datasets (generally either non-selective filters, or datasets that doesn't pack well into an r-tree) without delaying time-to-first-row or consuming too much memory.

Figure 29B:
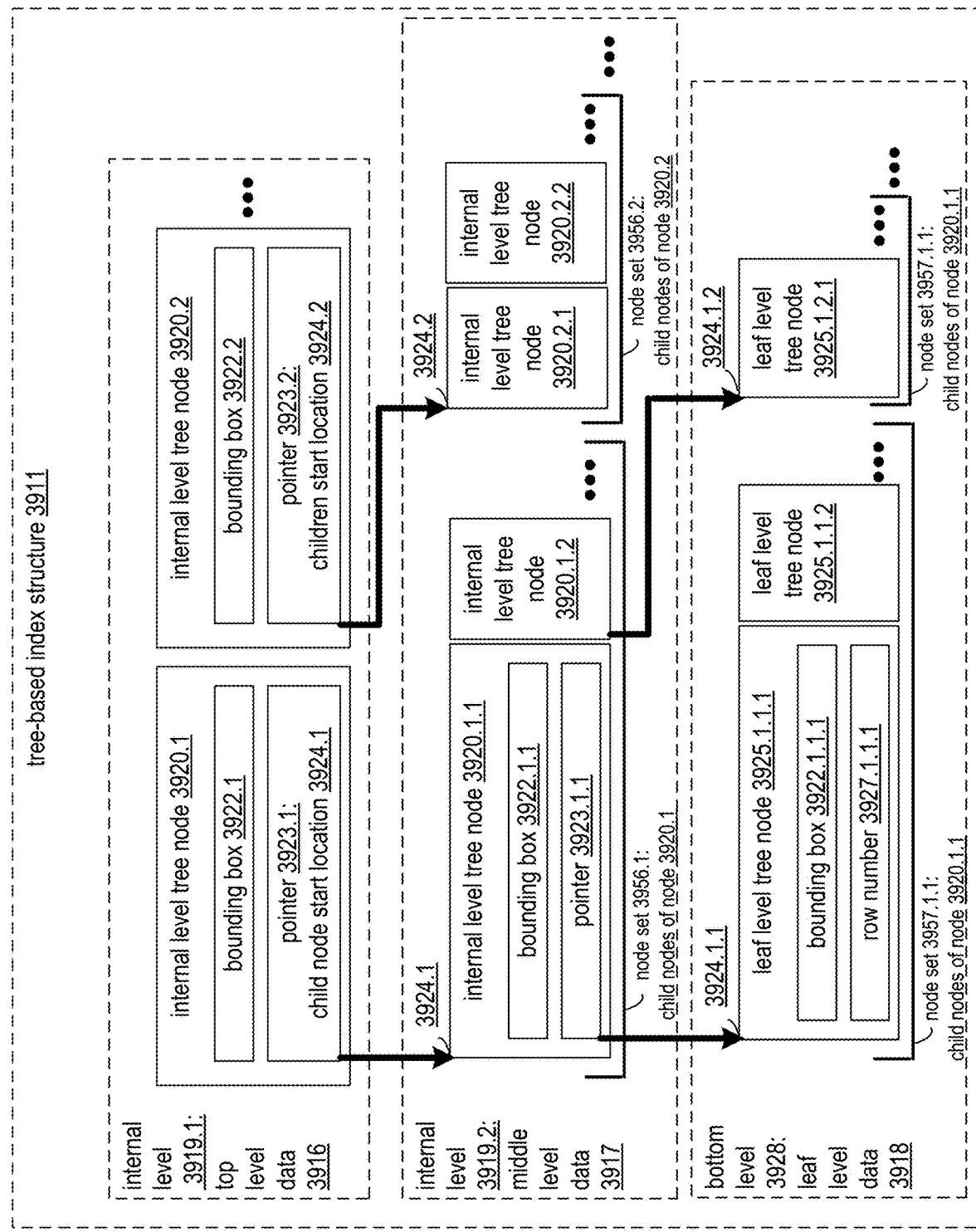
FIG. 29B illustrates structuring of a tree-based index structure of geospatial index data in accordance with various embodiments.

FIG. 29B illustrates structuring of a given tree-based index structure 3911 of geospatial index data 3910. Some or all features and/or functionality of the tree-based index structure 3911 can implement some or all index structures 3911 of FIG. 29A and/or any embodiment of geospatial index data 3910 and/or secondary index data 2545 described herein.

The tree-based index structure 3911 can include a plurality of levels, which can include at least: a first internal level 3919.1 having top level data 3916; a second internal level 3919.2 having middle level data 3917; and/or a bottom level 3928 having leaf level data 3918. For example, as illustrated in FIG. 29B, the tree-based index structure 3911 includes exactly three levels. In other embodiments, the tree-based index structure 3911 includes more than three levels based on including additional internal levels 3919.

Internal levels 3919 can each have a plurality of internal level tree nodes 3920 each having a corresponding bounding box 3922 and/or a corresponding pointer 3923. The bounding box 3922 of a given internal level tree node 3920 can correspond to the minimum bounding box that includes all child tree node bounding boxes for all child nodes of the given internal level tree node 3920 (e.g. smallest rectangle that bounds all rectangles of the child nodes' bounding boxes), where the pointer indicates a of the corresponding child nodes of the given internal level tree node 3920. This set of child nodes can constitute a node set that includes a plurality of nodes: the child nodes of a given internal level tree node 3920 at the internal level 3919.1 can constitute in a corresponding node set 3956 at the internal level 3919.2; and/or the child nodes of a given internal level tree node 3920 at the internal level 3919.2 can constitute in a corresponding node set 3957 at the bottom level 3928. The number of child nodes of a given internal level tree node 3920 can be set as and/or have a threshold maximum number of nodes set by a branching factor for the corresponding internal level 3919, which can be the same or different for different internal levels 3919. Location 3924 can correspond to an on-disk location, such as a starting location for the respective node set 3956 denoting all nodes in the node set.

The bottom level 3928 can have a plurality of leaf level tree nodes 3925 each having a corresponding bounding box 3922 and/or a corresponding row number 3927. The bounding box 3922 of a given leaf level tree node 3925 can correspond to the minimum bounding box that includes the corresponding geospatial object (e.g. smallest rectangle that bounds the corresponding geospatial object which is not necessarily a rectangle) of the given internal level tree node 3920, where the row number 3927 indicates the corresponding row having this geospatial object (e.g. set as and/or included in the value 2708 of the corresponding column 2707).

Each bounding box 3922 can be defined via latitude and/or longitude coordinates, and/or can be defined via a corresponding corner along with a length and a height (e.g. in terms of latitude and/or longitude measurements, respectively). Each bounding box 3922 can be defined in terms of other rectangular geospatial coordinates (e.g. "rectangular" despite corresponding to a region upon the surface of the non-flat Earth). Bounding box 3922 can implement some or all features and/or functionality of geospatial region bounding polygon 3317, where a geospatial object can implement some or all features and/or functionality of a corresponding geospatial region 3306.

Note that the tree nodes 3920 and 3925 are tree nodes of the corresponding tree-based index structure 3911, and are different from nodes 37 described herein that are nodes of a computing device 18. In particular, a given node 37 can store a given segment 2424 in one or more memory drives 2425, where this given segment 2424 includes secondary index data 2545 that includes geospatial index data 3910 that includes at least one index structure 3911, structured as a tree-based index structure having a plurality of internal level tree nodes 3920 in one or more internal levels 3919 as well as having a plurality of leaf level tree nodes 3925 in a bottom level 3928.

As a particular example of implementing the tree nodes of the index structure 3911, each given tree node of the tree-based index structure is implemented via 36 bytes, where the bounding box 3920 of the given tree node is depicted via 32 bytes of the 36 bytes. In such embodiments, the remaining 4 bytes of the 36 bytes can be utilized for the pointer 3923 in the case of an internal node 3920, and/or the remaining 4 bytes of the 36 bytes can be utilized for the row number 3927 in the case of a leaf node 3925.

In some embodiments, each tree-based index structure 3911 spans a maximum number of geospatial objects. As a particular example, each tree-based index structure 3911 spans at, most, $2^{20}$ (i.e. roughly one million) geospatial objects. Other maximum numbers of geospatial objects can be implemented in other embodiments. The maximum number of geospatial objects can invoke a corresponding maximum number of rows indexed via each tree-based index structure 3911, where the maximum number of geospatial objects corresponds to the maximum number of rows indexed. In the case where the maximum number of geospatial objects in each tree-based index structure 3911 is $2^{20}$, a given tree-based index structure 3911 can thus index, at most, at most $2^{20}$ rows. In the examples, described herein, the maximum number of geospatial objects for each tree-based index structure 3911 is implemented as $2^{20}$.

In some embodiments, within each given tree-based index structure 3911 (e.g. each given r-tree), a row number may not be unique (e.g. this is often the case for an array column). In some embodiments, the set of tree-based index structures 3911.1-2911.G are ordered in consecutive row order relative to the segment they are built from, for example, dictated by corresponding row bounds (e.g. row subranges 3915). For example, in the case of geospatial data column 3904 being a scalar column, tree-based index structure 3911.1 has row bounds [0, $2^{20}$), tree-based index structure 3911.2 has row bounds [$2^{20}$, $2*2^{20}$), etc., in the case where the maximum number of geospatial objects per tree-based index structures 3911 is $2^{20}$. Alternatively or in addition, in the case of geospatial data column 3904 being an array column, for example, where each array structure 2712 includes 1024 geospatial objects, tree-based index structure 3911.1 has row bounds [0, 1024), tree-based index structure 3911.2 has row bounds [1024, 2048), etc., in the case where the maximum number of geospatial objects per tree-based index structures 3911 is $2^{20}$. Note that in these different cases for a scalar vs. array column, the same number of geospatial objects ($2*2^{20}$) are indexed across tree-based index structure 3911.1 and tree-based index structure 3911.2, despite these two index structures indexing different numbers of rows ($2*2^{20}$ rows in the scalar column case vs. 2048 rows in the example array column case with 1024 geospatial objects per array structure).

In some embodiments, the $2^{20}$ row bound is equivalent to 128*1024*8, or 128 KiB*8=1048576 bits, 1 bit per row, where 128 KiB is implemented as a Hugepage fragment. Representing all rows in an efficient in-memory bitmap can be an important optimization used during index traversal, as discussed in conjunction with FIGS. 30A-30B.

In some embodiments, no row ordering is maintained within a single tree-based index structure 3911 (e.g. a single r-tree). The leaf level nodes 3025 can be sorted by their bounding boxes (E.g. their bounding boxes' Hilbert values), which has no regard for row ordering.

In some embodiments, a given tree-based index structure 3911 is configured to include $2^{20}$ geospatial objects based on being configured to include $2^{20}$ tree nodes. For example, each level uses a branching factor of 256 (e.g. each internal node has up to 256 child nodes in its child set), and/or the top level data 3916 has at most 16 nodes, rendering $2^{20}$ tree nodes total: (L1 Nodes=16)*(L1 Branching Factor=256) a (L2 Branching Factor=256)=1048576 L3 nodes=$2^{20}$, where L1 corresponds to the top level; L2 corresponds to the middle level; and L3 corresponds to the bottom level.

In some embodiments, the bottom level (L3) contains bounding boxes of geospatial objects, and their corresponding row numbers as discussed previously. Duplicate bounding boxes can be expected to be rare, so each leaf node can be configured to store a single row number, rather than a list of rows (e.g. unlike other embodiments of secondary index structures such as embodiments of the inverted secondary index). The upper two levels can be configured to contain spanning bounding boxes 3920 over the bounding boxes of their children ("bounding-bounding boxes"), as well as 4-byte pointers to their child nodes as discussed previously. A singular root node ("L0") for each r-tree in the forest is optionally unnecessary. Metadata for the set of tree-based index structures 3911.1-3911.G (e.g. the r-tree forest's metadata) can be configured to include information sufficient to parse each L1 layer.

As depicted in FIG. 29B, numbering utilized herein branches in a tree-based structuring: a given node 3920.1 at internal level 3919.1 has a plurality of child nodes in internal level 3919.2 including nodes 3920.1.1, 3920.1.2, 3920.1.3, and so on; a given node 3920.2 at internal level 3919.1 has a plurality of child nodes in internal level 2919.2 including nodes 3920.2.1, 3920.2.2, 3920.2.3, and so on; etc. Similarly, a given node 3920.1.1 at internal level 3919.2 has a plurality of child nodes in bottom level 3928 including nodes 3920.1.1.1, 3920.1.1.2, 3920.1.1.3, and so on; a given node 3920.1.2 at internal level 3919.2 has a plurality of child nodes in bottom level 3928 including nodes 3920.1.2.1, 3920.1.2.2, 3920.1.2.3, and so on; etc.

Figure 29C:
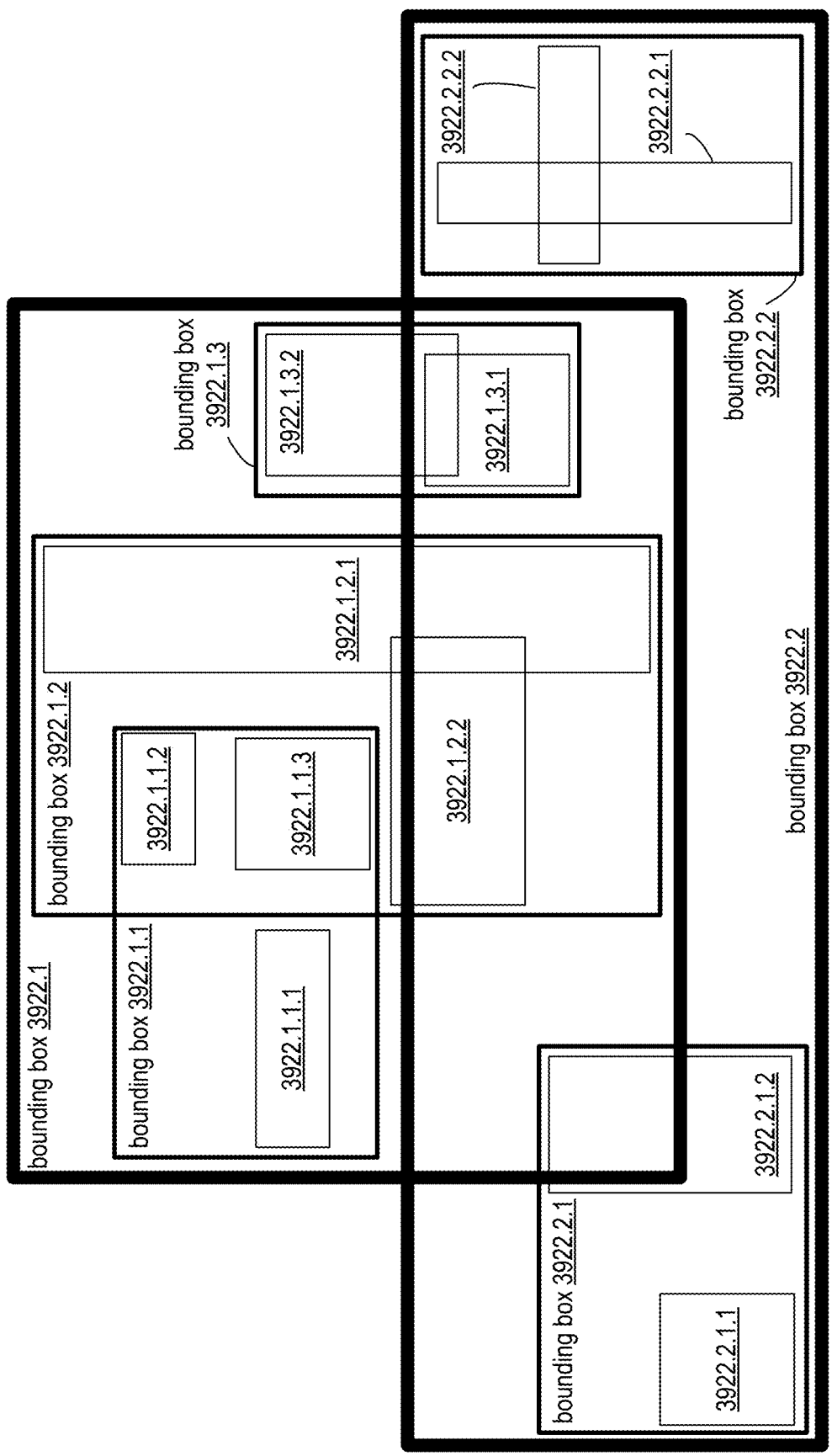
FIG. 29C is a spatial representation of example bounding boxes to illustrate the relationship between bounding boxes of various nodes at various levels of a tree-based index structure of geospatial index data in accordance with various embodiments.

FIG. 29C presents a spatial representation of example bounding boxes to illustrate the relationship between bounding boxes of various nodes at various levels of a tree-based index structure 3911 of geospatial index data 3910. Some or all features of the relationship between bounding boxes 3922 of FIG. 29C can implement the bounding boxes 3922 of FIG. 29B and/or any embodiment of bounding boxes 3922 of tree structures described herein.

The numbering presented as branches in accordance with the tree-based structuring as described above is utilized in FIG. 29C to illustrate the bounding boxes of nodes having corresponding parents/children. For example, bounding box 3922.1 corresponds to the bounding box 3922 of internal level tree node 3920.1 of FIG. 29B; bounding boxes 3922.1.1 and 3922.1.2 correspond to the bounding boxes 3922 of internal level tree nodes 3920.1.1. and 3920.1.2 that are child nodes of internal level tree node 3920.1; bounding boxes 3922.1.1.1 and 3922.1.1.2 correspond to the bounding boxes 3922 of leaf level tree nodes 3920.1.1.1 and 3920.1.1.2 that are child nodes of internal level tree node 3920.1.1; etc.

The relationship between the bounding boxes, where a given internal level bounding box 3922 of a given internal level node 3920 is implemented as a minimum bounding box bounding the bounding boxes 3922 of all child nodes in the child node set of this given internal level node 3920, can be utilized to implement corresponding lookup functionality of the corresponding index structure to render identification of rows (e.g. a superset of rows guaranteed to include all required rows) meeting particular query predicates against the geospatial data column 3904 (e.g. predicates for filtering based on whether rows have geospatial objects that: are included in within a given geospatial region having a given corresponding bounding box (e.g. "Contained" or "within" as described herein); include a given geospatial region having a given corresponding bounding box (e.g. "Contains" as described herein); intersects/overlaps with a given geospatial region having a given corresponding bounding box (e.g. "Intersects" as described herein); or is equivalent with/equal to with a given geospatial region having a given corresponding bounding box (e.g. "Equals" as described herein). Note that in cases where the actual query predicates and actual geospatial objects denote geospatial regions that are not necessarily rectangular, further filtering may be required by applying the corresponding functions to the actual values. However, as a large proportion of rows are filtered prior to this point by whether their bounding box meets these requirements the use of corresponding geospatial index data 3910 can greatly improve query performance for processing queries having such filtering predicates.

In some embodiments the lookup structure for the Geospatial index can be implemented as a variant of the R-tree, such as via some or all features and/or functionality of the packed Hilbert R-tree. In general, r-tree structuring utilized to implement each index structure 3911 of geospatial index data 3910 can function much like a b-tree, where improved lookup performance is rendered by only having to traverse a subsection of the tree, because inner nodes in the tree provide information about how to narrow down the search. Each leaf node 3925 in index structure 3911 can indicate a bounding box 3922 of a corresponding geospatial object of a corresponding row, and can indicate a row number of the corresponding row. Internal nodes 3920 can be constructed with a bounding box 3922 of all their children's bounding boxes (e.g. bounding-bounding box of children) and/or a pointer 3923 to their children.

In some embodiments, to traverse a given tree-based index structure 3911 (e.g. a given r-tree of the forest), the leaf-node bounding box filter is applied (e.g. "BB_INTERSECTS A", or "BB_EQUALS B", where "BB" optionally denotes the corresponding functions are applied to Bounding Boxes rather than an underlying geospatial object). In some embodiments, an inner node bounding box filter can also be generated, for example, because the leaf node filter does not necessarily traverse the tree in the correct way. The most obvious example is with BB_EQUALS. Imagine there is one leaf-node X that matches BB_EQUALS B. The inner nodes that contain leaf-node X would have larger bounding boxes, and not match BB_EQUALS B, resulting in a failed lookup. So a bb_contains filter is used on the inner nodes, while the bb_equals filter is used on the leaf nodes. In general, bb_intersection is used for the inner node filter, but can be optimized further to bb_contains (like in the bb_equals case). Selecting and applying inner predicates applied to internal nodes vs. leaf predicates applied to leaf nodes is discussed in further detail herein.

In some embodiments, the key to having efficient lookups is to have a well-packed r-tree. In some cases, children of inner nodes can be picked that have a poor packing, such that the inner node's bounding box would effectively cover all children. The ideal packing is one where inner-node bounding boxes (for a given inner node level) have as little overlap as possible. Such that when a filter is applied, as few r-tree branches are traversed as possible. If all inner-node bounding boxes were the same, then no subset of r-tree branches could be taken. Such packing can render more efficient packing than the simple illustrative example of FIG. 29C.

In some embodiments, bounding boxes are sorted by spatial locality, with the design that when an r-tree is built on top of the sorted values, good packing will result. In some embodiments, this is based on building an r-tree is accomplished from the bottom-up, for example, based Hilbert values generated for bounding boxes at the leaf level. In some embodiments, the Hilbert r-tree packing method is used to render this functionality. Embodiments of building a forest of tree-based index structures 3911.1-3911.G are discussed in further detail herein.

Figure 29D:
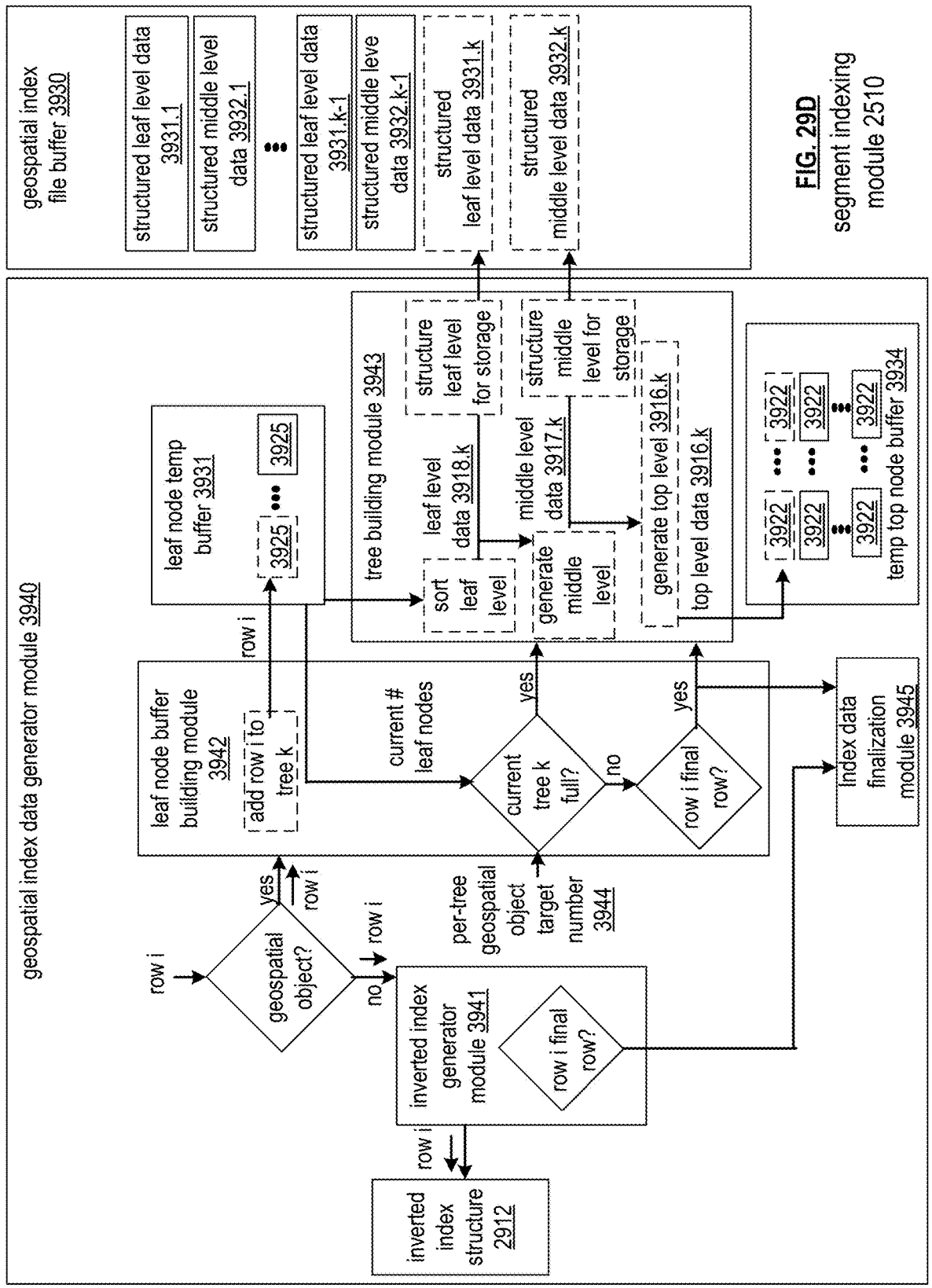
FIGS. 29D and 29E are schematic block diagrams of a geospatial index data generator module that writes to a file buffer to structure geospatial index data for storage in accordance with various embodiments.
Figure 29E:
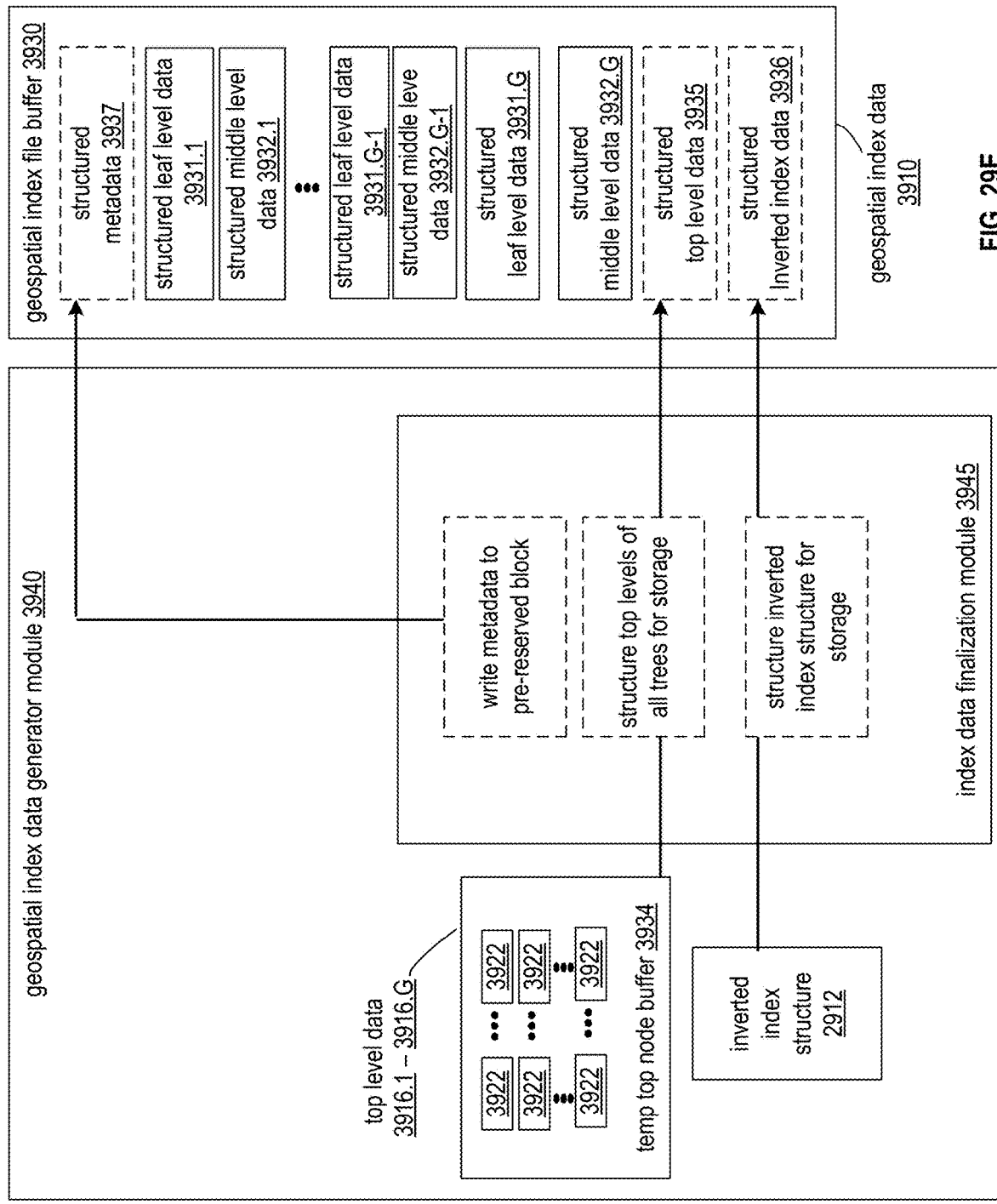

FIGS. 29D and 29E are schematic block diagrams of a geospatial index data generator module 3940 that writes to a geospatial index file buffer 3930 to structure geospatial index data 3910 for storage.

In some embodiments, the geospatial index data 3910 is built iteratively in a manner that bounds the maximum amount of in-memory data. For example, the geospatial index data 3910 is built, for example, via geospatial index data generator module 3940 as illustrated in FIG. 29D. This can be based on implementing some or all of the following logic, where, for all rows in the segment (e.g. rows are sorted in ascending order, starting from 0), and for all geospatial objects & geospatial special values in each row (e.g. only 1 for scalar columns, many for array columns):

If the given value within the given row (e.g. given row i) is a geospatial special value, the row can be added to the inverted index structure 3912 (e.g. the row is added to a row list mapped to the respective type of geospatial special value in the inverted index structure). The inverted index structure 3912 can be built in an ongoing fashion as further incoming rows are processed.

If the given value within the given row (e.g. given row i) is a geospatial object, the geospatial object is processed, for example, via a leaf node buffer building module 3942, to add a new leaf node 3025 (e.g. having a corresponding bounding box 3922 for the geospatial object and row number 3927) to a leaf node temporary buffer 3131. If a target number of geospatial objects are included in the buffer 3931 (e.g. the buffer 3131 includes a per-tree geospatial object target number 3944 of nodes 3925), a new tree is built via a tree-building module 3943. Otherwise, the buffer continues to increase as new nodes for new geospatial objects are added.

The tree building module 3943 can be implemented to build a new tree from leaf node temporary buffer 3931 (e.g. a new tree k, where k-1 trees were previously built). In some embodiments, each tree-based index structure 3911 is packed bottom-up, maintaining fixed sizes for the number of leaf nodes in one tree and the number of children in each node. Each range of $2^{20}$ geospatial objects can be packed into a full tree when possible.

Building the new tree from leaf node temporary buffer 3931 can include sorting the nodes 3925 in the leaf node temporary buffer 3931, for example, by Hilbert Value of their respective bounding boxes, to render leaf level data 3918.k. The resulting leaf level data 3918.k can be structured for storage as structure leaf level data 3931.k.

Accomplishing this structuring can include segregating the sorted nodes of the buffer as respective node sets 3957 corresponding to groups of child nodes for middle level nodes that will be built. This can include iterating over the now-sorted nodes in the buffer 3931 ("L3 buffer"), where, for each set of L3 nodes that includes L2 branching factor number (e.g. 256) nodes, the corresponding bounding box 3922 (e.g. the Bounding-Bounding Box from the bounding boxes of this set of nodes) is calculated. Each resulting node set 3957 can be compressed and/or written into the file buffer 3930 as a corresponding portion of the structured leaf level data 3931.k (e.g. as a corresponding compression frame within structured leaf level data 3931.k indicating the node set 3957), and a corresponding offset pointer can be recorded. The output can be placed into an L2 temporary buffer, for example, where the L2 temporary buffer thus includes a set of middle nodes each indicating the corresponding computed bounding box 3922 and the corresponding offset pointer 3923 to the compression frame of a corresponding node set 3957.

This process of structuring the leaf level data 3918.k can thus include the first portion of generating middle level data 3917.k for the new tree. Accomplishing this structuring can similarly include segregating the nodes of the L2 buffer as respective node sets 3956 corresponding to groups of child nodes for top level nodes that will be built. The tree building module 3943 can complete generation of the middle level data 3917.k based on iterating over the L2 buffer. The L2 buffer is optionally sorted by Hilbert Value, or, as the bounding boxes correspond to bounding-bounding boxes of bounding boxes of leaf level nodes that were already sorted, are optionally not sorted. In iterating over the L2 buffer, for each set of L2 nodes that includes L1 branching factor number (e.g. 256) nodes, the bounding box 3922 (e.g. the Bounding-Bounding Box from the bounding boxes of this set of nodes) is calculated. Each resulting node set 3956 can be compressed and/or written into the file buffer as a corresponding portion of the structured middle level data 3932.k (e.g. as a corresponding compression frame within structured leaf level data 3932.k indicating the node set 3956), and a corresponding offset pointer can be recorded. The output can be placed into a temporary top node buffer 3934 ("L1 temporary buffer"), for example, where the L1 temporary buffer thus includes a set of top nodes each indicating the corresponding computed bounding box 3922 and the corresponding offset pointer 3923 to a compression frame of the corresponding node set 3956 for the new tree, as well as top nodes for all previously built trees. In some embodiments, for the last L2 node in a given compression frame (a group of L1 Branching Factor number of L2 Nodes), it can be necessary to bookkeep how many blocks the data pointed by its pointer spans. For example, Usually the block span is calculated by comparing corresponding pointers (e.g. l2Node2.ptr-l2Node1.ptr), but this can be impossible with the last L2 node in a compression frame. Looking ahead to either the next L2 compression frame is possible, but can requires additional decompression, so instead a special entry (e.g. lastL2EntryBlockCount) can be utilized.

The process of building the geospatial index file buffer 3930 via this iterative process can continue as further rows of the segment are similarly processed. Once the final row (e.g. the final value within the final row) is processed, either via the inverted index generated module 3941 or the leaf node buffer building module 3942, the index data can be finalized via an index data finalization module 3945.

If any nodes remain in the L3 Buffer, another Tree can be built via the same procedure (e.g. despite not being full), for example, as illustrated in FIG. 29D.

In some embodiments, if there are remainder rows (e.g. numRows % $2^{20}$!=0 in the scalar column case, or totalNumGeospatialObjects % $2^{20}$!=0 in the array column case), the remaining rows can be packed into a tree that has fewer nodes at each level, but the same number of levels. The same branching factor can be used where possible.

For example, if there are $(2^{20})+257$ rows in a scalar column, 1 full r-tree will be built, with 16 L1 nodes, 4096 L2 nodes, and $2^{20}$ L3 nodes. The next r-tree will contain 1 L1 node, 2 L2 nodes, and 257 L3 nodes. In some embodiments, a scalar column that contains less than $2^{20}$ total rows will have a single r-tree. An array column that contains less than $2^{20}$ total geospatial objects will have a single r-tree.

In some embodiments, arrays are packed into r-trees such that r-tree row bounds are always increasing, with no overlap. For array columns, this means r-trees can have less than $2^{20}$ indexed geospatial objects, even if there are more than $2^{20}$ geospatial objects to index. For example, suppose the geospatial index data is built on an array column. $(2^{20})-1$ geospatial objects are added to r-tree 0, with row bounds [0, X). Next, geospatial objects are added from row X. The row's array contains 10 geospatial objects. Instead of adding 1 of the geospatial objects to the existing r-tree, all of the geospatial objects are added to a new r-tree. The result is r-tree 0 with row bounds [0, X) and $(2^{20})-1$ indexed objects, and r-tree 1 with row bounds [X, X+1) with 10 indexed objects.

In some embodiments, a Geospatial Index on an array column can enforce an implicit maximum array size of $2^{20}$. An array larger than this optionally cannot be indexed.

FIG. 29E illustrates an example of implementing the index data finalization module 3945. In addition to building a final tree with any remainder rows, an entire temp top node buffer 3934 including all top level data 3916.1-3916.G can be structured for storage (e.g. compressed in its entirety) as structured top level data 3935 written to the file buffer 3930. The inverted index structure 2912 can be structured for storage as structured inverted index data 3936 written to the file buffer 3930. Metadata can be generated and written to the file buffer 3930 as structured metadata 3937 written to a pre-reserved block at the beginning of the file buffer 3930.

In some embodiments, the structured metadata 3937 describes some or all of: the branching factors (e.g. they are adjustable); the location of structure top level data 3935;

and/or Inverted Secondary Index configuration metadata. In some embodiments, the structured metadata 3937 further describes, per tree-based index structure 3911 (e.g. Per tree in forest): number of nodes in the top level (Number of L1 nodes); number of nodes in the leaf level (Number of L3 nodes); row bound start and end (e.g. row subrange 3915); location of structured leaf level data 3931 (L3) on disk; and/or location of structured middle level data 3932 (L2) on disk.

The resulting file buffer can be written to disk for access during query execution (e.g. written to disk memory resources in conjunction with storing the segment 2424 in disk memory resources).

Figure 29F:
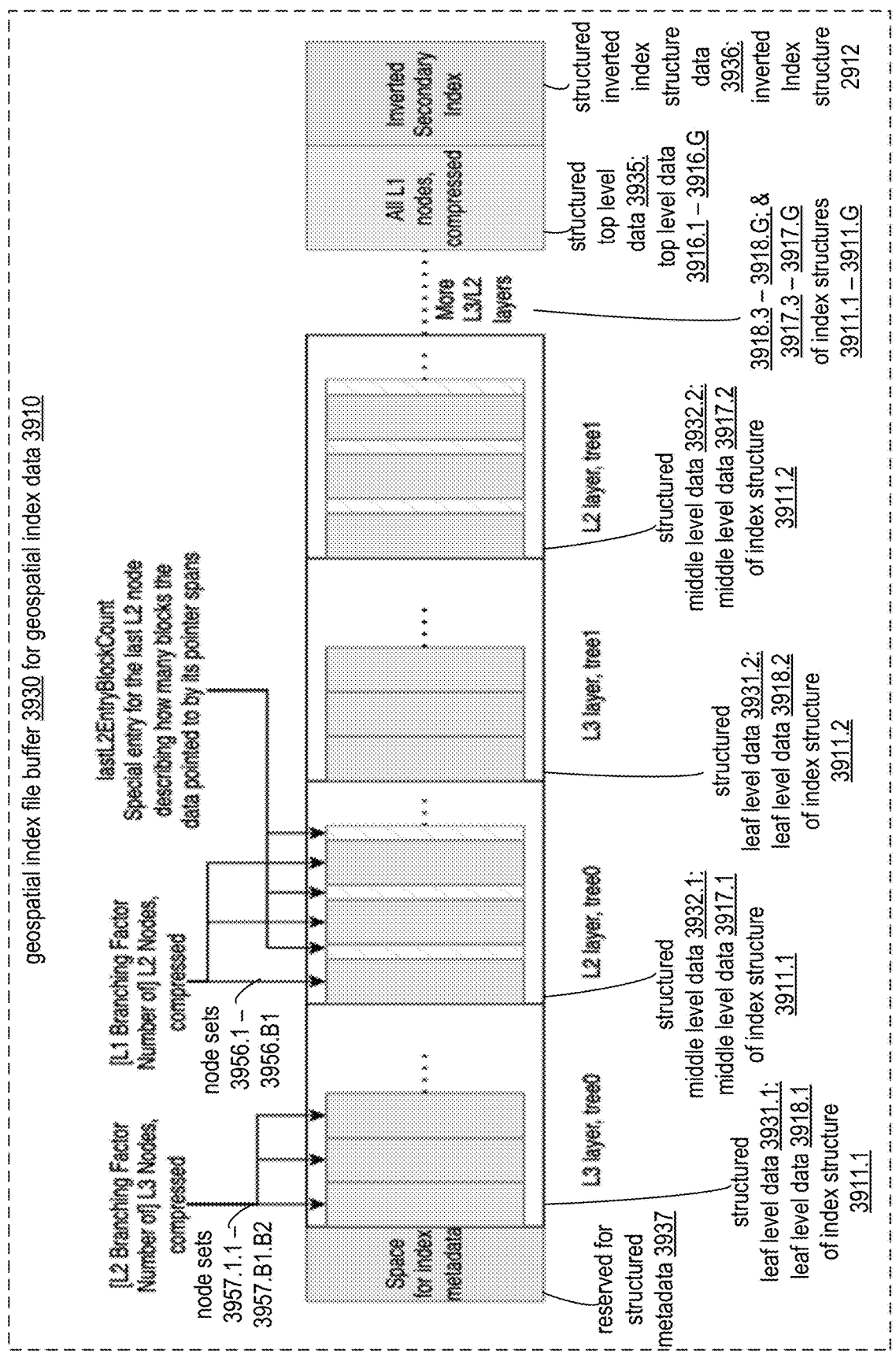
FIG. 29F illustrates example structuring of a geospatial index file buffer in accordance with various embodiments.

FIG. 29F illustrates example structuring of geospatial index file buffer 3930 that implements geospatial index data 3910. The geospatial index file buffer 3930 of FIG. 29F can correspond to the resulting geospatial index file buffer 3930 generated via geospatial index data generator module 3940 of FIGS. 29D and/or 29E. The geospatial index file 3930 of FIG. 29F can illustrate structuring of the corresponding geospatial index data 3910 in disk memory resources (e.g. in segment storage 2508 of FIG. 29A) based on the geospatial index file buffer 3930 being written to disk memory based on having been generated.

In some embodiments, compression is preferred in order to minimize on-disk size of the geospatial index data 3910. Instead of compressing entire layers of a given tree-based index structure 3911 or simply compressing the entire geospatial index data 3910 together, the compression can be piecewise in order to minimize over-read and wasted decompression effort while traversing the index. In some embodiments, only the L1 layer is compressed in its entirety. All L1 nodes from all trees in the forest can be compressed together into their own frame. The top level (L1) layer can be quite small even in the worst case (e.g. 64 r-trees*36 bytes per node*16 L1 Nodes=36 KB), so compressing and decompressing all L1 nodes can sufficiently efficient.

Meanwhile, the children of both L1 and L2 nodes can be compressed into their own frames. For a branching factor of 256, this can render 256L2 nodes being compressed together for a single L1 Node, or 256L3 nodes being compressed together for a single L2 node. For a very selective filter, a minimum amount of decompression is needed. In some embodiments, the ZSTD streaming library can be utilized to compress and decompress these frames. Any other compression/decompression scheme can be applied to render the corresponding compression and decompression of the compression frames.

Figure 29G:
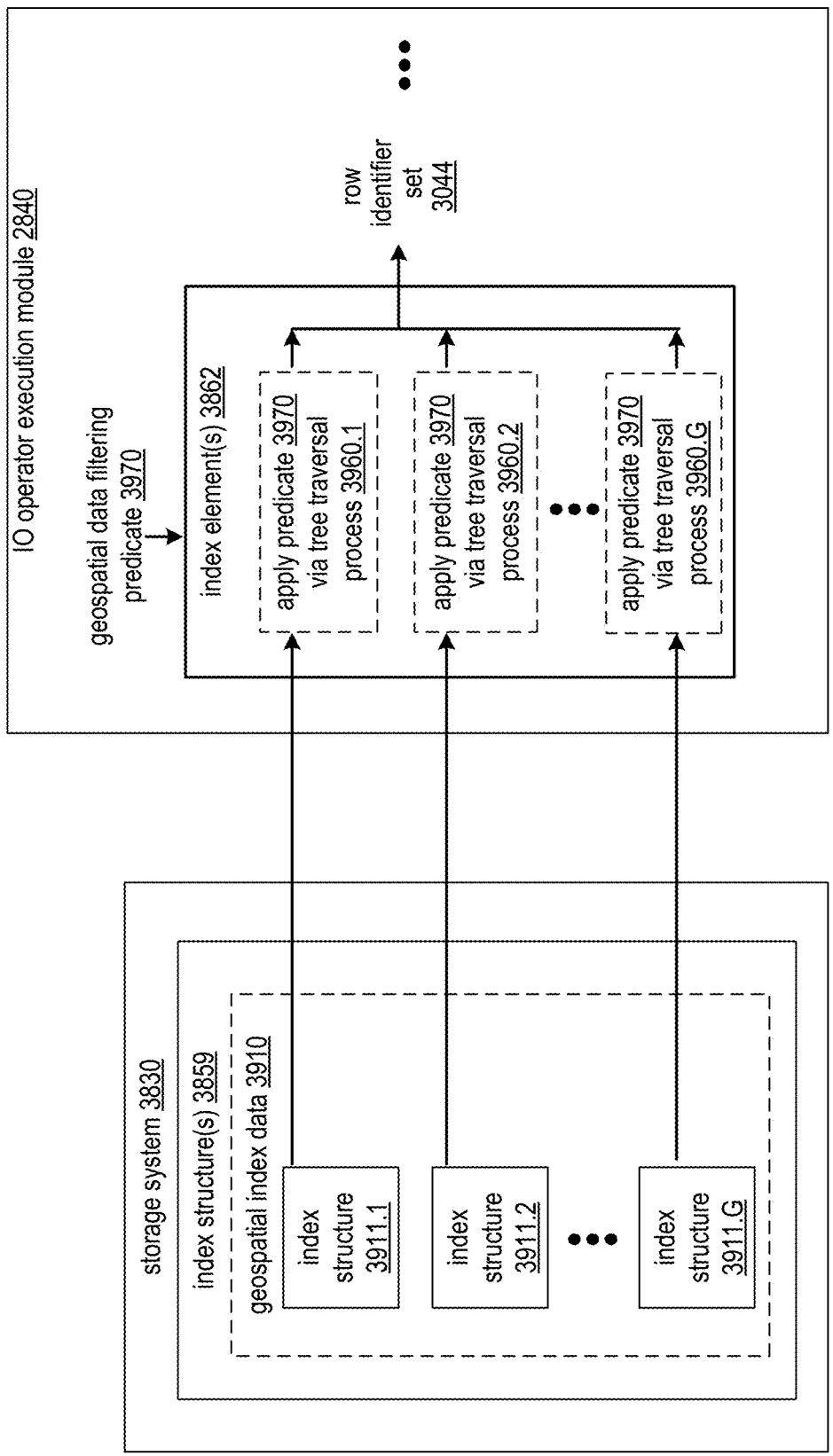
FIG. 29G is a schematic block diagram of an IO operator execution module that applies geospatial data filtering predicates by performing a plurality of tree traversal processes via accessing index structures of geospatial index data in accordance with various embodiments.

FIG. 29G is a schematic block diagram of an IO operator execution module 2840 that applies geospatial data filtering predicates 3970 (e.g. GIS filters) by implementing one or more index elements 3862 to perform a plurality of tree traversal processes 3960.1-3960.G via accessing some or all corresponding index structures 3911 of geospatial index data 3910. Each index structure 3911 can be traversed via a corresponding tree traversal processes 3960 to render a corresponding portion of row identifier set 3044. The means of traversing each index structure 3911 to identify rows meeting geospatial data filtering predicates 3970 can be identical. These processes are independent due to the trees being separate and can be performed serially or in parallel.

Row identifier set 3044 can be further filtered and/or processed in conjunction with the query execution. Note that the inverted index structure 2912 can be similarly accessed to identify rows meeting the geospatial data filtering predicates 3970 (and/or to remove rows not meeting geospatial data filtering predicates 3970, based on the rules applied to geospatial special values as discussed in conjunction with FIGS. 27A-27L.

In some embodiments, in performing a given tree traversal processes 3960, each Geospatial Index Cursor (e.g. cursor traversing the index and returning matching rows) is implemented via an inner predicate 3971 and a leaf predicate 3972. The Inner predicate can be used to match against internal nodes 3920 (L1 & L2 nodes), while the leaf predicate can be used against leaf nodes 3925 (L3 nodes).

Bounding Box Intersection (&&) can be performed based on applying Bounding Box Intersection for both the inner predicate & leaf predicate, thus implementing BoundingBox Intersection for both internal traversal and leaf traversal.

Bounding Box Equality (~=) can be performed based on applying Bounding Box Contains (~) for the inner predicate, and Bounding Box Equality for the leaf predicate, thus implementing BoundingBox Contains for internal traversal and Bounding Box Equality for leaf traversal.

Bounding Box Contains (~) can be performed based on applying Bounding Box Contains for both the inner predicate & leaf predicate, thus implementing BoundingBox Contains for both internal traversal and leaf traversal.

Bounding Box Contained (@) can be performed based on applying Bounding Box Intersection for the inner predicate, and Bounding Box Contained for the leaf predicate, thus implementing Bounding Box Intersection for internal traversal and Bounding Box Contained for leaf traversal.

In some embodiments, all Special Values are simply targeted against the inverted secondary index contained within the geospatial index data 3910.

In some embodiments, the cursor architecture supports combinations of predicates. Instead of two cursors for two predicates, resulting in two traversals of the geospatial index, this work can be combined into a single traversal. For example, consider two predicates: (col BB_OP filterBB1) AND (col BB_OP filterBB2). A single traversal of the set of index structures 3911.1-3911.G (e.g. single traversal of the R-tree forest) would intersect the results of each application of internal & leaf node predicates. This can work for any number of either AND'd or OR'd predicates. (e.g. any "pred1 AND pred2 AND pred3 . . . " and/or any "pred1 OR pred2 OR pred3 . . . ").

Figure 29H:
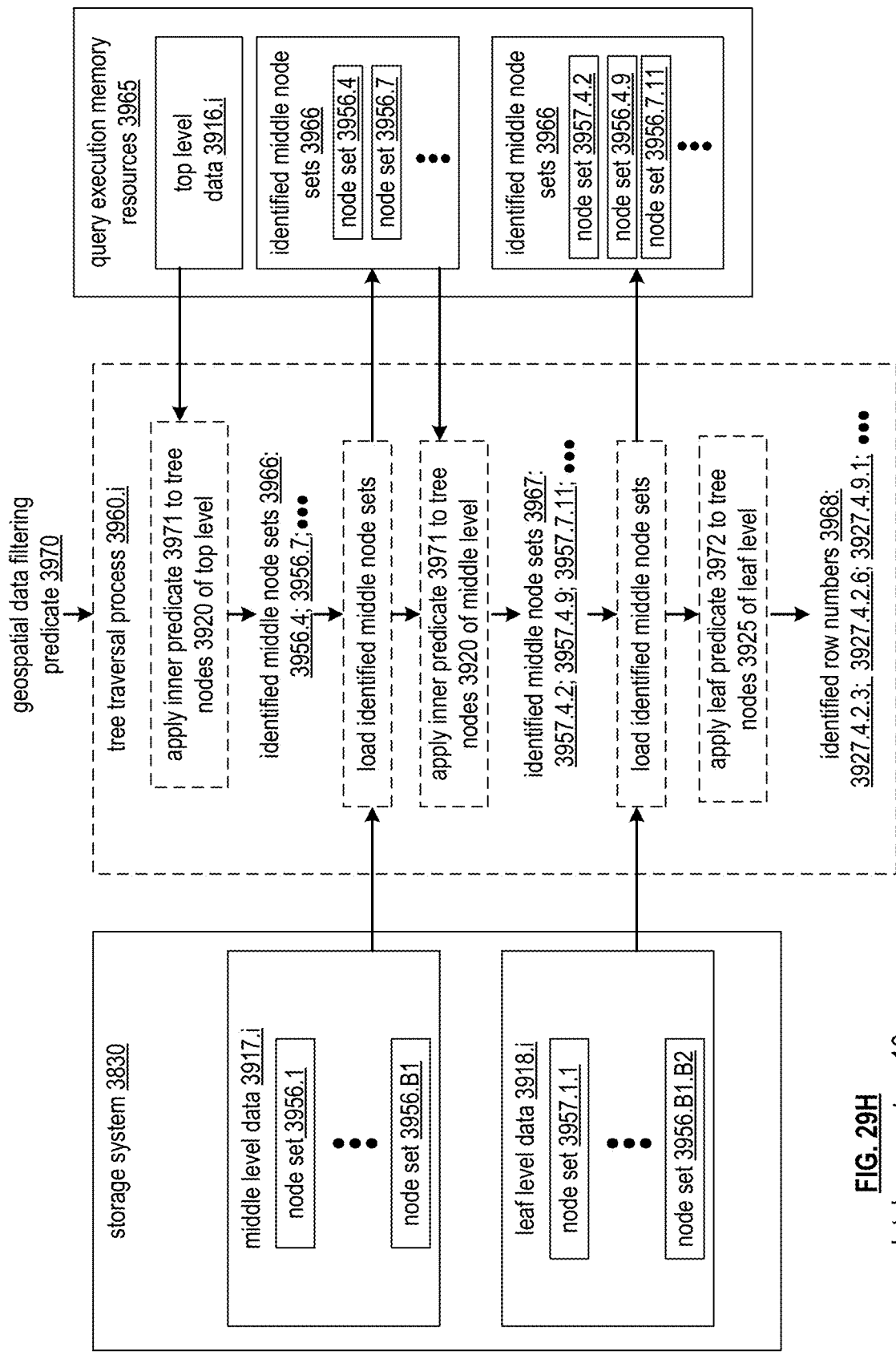
FIG. 29H illustrates performance of a tree traversal process in accordance with various embodiments.

In some embodiments, selectivity for geospatial objects is estimated. For example, during pipeline compilation, filter selectivity is used to help determine where to place the corresponding element(s) 3862 in the pipeline. This can be achieved based on loading in the entire L1 layer. This L1 layer can be cached for later use during actual index traversal (e.g. as illustrated in FIG. 29H). The internal predicate can be run against the L1 nodes, and the matches can be summed. The matches can then be used to determine the worst-case proportion of the rows that would match the cursor's filters (e.g. EstimatedMatchedRows= (matchedL1Values/totalL1Values)*numRowsInIndex).

In some embodiments, selectivity for special values is similarly estimated, for example, based on using the inverted Secondary Index built into the geospatial index.

FIG. 29H illustrates example performance of a tree traversal process 3960 based on loading various portions of a tree being traversed into query execution memory resources 3965 as needed. In some embodiments, during pipeline execution, the cursor can take full advantage of the moving row range window to selectively load data for the next tree in the forest, and to drop data from the previous tree.

The top level data 3916 of L1 Layer can be always held in memory (e.g. query execution memory resources 3965), for example, loaded and decompressed initially when selectivity is estimated. Based on the pull row bound, the L1 layer can be matched against the inner predicate 3971, returning identified middle node sets 3966 as a list of node sets 3956 (e.g. list of L2 compression frames) to search. In some embodiments block IO for all matched L2 compression frames can be issued at once. The frames can be decompressed as node sets 3956 and made available for the next traversal pass.

Similar to how the L1 layer is processed, the L2 layer is matched against the inner predicate 3971, returning identified leaf node sets 3967 as a list of node sets 3957 (e.g. a list of L3 compression frames) to search. Block IO for all matched L3 compression frames can be issued at once. The frames can be decompressed and made available for the next traversal.

Note that loading L3 compression frames does not have to wait for all L2 compression frames to be complete. For example, block IO is prioritized by low-row number, so it is possible that r-tree 0 would being issuing IO requests for L3 data before r-tree 1 is finished with its L2 layer, even if both trees began traversal at the same time.

Once L3 nodes are available, they are run against the leaf predicate 3972. If match, the row is added to a set of identified row numbers 3968. For example, the row is added to bitmap rowlist builder for this tree as discussed in conjunction with FIG. 30A. After an entire tree has been processed the rows can be emitted as rows of row identifier set 3044 (e.g. a bitmap rowlist builder can output rows to be returned upstream).

In some embodiments, some or all features and/or functionality of database system 10 of FIGS. 29A-29H implements some or all features and/or functionality of the database system 10 of FIGS. 28A-28R. In some embodiments, some or all features and/or functionality of database system 10 described herein implements some or all features and/or functionality of the database system 10 as disclosed by U.S. Utility application Ser. No. 17/448,242, entitled "IMPLEMENTING SUPERSET-GUARANTEEING EXPRESSIONS IN QUERY EXECUTION", filed Sep. 21, 2021, which is hereby incorporated herein by reference in its entirety and made part of the present U.S. Utility Patent Application for all purposes. For example, the geospatial data column 3904 and/or corresponding values 2708 and/or bounding boxes 3922 and/or 2925 described herein are implemented based on implementing some or all features and/or functionality of geospatial regions 3307 and/or 3306 and/or geospatial region bounding polygon 3317 as described in conjunction with FIGS. 28A-28O and/or as disclosed by U.S. Utility application Ser. No. 17/448,242. As another example, processing of geospatial data column 3904 and/or corresponding values 2708 in conjunction with query execution (e.g. based on applying geospatial data filtering predicate 3970, such as applying corresponding geospatial data operators such as Intersects operators, Equals operators, Contains operators, Contained operators, described herein are implemented based on implementing some or all features and/or functionality of processing geospatial regions 3307 and/or 3306 of rows 3308, for example, via applying conditional statement 3320 and/or overlap identification function 3324 of overlapping geospatial region determination module 3315 as described in conjunction with FIGS. 28A-28O and/or as disclosed by U.S. Utility application Ser. No. 17/448,242.

In some embodiments, some or all features and/or functionality of database system 10 of FIGS. 29A-29H implements some or all features and/or functionality of the database system 10 of FIGS. 27A-27K. In some embodiments, some or all features and/or functionality of database system 10 described herein implements some or all features and/or functionality of the database system 10 as disclosed by U.S. Utility application Ser. No. 17/450,109 entitled "MISSING DATA-BASED INDEXING IN DATABASE SYSTEMS", filed Oct. 6, 2021, which is hereby incorporated herein by reference in its entirety and made part of the present U.S. Utility Patent Application for all purposes. For example, the special geospatial data/special geospatial value (e.g. empty geospatial data/empty geospatial object) described herein is implemented as a value meeting a missing data based condition 3837 as described in conjunction with FIGS. 27A-27K and/or as disclosed by U.S. Utility application Ser. No. 17/450,109. As another example, the index structure 3912 (e.g. inverted index structure indexing special geospatial value) is implemented as special index data 3824 as described in conjunction with FIGS. 27A-27K and/or as disclosed by U.S. Utility application Ser. No. 17/450,109, for example, where geospatial index data 3910 is implemented as index data 3820 and/or the set of tree-based index structures 3911 are implemented as value-based index data 3822. As another example, the geospatial data column 3904 is implemented as an array field 2712 storing array structures 2718, which optionally include multiple geospatial objects, multiple special geospatial values, and/or a combination of both, in a same or similar fashion as described in conjunction with FIGS. 27A-27K and/or as disclosed by U.S. Utility application Ser. No. 17/450,109.

Figure 29I:
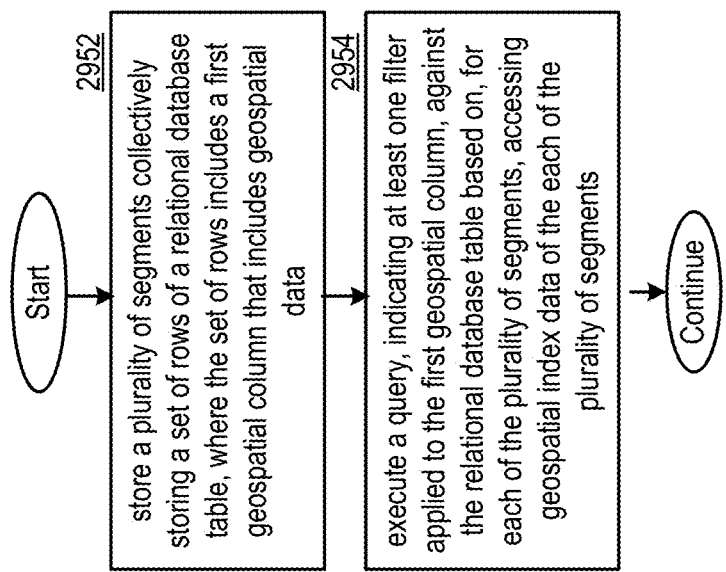
FIG. 29I is a logic diagram illustrating a method for execution in accordance with various embodiments.

FIG. 29I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29I. Some or all of the method of FIG. 29I can be performed by nodes executing a query in conjunction with a query execution, for example, via one or more nodes 37 implemented as nodes of a query execution module 2504 implementing a query execution plan 2405. Some or all of the steps of FIG. 29I can optionally be performed by any other processing module of the database system 10. Some or all of the steps of FIG. 29I can be performed to implement some or all of the functionality of the database system 10 as described in conjunction with FIGS. 29A-29H, for example, by implementing the segment indexing module 2510 to generate geospatial index data 3910; by implementing segment storage system 2508 and/or any database storage 2450 to store segments 2424 that include the geospatial index data 3910; and/or by implementing query execution module 2504 to execute queries via accessing the geospatial index data 3910. Some or all steps of FIG. 29I can be performed by database system 10 in accordance with other embodiments of the database system 10 and/or nodes 37 discussed herein. Some or all steps of FIG. 29I can be performed by database system 10 in conjunction with performing: some or all steps of FIG. 29J, some or all steps of FIG. 29K; some or all steps of FIG. 30B; and/or some or all steps of any other method described herein.

Step 2952 includes storing a plurality of segments collectively storing a set of rows of a relational database table. In various examples, the set of rows includes a first geospatial column that includes geospatial data. Step 2954 includes executing a query, indicating at least one filter applied to the first geospatial column, against the relational database table. In various examples, executing the query against the relational database table based on, for each of the plurality of segments, accessing geospatial index data of the each of the plurality of segments.

In various examples, each of the plurality of segments includes a plurality of rows corresponding to a subset of the set of rows. In various examples, a plurality of subsets of the set of rows are stored across the plurality of segments. In various examples, the plurality of subsets are mutually exclusive.

In various examples, each of the plurality of segments further includes geospatial index data that includes set of index structures indexing, for the plurality of rows, values of the first geospatial column. In various examples, the set of index structures includes an ordered set of index structures (e.g. index structures 3911.1-3911.G) having a first index type. In various examples, the set of index structures includes at least one additional index structure (e.g. index structure 3912) having a second index type.

In various examples, each index structure of the ordered set of index structures includes: a set of leaf tree nodes at a bottom level of a set of levels of the each index structure. In various examples, each leaf tree node of the each index structure includes: a leaf level bounding box corresponding to a geospatial object of a corresponding row of the plurality of rows for the first geospatial column; and/or a row number indicating the corresponding row of the plurality of rows.

In various examples, the each index structure of the ordered set of index structures further includes a plurality of internal levels of the set of levels. In various examples, each internal level of the plurality of internal levels includes a corresponding set of internal level tree nodes. In various examples, each internal level tree node of the corresponding set of internal level tree nodes of the each internal level of the each index structure includes: an internal level bounding box computed from a plurality of bounding boxes of a plurality of child tree nodes of the each internal level tree node in a lower level of the set of levels; and/or a pointer indicating a starting location of the plurality of child tree nodes of the each internal level tree node.

In various examples, accessing the geospatial index data of the each of the plurality of segments to execute the query is based on, for each index structure of the ordered set of index structures, traversing a corresponding tree structure based on identifying whether to advance to a given child node of a given current node based on determining whether a bounding box of the given child node meets the at least one filter.

In various examples, the set of levels includes exactly three levels based on the plurality of internal levels including exactly two internal levels. In various examples, the set of levels includes strictly more than three levels based on the plurality of internal levels including strictly more than two internal levels.

In various examples, the plurality of child tree nodes of each internal level tree node includes no more than a threshold number of child tree nodes. In various examples, the threshold number of child tree nodes is a same number of child tree nodes across all levels of the plurality of internal levels.

In various examples, the threshold number of child tree nodes is 256 based on a corresponding branching factor being configured as 256, wherein a number of tree nodes at a top level of the set of levels is 16, wherein a total number of levels in the set of levels is three, and wherein a threshold maximum number of nodes is 1048576 (i.e. $2^{20}$)

In various examples, the ordered set of index structures are ordered based on an ordering of the plurality of rows by a corresponding plurality of row numbers, wherein each of the ordered set of index structures have corresponding row number bounds based on a maximum size of the first index type, and wherein the an ordered set of corresponding row number bounds contiguously encompass the corresponding plurality of row numbers of the plurality of rows.

In various examples, the first geospatial column is a scalar column. In various examples, none of the plurality of rows include more than one geospatial object in the first geospatial column based on the first geospatial column being the scalar column.

In various examples, the first geospatial column is an array column. In various examples, at least one of the plurality of rows include one geospatial value indicates multiple geospatial objects in the first geospatial column based on the first geospatial column being the array column. In various examples, multiple ones of a set of leaf tree nodes at a bottom level of a set of levels of the each index structure indicate a same corresponding row of the plurality of rows based on corresponding to multiple different multiple geospatial objects of the array column of the same corresponding row.

In various examples, second geospatial index data that includes a second set of index structures indexing a second geospatial column includes a second ordered set of index structures having the first index type. In various examples, the second geospatial column is a scalar column. In various examples, the first index type is configured to support a maximum number of geospatial objects. In various examples, each of the set of index structures has a first number of tree nodes based on the maximum number of geospatial objects. In various examples each of the second set of index structures also has the first number of tree nodes based on the maximum number of geospatial objects. In various examples, the each of the set of index structures indexes the array column for a first number of rows via the first number of tree nodes. In various examples, the each of the second set of index structures indexes the scalar column for a second number of rows via the first number of tree nodes. In various examples, the second number of rows is larger than the first number of rows based on the second geospatial column being the scalar column and the first geospatial column being the array column. In various examples, the each of the set of index structures indexes and the each of the second set of index structures indexes a same number of geospatial objects despite indexing different numbers of rows based on the second geospatial column being the scalar column and the first geospatial column being the array column.

In various examples, the set of rows includes both the first geospatial column and the second geospatial column. In various examples, the second geospatial index data that includes the second set of index structures is one of a plurality of second geospatial index data stored across the plurality of segments, wherein each of the plurality of segments stores one of the plurality of second geospatial index data. In various examples, a different set of rows includes the second geospatial column. In various examples, the second geospatial index data that includes the second set of index structures is stored across a second plurality of segments storing the different set of rows.

In various examples, the ordered set of index structures indexes a plurality of geospatial objects of the plurality of rows having corresponding bounding boxes. In various examples, the at least one additional index structure indexes a plurality of geospatial special values corresponding to empty geospatial data having no corresponding bounding boxes.

In various examples, the ordered set of index structures includes a plurality of r-tree index structures. In various examples, the at least one additional index structure includes an inverted secondary index structure.

In various examples, the at least one filter applied to the first geospatial column is indicated via one of: an Intersects operation (e.g. BB_Intersects( ); ST_Intersects( )); etc., an Equals operation (e.g. BB_Equals( ); ST_Equals( )), a Contains operation (e.g. BB_Contains( ); ST_Contains( ); etc.), or a Contained operation (e.g. BB_Within( ); ST_Within( )).

In various examples, a plurality of subsets of the set of rows are stored across the plurality of segments. In various examples, the plurality of subsets are mutually exclusive. In various examples, each of the plurality of rows is indexed for the first geospatial column via exactly one of the set of index structures.

In various embodiments, any one of more of the various examples listed above are implemented in conjunction with performing some or all steps of FIG. 29I. In various embodiments, any set of the various examples listed above can be implemented in tandem, for example, in conjunction with performing some or all steps of FIG. 29I.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29I, for example, in conjunction with further implementing any one or more of the various examples described above.

In various embodiments, the operational instructions, when executed by the at least one processor, cause the database system to store a plurality of segments collectively storing a set of rows of a relational database table, where the set of rows includes a first geospatial column that includes geospatial data, and/or where each of the plurality of segments includes: a plurality of rows corresponding to a subset of the set of rows, where a plurality of subsets of the set of rows are stored across the plurality of segments, and/or where the plurality of subsets are mutually exclusive; and/or geospatial index data that includes set of index structures indexing, for the plurality of rows, values of the first geospatial column, where the set of index structures includes an ordered set of index structures having a first index type, and wherein the set of index structures includes at least one additional index structure having a second index type. In various embodiments, the operational instructions, when executed by the at least one processor, cause the database system to execute a query against the relational database table indicating at least one filter applied to the first geospatial column based on, for each of the plurality of segments, accessing the geospatial index data of the each of the plurality of segments.

Figure 29J:
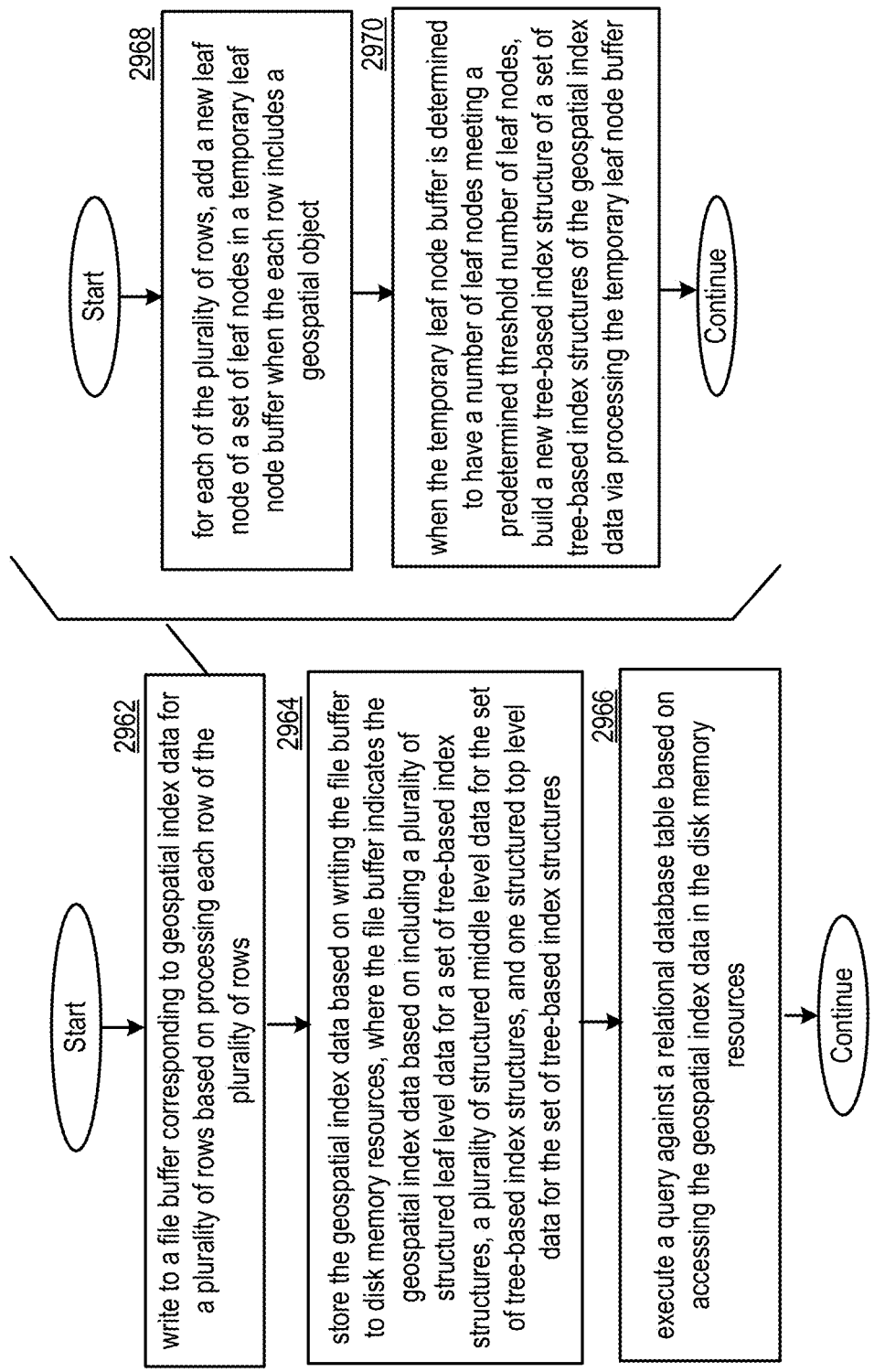
FIG. 29J is a logic diagram illustrating a method for execution in accordance with various embodiments.

FIG. 29J illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29J. Some or all of the method of FIG. 29J can be performed by nodes executing a query in conjunction with a query execution, for example, via one or more nodes 37 implemented as nodes of a query execution module 2504 implementing a query execution plan 2405. Some or all of the steps of FIG. 29J can optionally be performed by any other processing module of the database system 10. Some or all of the steps of FIG. 29J can be performed to implement some or all of the functionality of the database system 10 as described in conjunction with FIGS. 29A-29H, for example, by implementing the geospatial index data generator module 3940 to generate geospatial index data 3910 via generation of a corresponding geospatial index file buffer 3930 for storage. Some or all steps of FIG. 29J can be performed by database system 10 in accordance with other embodiments of the database system 10 and/or nodes 37 discussed herein. Some or all steps of FIG. 29J can be performed by database system 10 in conjunction with performing: some or all steps of FIG. 29I, some or all steps of FIG. 29K; some or all steps of FIG. 30B; and/or some or all steps of any other method described herein.

Step 2962 includes writing to a file buffer corresponding to geospatial index data for a plurality of rows based on processing each row of the plurality of rows. Step 2964 includes storing the geospatial index data based on writing the file buffer to disk memory resources. In various examples, where the file buffer indicates the geospatial index data based on including a plurality of structured leaf level data for a set of tree-based index structures, a plurality of structured middle level data for the set of tree-based index structures, and one structured top level data for the set of tree-based index structures. Step 2966 includes executing a query against a relational database table based on accessing the geospatial index data in the disk memory resources (e.g. at least one memory drive 2425 of at least one node 37 in conjunction with storage of a corresponding segment 2424; at least one disk memory device of segment storage system 2508; at least one disk memory device of database storage 2450; and/or other one or more disk memories of corresponding disk memory resources of database system 10).

In various embodiments, performing step 2962 includes performing step 2968 and/pr 2970. Step 2968 includes, for each of the plurality of rows, adding a new leaf node of a set of leaf nodes in a temporary leaf node buffer when the each row includes a geospatial object. Step 2970 includes, when the temporary leaf node buffer is determined to have a number of leaf nodes meeting a predetermined threshold number of leaf nodes, building a new tree-based index structure of a set of tree-based index structures of the geospatial index data via processing the temporary leaf node buffer.

In various examples, each of the plurality of structured leaf level data indicates leaf level data for only a corresponding one of the set of tree-based index structures. In various examples, each of the plurality of structured middle level data indicates middle level data for only a corresponding one of the set of tree-based index structures. In various examples, the one structured top level data indicates top level data for every one of the set of tree-based index structures.

In various examples, the file buffer includes the plurality of structured leaf level data and the plurality of structured middle level data in an alternating pattern in accordance with an ordering of generating the set of tree-based index structures. In various examples, the file buffer further includes the one structured top level data for the set of tree-based index structures strictly after the alternating pattern of the plurality of structured leaf level data and the plurality of structured middle level data.

In various examples, the file buffer further includes index metadata strictly before all of the plurality of structured leaf level data and the plurality of structured middle level data.

In various examples, the file buffer further includes structured inverted index data indicating an inverted index structure indexing special geospatial values of the plurality of rows. In various examples, the file buffer includes the structured inverted index data strictly after the one structured top level data.

In various examples, a given new tree-based index structure is generated prior to a final new tree-based index structure of the set of based index structures based on the temporary leaf node buffer being determined to have a number of leaf nodes meeting the predetermined threshold number of leaf nodes prior to a final row of the plurality of rows being processed. In various examples, given structured leaf level data and given structured middle level data for the given new tree-based index structures are written to the file buffer strictly before generating any subsequently generated ones of the set of based index structures.

In various examples, building a new tree-based index structure includes: generating corresponding leaf level data for the new tree-based index structure based on processing the temporary leaf node buffer, writing, to the file buffer, corresponding structured leaf level data indicating the corresponding leaf level data; generating corresponding middle level data for the new tree-based index structure based on processing the corresponding leaf level data for the new tree-based index structure; writing, to the file buffer, corresponding structured middle level data indicating the corresponding middle level data; generating corresponding top level data for the new tree-based index structure based on processing the corresponding middle level data for the new tree-based index structure; and/or writing, to a temporary top node buffer, the corresponding top level data. In various examples, structured top level data is written to the file buffer after processing all of the plurality of rows based on processing the temporary top node buffer.

In various examples, each of the set of leaf nodes indicates a corresponding bounding box for geospatial data of a corresponding row of the plurality of rows. In various examples, generating the corresponding leaf level data for the new tree-based index structure is based on: sorting, based on bounding boxes of the set of leaf nodes, the set of leaf nodes of the temporary leaf node buffer to produce a sorted set of leaf nodes, wherein the structured leaf level data includes the sorted set of leaf nodes; and/or segregating the sorted set of leaf nodes into a plurality of child leaf node groups.

In various examples, the structured leaf level data is generated from the corresponding leaf level data to include a plurality of leaf node compression frames based on separately compressing each plurality of child leaf node groups to generate a corresponding one of the plurality of leafnode compression frames. In various examples, the sorted set of leaf nodes are segregated into the plurality of child leaf node groups based on applying a predetermined branching factor.

In various examples, generating the corresponding middle level data for the new tree-based index structure is based on: generating a plurality of middle level nodes based on, for each of the plurality of child leafnode groups, generating a corresponding middle level node based on computing a bounding box from corresponding bounding boxes of nodes included in the each of the plurality of child leafnode groups; sorting, based on bounding boxes of the set of middle nodes, the set of middle nodes to produce a sorted set of middle nodes; and/or segregating the sorted set of middle nodes into a plurality of child middle node groups.

In various examples, the structured middle level data is generated from the corresponding middle level data based on: generating a plurality of middle node compression frames based on separately compressing each plurality of child middle node groups to generate a corresponding one of the plurality of middle node compression frames; and/or after each of the plurality of middle node compression frames, appending an entry indicating a data size of data pointed to by a pointer of the each of the plurality of middle node compression frames.

In various examples, sorting the set of leaf nodes is based on computing Hilbert values for the bounding boxes of the set of leaf nodes. In various examples, sorting the set of middle nodes is based on computing Hilbert values for the bounding boxes of the set of middle nodes.

In various examples, writing to the file buffer is further based on performing a geospatial index data finalization process after processing a final row of the plurality of rows. In various examples, performing the geospatial index data finalization process includes building a final new tree-based index structure even when the temporary leaf node buffer is determined to have a number of rows not meeting the predetermined threshold number of rows.

In various examples, performing the geospatial index data finalization process further includes writing metadata into a pre-reserved block at a beginning of the file buffer. In various examples, the metadata indicates at least one of: a common top level branching factor for all tree-based index structures; a common middle level branching factor for all tree-based index structures; a location of the structured top level data in the file buffer (e.g. corresponding bit offset, corresponding pointer, corresponding disk location; etc.); and/or inverted secondary index configuration metadata of a corresponding inverted secondary index included in the file buffer, separate from the structured data for the set of tree-based index structures. In various examples, the metadata indicates at least one of, for each given tree-based index structure of the set of tree-based index structures: a number of leaf level nodes; a number of top level nodes; a start row number and end row number defining a corresponding row bound for rows indexed by the given tree-based index structure; a location of the structured leaf level data for the given tree-based index structure (e.g. corresponding bit offset; corresponding pointer, corresponding disk location; etc.); and/or a location of the structured leaf level data for the given tree-based index structure (e.g. corresponding bit offset, corresponding pointer, corresponding disk location; etc.).

In various examples, processing each row of the plurality of rows is further based on adding the each row to an inverted index structure when the row includes a geospatial special value. In various examples, performing the geospatial index data finalization process further includes writing the inverted index structure to the file buffer.

In various examples, at least one of the plurality of rows includes multiple geospatial objects in a corresponding array column.

In various examples, building the new tree-based index structure is based on applying a Hilbert r-tree packing method.

In various examples, executing the query is based on: traversing the set of tree-based index structures to identify ones of the plurality of rows meeting predicate applied to a geospatial data column indexed by the geospatial index data; adding the ones of the plurality of rows to a bitmap; and/or emitting the ones of the plurality of rows in an ordered row list based on serializing the bitmap into sorted order. In various examples, a query resultant of the query based on the ones of the plurality of rows.

In various embodiments, any one of more of the various examples listed above are implemented in conjunction with performing some or all steps of FIG. 29J. In various embodiments, any set of the various examples listed above can be implemented in tandem, for example, in conjunction with performing some or all steps of FIG. 29J.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29J described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29J, for example, in conjunction with further implementing any one or more of the various examples described above.

In various embodiments, the operational instructions, when executed by the at least one processor, cause the database system to write to a file buffer corresponding to geospatial index data for a plurality of rows based on processing each row of the plurality of rows based on: adding a new leafnode of a set of leafnodes in a temporary leafnode buffer when the each row includes a geospatial object, and/or when the temporary leaf node buffer is determined to have a number of leaf nodes meeting a predetermined threshold number of leaf nodes, building a new tree-based index structure of a set of tree-based index structures of the geospatial index data via processing the temporary leaf node buffer. In various embodiments, the operational instructions, when executed by the at least one processor, further cause the database system to store: the geospatial index data based on writing the file buffer to disk memory resources, where the file buffer indicates the geospatial index data based on including a plurality of structured leaf level data for the set of tree-based index structures, a plurality of structured middle level data for the set of tree-based index structures, and one structured top level data for the set of tree-based index structures; and/or execute a query against a relational database table based on accessing the geospatial index data in the disk memory resources.

Figure 29K:
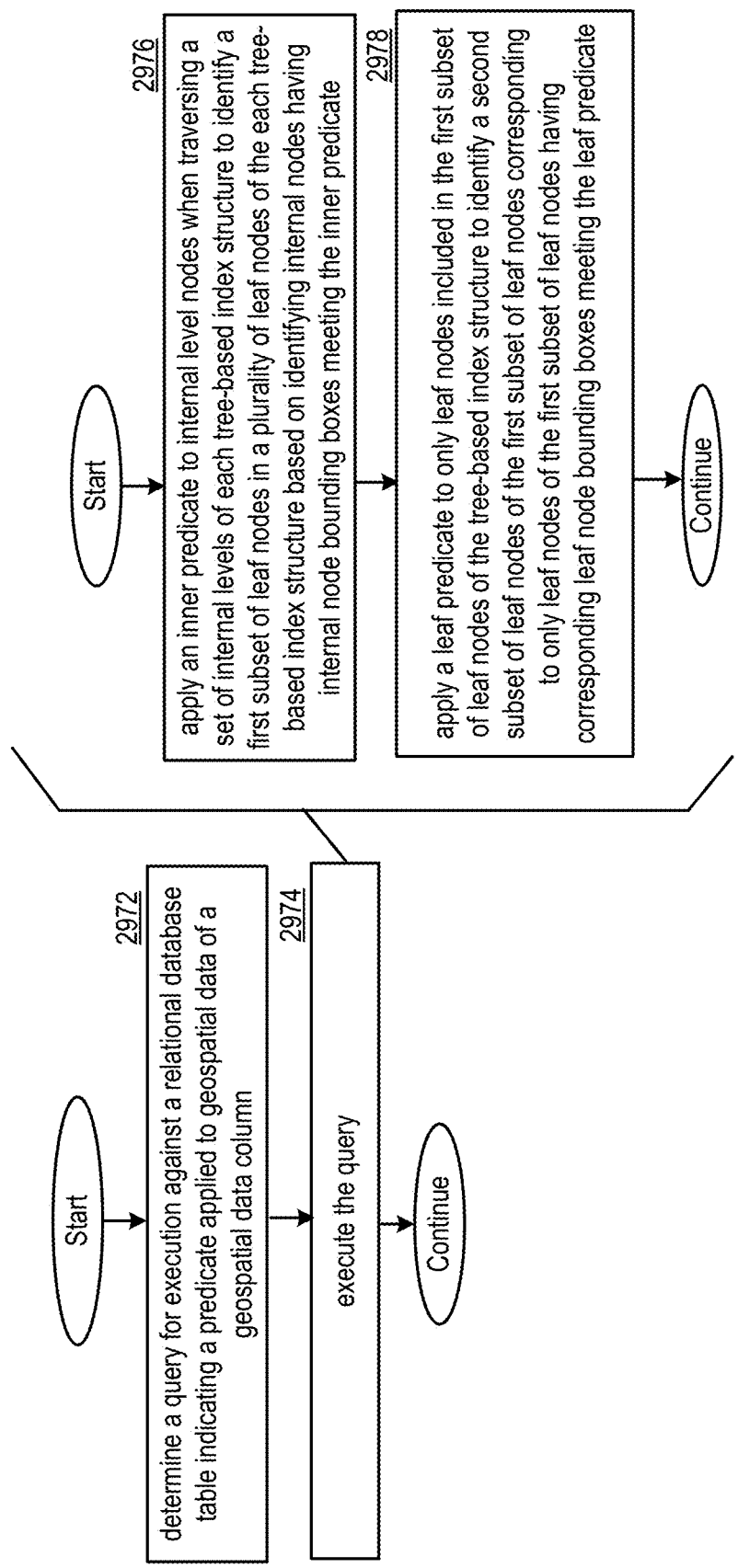
FIG. 29K is a logic diagram illustrating a method for execution in accordance with various embodiments.

FIG. 29K illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29K. Some or all of the method of FIG. 29K can be performed by nodes executing a query in conjunction with a query execution, for example, via one or more nodes 37 implemented as nodes of a query execution module 2504 implementing a query execution plan 2405. Some or all of the steps of FIG. 29K can optionally be performed by any other processing module of the database system 10. Some or all of the steps of FIG. 29K can be performed to implement some or all of the functionality of the database system 10 as described in conjunction with FIGS. 29A-29H, for example, by implementing a tree traversal process 3960 for each index structure 3911 via an IO operator execution module 2840 and/or other processing resources of query execution module 2504. Some or all steps of FIG. 29K can be performed by database system 10 in accordance with other embodiments of the database system 10 and/or nodes 37 discussed herein. Some or all steps of FIG. 29K can be performed by database system 10 in conjunction with performing: some or all steps of FIG. 29I, some or all steps of FIG. 29J; some or all steps of FIG. 30B; and/or some or all steps of any other method described herein.

Step 2972 includes determining a query for execution against a relational database table indicating a predicate applied to geospatial data of a geospatial data column. Step 2974 includes executing the query.

Performing step 2974 can include performing step 2976 and/or 2978. Step 2976 includes applying an inner predicate to internal level nodes when traversing a set of internal levels of each tree-based index structure to identify a first subset of leaf nodes in a plurality of leafnodes of the each tree-based index structure based on identifying internal nodes having internal node bounding boxes meeting the inner predicate. Step 2978 includes applying a leaf predicate to only leaf nodes included in the first subset of leaf nodes of the tree-based index structure to identify a second subset of leaf nodes of the first subset of leaf nodes corresponding to only leaf nodes of the first subset of leaf nodes having corresponding leaf node bounding boxes meeting the leaf predicate.

In various examples, a query resultant of the query is generated based on geospatial objects of the geospatial data column for ones of a plurality of rows of the relational database table indicated by the second subset of leaf nodes.

In various examples, the relational database table is stored across a plurality of segments that includes the segment. In various examples, executing the query is further based on, for each segment in the set of segments, traversing each corresponding tree-based index structure of a corresponding set of tree-based index structures included in corresponding geospatial index data of the each segment.

In various examples, the predicate includes a given geospatial data filtering operator of a set of possible geospatial filtering operators and further includes a given geospatial value. In various examples, the method further includes: selecting, based on the given geospatial data filtering operator, an inner predicate filtering operator of the set of possible geospatial filtering operators, wherein applying the inner predicate is based on applying the inner predicate filtering operator and the given geospatial value to the internal node bounding boxes; and/or selecting, based on the given geospatial data filtering operator, a leaf predicate filtering operator of the set of possible geospatial filtering operators, wherein applying the leaf predicate is based on applying leaf inner predicate filtering operator and the given geospatial value to the leaf node bounding boxes.

In various examples, the leaf predicate filtering operator and the inner predicate filtering operator are selected as a same geospatial data filtering operator of the set of possible geospatial filtering operators. In various examples, the leaf predicate filtering operator and the inner predicate filtering operator are selected as two different geospatial data filtering operators of the set of possible geospatial filtering operators.

In various examples, the leaf predicate filtering operator is selected as the given geospatial data filtering operator, and/or the inner predicate filtering operator is selected as the given geospatial data filtering operator.

In various examples, the leaf predicate filtering operator is selected as the given geospatial data filtering operator. In various examples, the inner predicate filtering operator is selected as another one of the set of possible geospatial filtering operators different from the given geospatial data filtering operator.

In various examples, the set of possible geospatial filtering operators includes an intersection operator (e.g. ST_Intersects( )), an equality operator (e.g. ST_Equals( )), a contains operator (e.g. ST_Contains( )), and a contained operator (e.g. ST_Within( )). In various examples, the given geospatial data filtering operator is the intersection operator, the inner predicate filtering operator is selected as the intersection operator based on the given geospatial data filtering operator being the intersection operator, and/or the leaf predicate filtering operator is selected as the intersection operator based on the given geospatial data filtering operator being the intersection operator. In various examples, the given geospatial data filtering operator is the equality operator, the inner predicate filtering operator is selected as the contains operator based on the given geospatial data filtering operator being the equality operator, and/or the leaf predicate filtering operator is selected as the equality operator based on the given geospatial data filtering operator being the equality operator. In various examples, the given geospatial data filtering operator is the contains operator, the inner predicate filtering operator is selected as the contains operator based on the given geospatial data filtering operator being the contains operator, and/or the leaf predicate filtering operator is selected as the contains operator based on the given geospatial data filtering operator being the contains operator. In various examples, the given geospatial data filtering operator is the contained operator, the inner predicate filtering operator is selected as the intersection operator based on the given geospatial data filtering operator being the contained operator, and/or the leaf predicate filtering operator is selected as the contained operator based on the given geospatial data filtering operator being the contained operator.

In various examples. executing the query is further based on accessing an inverted index structure of the geospatial index data of the segment to identify further ones of the plurality of rows having a special geospatial value for the geospatial data column. In various examples, the special geospatial value satisfies the predicate, and the inverted index structure of the geospatial index data is accessed to identify the further ones of the plurality of rows having the special geospatial value based on the special geospatial value satisfying the predicate.

In various examples, the geospatial data column is an array column. In various examples, the ones of the plurality of rows of the relational database table indicated by the second subset of leaf nodes have at least one geospatial object of a set of geospatial objects in the array column having a bounding box meeting the predicate.

In various examples, the predicate includes a combination of a plurality of sub-predicates each indicating a corresponding geospatial data filtering operator. In various examples, and wherein the each tree-based index structure is traversed a single time based on applying the inner predicate and the leaf predicate to apply the combination of multiple predicates. In various examples, the combination of multiple predicates is a conjunction of the plurality of sub-predicates (e.g. "p1 AND p2 AND p3", where p1, p2, and p3 are simple predicates). In various examples, the combination of multiple predicates is a conjunction of the plurality of sub-predicates (e.g. "p1 OR p2 OR p3", where p1, p2, and p3 are simple predicates).

In various examples, the method further includes generating an IO pipeline based on the query. In various examples, executing the query includes executing the IO pipeline. In various examples, the leaf nodes of the each tree-based index structure having the corresponding leaf node bounding boxes meeting the leaf predicate are identified via execution of the IO pipeline.

In various examples, the IO pipeline includes an arrangement of IO pipeline elements, where one of the IO pipeline elements is executed to apply the predicate for the geospatial data column. In various examples, generating the IO pipeline is based on selecting a placement of the one of the IO pipeline elements in the IO pipeline based on generating filter selectivity estimate data for the predicate based on the geospatial index data.

In various examples, the set of internal levels includes a top level and a middle level. In various examples, and generating the filter selectivity estimate data is based on: applying the inner predicate to only internal nodes included in the top level to identify a number of internal nodes included in the top level having internal node bounding boxes meeting the inner predicate. In various examples, the filter selectivity estimate data is computed as a function of the number of internal nodes included in the top level having the internal node bounding boxes meeting the inner predicate.

In various examples, generating the filter selectivity estimate data is further based on loading top level data of the each tree-based index structure from geospatial index storage resources to query execution memory resources. In various examples, applying the inner predicate to only internal nodes included in the top level is based on accessing the top level data in the query execution memory resources. In various examples, the method further includes caching the top level data of the each tree-based index structure in the query execution memory resources for use in executing the query based on having loaded the top level data of the each tree-based index structure in generating the filter selectivity estimate data.

In various examples, the set of internal levels includes a top level and a middle level. In various examples, traversing the set of internal levels of the each tree-based index structure includes: accessing top level data indicating a plurality of top level nodes of the top level; applying the inner predicate to the plurality of top level nodes to identify a subset of the plurality of top level nodes having internal level bounding boxes meeting the inner predicate; and/or loading and decompressing a subset of middle level compression frames, identified from a plurality of middle level compression frames based on the subset of the plurality of top level nodes, to render a plurality of corresponding sets of middle level nodes of the middle level. In various examples, each corresponding set of middle level nodes of the plurality of corresponding sets of middle level nodes are child nodes of a corresponding top level node of the subset of the plurality of top level nodes based on having corresponding internal node bounding boxes all included within a corresponding internal bounding box of the corresponding top level node.

In various examples, traversing the set of internal levels of the each tree-based index structure further includes: applying the inner predicate to each corresponding set of middle level nodes of the plurality of corresponding sets of middle level nodes to identify a subset of middle level nodes having internal level bounding boxes meeting the inner predicate; and/or loading and decompressing a subset of leaf level compression frames, identified from a plurality of leaf level compression frames based on the subset of middle level nodes, to render the first subset of leaf nodes as a plurality of corresponding sets of leaf level nodes. In various examples, each corresponding set of leaf level nodes of the plurality of corresponding sets of leaf level nodes are child nodes of a corresponding middle level node of the subset of middle level nodes based on having corresponding leafnode bounding boxes all included within a corresponding internal bounding box of the corresponding middle level node.

In various examples, traversing the set of internal levels of the each tree-based index structure further includes applying the leaf predicate to each corresponding set of leaf level nodes of the plurality of corresponding sets of leaf level nodes to identify the second subset of leaf nodes having leaf level bounding boxes meeting the inner predicate.

In various examples, loading and decompressing the subset of middle level compression frames is based on, after identifying all of the subset of the plurality of top level nodes, issuing a first IO request indicating a first list of compression frames that includes all of the subset of middle level compression frames. In various examples, loading and decompressing the subset of leaf level compression frames is based on, after identifying all of the subset of middle level nodes, issuing a second IO indicating a second list of compression frames that includes all of the subset of leaf level compression frames.

In various examples, traversal of a first set of internal levels of a first tree-based index structure and traversal of a second set of internal levels of a second tree-based index structure is initiated at a same time. In various examples, the inner predicate is applied to top level nodes of both the first tree-based index structure and the second tree-based index structure is performed during overlapping time frames. In various examples, a first given second IO indicating a first given second list of compression frames that includes all of a first subset of leaf level compression frames of the first tree-based index structure is issued strictly prior to issuing a second given second IO indicating a second given second list of compression frames that includes all of a second subset of leaf level compression frames of the second tree-based index structure based on traversal of the second set of internal levels of the second tree-based index structure still being in progress after the traversal of the first set of internal levels of the first tree-based index structure is completed.

In various examples executing the query is further based on: adding, for each tree-based index structure, the plurality of rows of the relational database table indicated by the second subset of leaf nodes to a bitmap, where the bitmap includes all rows identified via traversal of all of the set of tree-based index structures; and/or emitting the all rows in an ordered row list based on serializing the bitmap into sorted order.

In various embodiments, any one of more of the various examples listed above are implemented in conjunction with performing some or all steps of FIG. 29J. In various embodiments, any set of the various examples listed above can be implemented in tandem, for example, in conjunction with performing some or all steps of FIG. 29J.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29J described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29J, for example, in conjunction with further implementing any one or more of the various examples described above.

In various embodiments, the operational instructions, when executed by the at least one processor, cause the database system to: determine a query for execution against a relational database table indicating a predicate applied to geospatial data of a geospatial data column; and/or execute the query. In various embodiment, executing the query is based on, for each tree-based index structure of a set of tree-based index structures included in geospatial index data of a segment: applying an inner predicate to internal level nodes when traversing a set of internal levels of the each tree-based index structure to identify a first subset of leaf nodes in a plurality of leaf nodes of the each tree-based index structure based on identifying internal nodes having internal node bounding boxes meeting the inner predicate; and/or applying a leaf predicate to only leaf nodes included in the first subset of leaf nodes of the tree-based index structure to identify a second subset of leaf nodes of the first subset of leaf nodes corresponding to only leaf nodes of the first subset of leaf nodes having corresponding leaf node bounding boxes meeting the leaf predicate. In various embodiments, a query resultant of the query is generated based on geospatial objects of the geospatial data column for ones of a plurality of rows of the relational database table indicated by the second subset of leaf nodes.

Figure 30A:
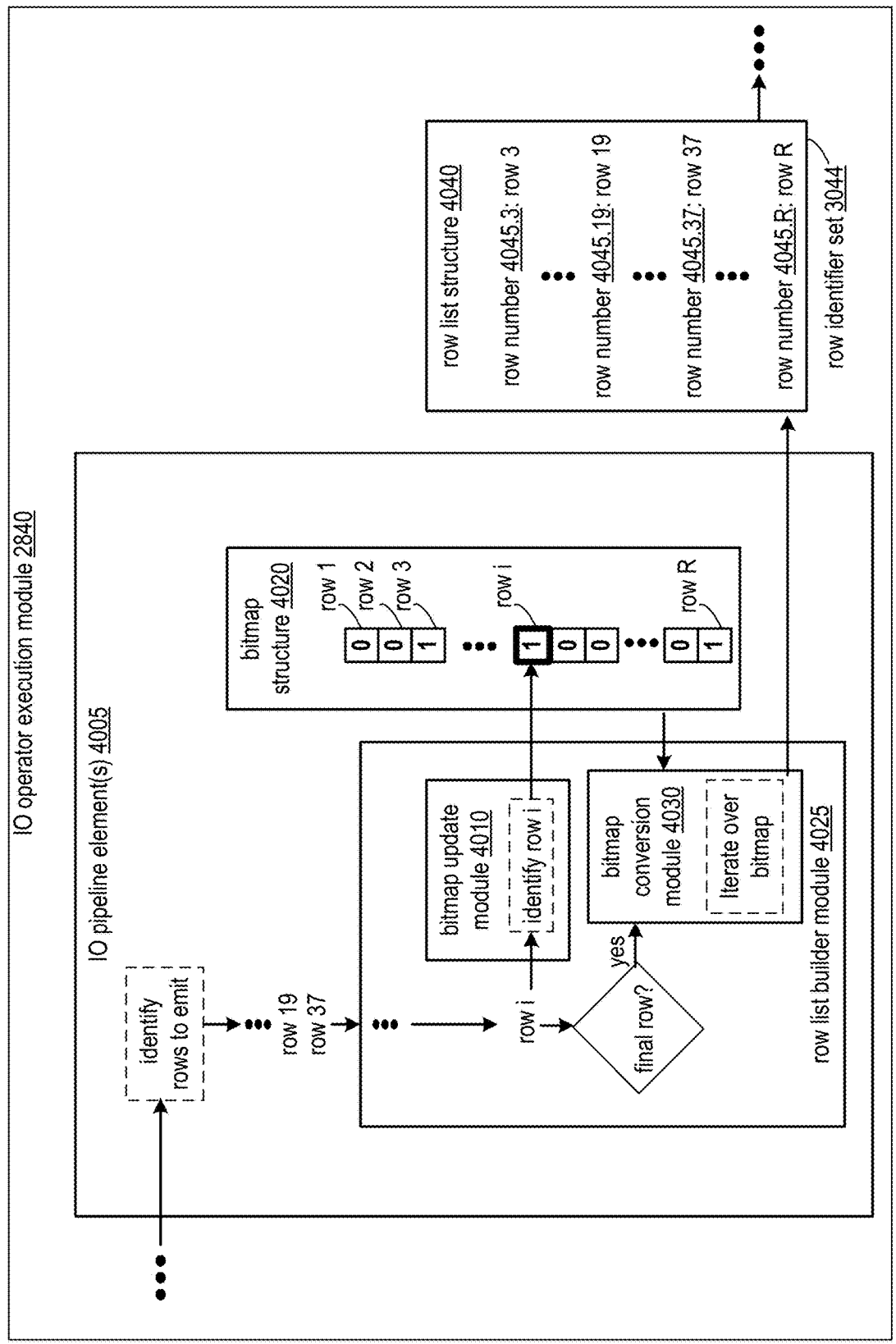
FIG. 30A is a schematic block diagram of an IO operator execution module that implements a row list builder module based on populating a bitmap structure in accordance with various embodiments.

FIG. 30A illustrates an embodiment of an IO operator execution module 2840 of database system 10 that implements a row list builder module 4025 based on populating a bitmap structure 4025. In particular, one or more IO pipeline elements 4005 of a corresponding IO pipeline executed by an IO operator execution module 2840 in conjunction with executing a corresponding query can be executed to emit a corresponding row list structure 4040 to implement row identifier set 3044 (or implement any output row list/row set described herein) based on populating a bitmap structure 4020 and further based on converting the bitmap structure 4020 into the row list structure 4040.

Some or all features and/or functionality of the operator execution module 2840 of FIG. 30A can implement: any embodiment of operator execution module 2840 described herein, and/or can implement any embodiment of database system 10 described herein, any corresponding processing of an IO pipeline, and/or any corresponding execution of a query described herein. Some or all features and/or functionality of the IO element(s) 4005 of FIG. 30A can implement any element of an IO pipeline described herein, such as: one or more index elements 3862, index elements 3512, and/or any other index elements and/or access to index structures described herein; one or more source elements 3014; one or more filter elements 3016; one or more set union elements 3218, one or more set operator elements 3318; UNION operations, and/or other union-ing/combining of row sets described herein; one or more set difference elements 3308 and/or other applying of set difference to row sets described herein; and/or any other elements of IO pipeline and/or corresponding processing of rows during query execution to apply query predicates described herein.

In some embodiments, because traversal of an index (e.g. the geospatial index data 3910) can branch, matching rows during query execution (e.g. as illustrated in FIGS. 29G and/or 29H) are not necessarily sequential in the structure. This can make it challenging to construct result lists in bounded memory. Combined with the forest-of-r-trees approach, a bitmap-backed row list can allow fast out-of-order row accounting in bounded memory, and can improve performance of query execution with various optimizations.

In some embodiments, a row list structure 4040 ("row list") is implemented as a data structure that holds a list of segment-local row numbers 4045. To indicate what range of row numbers a given row list may contain, each can have an upper and lower bound that is exposed (e.g. to the requestor entity/user entity). Row lists can be used in a few different contexts, the principal one being representing which rows have been filtered in a sliding window of rows being processed by an IO pipeline element 4005 of an IO pipeline 2840 (e.g. where row identifier sets 3044 as described herein are emitted as row list structures 4040.

Row list structures can be represented internally as a sorted list of non-overlapping contiguous ranges of rows that allow for fast searching, union, and intersection. A row list structure 4040 can be traversed via an iterator interface that supports the ability to advance one row at a time (e.g. via operator++), to the first row greater than or equal to a given row (e.g. via skipAhead( )), or over a set number of rows irrespective of those row values (e.g. via skipAheadRows( )). The sorted representation and/or forward traversal can be also most compatible with how the pipeline operator processes rows. As a result, the primary interface for building a row list can require rows be added in monotonically increasing order. This ordering can mean inserting a row is a constant-time operation, either extending the previous contiguous range in the list (e.g. if the last row added immediately precedes the one being added) or adding a new contiguous range (e.g. if there was a gap between added rows).

In some embodiments, particularly when implementing the geospatial index data 3910, it can be preferable to construct a row list without the constraint of needing to add rows in order. To accomplish this, an alternate implementation of the row list builder can be implemented to store each added row in a bitmap structure 4020 ("bitmap"), and to serialize that bitmap into a sorted row list when the requesting entity/user entity is finished adding rows. This can improve the technology of database systems by enabling out-of-order row processing, while still guaranteeing that an ordered row list is emitted.

In some embodiments, the conversion of the bitmap into a list of indexes (e.g. row numbers) where bits of the bitmap were set can be performed efficiently with GNU Compiler Collection (GCC) built-ins (e.g. _builtin_clzl( ) which operates on a single 64-bit word, and/or on some processors with AVX-512 SIMD instructions). These instructions can also be leveraged to zero the bitmap when it is initialized.

This builder implementation can require sizing of the bitmap such that the number of bits contained equals or exceeds the difference between the upper bound and lower bound of the row list to be built. In addition to imposing a size constraint, this can require knowledge of the bounds of the row list being constructed before rows are added.

Serializing the bitmap into a row list can require iterating over the entire bitmap regardless of how many rows were set. This is not very efficient if the number of rows added is small. To improve performance in that case, added rows are stored as row numbers in a set until a threshold number of rows (e.g. heuristically identified number of rows) is reached, at which point those row numbers are copied into the bitmap and use the bitmap for the remainder of processing. The memory and runtime cost of copying that set into the bitmap once the heuristic is reached grows linearly with the number of rows, but is much more efficient than traversing the whole bitmap in the case where only a few rows were added. In some embodiments, if the threshold number of rows of rows is never reached, the bitmap is never built, and the set of row numbers is sorted to render the row list to be emitted.

Such a bitmap builder can also be useful in improving efficiency when utilized to performing efficient row list union. In some embodiments, when there were many row lists being union-ed and many total ranges contained in those row lists, one approach is to store iterators over each row list e.g. in a min heap ordered by their current position. Until all of the iterators reach the end of their respective lists we do the following: (1) pop from the min heap, giving us an iterator pointing to the next row in the union-ed row list; (2) add the current contiguous range of rows from the iterator to the builder we're using to compile our union-ed row list; and/or (3) advance the popped iterator to the next contiguous range, and push it back into the min heap.

This approach can result in performing many costly min heap pop/push operations. In some embodiments, the cost of each pop/push call can scale with the number of row lists being union-ed, and/or the number of calls scales linearly with the number of contiguous ranges contained in all row lists. To improve query performance, the bitmap row list builder functionality can be applied in this case perform this union more efficiently. In some embodiments, this can include iterating over the incoming row lists, adding each row list to the bitmap builder representing the union-ed row list, and then serializing the bitmap to get the result of the union. In some embodiments, fixed-size batches of the incoming row lists are processed such that the bitmap has known size and bounds. In some embodiments, to take advantage of potentially contiguous incoming rows, a separate append rows function (e.g. appendRows(startRow, numRows)) is applied for adding a range of rows rather than adding them one-at-a-time. This can be useful in avoiding the duplicate work of reading the same word from the bitmap, setting the bit corresponding to the added row, and writing the word back to the bitmap. In some embodiments of implementing the append rows function, the first word of the contiguous range can be computed using bit shifts (e.g. potentially partial on left and right), any complete words can be set (e.g. with std::memset( )); and/or the final word in the range can be computed (potentially partial on the right).

As illustrated in FIG. 30A, one or more IO pipeline elements 4005 can be implemented to identify rows to emit (e.g. receive one or more incoming row lists for filtering, receive two or more incoming row lists to have a set operator applied such as a set intersection, set union, or set difference; access one or more index structures to identify rows meeting certain predicates, filter incoming rows based on applying certain predicates to sourced column values, etc.). These rows are optionally received out of row order (e.g. in this example, the stream of incoming rows includes row 37, and then row 19). For example, the rows are identified out of row order based on traversing through one or more tree-based index structures, such as the tree-based index structures 3911 of geospatial index data. As another example, the rows are identified out of row order based on applying a set UNION operator to multiple incoming row lists.

A row list builder module 4025 can process the incoming rows based on adding them to a bitmap update module. Each given incoming row i (or each incoming row once the predetermined threshold number of rows have been processed to trigger use of the bitmap) can be processed via a bitmap update module 4010, where a bit in the bitmap (e.g. at an index in the bitmap corresponding to the respective row number is set as '1', where all entries of '1' indicate row numbers that have been identified to be emitted. In this example, the bitmap structure can indicate identification of rows 19 and 37 based on setting bits at corresponding indexes (e.g. indexes 19 and 37 if both the rows and bitmap are zero-indexed or are both one-indexed).

Once the final row is identified for being emitted, the bitmap structure 4020 can be converted into the row list structure 4040 via bitmap conversion module 4030 based on iterating over the bitmap, starting from the first entry at the first index (e.g. row 1) and adding row numbers 4045 only where corresponding indexes in the bitmap have bits set to 1. This renders listing of the identified row numbers in order (e.g. in increasing order, or other ordering reflected in the index ordering in the respective bitmap). In this example, the row list structure 4040 includes a row number indicating row 3, based on being the first ordered identified row indicated in the bitmap structure (e.g. rows 1 and 2 were not identified to be emitted). This row list can implement the row identifier set 3044 emitted by a corresponding IO pipeline element for further processing in conjunction with executing the query.

Figure 30B:
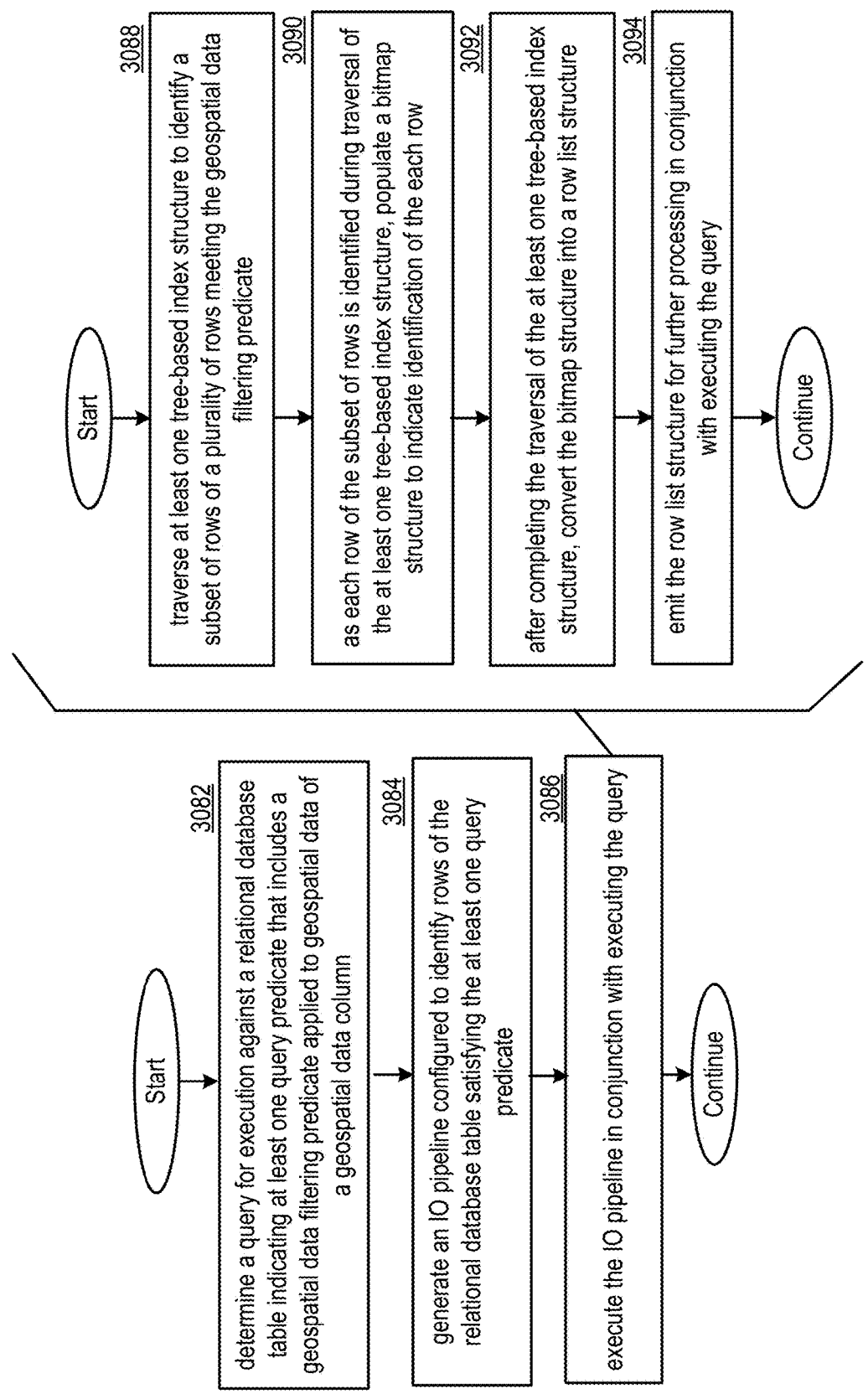
FIG. 30B is a logic diagram illustrating a method for execution in accordance with various embodiments.

FIG. 30B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30B. Some or all of the method of FIG. 30B can be performed by nodes executing a query in conjunction with a query execution, for example, via one or more nodes 37 implemented as nodes of a query execution module 2504 implementing a query execution plan 2405. Some or all of the steps of FIG. 30B can optionally be performed by any other processing module of the database system 10. Some or all of the steps of FIG. 30B can be performed to implement some or all of the functionality of the database system 10 as described in conjunction with FIG. 30A, for example, by implementing row list builder module 4025 to generate a bitmap structure 4020 and convert the bitmap structure into a row list structure 4040. Some or all steps of FIG. 30B can be performed by database system 10 in accordance with other embodiments of the database system 10 and/or nodes 37 discussed herein. Some or all steps of FIG. 30B can be performed by database system 10 in conjunction with performing: some or all steps of FIG. 29I, some or all steps of FIG. 29J; some or all steps of FIG. 29K; and/or some or all steps of any other method described herein.

Step 3082 includes determining a query for execution against a relational database table indicating at least one query predicate that includes a geospatial data filtering predicate applied to geospatial data of a geospatial data column. Step 3084 includes generating an IO pipeline configured to identify rows of the relational database table satisfying the at least one query predicate. Step 3086 includes executing the IO pipeline in conjunction with executing the query.

Performing step 3086 can include performing some or all of steps 3088, 3090, 3092, and/or 3094. Performing step 3088 includes traversing at least one tree-based index structure to identify a subset of rows of a plurality of rows meeting the geospatial data filtering predicate. Step 3090 includes, as each row of the subset of rows is identified during traversal of the at least one tree-based index structure, populating a bitmap structure to indicate identification of the each row. Step 3092 includes, after completing the traversal of the at least one tree-based index structure, converting the bitmap structure into a row list structure. Step 3094 includes emitting the row list structure for further processing in conjunction with executing the query.

In various examples, the relational database table is stored across a plurality of segments. In various examples, the IO pipeline is generated and executed for one segment of the plurality of segments to identify the subset of rows from a plurality of rows stored in the segment. In various examples, a plurality of other IO pipelines are generated and executed for other ones of the plurality of segments to identify other subsets of rows from other pluralities of rows stored in the segment. In various examples, executing the query is further based on, for each segment in the plurality of segments, traversing each corresponding tree-based index structure of a corresponding set of tree-based index structures included in corresponding geospatial index data of the each segment.

In various examples, the method further includes initializing the bitmap structure to have a fixed number of bits corresponding to a set of possible rows for the row list structure.

In various examples, initializing the bitmap structure includes setting each of the fixed number of entries as having a value of zero. In various examples, populating the bitmap structure to indicate identification of the each row includes resetting a corresponding one of the fixed number of bits corresponding to the each row as having a value of one.

In various examples, the set of possible rows for the row list structure is based on a row number range corresponding the set of possible rows. In various examples, row list structure includes an ordered list of row numbers corresponding to the subset of rows.

In various examples, after completing the traversal of the at least one tree-based index structure, converting the bitmap structure into the row list structure includes iterating over the bitmap structure and included row numbers corresponding to ones of the fixed number of bits denoting identification of a corresponding row during the traversal of the at least one tree-based index structure.

In various examples, the bitmap structure is initialized prior to initiating the traversal of the at least one tree-based index structure.

In various examples, the bitmap structure is initialized after initiating the traversal of the at least one tree-based index structure in response to having identified at least a threshold number of rows.

In various examples, executing the IO pipeline in conjunction with executing the query is further based on: adding row numbers corresponding to a first set of identified rows to a set structure during a first temporal period during the traversal of the at least one tree-based index structure; detecting the first set of identified rows included in the set structure includes the threshold number of rows; and/or, in response to detecting the set structure includes the threshold number of rows, initializing the bitmap structure and populating the bitmap structure to indicate the first set of identified rows having corresponding row numbers included in the set structure. In various examples, the bitmap structure is further populated structure during a second temporal period to further indicate a second set of identified rows identified during the second temporal period via further traversal of the at least one tree-based index structure. In various examples, the subset of rows is a set union of the first set of rows and the second set of rows.

In various examples, the plurality of rows have a corresponding row ordering, In various examples, the subset of rows meeting the geospatial data filtering predicate are identified during the traversal of the at least one tree-based index structure in an order that is different from the corresponding row ordering. In various examples, the row list structure is generated from the bitmap structure to indicate the subset of rows listed in accordance with the corresponding row ordering.

In various examples, the subset of rows are identified during the during traversal of the at least one tree-based index structure in an order that is different from the corresponding row ordering based on a structuring of rows in the at least one tree-based index structure not being sequential.

In various examples, the method further includes: determining a second query for execution against the relational database table indicating at least one second query predicate; generating a second IO pipeline for the second query; and/or executing the second IO pipeline in conjunction with executing the second query. In various examples, executing the second IO pipeline in conjunction with executing the second query is based on: generating a plurality of row list structures via execution of a first plurality of IO pipeline elements of the second IO pipeline; populating a second bitmap structure based on iterating over each of the plurality of row list structures to indicate identification of rows included in any one of the plurality of row list structures; after completing the iterating over all of the plurality of row list structures, converting the second bitmap structure into a second row list structure; and/or emitting the second row list structure for further processing in conjunction with executing the second query.

In various examples, the second bitmap structure is initialized to have a fixed number of bits corresponding to a predetermined row number range. In various examples, a fixed-sized batch of each of the plurality of row list structures, corresponding to the predetermined row number range, is processed to populate the second bitmap structure.

In various examples, executing the second IO pipeline in conjunction with executing the second query is further based on populating a plurality of second bitmap structures that includes the second bitmap structure. In various examples, populating each of the plurality of second bitmap structures is based on iterating over a corresponding fixed-size batch of each of the plurality of row list structures. In various examples, the each of the plurality of second bitmap structures is initialized to have a corresponding fixed number of bits corresponding to a corresponding predetermined row number range. In various examples, the corresponding fixed-size batch corresponds to the corresponding predetermined row number range.

In various examples, at least one of the plurality of row list structures includes a list of consecutively ordered rows. In various examples, populating the second bitmap structure to indicate identification of the list of consecutively ordered rows is based on performing an append rows function indicating a starting row of the list of consecutively ordered rows and further indicating a number of rows in the list of consecutively ordered rows.

In various embodiments, any one of more of the various examples listed above are implemented in conjunction with performing some or all steps of FIG. 30B. In various embodiments, any set of the various examples listed above can be implemented in tandem, for example, in conjunction with performing some or all steps of FIG. 30B.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30B, for example, in conjunction with further implementing any one or more of the various examples described above.

In various embodiments, the operational instructions, when executed by the at least one processor, cause the database system to: determine a query for execution against a relational database table indicating at least one query predicate that includes a geospatial data filtering predicate applied to geospatial data of a geospatial data column; generate an IO pipeline configured to identify rows of the relational database table satisfying the at least one query predicate; and/or execute the IO pipeline in conjunction with executing the query. In various embodiments, executing the IO pipeline in conjunction with executing the query is based on: traversing at least one tree-based index structure to identify a subset of rows of a plurality of rows meeting the geospatial data filtering predicate; as each row of the subset of rows is identified during traversal of the at least one tree-based index structure, populating a bitmap structure to indicate identification of the each row, after completing the traversal of the at least one tree-based index structure, converting the bitmap structure into a row list structure; and/or emitting the row list structure for further processing in conjunction with executing the query.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A store and compute sub-system of a database system, wherein the store and compute sub-system comprises:
   pluralities of computing nodes of a plurality of computing device clusters, wherein a computing device cluster of the plurality of computing device clusters includes a plurality of computing devices, wherein a computing device of the plurality of computing devices includes a plurality of computing nodes of the pluralities of computing nodes, wherein a first computing node of the plurality of computing nodes of the computing device includes:
   a first main memory;
   a first plurality of memory devices, wherein a first memory device of the first plurality of memory devices stores, in a long-term storage (LTS) format, a first segment of a plurality of segments of a first geospatial dataset, wherein the first segment includes a first geospatial index, wherein the first geospatial index includes a first set of tree structures for identifying rows of the first segment based on a geographic boundary protocol; and
   a first plurality of processing modules, wherein, for a first query regarding the first geospatial dataset:
      a first processing module of the first plurality of processing modules is configured as a first IO pipeline to control processing of the first segment to produce a first portion of first query read raw data, wherein the first IO pipeline controls processing of the first segment by:
         traversing, via a cursor pipeline element of a first plurality of pipeline elements of the first IO pipeline, the first geospatial index to identify rows of the first segment related to the first query, wherein the cursor pipeline element implements the geographic boundary protocol;
         providing the identified rows to a row list builder pipeline element of the first plurality of pipeline elements; and
         when the row list builder pipeline element completes a row list:
            directing the row list through remaining pipeline elements of the first plurality of pipeline elements to produce the first portion of the first query read raw data.

2. The store and compute sub-system of claim 1, wherein the cursor pipeline element is operable to traverse the first geospatial index via the geographic boundary protocol by:
   for a first tree structure of the set of tree structures:

applying an internal node geographic boundary filtering condition to first layer nodes of a first layer of the first tree structure;

when the internal node geographic boundary filtering condition matches a set of first layer nodes of the first layer nodes:

accessing, from the set of first layer nodes, a list of second layer nodes of a second layer of the first tree structure;

applying the internal node geographic boundary filtering condition to second layer nodes indicated in the list of second layer nodes;

when the internal node geographic boundary filtering condition matches a set of second layer nodes of the second layer nodes:

accessing, from the set of second layer nodes, a list of third layer nodes of a third layer of the first tree structure;

applying a leaf node geographic boundary filtering condition to third layer nodes indicated in the list of third layer nodes; and when the leaf node bounding box filtering condition matches a set of third layer nodes of the third layer nodes:

providing a set of rows indicated in the set of third layer nodes to the row list builder pipeline element.

3. The store and compute sub-system of claim 1, wherein the cursor pipeline element is operable to traverse the first geospatial index via the geographic boundary protocol by:

for a first tree structure of the set of tree structures:

applying an internal node geographic boundary filtering condition to first layer nodes of a first layer of the first tree structure;

when the internal node geographic boundary filtering condition matches a set of first layer nodes of the first layer nodes:

accessing, from the set of first layer nodes, a list of second layer nodes of a second layer of the first tree structure;

applying the internal node geographic boundary filtering condition to second layer nodes indicated in the list of second layer nodes;

when the internal node geographic boundary filtering condition matches a set of second layer nodes of the second layer nodes:

accessing, from the set of second layer nodes, a list of third layer nodes of a third layer of the first tree structure;

applying the internal node geographic boundary filtering condition to third layer nodes indicated in the list of third layer nodes;

when the internal node geographic boundary filtering condition matches a set of third layer nodes of the third layer nodes:

accessing, from the set of third layer nodes, a list of fourth layer nodes of a fourth layer of the first tree structure;

applying a leaf node geographic boundary filtering condition to fourth layer nodes indicated in the list of fourth layer nodes; and when the leaf node geographic boundary filtering condition matches a set of fourth layer nodes of the fourth layer nodes:

providing a set of rows indicated in the set of fourth layer nodes to the row list builder pipeline element.

4. The store and compute sub-system of claim 2, wherein a first layer node of the first layer nodes includes geographic boundary information computed from a set of corresponding children nodes of the first tree structure and a pointer to a starting location of the set of corresponding children nodes.

5. The store and compute sub-system of claim 2, wherein a second layer node of the second layer nodes includes geographic boundary information computed from a set of corresponding children nodes of the first tree structure and a pointer to a starting location of the set of corresponding children nodes.

6. The store and compute sub-system of claim 2, wherein a third layer node of the third layer nodes includes a geographic boundary corresponding to at least a portion of the first geospatial dataset and a row number of the at least the portion of the first geospatial dataset.

7. The store and compute sub-system of claim 1, wherein the cursor pipeline element is operable to traverse the first geospatial index via the geographic boundary protocol by:

for a second tree structure of the set of tree structures:

applying an internal node geographic boundary filtering condition to first layer nodes of a first layer of the second tree structure;

when the internal node geographic boundary filtering condition matches a set of first layer nodes of the first layer nodes:

accessing, from the set of first layer nodes, a list of second layer nodes of a second layer of the second tree structure;

applying the internal node geographic boundary filtering condition to second layer nodes indicated in the list of second layer nodes;

when the internal node geographic boundary filtering condition matches a set of second layer nodes of the second layer nodes:

accessing, from the set of second layer nodes, a list of third layer nodes of a third layer of the second tree structure;

applying a leaf node geographic boundary filtering condition to third layer nodes indicated in the list of third layer nodes; and when the leaf node geographic boundary filtering condition matches a set of third layer nodes of the third layer nodes:

providing a set of rows indicated in the set of third layer nodes to the row list builder pipeline element.

8. The store and compute sub-system of claim 1 further comprises:

wherein a second memory device of the first plurality of memory devices stores, in the LTS format, a second segment of the plurality of segments of the first geospatial dataset, wherein the second segment includes a second geospatial index, wherein the second geospatial index includes a second set of tree structures for identifying rows of the second segment based on the geographic boundary protocol; and wherein, for the first query regarding the first geospatial dataset:

a second processing module of the first plurality of processing modules is configured as a second IO pipeline to control processing of the second segment to produce second query read raw data, wherein the second IO pipeline controls processing of the second segment by:

traversing, via a second cursor pipeline element of a second plurality of pipeline elements of the second IO pipeline, the second geospatial index to identify rows of the second segment related to the first query, wherein the second cursor pipeline element implements the geographic boundary protocol;

providing the identified rows to a second row list builder pipeline element of the second plurality of pipeline elements; and when the second row list builder pipeline element completes a second row list:

directing the second row list through remaining pipeline elements of the second plurality of pipeline elements to produce a second portion of the first query read raw data.

9. A computer readable memory comprises:

a first memory section that stores operational instructions that when executed by a first processing module of a first plurality of processing modules of a first computing node of a plurality of computing nodes of a plurality of computing device clusters of a data store and compute sub-system of a database system, cause the first processing module to:

when configured as a first IO pipeline to control processing of a first segment of a plurality of segments of a first geospatial dataset of a first query, wherein the first segment is stored, in a long-term storage (LTS) format in a first memory device of a first plurality of memory devices of the first computing node, wherein the first segment includes a first geospatial index, and wherein the first geospatial index includes a first set of tree structures for identifying rows of the first segment based on a geographic boundary protocol:

traverse, via a cursor pipeline element of a first plurality of pipeline elements of the first IO pipeline, the first geospatial index to identify rows of the first segment related to the first query, wherein the cursor pipeline element implements the geographic boundary protocol;

provide the identified rows to a row list builder pipeline element of the first plurality of pipeline elements; and when the row list builder pipeline element completes a row list:

direct the row list through remaining pipeline elements of the first plurality of pipeline elements to produce a first portion of first query read raw data.

10. The computer readable memory of claim 9, wherein the first memory section further stores operational instructions that when executed by the first processing module configured as the first IO pipeline, cause the cursor pipeline element to traverse the first geospatial index via the geographic boundary protocol by:

for a first tree structure of the set of tree structures:

applying an internal node geographic boundary filtering condition to first layer nodes of a first layer of the first tree structure;

when the internal node geographic boundary filtering condition matches a set of first layer nodes of the first layer nodes:

accessing, from the set of first layer nodes, a list of second layer nodes of a second layer of the first tree structure;

applying the internal node geographic boundary filtering condition to second layer nodes indicated in the list of second layer nodes;

when the internal node geographic boundary filtering condition matches a set of second layer nodes of the second layer nodes:

accessing, from the set of second layer nodes, a list of third layer nodes of a third layer of the first tree structure;

applying a leaf node geographic boundary filtering condition to third layer nodes indicated in the list of third layer nodes; and when the leaf node bounding box filtering condition matches a set of third layer nodes of the third layer nodes:

providing a set of rows indicated in the set of third layer nodes to the row list builder pipeline element.

11. The computer readable memory of claim 9, wherein the first memory section further stores operational instructions that when executed by the first processing module configured as the first IO pipeline, cause the cursor pipeline element to traverse the first geospatial index via the geographic boundary protocol by:

for a first tree structure of the set of tree structures:

applying an internal node geographic boundary filtering condition to first layer nodes of a first layer of the first tree structure;

when the internal node geographic boundary filtering condition matches a set of first layer nodes of the first layer nodes:

accessing, from the set of first layer nodes, a list of second layer nodes of a second layer of the first tree structure;

applying the internal node geographic boundary filtering condition to second layer nodes indicated in the list of second layer nodes;

when the internal node geographic boundary filtering condition matches a set of second layer nodes of the second layer nodes:

accessing, from the set of second layer nodes, a list of third layer nodes of a third layer of the first tree structure;

applying the internal node geographic boundary filtering condition to third layer nodes indicated in the list of third layer nodes;

when the internal node geographic boundary filtering condition matches a set of third layer nodes of the third layer nodes:

accessing, from the set of third layer nodes, a list of fourth layer nodes of a fourth layer of the first tree structure;

applying a leaf node geographic boundary filtering condition to fourth layer nodes indicated in the list of fourth layer nodes; and when the leaf node geographic boundary filtering condition matches a set of fourth layer nodes of the fourth layer nodes:

providing a set of rows indicated in the set of fourth layer nodes to the row list builder pipeline element.

12. The computer readable memory section of claim 11, wherein a first layer node of the first layer nodes includes geographic boundary information computed from a set of corresponding children nodes of the first tree structure and a pointer to a starting location of the set of corresponding children nodes.

13. The computer readable memory section of claim 11, wherein a second layer node of the second layer nodes includes geographic boundary information computed from a set of corresponding children nodes of the first tree structure and a pointer to a starting location of the set of corresponding children nodes.

14. The computer readable memory section of claim 11, wherein a third layer node of the third layer nodes includes a geographic boundary corresponding to at least a portion of the first geospatial dataset and a row number of the at least the portion of the first geospatial dataset.

15. The computer readable memory of claim 9, wherein the first memory section further stores operational instructions that when executed by the first processing module configured as the first IO pipeline, cause the cursor pipeline element to traverse the first geospatial index via the geographic boundary protocol by:
   for a second tree structure of the set of tree structures:
     applying an internal node geographic boundary filtering condition to first layer nodes of a first layer of the second tree structure;
     when the internal node geographic boundary filtering condition matches a set of first layer nodes of the first layer nodes:
       accessing, from the set of first layer nodes, a list of second layer nodes of a second layer of the second tree structure;
       applying the internal node geographic boundary filtering condition to second layer nodes indicated in the list of second layer nodes;
     when the internal node geographic boundary filtering condition matches a set of second layer nodes of the second layer nodes:
       accessing, from the set of second layer nodes, a list of third layer nodes of a third layer of the second tree structure;
       applying a leaf node geographic boundary filtering condition to third layer nodes indicated in the list of third layer nodes; and
     when the leaf node geographic boundary filtering condition matches a set of third layer nodes of the third layer nodes:
       providing a set of rows indicated in the set of third layer nodes to the row list builder pipeline element.

16. The computer readable memory of claim 9 further comprises:
   a second memory section that stores operational instructions that when executed by a second processing module of the first plurality of processing modules, cause the second processing module to:
   when configured as a second IO pipeline to control processing of a second segment of the plurality of segments of the first geospatial dataset, wherein the second segment is stored, in the LTS format in a second memory device of the first plurality of memory devices, wherein the second segment includes a second geospatial index, and wherein the second geospatial index includes a second set of tree structures for identifying rows of the second segment based on the geographic boundary protocol:
     traverse, via a second cursor pipeline element of a second plurality of pipeline elements of the second IO pipeline, the second geospatial index to identify rows of the second segment related to the first query, wherein the second cursor pipeline element implements the geographic boundary protocol;
     providing the identified rows to a second row list builder pipeline element of the second plurality of pipeline elements; and
     when the second row list builder pipeline element completes a second row list:
       directing the second row list through remaining pipeline elements of the second plurality of pipeline elements to produce a second portion of the first query read raw data.

* * * * *